Gray, Jr. et al.

United States Patent [19]

[11] 4,158,886

[45] Jun. 19, 1979

[54] OPERATOR CONSOLE FOR A REPRODUCTION MACHINE

[75] Inventors: Gerald A. Gray, Jr., Fairport; Edward L. Steiner, Macedon, both of N.Y.

[73] Assignee: Xerox Corporation, Stamford, Conn.

[21] Appl. No.: 829,027

[22] Filed: Aug. 30, 1977

[51] Int. Cl.[2] .......................... G06F 9/06; G06F 15/20

[52] U.S. Cl. .................................... 364/518; 235/304; 355/14; 364/900

[58] Field of Search ...................... 235/304, 304.1, 302; 364/200, 900, 518; 355/14

[56] References Cited

U.S. PATENT DOCUMENTS

| | | | |
|---|---|---|---|
| 3,979,057 | 9/1976 | Katz et al. | 364/706 |
| 4,034,194 | 7/1977 | Thomas et al. | 235/302 |
| 4,035,072 | 7/1977 | Deetz et al. | 355/14 |

*Primary Examiner*—Charles E. Atkinson

[57] ABSTRACT

An operator console for a reproduction machine, with the console including a fixed number of input selection devices, e.g. pushbuttons, for initiating machine activity. The activation of the machine components is preferably controlled by a digital computer being instructed by a plurality of operating programs. The selection of the same console input device will initiate a different machine activity depending on what program is currently instructing the machine.

5 Claims, 57 Drawing Figures

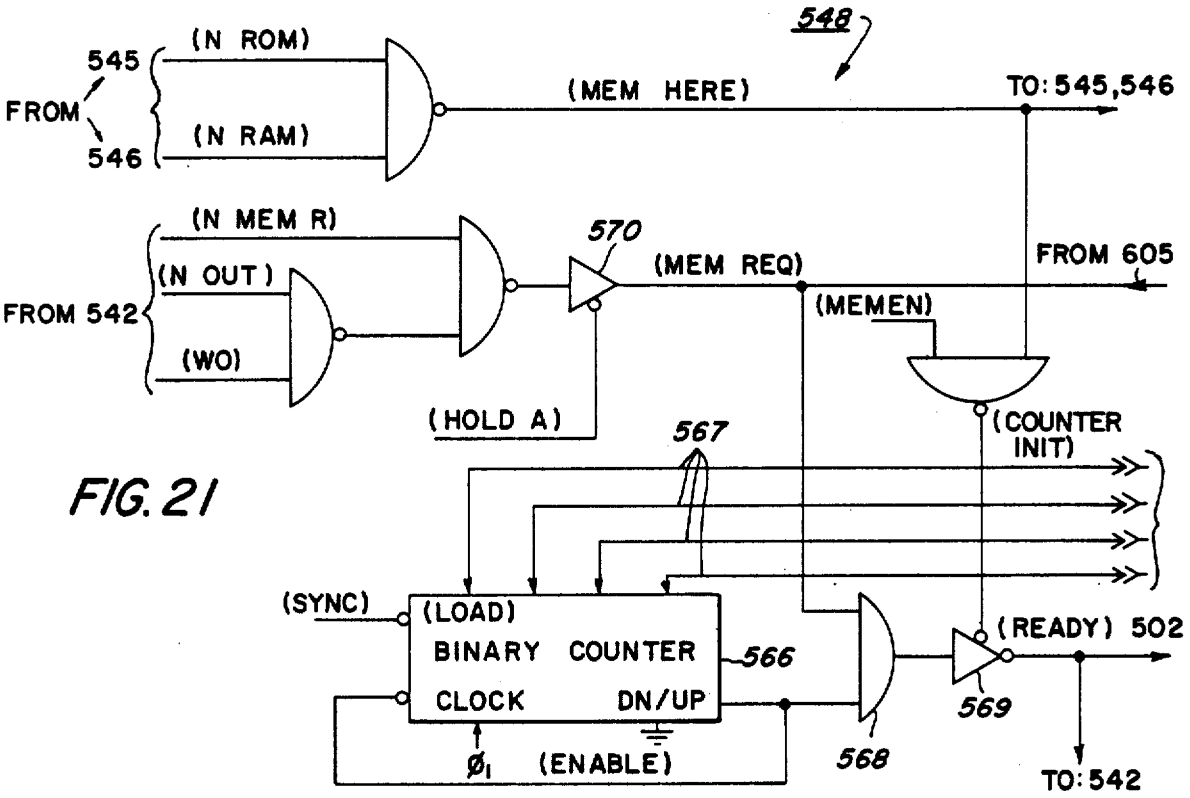
FIG. 21
MEMORY READY
FIG. 24
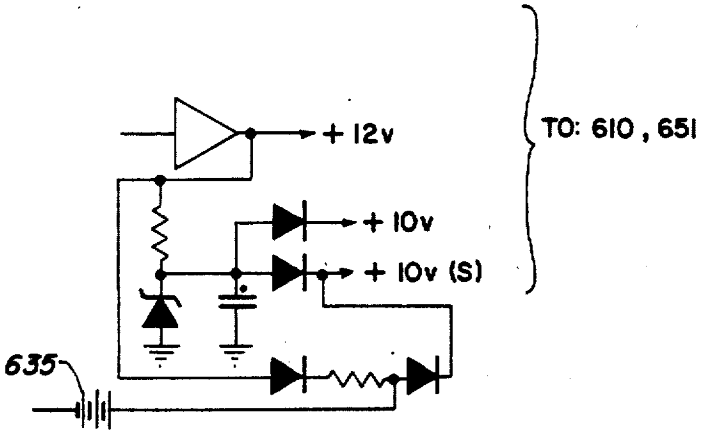

PROLOGUE

LOOP

EPILOGUE

LEGEND:
CF-CONTROLLER FAULT
BF-BUS FAULT
RF-REMOTE FAULT

STATE CHECKER ROUTINE
(TABLE I)

MACHINE INTERRUPT ROUTINE

LEGEND:

PNTR- POINTER
INCRM- INCREMENT
REL- RELATIVE
ADDR- ADDRESS
SR- SHIFT REGISTER
REG- REGISTER
SUBR- SUBROUTINE

REAL TIME INTERRUPT

LEGEND:

PNTR - POINTER
RTC - REAL TIME COUNTER
CNTR - COUNTER
REG - REGISTER

OPERATOR CONSOLE FOR A REPRODUCTION MACHINE

BACKGROUND OF THE INVENTION

This invention relates to electrostatographic xerographic type reproduction machines, and more particularly, to an improved control system for such machines.

The advent of higher speed and more complex copiers and reproduction machines has brought with it a corresponding increase in the complexity in the machine control wiring and logic. While this complexity manifests itself in many ways, perhaps the most onerous involves the inflexibility of the typical control logic/wiring systems. For as can be appreciated, simple unsophisticated machines with relatively simple control logic and wiring can be altered and modified easily to incorporate changes, retrofits, and the like. Servicing and repair of the control logic is also fairly simple. On the other hand, some modern high speed machines, which often include sorters, a document handler, choice of copy size, multiple paper trays, jam protection and the like have extremely complex logic systems making even the most minor changes and improvements in the control logic difficult, expensive and time consuming. And servicing or repairing the machine control logic may similarly entail substantial difficulty, time and expense.

To mitigate problems of the type alluded to, a programmable controller may be used, enabling changes and improvements in the machine operation to be made through the expediency of reprogramming the controller. However, the control data which operates the machine and which is stored in the controller memory pending use, must be transferred to the various machine components at the proper time and in the correct sequence without unduly interfering with or intruding unnecessarily upon the other essential functions and operations of the controller.

As noted above, the obvious trend is to offer increasingly more features on these machines. Accordingly, there must be provided a way of selecting the particular feature desired. One of the most widely used methods is to provide an input selection device, for example, a button on an operator console for each feature. However, in order to provide a button for each feature, it may require redesign of the operator console especially where a new feature is added late in the design phase of a new product. Moreover, the operation of the machine may tend to become more confusing to the user when there is a large number of buttons on the console.

OBJECTS AND SUMMARY OF THE INVENTION

Therefore, it is the primary object of this invention to provide a control system for a reproduction machine which minimizes the required number of console input selection devices, while still permitting selection of a wide variety of machine operations.

This and other objects of the subject invention is accomplished by a control system which permits the utilization of the same console input selection device to initiate at least two entirely different machine activities. Preferably, the machine components are controlled by a digital computer being instructed by a stored program. It is a feature of this invention that other programs are also stored in the computer memory, with these programs controlling the machine in a particular manner.

The selection of the same console device will initiate entirely different machine activities depending on the program currently instructing the computer.

BRIEF DESCRIPTION OF THE DRAWINGS

Other objects and advantages will be apparent from the ensuing description and drawings in which:

FIG. 21 is a logic schematic of the CPU memory ready;

FIG. 24 is a logic schematic of the nonvolatile memory power supply;

DETAILED DESCRIPTION OF THE PREFERRED EMBODIMENT OF THE INVENTION

Figure 1:
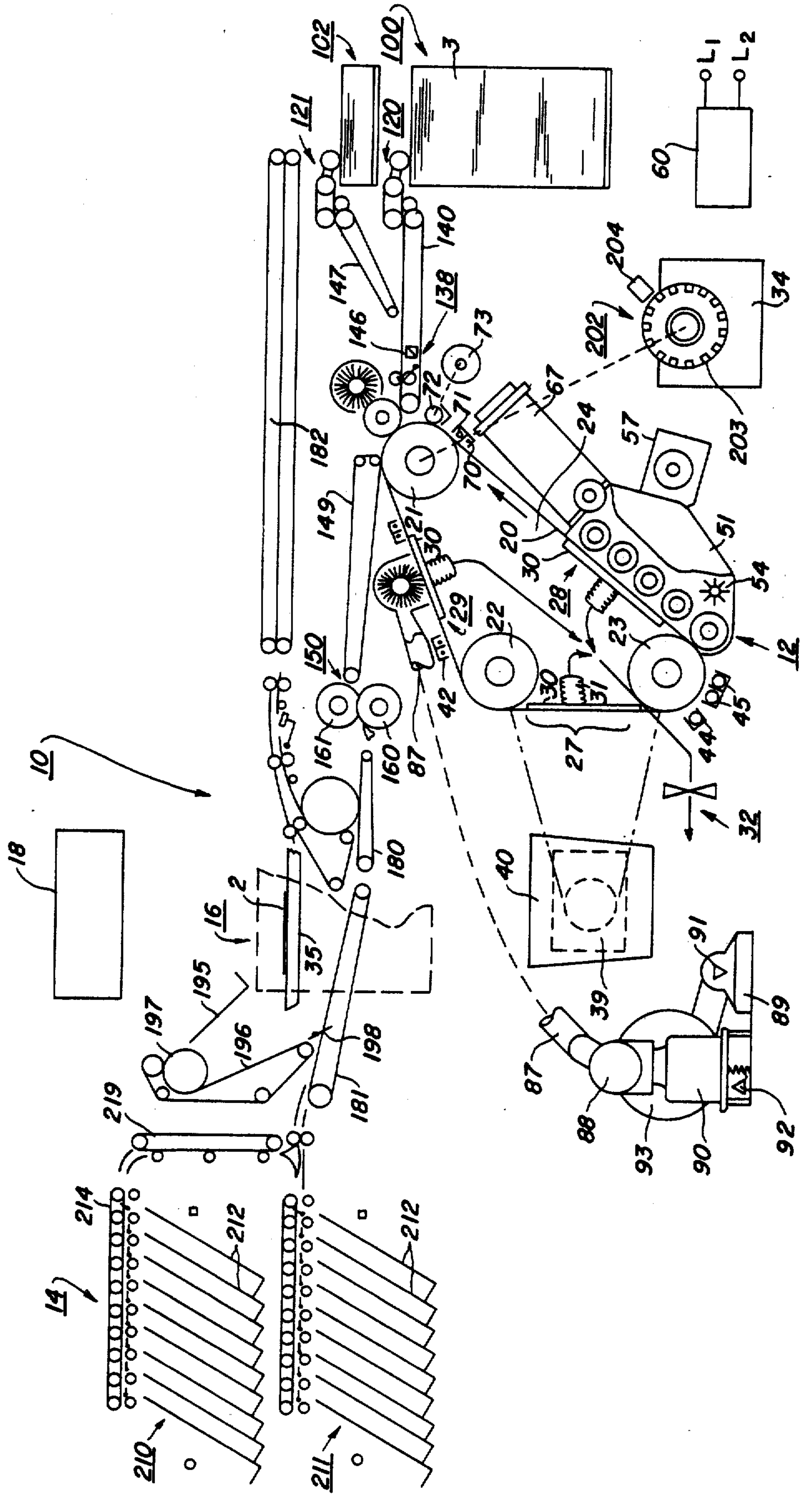
FIG. 1 is a schematic representation of an exemplary reproduction apparatus incorporating the control system of the present invention.
Figure 2:
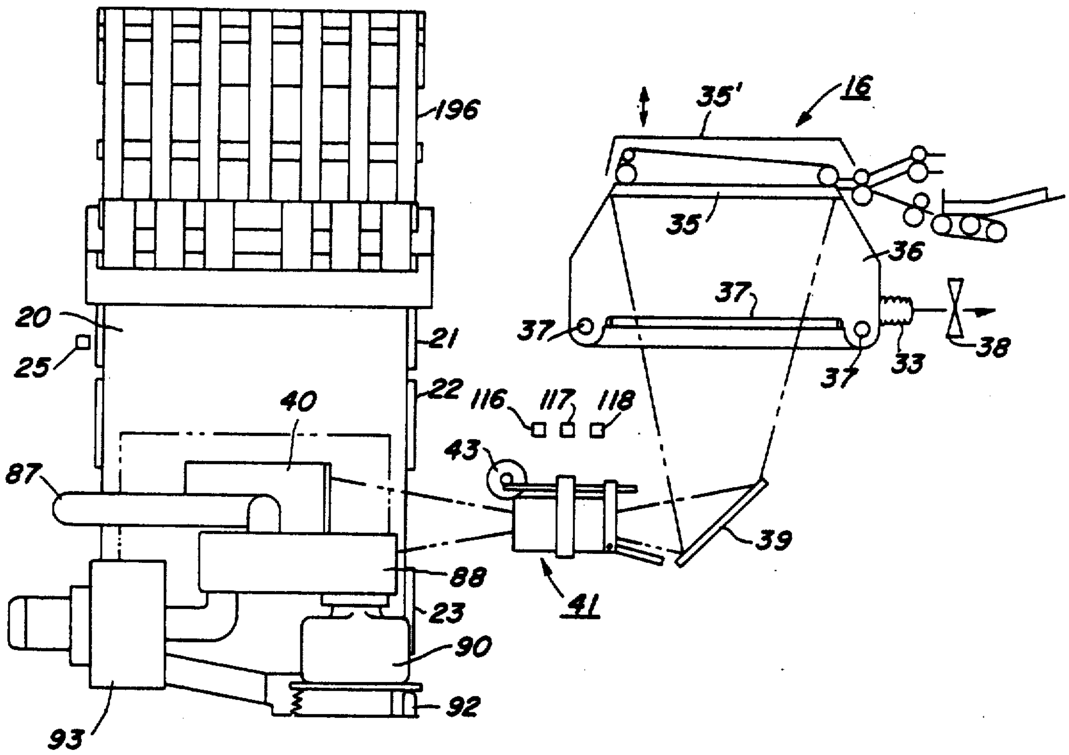
FIG. 2 is a vertical sectional view of the apparatus shown in FIG. 1 along the image plane.
Figure 3:
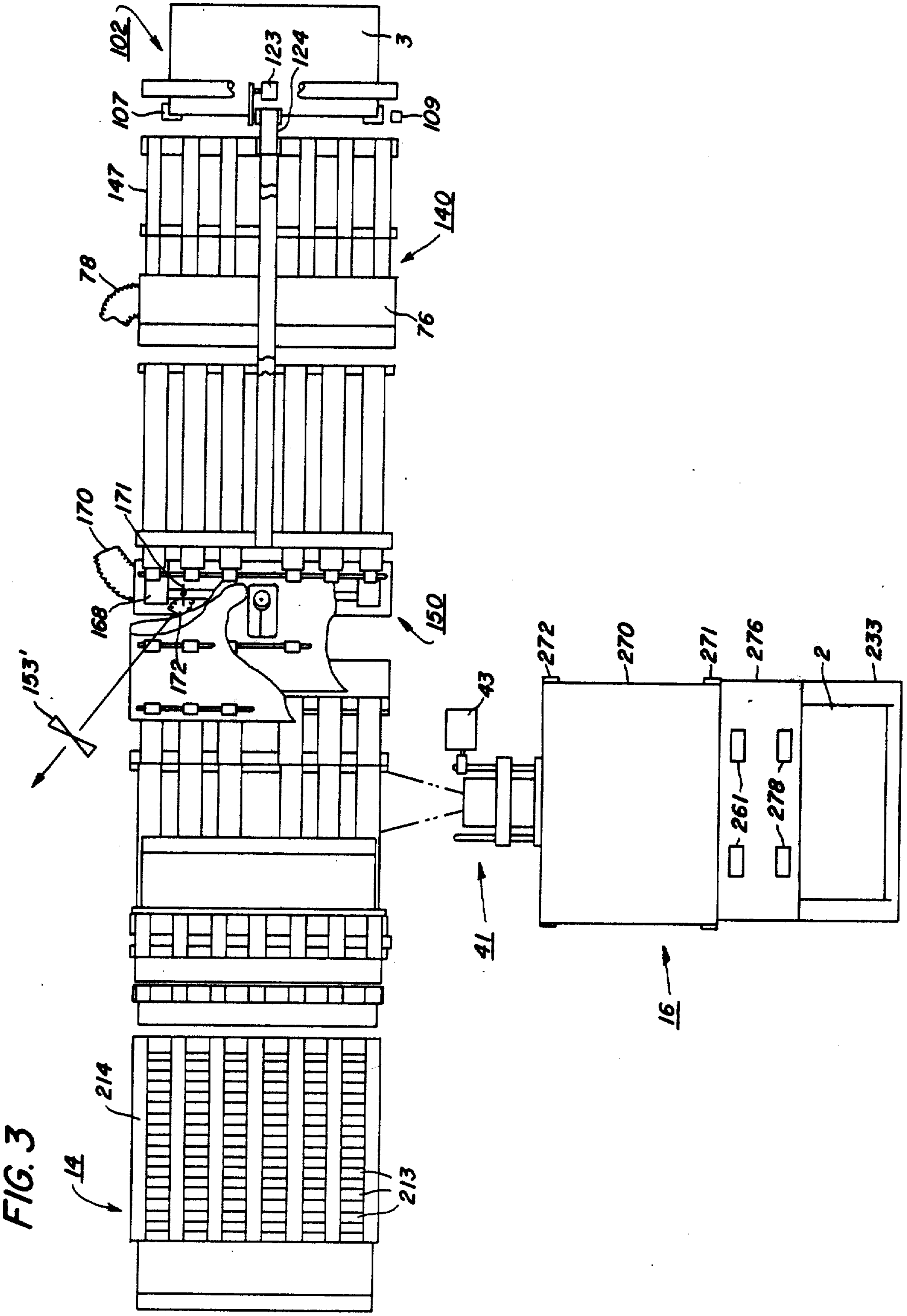
FIG. 3 is a top plane view of the apparatus shown in FIG. 1.

Referring particularly to FIGS. 1*a*, 2 and 3 of the drawings, there is shown, in schematic outline, an electrostatic reproduction system or host machine, identified by numeral 10, incorporating the control arrangement of the present invention. To facilitate description, the reproduction system 10 is divided into a main electrostatic xerographic processor 12, sorter 14, document handler 16, and controller 18. Other processor, sorter and/or document handler types and constructions, and different combinations thereof may instead by envisioned.

PROCESSOR

Processor 12 utilizes a photoreceptor in the form of an endless photoconductive belt 20 supported in generally triangular configuration by rolls 21, 22, 23. Belt supporting rolls 21, 22, 23 are in turn rotatably journaled on subframe 24.

In the exemplary processor illustrated, belt 20 comprises a photoconductive layer of selenium, which is the light receiving surface and imaging medium, on a conductive substrate. Other photoreceptor types and forms, such as comprising organic materials or of multilayers or a drum may instead be envisioned. Still other forms may comprise scroll type arrangements wherein webs of photoconductive material may be played in and out of the interior of supporting cylinders.

Figure 4:
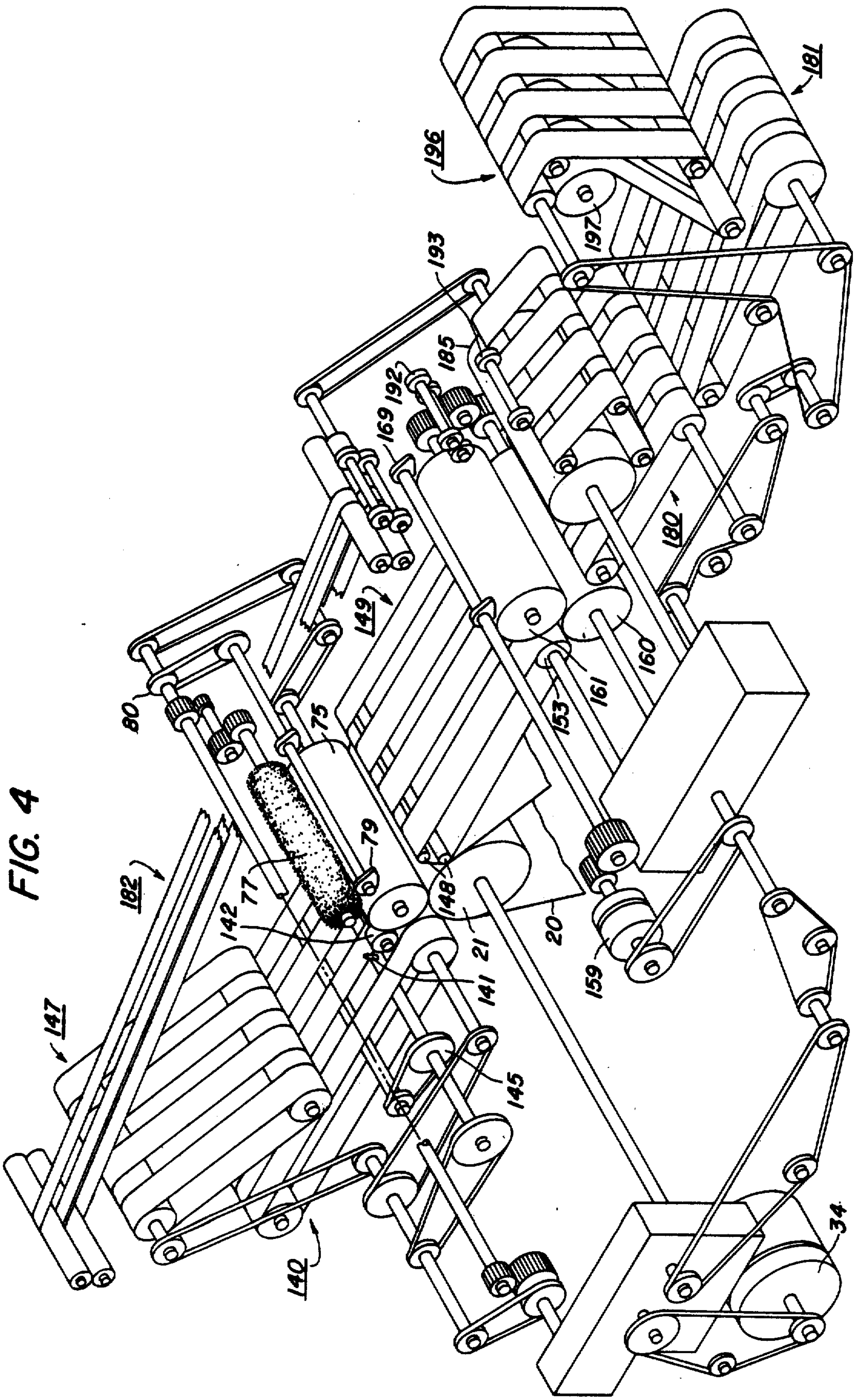
FIG. 4 is an isometric view showing the drive train for the apparatus shown in FIG. 1.

Suitable biasing means (not shown) are provided on subframe 24 to tension the photoreceptor belt 20 and insure movement of belt 20 along a prescribed operating path. Belt tracking switch 25 (shown in FIG. 2) monitors movement of belt 20 from side to side. Belt 20 is supported so as to provide a trio of substantially flat belt runs opposite exposure, developing, and cleaning stations 27, 28, 29 respectfully. To enhance belt flatness at these stations, vacuum platens 30 are provided under belt 20 at each belt run. Conduits 31 communicate vacuum platens 30 with a vacuum pump 32. Photoconductive belt 20 moves in the direction indicated by the solid line arrow, drive thereto being effected through roll 21, which in turn is driven by main drive motor 34, as seen in FIG. 4.

Processor 12 includes a generally rectangular, horizontal transparent plate 35 on which each original 2 to be copied is disposed. A two or four sided illumination assembly, consisting of internal reflectors 36 and flash lamps 37 (shown in FIG. 2) disposed below and along at least two sides of platen 35, is provided for illuminating the original 2 on platen 35. To control temperatures within the illumination space, the assembly is coupled through conduit 33 with a vacuum pump 38 which is adapted to withdraw overly heated air from the space. To retain the original 2 in place on platen 35 and prevent escape of extraneous light from the illumination assembly, a platen cover 35' may be provided.

The light image generated by the illumination system is projected via mirrors 39, 40 and a variable magnification lens assembly 41 onto the photoreceptive belt 20 at the exposure station 27. Reversible motor 43 is provided to move the main lens and add on lens elements that comprise the lens assembly 41 to different predetermined positions and combinations to provide the preselected image sizes corresponding to push button selectors 818, 819, 820 on operator module 800. (See FIG. 32) Sensors 116, 117, 118 signal the present disposition of lens assembly 41. Exposure of the previously charged belt 20 selectively discharges the photoconductive belt to produce on belt 20 an electrostatic latent image of the original 2. To prepare belt 20 for imaging, belt 20 is uniformly charged to a preselected level by charge corotron 42 upstream of the exposure station 27.

Figure 5:
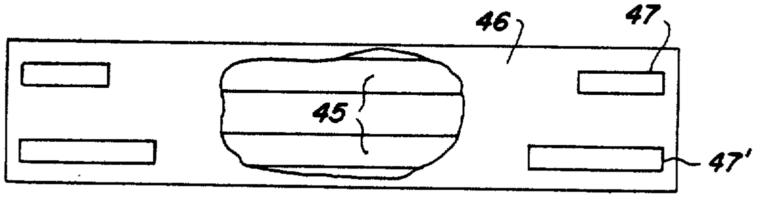
FIG. 5 is an enlarged view showing details of the photoreceptor edge fade-out mechanism for the apparatus shown in FIG. 1.

To prevent development of charged but unwanted image areas, erase lamps 44, 45 are provided. Lamp 44, which is referred to herein as the pitch fadeout lamp, is supported in transverse relationship to belt 20, lamp 44 extending across substantially the entire width of belt 20 to erase (i.e. discharge) areas of belt 20 before the first image, between successive images, and after the last image. Lamps 45, which are referred to herein as edge fadeout lamps, serve to erase areas bordering each side of the images. Referring particularly to FIG. 5, edge fadeout lamps 45, which extend transversely to belt 20, are disposed within a housing 46 having a pair of transversely extending openings 47, 47' of differing length adjacent each edge of belt 20. By selectively actuating one or the other of the lamps 45, the width of the area bordering the sides of the image that is erased can be controlled.

Figure 6:
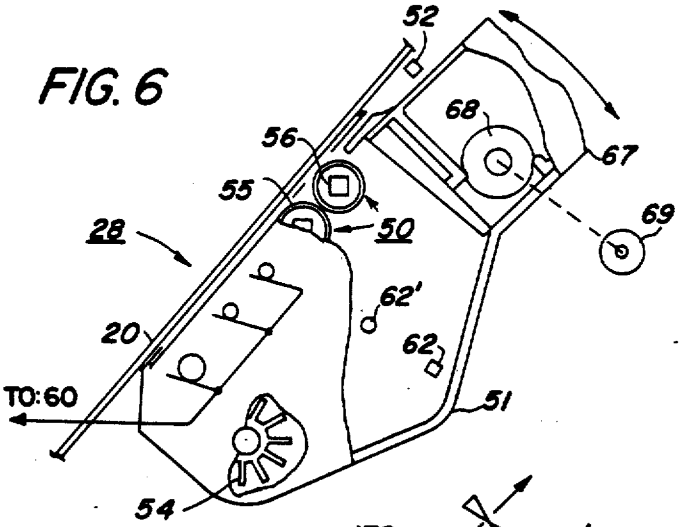
FIG. 6 is an enlarged view showing details of the developing mechanism for the apparatus shown in FIG. 1.
Figure 7:
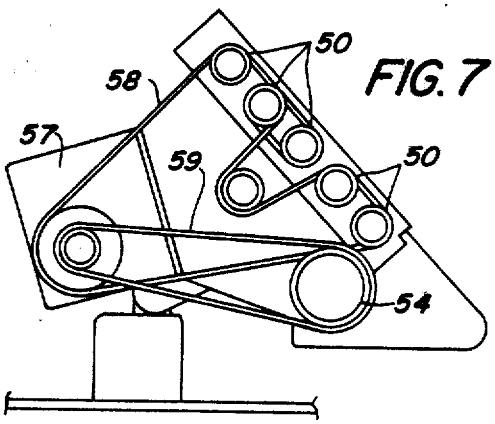
FIG. 7 is an enlarged view showing details of the developing mechanism drive.

Referring to FIGS. 1, 6 and 7, magnetic brush rolls 50 are provided in a developer housing 51 at developing station 28. Housing 51 is pivotally supported adjacent the lower end thereof with interlock switch 52 to sense disposition of housing 51 in operative position adjacent belt 20. The bottom of housing 51 forms a sump within which a supply of developing material is contained. A rotatable auger 54 in the sump area serves to mix the developing material and bring the material into operative relationship with the lowermost of the magnetic brush rolls 50.

As will be understood by those skilled in the art, the electrostatically attractable developing material commonly used in magnetic brush developing apparatus of the type shown comprises a pigmented resinous powder, referred to as toner, and larger granular beads referred to as carrier. To provide the necessary magnetic properties, the carrier is comprised of a magnetizable material such as steel. By virtue of the magnetic fields established by developing rolls 50 and the interrelationship therebetween, a blanket of developing material is formed along the surfaces of developing rolls 50 adjacent the belt 20 and extending from one roll to another. Toner is attracted to the electrostatic latent image from the carrier bristles to produce a visible powder image on the surface of belt 20.

Magnetic brush rolls 50 each comprise a rotatable exterior sleeve 55 with relatively stationary magnet 55 inside. Sleeves 55 are rotated in unison and at substantially the same speed as belt 20 by a developer drive motor 57 through a belt and pulley arrangement 58. A second belt and pulley arrangement 59 drive auger 54.

To regulate development of the latent electrostatic images on belt 20, magnetic brush sleeves 55 are electrically biased. A suitable power supply 60 is provided for this purpose with the amount of bias being regulated by controller 18.

Figure 8:
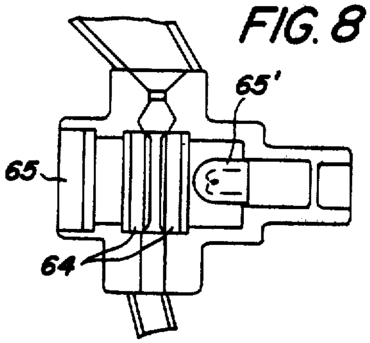
FIG. 8 is an enlarged view showing details of the developability control for the apparatus shown in FIG. 1.
Figure 11:
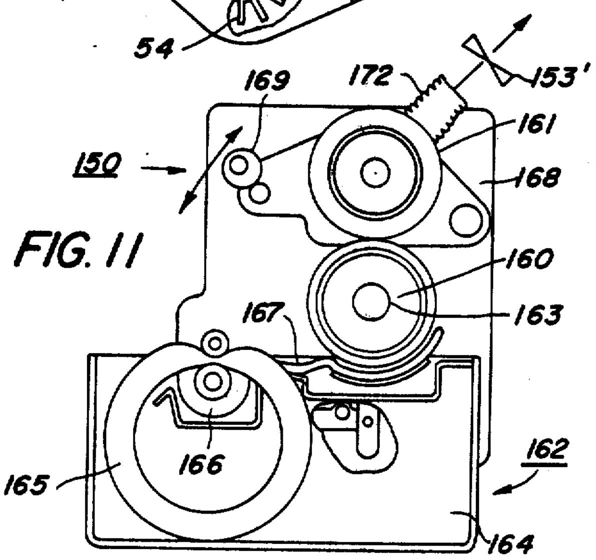
FIG. 11 is an enlarged view showing details of the fuser for the apparatus shown in FIG. 1.

Developing material is returned to the upper portion of developer housing 51 for reuse. A photocell 62 monitors the level of developing material in housing 51 with lamp 62' therefore spaced opposite to the photocell 62. The disclosed machine is also provided with automatic developability control which maintains an optimum proportion of toner-to-carrier material by sensing toner concentration and replenishing toner, as needed. As shown in FIG. 8, the automatic developability control comprises a pair of transparent plates 64 mounted in spaced, parallel arrangement in developer housing 51 such that a portion of the returning developing material passes therebetween. A suitable circuit, not shown, alternately places a charge on the plates 64 to attract toner thereto. Photocell 65 on one side of the plate pair senses the developer material as the material passes therebetween. Lamp 65' on the opposite side of plate pair 64 provides reference illumination. In this arrangement, the returning developing material is alternately attracted and repelled to and from plates 64. The accumulation of toner, i.e. density determines the amount of light transmitted from lamp 65' to photocell 65. Photocell 65 monitors the density of the returning developing material with the signal output therefrom being used by controller 18 to control the amount of fresh or make-up toner to be added to developer housing 51 from toner supply container 67.

To discharge toner from container 67, rotatable dispensing roll 68 is provided in the inlet to developer housing 51. Motor 69 drives roll 68. When fresh toner is required, as determined by the signal from photocell 65, controller 18 actuates motor 69 to turn roll 68 for a timed interval. The rotating roll 68, which is comprised of a relatively porous sponge-like material, carries toner particles thereon into developer housing 51 where it is discharged. Pre-transfer corotron 70 and lamp 71 are provided downstream of magnetic brush rolls 50 to regulate developed image charges before transfer.

A magnetic pick-off roll 72 is rotatably supported opposite belt 20 downstream of pre-transfer lamp 71, roll 72 serving to scavenge leftover carrier from belt 20 preparatory to transfer of the developed image to the copy sheet 3. Motor 73 turns roll 72 in the same direction and at substantially the same speed as belt 20 to prevent scoring or scratching of belt 20. One type of magnetic pick-off roll is shown in U.S. Pat. No. 3,834,804, issued Oct. 10, 1974 to Bhagat et al.

Figure 9:
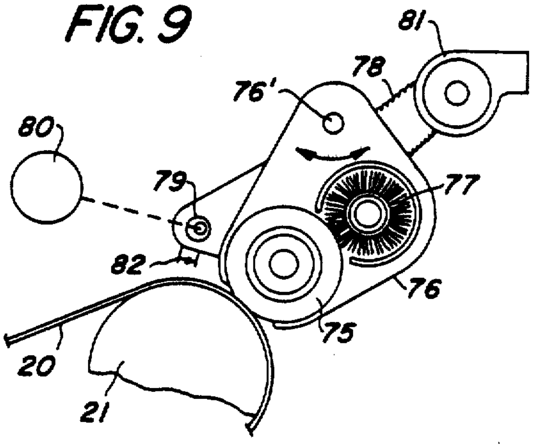
FIG. 9 is an enlarged view showing details of the transfer roll support mechanism for the apparatus shown in FIG. 1.
Figure 12:
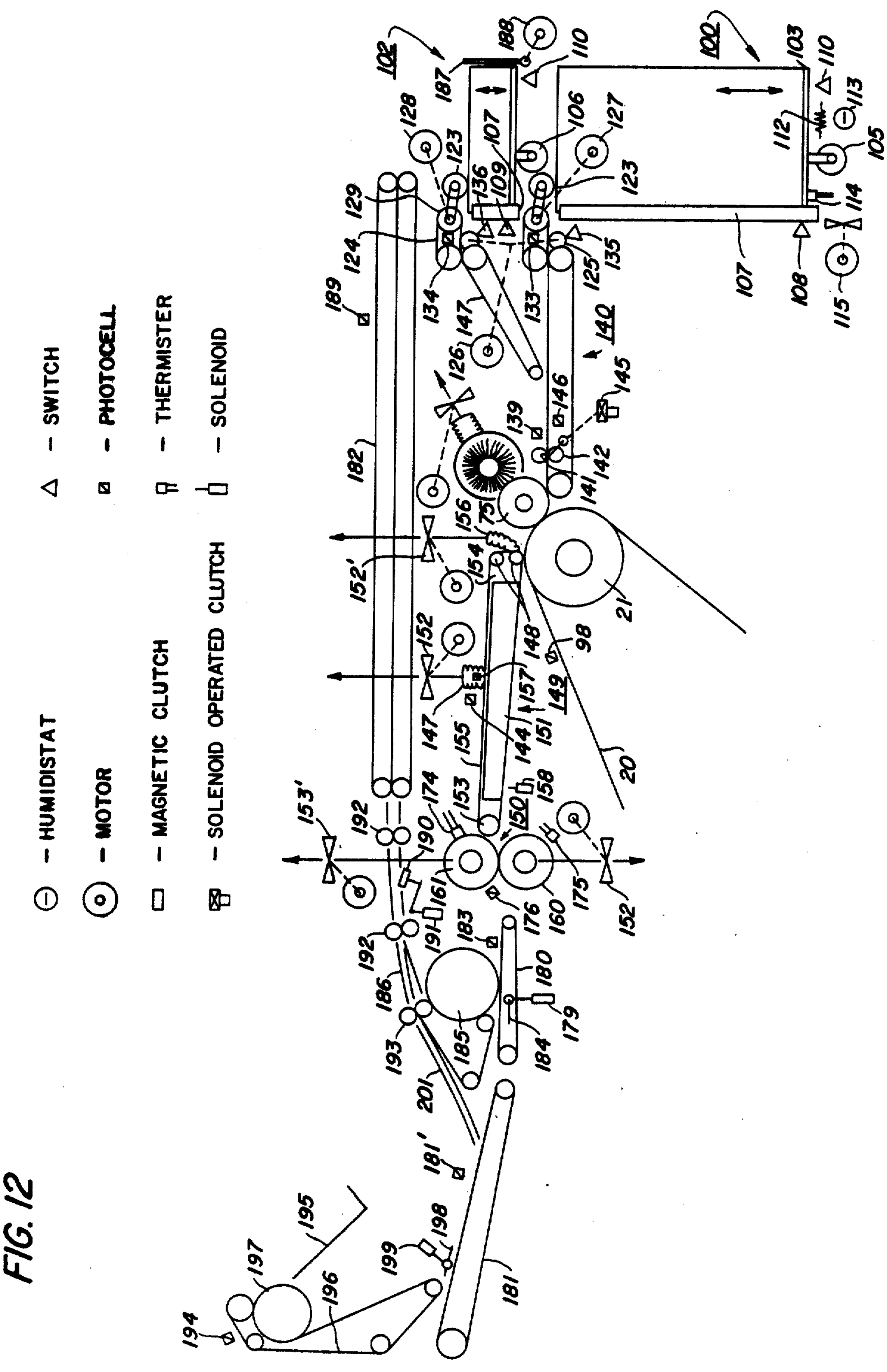
FIG. 12 is a schematic view showing the paper path and sensors of the apparatus shown in FIG. 1.

Referring to FIGS. 4, 9 and 12, to transfer developed images from belt 20 to the copy sheets 3, a transfer roll 75 is provided. Transfer roll 75, which forms part of the copy sheet feed path, is rotatably supported within a transfer roll housing 76 opposite belt support roll 21. Housing 76 is pivotally mounted for swinging movement about axis 76' to permit the transfer roll assembly to be moved into and out of operative relationship with belt 20. A transfer roll cleaning brush 77 is rotatably journalled in transfer roll housing 76 with the brush periphery in contact with transfer roll 75. Transfer roll 75 is driven through contact with belt 20 while cleaning brush 77 is coupled to main drive motor 34. To remove toner, housing 76 is connected through conduit 78 with vacuum pump 81. To facilitate and control transfer of the developed images from belt 20 to the copy sheets 3, a suitable electrical bias is applied to transfer roll 75.

To permit transfer roll 75 to be moved into and out of operative relationship with belt 20, cam 79 is provided in driving contact with transfer roll housing 76. Cam 79 is driven from motor 34 through an electromagnetically operated one revolution clutch 80. Spring means (not shown) serves to maintain housing 76 in driving engagement with cam 79.

To facilitate separation of the copy sheets 3 from belt 20 following transfer of developed images, a detack corotron 82 is provided. Corotron 82 generates a charge designed to neutralize or reduce the charges tending to retain the copy sheet on belt 20. Corotron 82 is supported on transfer roll housing 76 opposite belt 20 and downstream of transfer roll 75.

Figure 10:
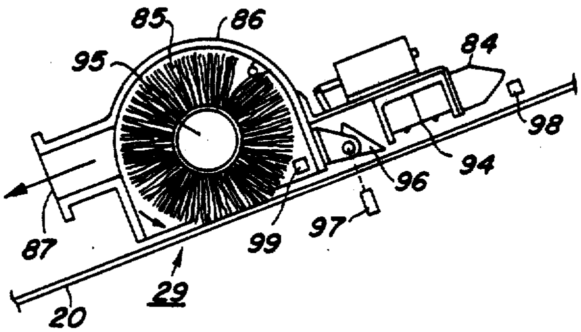
FIG. 10 is an enlarged view showing details of the photoreceptor cleaning mechanism for the apparatus shown in FIG. 1.

Referring to FIGS. 1*a*, 2 and 10, to prepare belt 20 for cleaning, residual charges on belt 20 are removed by discharge lamp 84 and preclean corotron 94. A cleaning brush 85, rotatably supported within an evacuated semi-circular shaped brush housing 86 at cleaning station 29, serves to remove residual developer from belt 20. Motor 95 drive brush 85, brush 85 turning in a direction opposite that of belt 20.

Vacuum conduit 87 couples brush housing 86 through a centrifugal type separator 88 with the suction side of vacuum pump 93. A final filter 89 on the outlet of pump 93 traps particles that pass through separator 88. The heavier toner particles separated by separator 88 drop into and are collected in one or more collecting bottles 90. Pressure sensor 91 monitors the condition of final filter 89 while a sensor 92 monitors the amount of toner particles in collecting bottles 90.

To obviate the danger of copy sheets remaining on belt 20 and becoming entangled with the belt cleaning mechanism, a deflector 96 is provided upstream of cleaning brush 85. Deflector 96, which is pivotally supported on the brush housing 86, is operated by solenoid 97. In the normal or off position, deflector 96 is spaced from belt 20 (the solid line position shown in the drawings). Energization of solenoid 97 pivots deflector 96 downwardly to being the deflector leading edge into close proximity to belt 20.

Sensors 98, 99 are provided on each side of deflector 96 for sensing the presence of copy material on belt 20. A signal output from upstream sensor 98 triggers solenoid 97 to pivot deflector 96 into position to intercept the copy sheet on belt 20. The signal from sensor 98 also initiates a system shutdown cycle (mis-strip jam) wherein the various operating components are, within a prescribed interval, brought to a stop. The interval permits any copy sheet present in fuser 150 to be removed, sheet trap solenoid 158 (FIG. 12) having been actuated to prevent the next copy sheet from entering fuser 150 and becoming trapped therein. The signal from sensor 99, indicating failure of detector 96 to intercept or remove the copy sheet from belt 20, triggers an immediate or hard stop (sheet on selenium jam) of the processor. In such instances the power to drive motor 34 is interrupted to bring belt 20 and the other components driven therefrom to an immediate stop.

Referring particularly to FIGS. 1*a* and 12, copy sheets 3 comprise precut paper sheets supplied from either main or auxiliary paper trays 100, 102. Each paper tray has a platform or base 103 for supporting in stack-like fashion a quantity of sheets. The tray platforms 103 are supported for vertical up and down movement by motors 105, 106 being provided to raise and lower the platform. Side guide pairs 107, in each tray 100, 102 delimit the tray side boundaries, the guide pairs being adjustable toward and away from one another in accommodation of different size sheets. Sensors 108, 109 respond to the position of each side guide pair 107, the output of sensors 108, 109 serving to regulate operation of edge fadeout lamps 45 and fuser cooling valve 171 (FIG. 3). Lower limit switches 110 on each tray prevent overtravel of the tray platform in a downward direction.

A heater 112 is provided below the platform 103 of main tray 100 to warm the tray area and enhance feeding of sheets therefrom. Humidstat 113 and thermostat 114 control operation of heater 112 in response to the temperature/humidity conditions of main tray 100. Fan 115 is provided to circulate air within tray 100.

To advance the sheets 3 from either main or auxiliary tray 100, 102, main and auxiliary sheet feeders 120, 121 are provided. Feeders 120, 121 each include a nudger roll 123 to engage and advance the topmost sheet in the paper tray forward into the nip formed by a feed belt 124 and retard roll 125. Retard rolls 125, which are driven at an extremely low speed by motor 126, cooperate with feed belts 124 to restrict feeding of sheets from trays 100, 102 to one sheet at a time.

Feed belts 124 are driven by main and auxiliary sheet feed motors 127, 128 respectively. Nudger rolls 123 are supported for pivotal movement about the axis of feed belt drive shaft 129 with drive to the nudger rolls taken from drive shaft 129. Stack height sensors 133, 134 are provided for the main and auxiliary trays, the pivoting nudger rolls 123 serving to operate sensors 133, 134 in response to the sheet stack height. Main and auxiliary tray misfeed sensors 135, 136 are provided at the tray outlets.

Main transport 140 extends from main paper tray 100 to a point slightly upstream of the nip formed by photoconductive belt 20 and transfer roll 75. Transport 140 is driven from main motor 34. To register sheets 3 with the images developed on belt 20, sheet register fingers 141 are provided, fingers 141 being arranged to move into and out of the path of the sheets on transport 140 once each revolution (see also FIG. 4). Registration fingers 141 are driven from main motor 34 through electromagnetic clutch 145 (seen in FIG. 4). A timing or reset switch 146 is set once on each revolution of sheet register fingers 141. Sensor 139 monitors transport 140 for jams. Further amplification of sheet register system may be found in U.S. Pat. No. 3,781,004, issued Dec. 25, 1973 to Buddendeck et al.

Pinch roll pair 142 is interspaced between transport belts that comprise main transport 140 on the downstream side of register fingers 141. Pinch roll pair 142 are driven from main motor 34.

Auxiliary transport 147 extends from auxiliary tray 102 to main transport 140 at a point upstream of sheet register fingers 141. Transport 147 is driven from motor 34.

To maintain the sheets in driving contact with the belts of transports 140, 147, suitable guides or retainers (not shown) may be provided along the belt runs.

The image bearing sheets leaving the nip formed by photoconductive belt 20 and transfer roll 75 are picked off by belts 155 of the leading edge of vacuum transport 149. Belts 155, which are perforated for the admission of vacuum therethrough, ride on forward roller pair 148 and rear roll 153. A pair of internal vacuum plenums 151, 154 are provided, the leading plenum 154 cooperating with belts 155 to pick up the sheets leaving the belt/transfer roll nip. Transport 149 conveys the image bearing sheets to fuser 150. Vacuum conduits 147, 156 communicate plenums 151, 154 with vacuum pumps 152, 152'. A pressure sensor 157 monitors operation of vacuum pumps 152, 152'. Sensor 144 monitors transport 149 for jams.

To prevent the sheet on transport 149 from being carried into fuser 150 in the event of a jam or malfunction, a trap solenoid 158 is provided below transport 149. Energization of solenoid 158 raises the armature thereof into contact with the lower face of plenum 154 to intercept and stop the sheet moving therepast.

Referring particularly to FIGS. 3, 4, 11 and 12, fuser 150 comprises a lower heated fusing roll 160 and upper pressure roll 161. Rolls 160, 161 are supported for rotation in fuser housing 162. The core of fusing roll 160 is hollow for receipt of heating rod 163 therewithin.

Housing 162 includes a sump 164 for holding a quantity of liquid release agent, herein termed oil. Dispensing belt 165, moves through sump 164 to pick up the oil, belt 165 being driven by motor 166. A blanket-like wick 167 carries the oil from belt 165 to the surface of fusing roll 160.

Pressure roll 161 is supported within an upper pivotal section 168 of housing 162. This enables pressure roll 161 to be moved into and out of operative contact fusing roll 160. Cam shaft 169 in fuser housing 162 serves to move housing section 168 and pressure roll 161 into operative relationship with fusing roll 160 against a suitable bias (not shown). Cam shaft 169 is coupled to main motor 34 through an electromagnetically operated one revolution clutch 159.

Fuser housing section 168 is evacuated. For this purpose, a conduit 170 couples housing section 168 with vacuum pump 153. The ends of housing section 168 are separated into vacuum compartments opposite the ends of pressure roll 161 thereunder to cool the roll ends where smaller size copy sheets 3 are being processed. Vacuum valve 171 (FIG. 3) in conduit 172 regulates communication of the vacuum compartments with vacuum pump 153' in response to the size sheets as sensed by side guide sensors 108, 109 in paper trays 100, 102.

Fuser roll 160 is driven from main motor 34. Pressure roll 161 is drivingly coupled to fuser roll 160 for rotation therewith.

Thermostat 174 (FIG. 12) in fuser housing 162 controls operation of heating rod 163 in response to temperature. Temperature sensor 175 protects against fuser over-temperature. To protect against trapping of a sheet in fuser 150 in the event of a jam, sensor 176 is provided.

Following fuser 150, the sheet is carried by post fuser transport 180 to either discharge transport 181 or, where duplex or two sided copies are desired, to return transport 182. Sheet sensor 183 monitors passage of the sheets from fuser 150. Transports 180, 181 are driven from main motor 34. Sensor 181' monitors transport 181 for jams. Suitable retaining means may be provided to retain the sheets on transports 180, 181.

A deflector 184, when extended, directs sheets on transport 180 onto conveyor roll 185 and into chute 186 leading to return transport 182. Solenoid 179, when energized raises deflector 184 into the sheet path. Return transport 182 carries the sheets back to auxiliary tray 102. Sensor 189 monitors transport 182 for jams. Paper stops 187 of tray 102 is supported for oscillating movement. Motor 188 drives stops 187 back and forth tap sheets returned to auxiliary tray 102 into alignment for refeeding.

To invert duplex copy sheets following fusing of the second or duplex image, a displaceable sheet stop 190 is provided adjacent the discharge end of chute 186. Stop 190 is pivotally supported for swinging movement into and out of chute 186. Solenoid 191 is provided to move stop 190 selectively into or out of chute 186.

The sheet trapped in chute 186 by stop 190 is removed by pinch roll pairs 192, 193 and fed out through chute 201 onto discharge transport 181. Further description of the inverter mechanism may be found in U.S. Pat. No. 3,856,295, issued Dec. 24, 1974, to John H. Looney.

Output tray 195 receives unsorted copies. Transport 196 a portion of which is wrapped around a turn around roll 197, serves to carry the finished copies to tray 195. Sensor 194 monitors transport 196 for jams. To route copies into output tray 195, a deflector 198 is provided. Deflector solenoid 199, when energized, turns deflector 198 to intercept sheets on conveyor 181 and route the sheets onto conveyor 196.

When output tray 195 is not used, the sheets are carried by conveyor 181 to sorter 14.

SORTER

Figure 13:
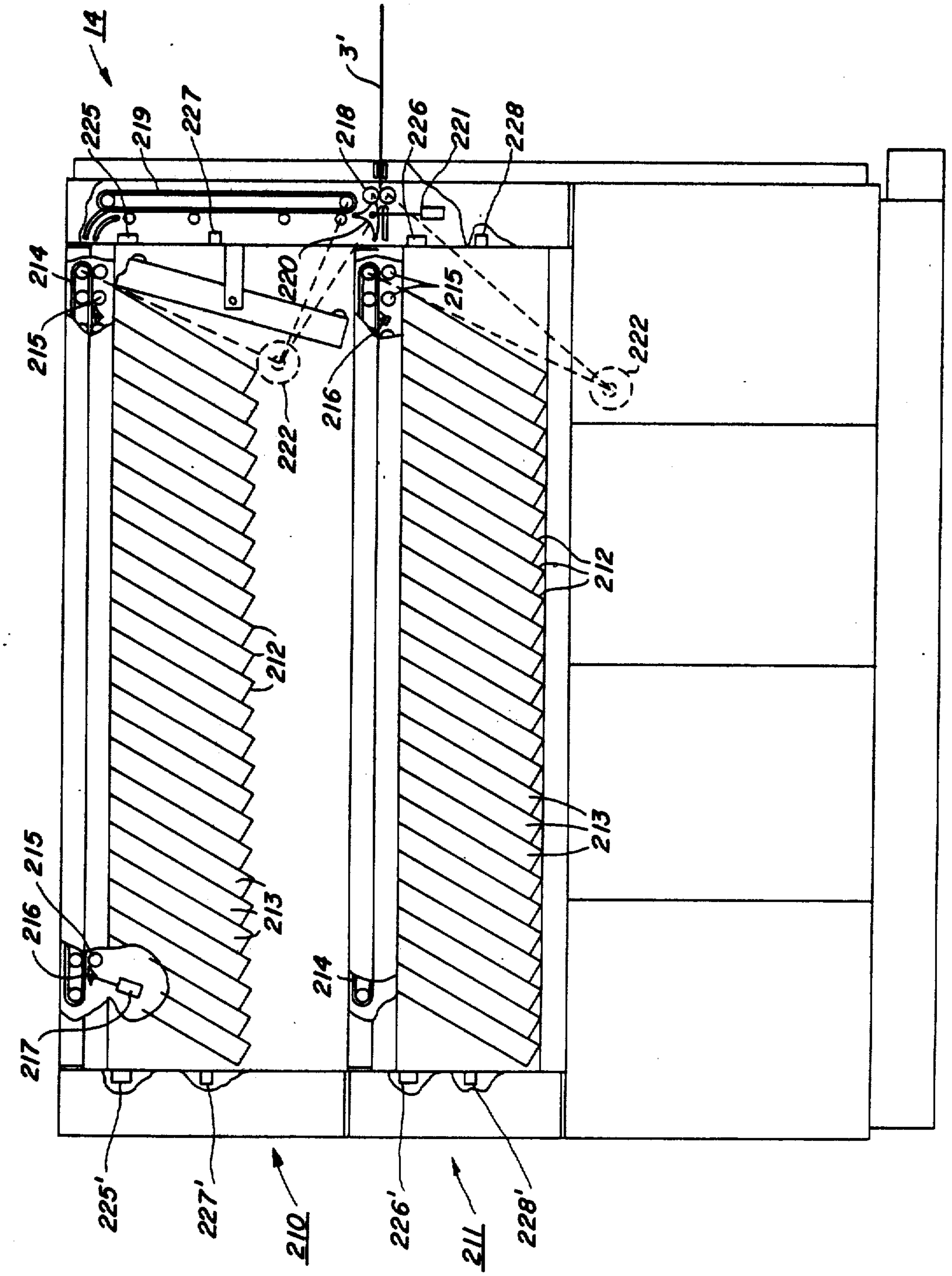
FIG. 13 is an enlarged view showing details of the copy sorter for the apparatus shown in FIG. 1.

Referring particularly to FIG. 13, sorter 14 comprises upper and lower bin arrays 210, 211. Each bin array 210, 211 consists of series of spaced downwardly inclined trays 212, forming a series of individual bins 213 for receipt of finished copies 3'. Conveyors 214 along the top of each bin array, cooperate with idler rolls 215 adjacent the inlet to each bin to transport the copies into juxtaposition with the bins. Individual defelctors 216 at each bin cooperate, when depressed, with the adjoining idler roll 215 to turn the copies into the bin associated therewith. An operating solenoid 217 is provided for each deflector.

A driven roll pair 218 is provided at the inlet to sorter 14. A generally vertical conveyor 219 serves the bring copies 3' to the upper array 210. Entrance deflector 220 routes the copies selectively to either the upper or lower bin array 210, 211 respectively. Solenoid 221 operates deflector 220.

Motor 222 is provided to drive the conveyors 214 and 219 of upper bin array 210 and conveyor 214 of lower bin array 211. Roll pair 218 is drivingly coupled to motor 222.

To detect entry of copies 3' in the individual bins 213, a photoelectric type sensor 225, 226 is provided at one end of each bin array 210, 211 respectively. Sensor lamps 225', 226' are disposed adjacent the other end of the bin array. To detect the presence of copies in the bins 213, a second set of photoelectric type sensors 227, 228 is provided for each bin array, on a level with a tray cutout (not shown). Sensor lamps 227', 228' are disposed opposite sensors 227, 228.

DOCUMENT HANDLER

Figure 14:
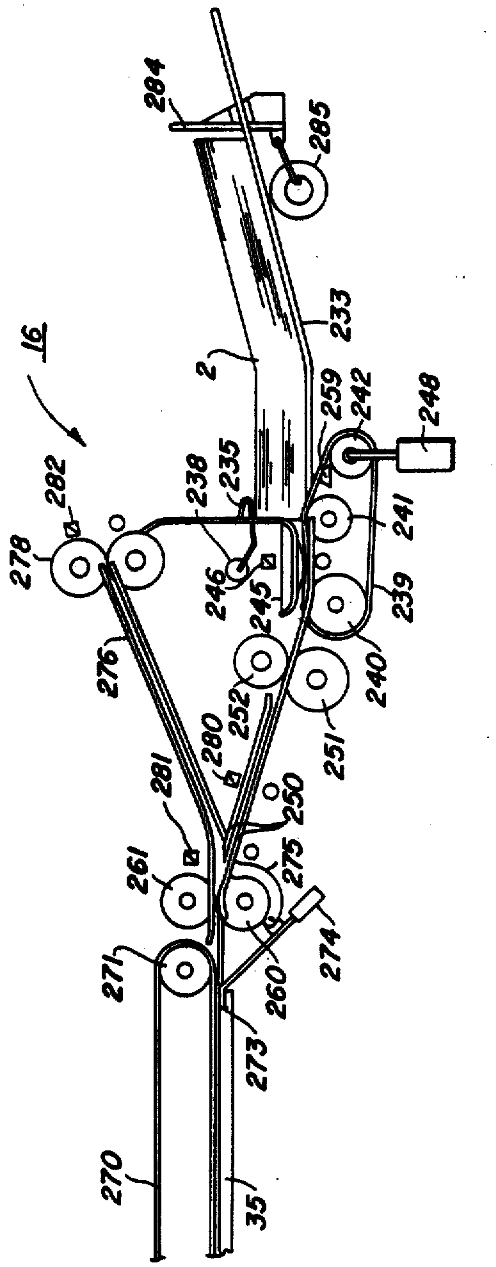
FIG. 14 is a schematic view showing details of the document handler for the apparatus shown in FIG. 1.
Figure 15:
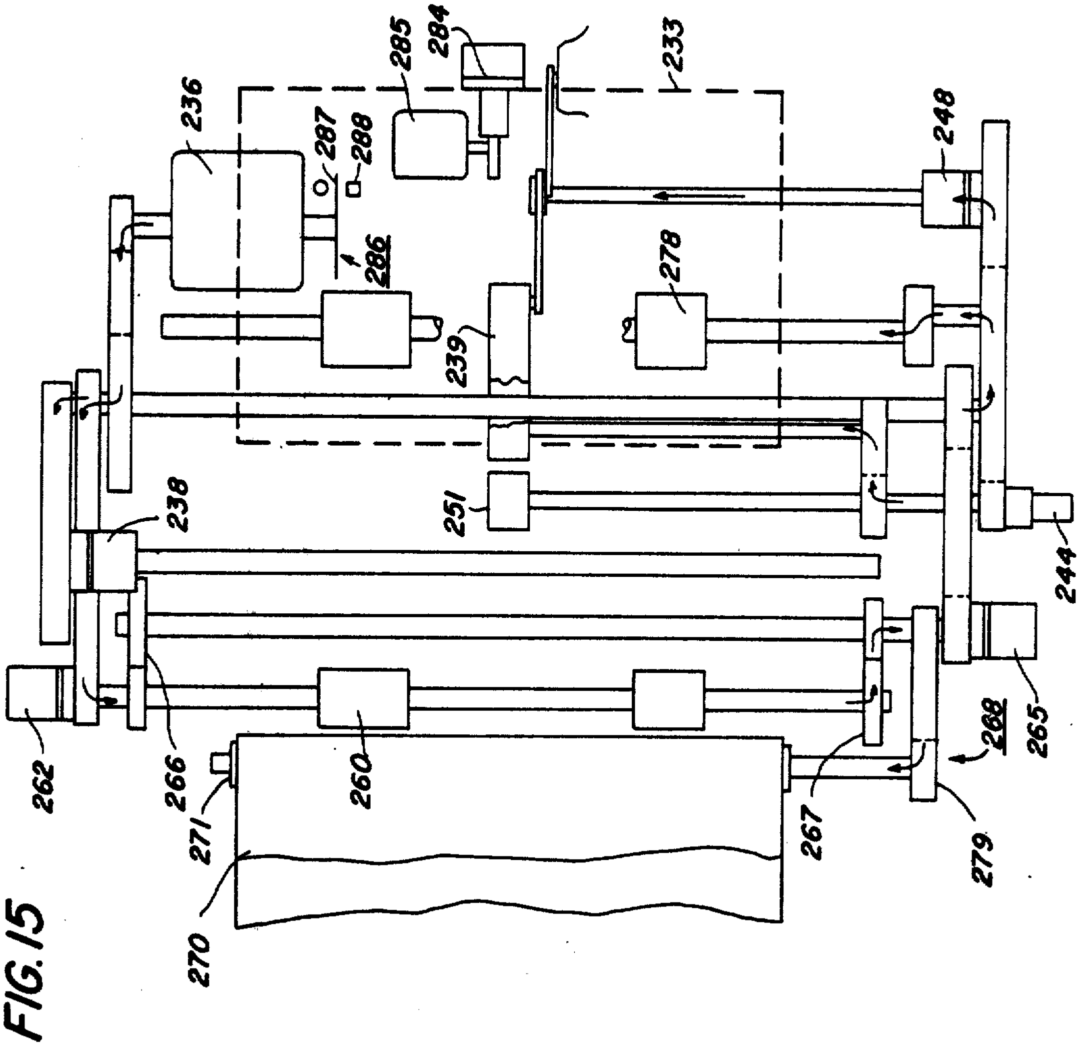
FIG. 15 is a view showing details of the drive mechanism for the document handler shown in FIG. 14.

Referring particularly to FIGS. 14 and 15, document handler 16 includes a tray 233 into which originals or documents 2 to be copied are placed by the operator following which a cover (not shown) is closed. A movable bail or separator 235, driven in an oscillatory path from motor 236 through a solenoid operated one revolution clutch 238, is provided to maintain document separation.

A document feed belt 239 is supported on drive and idler rolls 240, 241 and kicker roll 242 under tray 233, tray 233 being suitably apertured to permit the belt surface to project therewithin. Feedbelt 239 is driven by motor 236 through electromagnetic clutch 244. Guide 245, disposed near the discharge end of feed belt 239, cooperates with belt 239 to form a nip between which the documents pass.

A photoelectric type sensor 246 is disposed adjacent the discharge end of belt 239. Sensor 246 responds on failure of a document to feed within a predetermined interval to actuate solenoid 248 to raise kicker roll 242 and increases the surface area of feed belt 239 in contact with the documents. Another sensor 259 located underneath tray 233 provides an output signal when the last document 2 of each set has left the tray 233.

Document guides 250 route the document fed from tray 233 via roll pair 251, 252 to platen 35. Roll 251 is drivingly coupled to motor 236 through electromagnetic clutch 244. Contact of roll 251 with roll 252 turns roll 252.

Roll pair 260, 261 at the entrance to platen 35 advance the document onto platen 35, roll 260 being driven through electromagnetic clutch 262 in the forward direction. Contact of roll 260 with roll 261 turns roll 261 in the document feeding direction. Roll 260 is selectively coupled through gearset 268 with motor 236 through electromagnetic clutch 265 so that on engagement of clutch 265 and disengagement of clutch 262, roll 260 and roll 261 therewith turn in the reverse direction to carry the document back to tray 233 via return chute 276. One way clutches 266, 267 permit free wheeling of the roll drive shafts.

The document leaving roll pair 260, 261 is carried by platen feed belt 270 onto platen 35, belt 270 being comprised of a suitable flexible material having an exterior surface of xerographic white. Belt 270 is carried about drive and idler rolls 271, 272. Roll 271 is drivingly coupled to motor 236 for rotation in either a forward or reverse direction through clutches 262, 265. Engagement of clutch 262 operates through belt and pulley drive 279 to drive belt in the forward direction, engagement of clutch 265 operates through drive 279 to drive belt 270 in the reverse direction.

To locate the document in predetermined position on platen 35, a register 273 is provided at the platen inlet for engagement with the document trailing edge. For this purpose, control of platen belt 270 is such that following transporting of the document onto platen 35 and beyond register 273, belt 270 is reversed to carry the document backwards against register 273.

To remove the document from platen 35 following copying, register 273 is retracted to an inoperative position. Solenoid 274 is provided for moving register 273.

A document deflector 275, is provided to route the document leaving platen 35 into return chute 276, deflector 275 being raised by solenoid 274 when withdrawing register 273. For this purpose, platen belt 270 and pinch roll pair 260, 261 are reversed through engagement of clutch 265. Discharge roll pair 278, driven by motor 236, carry the returning document into tray 233.

To monitor movement of the documents in document handler 16 and detect jams and other malfunctions, photoelectric type sensors 246 and 280, 281 and 282 are disposed along the document routes.

To align documents 2 returned to tray 233, a document patter 284 is provided adjacent one end of tray 233. Patter 284 is oscillated by motor 285.

TIMING

To provide the requisite operational synchronization between host machine 10 and controller 18 as will appear, processor or machine clock 202 is provided. Referring particularly to FIG. 1*a*, clock 202 comprises a toothed disc 203 drivingly supported on the output shaft of main drive motor 34. A photoelectric type signal generator 204 is disposed astride the path followed by the toothed rim of disc 203, generator 204 producing, whenever drive motor 34 is energized, a pulse like signal output at a frequency correlated with the speed of motor 34, and the machine components driven therefrom.

As described, a second machine clock, termed a pitch reset clock 138 herein, and comprising timing switch 146 is provided. Switch 146 cooperates with sheet register fingers 141 to generate an output pulse once each revolution of fingers 141. As will appear, the pulse like output of the pitch reset clock is used to reset or resynchronize controller 18 with host machine 10.

Figure 17:
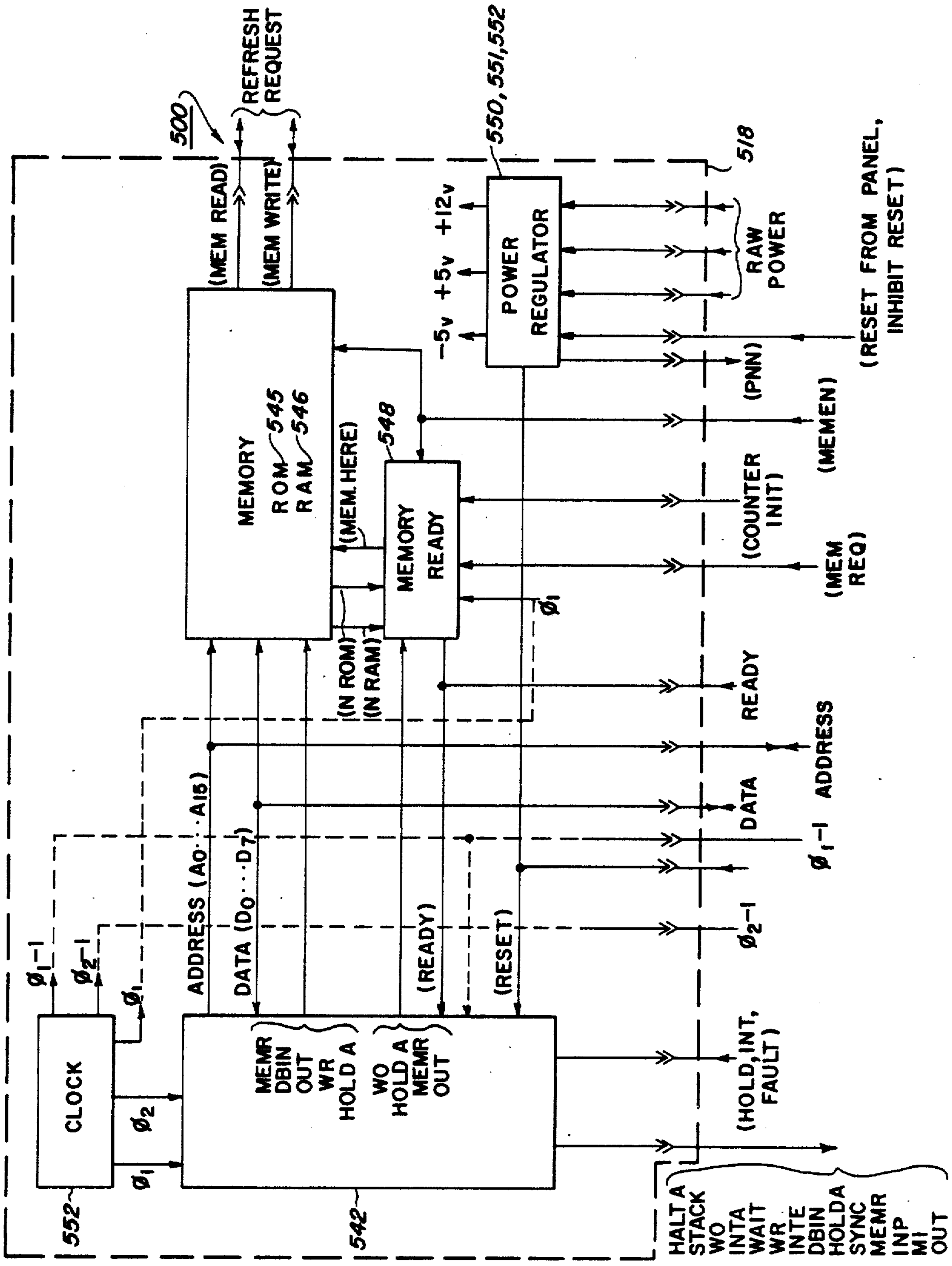
FIG. 17 is a block diagram of the controller CPU.

Referring to FIG. 15, a document handler clock 286 consisting of apertured disc 287 on the output shaft of document handler drive motor 236 and cooperating photoelectric type signal generator 288 is provided. As in the case of machine clock 202, document handler clock 286 produces an output pulse train from which components of the document handler may be synchronized. A real time clock such as clock 552 of FIG. 17, is utilized to control internal operations of the controller 18 as is known in the art.

CONTROLLER

Figure 16:
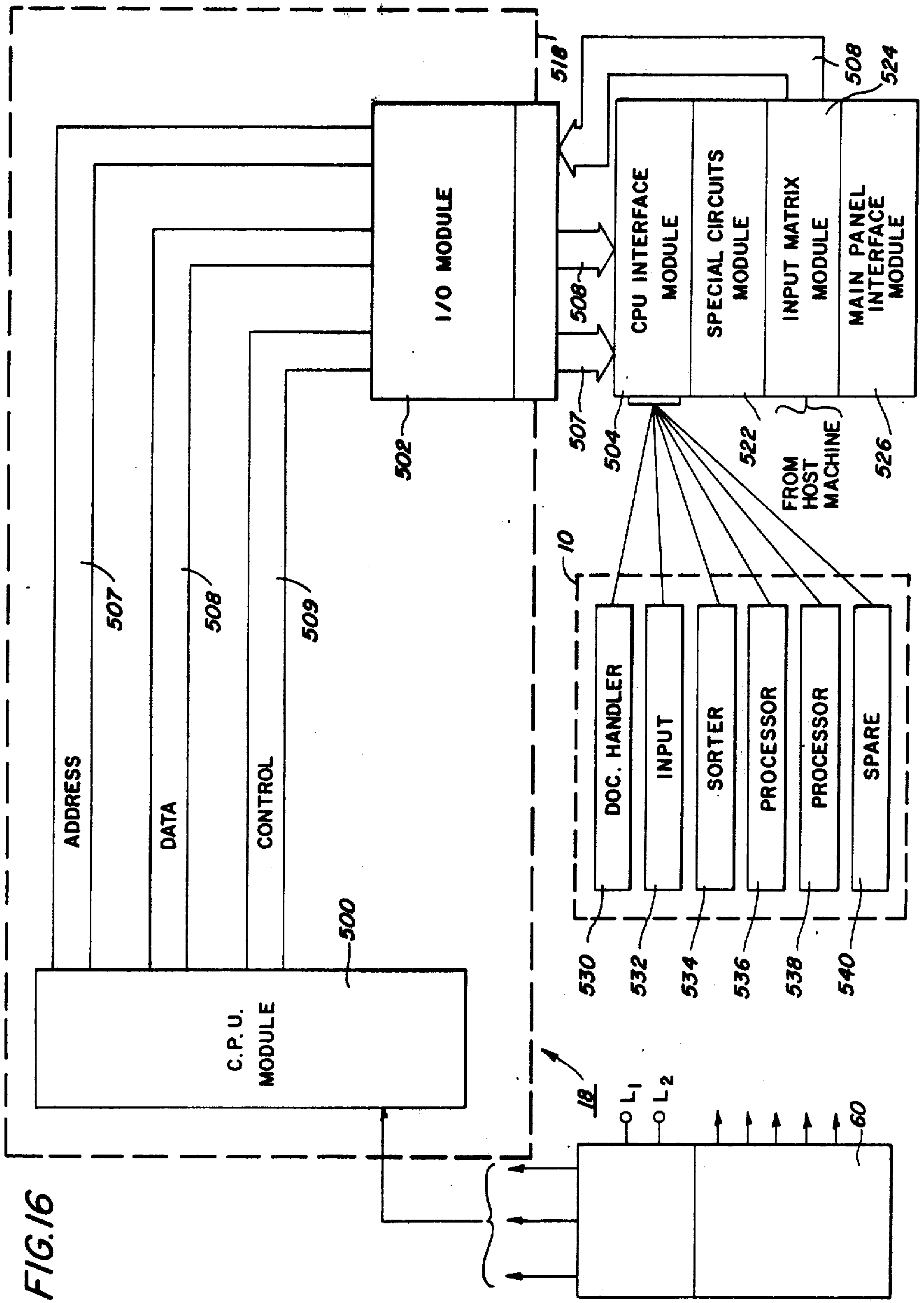
FIG. 16 is a block diagram of the controller for the apparatus shown in FIG. 1.

Referring to FIG. 16, digital computer or controller 18 includes a Central Processor Unit (CPU) Module 500, Input/Output (I/O) Module 502, and Interface 504. Address, Data and Control Buses 507, 508, 509 respectively operatively couple CPU Module 500 and I/O Module 502. CPU Module 500 I/O Module 502 are disposed within a shield 518 to prevent noise interference.

Interface 504 couples I/O Module 502 with special circuits module 522, input matrix module 524, and main panel interface module 526. Module 504 also couples I/O Module 502 to the operating sections of the machine, namely, document handler section 530, input section 532, sorter section 534 and processor sections 536, 538. A spare section 540, which may be used for monitoring operation of the host machine, or which may be later utilized to control other devices, is provided.

Referring to FIGS. 17, 18(*a*), CPU module 500 comprises a processor 542 such as an Intel 8080 microprocessor manufactured by Intel Corporation, Santa Clara, Calif., 16K Read Only Memory (herein ROM) and 2K Random Access Memory (herein RAM) sections 545, 546, Memory Ready section 548, power regulator section 550, and onboard clock 552. Bipolar tristate buffers 510, 511 in Address and Data buses 507, 508 disable the bus on a Direct Memory access (DMA) signal (HOLDA) as will appear. While the capacity of memory sections 545, 546 are indicated throughout as being 16K and 2K respectively, other memory sizes may be readily contemplated.

Figure 19A:
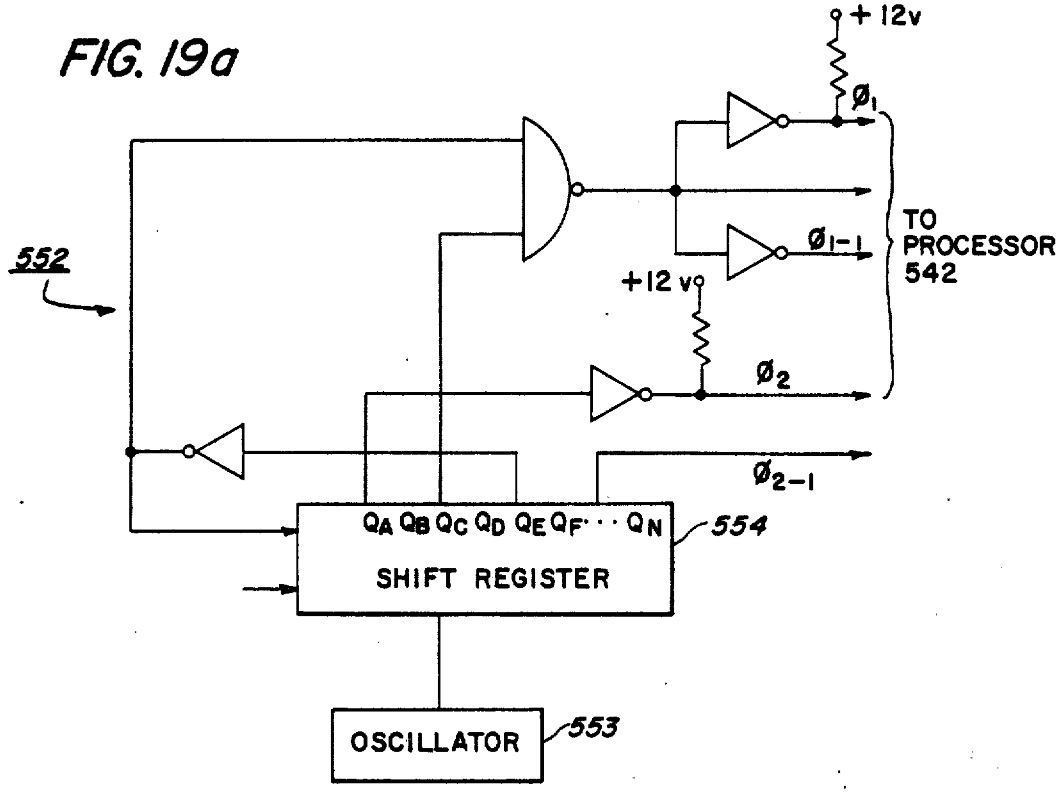
FIG. 19*a* is a logic schematic of the CPU clock.
Figure 19B:
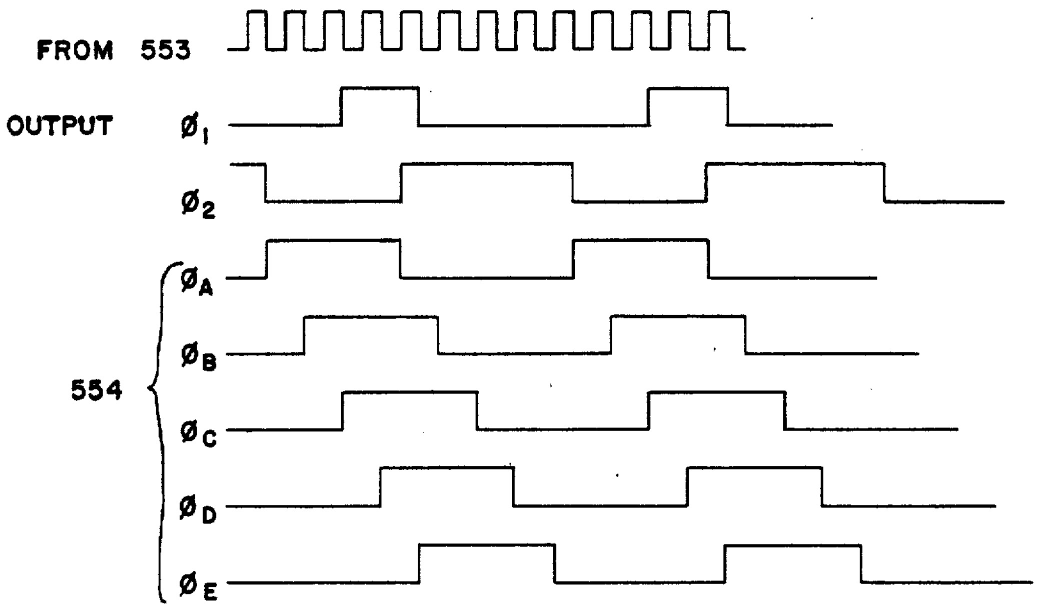
FIG. 19*b* is a chart illustrating the output wave form of the clock shown in FIG. 19*a*.

Referring particularly to FIGS. 19(*a, b*), clock 552 comprises a suitable clock oscillator 553 feeding a multibite (Qa-Qn) shift register 554. Register 554 includes an internal feedback path from one bit to the serial input of register 554. Output signal waveforms $\phi_1$, $\phi_2$, $\phi_{1-1}$ and $\phi_{2-1}$ are produced for use by the system.

Figure 20:
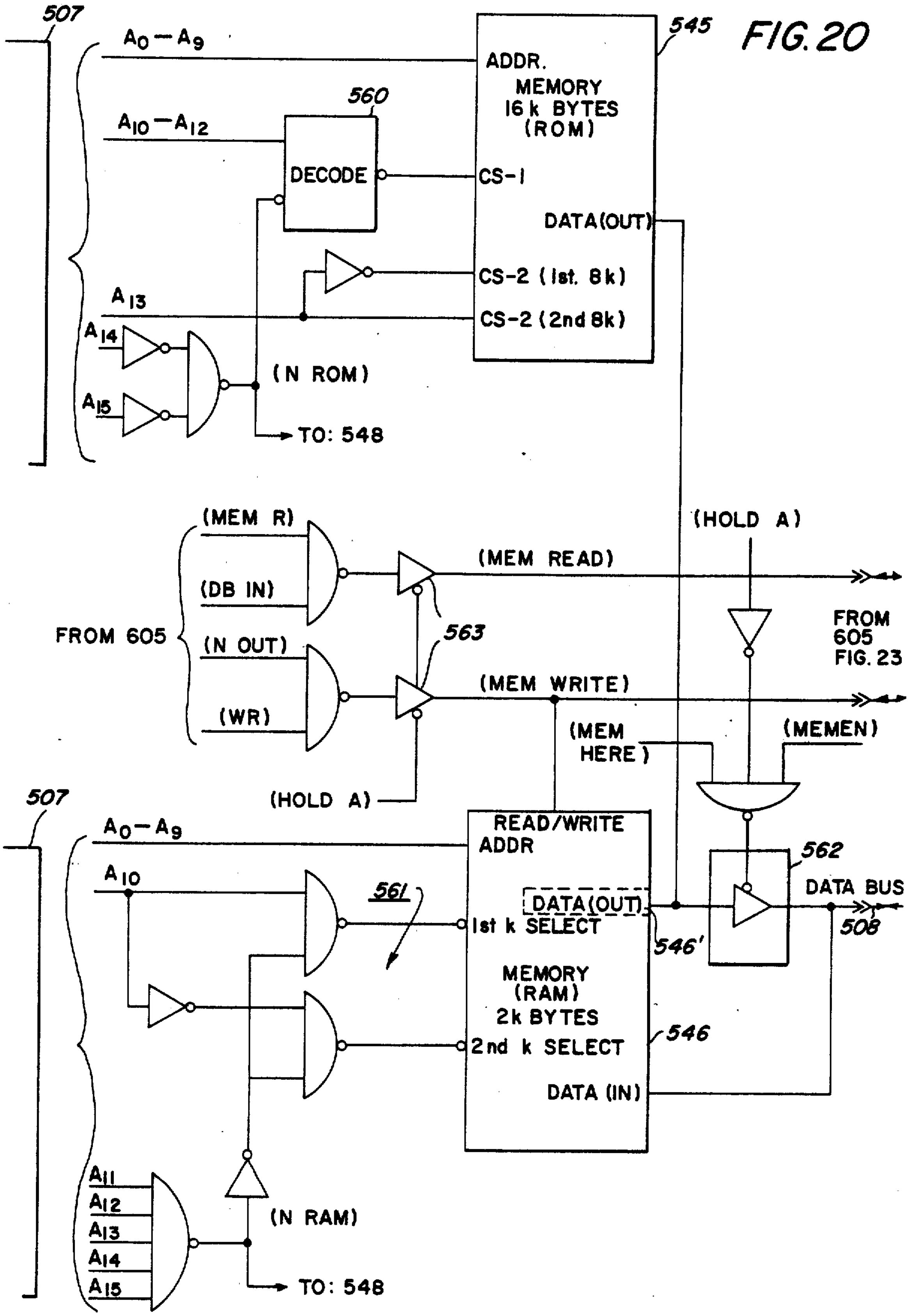
FIG. 20 is a logic schematic of the CPU memory.

Referring to FIG. 20, the memory bytes in ROM section 545 are implemented by address signals (A0-A15) from processor 542, selection being effected by 3 to 8 decode chip 560 controlling chip select 1 (CS-1) and a 1 bit selection (A13) controlling chip select 2 (CS-2). The most significant address bits (A14, A15) select the first 16K of the total 64 bytes of the addressing space. The memory bytes in RAM section 546 are implemented by Address signals (A0-A15) through selector circuit 561. Address bit A10 serves to select the memory bank while the remaining five most significant bits (A11-A15) select the last 2K bytes out of the 64K bytes of addressing space. RAM memory section 546 includes a 40 bit output buffer (DATA OUT) the output of which is tied together with the output from ROM memory section 545 and goes to tri-state buffer 562 to drive Data bus 508. Buffer 562 is enabled when either memory section 545 or 546 is being addressed and either a (MEM READ) or DMA (HOLD A) memory request exists. An enabling signal (MEMEN) is provided from the machine control or service panel (not shown) which is used to permit disabling of buffer 562 during servicing of CPU Module 500. Write control comes from either processor 542 (MEM WRITE) or from DMA (HOLD A) control. Tri-state buffers 563 permit Refresh Control 605 of I/O Module 502 (FIG. 23*b*) to access MEM READ and MEM WRITE control channels directly on a DMA signal (HOLD A) from processor 542 as will appear.

Referring to FIG. 21, memory ready section 548 provides a READY signal to processor 542. A binary counter 566, which is initialized by a SYNC signal ($\phi$,) to a prewired count as determined by input circuitry 567, counts up at a predetermined rate. At the maximum count, the output at gate 568 comes true stopping the counter 566. If the cycle is a memory request (MEM REQ) and the memory location is on board as determined by the signal (MEM HERE) to tri-state buffer 569, a READY signal is sent to processor 542. Tri-state buffer 570 in MEM REQ line permits Refresh Control 605 of I/O Module 502 to access the MEM REQ channel directly on a DMA signal (HOLD A) from processor 542 as will appear.

Figure 22A:
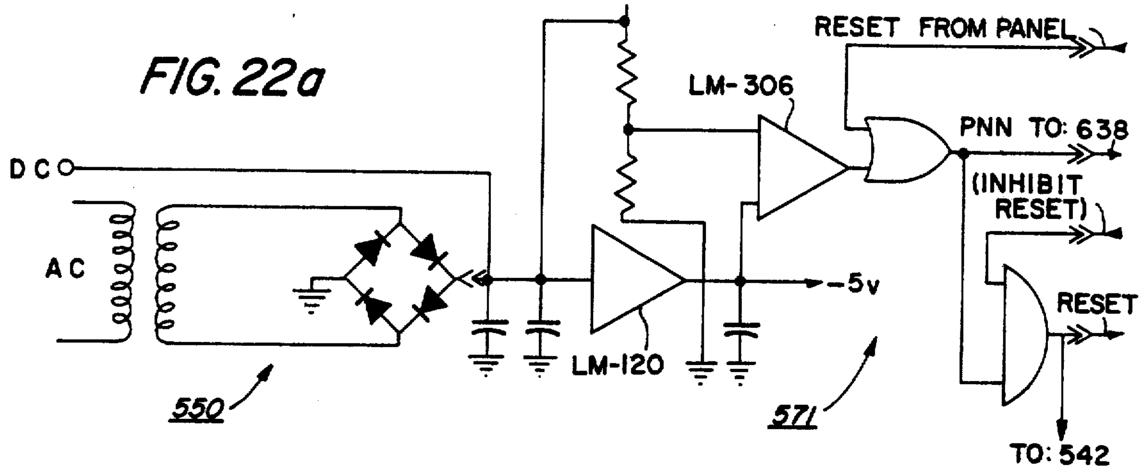
FIGS. 22*a*, 22*b*, 22*c* are logic schematics of the CPU power supply stages.
Figure 22B:
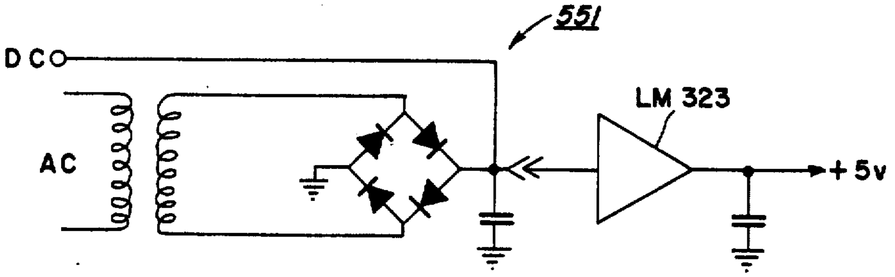
Figure 22C:
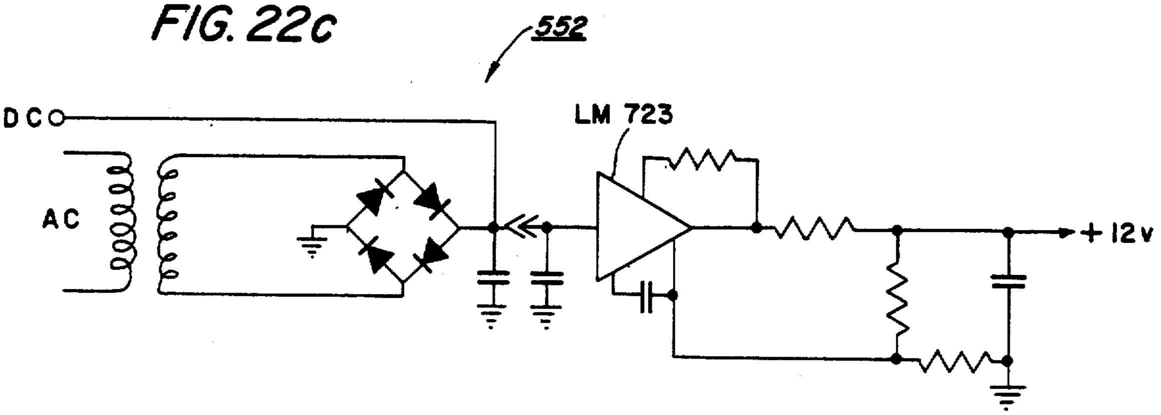

Referring to FIGS. 22(*a, b, c*) and 23*b*, power regulators 550, 551, 552 provide the various voltage levels, i.e. +5 v, +12 v, and −5 v D.C. required by the module 500. Each of the three on board regulators 550, 551, 552 employ filtered D.C. inputs. Power Not Normal (PNN) detection circuitry 571 is provided to reset processor 542 during the power up time. Reset control from the machine service panel (not shown) is also provided via PNN. An enabling signal (INHIBIT RESET) from Memory Control 638 allows completion of a write cycle in Non Volatile (N.V.) Memory 610 of I/O Module 502.

Figure 18A:
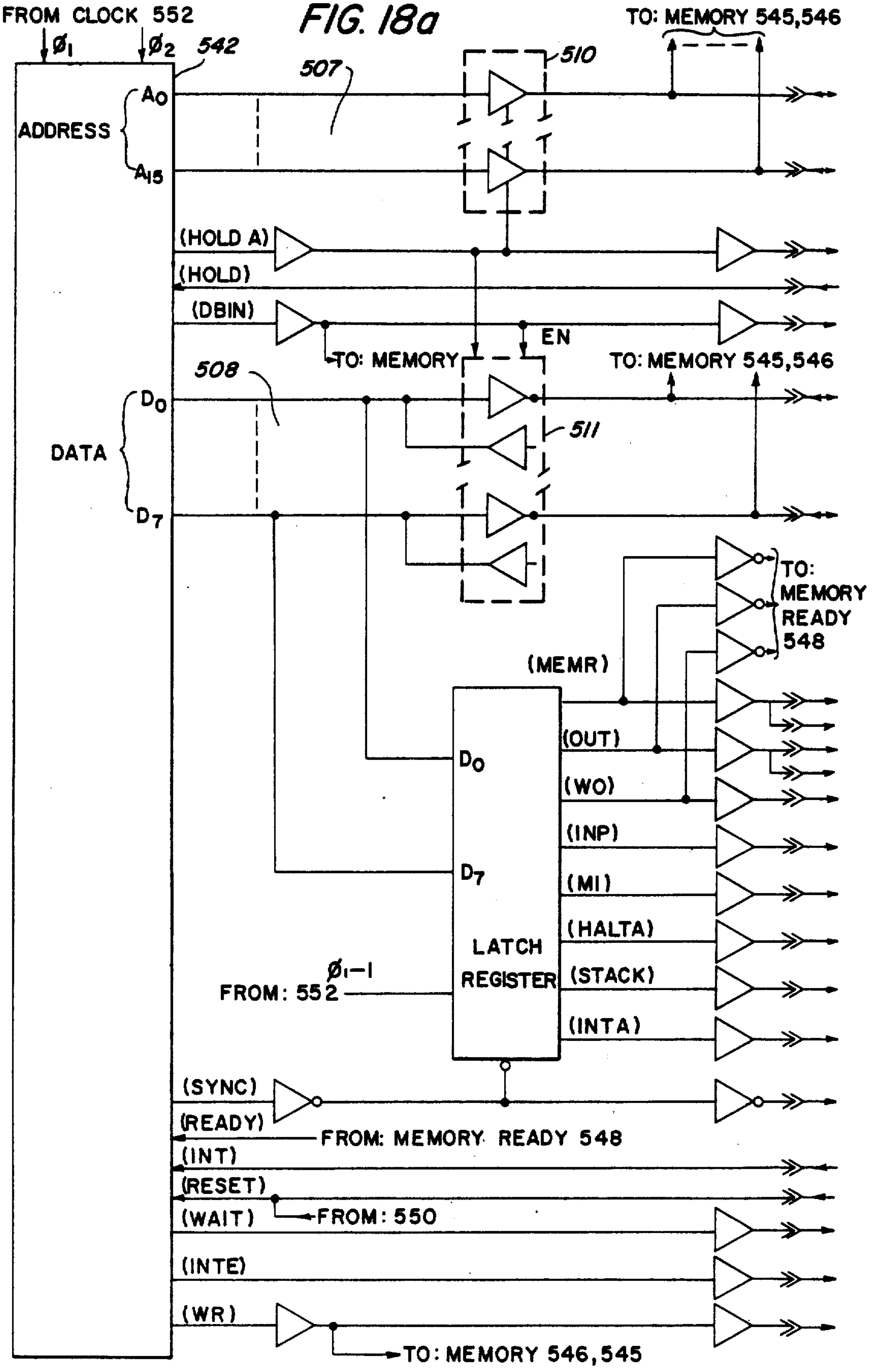
FIG. 18*a* is a block diagram showing the CPU microprocessor input/output connections.
Figure 18B:
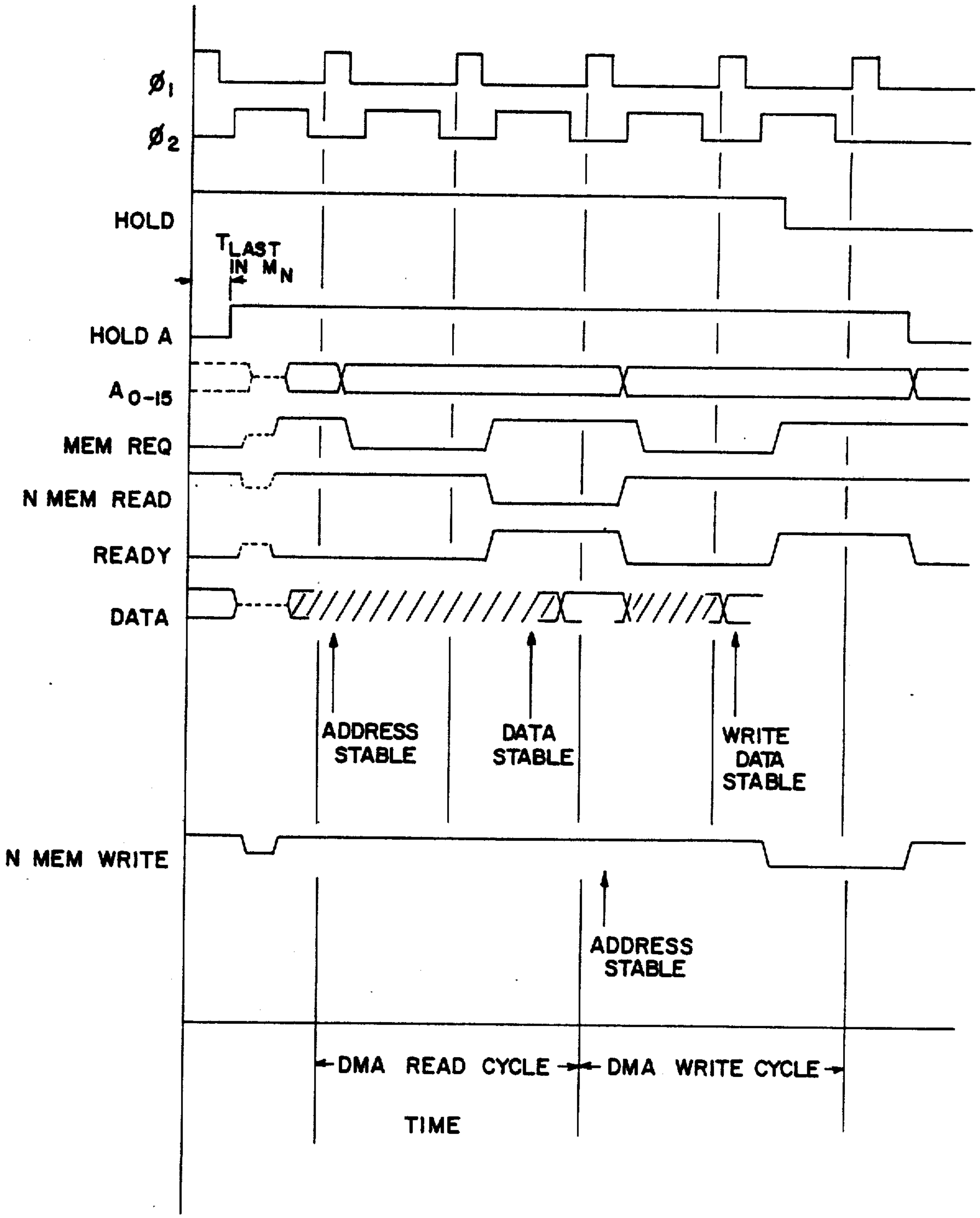
FIG. 18*b* is a timing chart of Direct Memory access (DMA) Read and Write cycles.
Figure 23A:
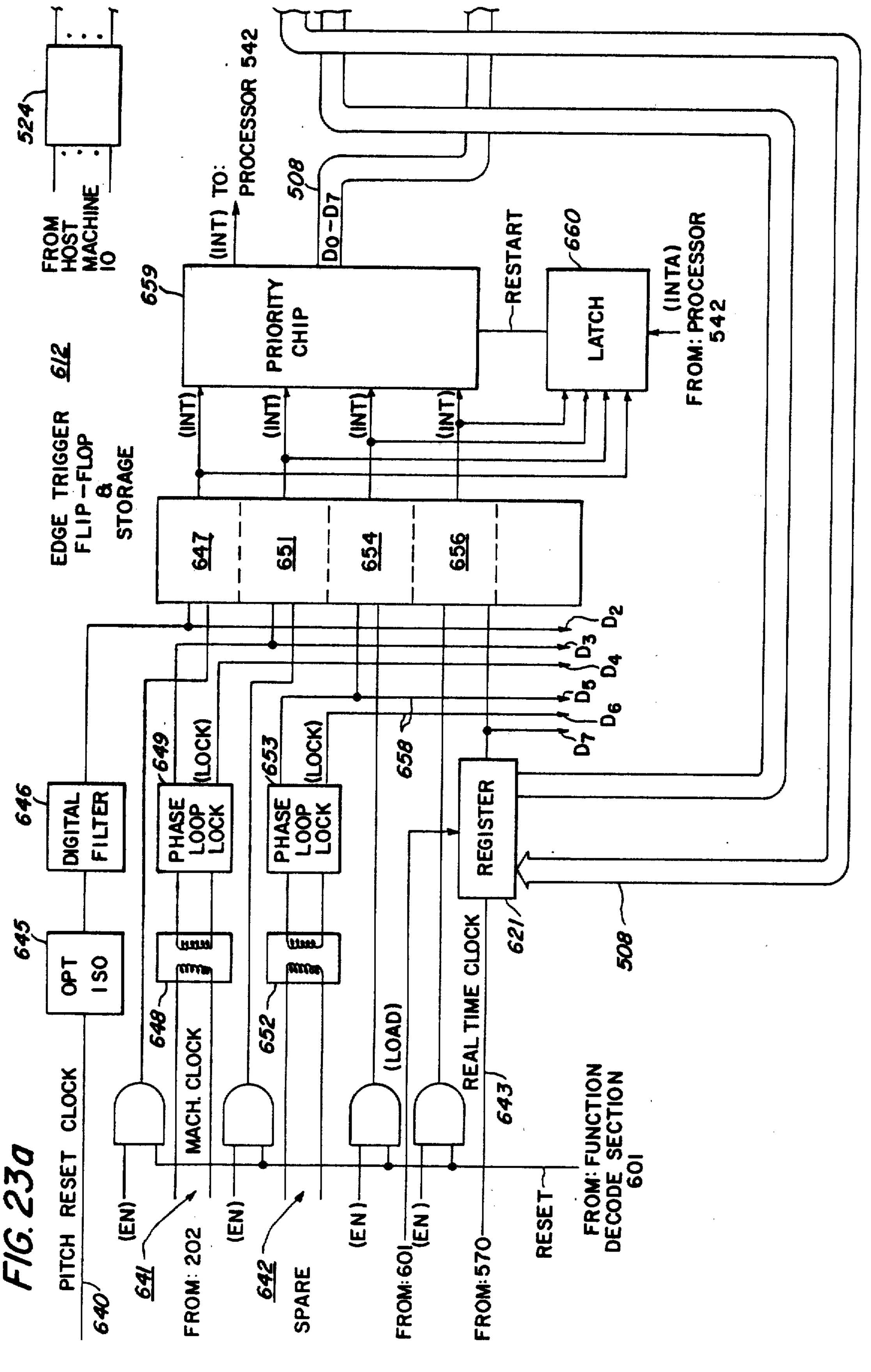
FIGS. 23*a* and 23*b* comprise a block diagram of the controller I/O module.
Figure 23B:
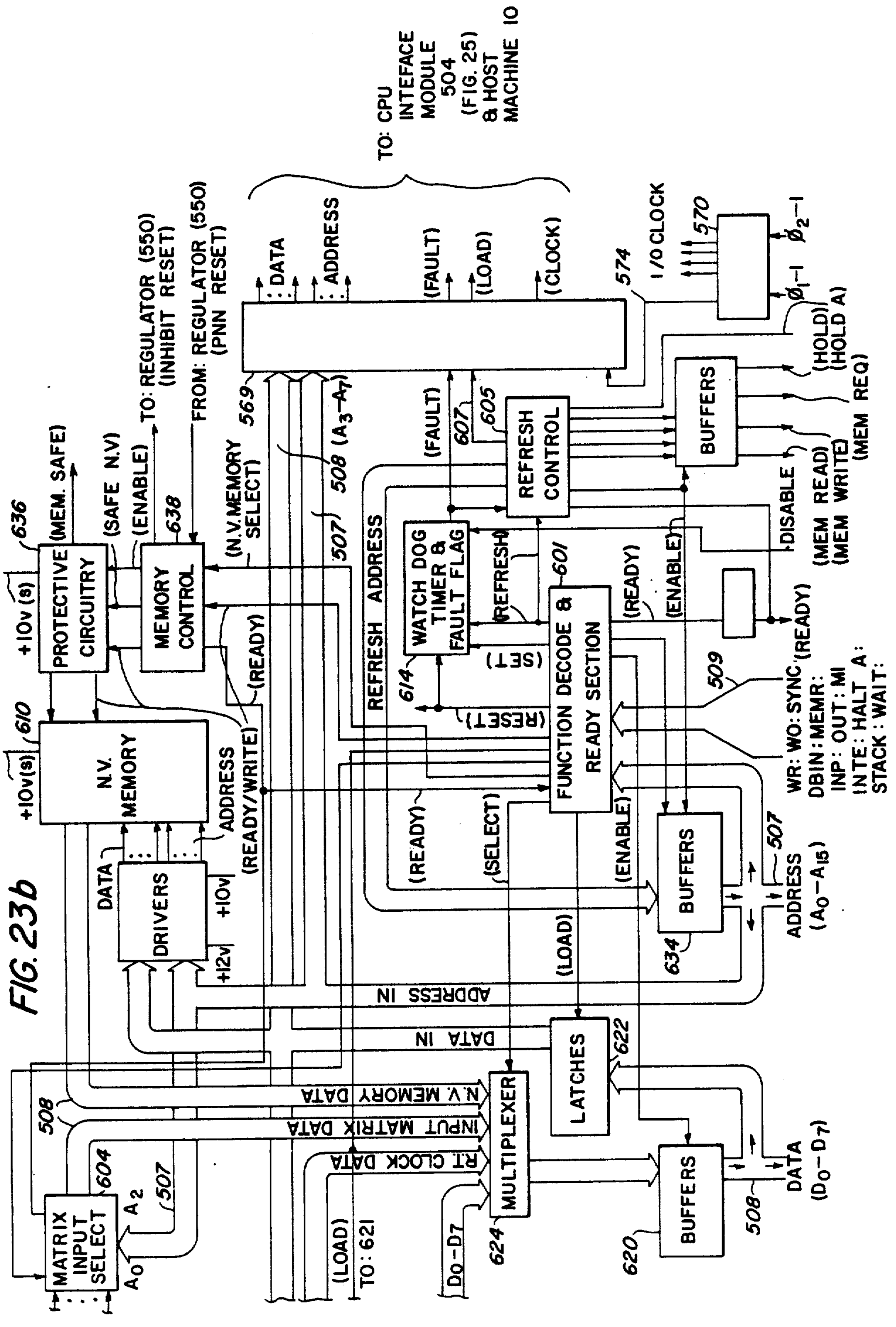

Referring to FIGS. 18*a*, 20, 21, and the DMA timing chart (FIG. 18*b*) data transfer from RAM section 546 to host machine 10 is effected through Direct Memory Access (DMA), as will appear. To initiate DMA, a signal (HOLD) is generated by Refresh Control 605 (FIG. 23*b*). On acceptance, processor 542 generates a signal HOLD ACKNOWLEDGE (HOLD A) which works through tri-state buffers 510, 511 and through buffers 563 and 570 to release Address bus 507, Data bus 508 and MEM READ, MEM WRITE, and MEM REQ channels (FIGS. 20, 21) to Refresh Control 605 of I/O Module 502.

Referring to FIGS. 23(*a, b*), I/O Module 502 interfaces with CPU module 500 through bi-directional Address, and Data buses 507, 508, respectively, and control bus 509. I/O Module 502 appears to CPU module 500 as a memory portion. Data transfers between CPU and I/O modules 500, 502, and commands to I/O module 502 except for output refresh are controlled by memory reference instructions executed by CPU module 500. Output refresh which is initiated by one of several uniquely decoded memory reference commands, enables Direct Memory access (DMA) by I/O module 502 of RAM section 546.

I/O module 502 includes Matrix Input select 604 (through which inputs from the host machine 10, are received), Refresh Control 605, Nonvolatile (NV) memory 610, Interrupt Control 612 (FIG. 23*a*), Watch dog Timer and failure Flag 614 and clock 570.

A Function Decode Section 601 receives and interprets commands from CPU section 500 by decoding information on address bus 507 along with control signals from processor 542 on control bus 509. On command, decode section 601 generates control signals to perform the function indicated. These functions include (a) controlling tri-state buffers 620 to establish the direction of data flow in Data bus 508; (b) strobing data from Data bus 508 into buffer latches 622; (c) controlling multiplexer 624 to put data from Interrupt Control 612, Real Time clock register 621, Matrix Input Select 604 or N.V. memory 610 onto data bus 508; (d) actuating refresh control 605 to initiate a DMA operation; (e) actuating buffers 634 to enable address bits A0-A7 to be sent to the host machine 10 for input matrix read operations; (f) commanding operation of Matrix Input Select 604; (g) initiating read or write operation of N.V. memory 610 through Memory Control 638; (h) loading Real Time clock register 621 (FIG. 23*a*) from data bus 508; and (i) resetting the Watch Dog timer and setting the Fault Failure flag 614. In addition, section 601 includes logic to control and synchronize the READY control line to CPU module 500, the READY line being used to advise module 500 when data placed on the Data bus by I/O module 502 is valid.

Watch dog timer and failure flag 614, which serves to detect certain hardwired and software malfunctions, comprises a free running counter which under normal circumstances is periodically reset by an output refresh command (REFRESH) from Function Decode Section 601. If an output refresh command is not received within a preset time interval, (i.e., 25 m sec) a fault flip flop is set and a signal (FAULT) sent to the host machine 10. The signal (FAULT) also raises the HOLD line (via Refresh Control 605) to disable CPU Module 500. Clearing of the fault flip flop may be by cycling power or generating a signal (RESET). A selector (not shown) may be provided to disable (DISABLE) the watch dog timer when desired. The fault flip flop may also be set by a command from the CPU Module to indicate that the operating program detected a fault.

Matrix Input select 604 which controls receipt of data from host machine 10 has capacity to read up to 32 groups of 8 discrete inputs from host machine 10. Lines $A_3$ through $A_7$ of Address bus 507 are routed to host machine 10 via optical isolator 569 and CPU Interface Module 504 to select the desired group of 8 inputs. The selected inputs from machine 10 are received by matrix 604 via Input Matrix Module 524 (FIG. 28) and are placed by matrix 604 onto data bus 508 and sent to CPU Module 500 via multiplexer 624. Bit selection is effected by lines $A_0$ through $A_2$ of Address bus 507.

Output refresh control 605, when initiated, transfers either 16 or 32 sequential words from the memory output buffer (DATA OUT) of Ram memory section 546 to host machine 10 at the predetermined clock rate in line 574. Direct Memory access (DMA) is used to facilitate transfer of the data at a relatively high rate. On a Refresh signal from Function Decode Section 601, Refresh Control 605 generates a HOLD signal to processor 542. On acknowledgement (HOLD A) processor 542 enters a hold condition. In this mode, CPU Module 500 releases address and data buses 507, 508 (through actuation of tristate buffers 510, 511 as described) to the high impedance state giving I/O module 502 control thereover. I/O module 502 then sequentially accesses the 32 memory words from output buffer (DATA OUT) of RAM section 546 (REFRESH ADDRESS) and transfers the contents to the host machine 10 via data bus 508 and optical isolator 569. CPU Module 500 is dormant during this period.

On capture of the address and data buses 507, 508, a control signal (LOAD) from Refresh Control 605 together with a clock signal (CLOCK) are utilized to generate eight 32 bit serial words which are transmitted serially via CPU Interface Module 504 to the host machine remote locations where serial to parallel transformation is performed. Alternatively, the data may be stored in addressable latches and distributed in parallel directly to the required destinations.

N.V. memory 610 comprises a predetermined number of bits of nonvolatile memory stored in I/O module 502 under Memory Control 638. N.V. memory 610 appears to CPU module 500 as part of the CPU module memory complement and therefore may be accessed by the standard CPU memory reference instruction set. Referring particularly to FIG. 24, to sustain the contents of N.V. memory 610 should system power be interrupted, one or more rechargeable batteries 635 are provided exterior to I/O module 502. CMOS protective circuitry 636 couples batteries 635 to memory 610 to preserve memory 610 on a failure of the system power. A logic signal (INHIBIT RESET) prevents the CPU Module 500 from being reset during the N.V. memory write cycle interval so that any write operation in progress will be completed before the system is shut down.

For tasks that require frequent servicing, high speed response to external events, or synchronization with the operation of host machine 10, a multiple interrupt system is provided. These comprise machine based interrupts, herein referred to as Pitch Reset interrupt and the Machine interrupt, as well as a third clock driven interrupt, the Real Time interrupt.

Referring particularly to FIG. 23(*a*) the highest priority interrupt signal, Pitch reset signal 640, is generated by the signal output of pitch reset clock 138. The clock signal is fed via optical isolator 645 and digital filter 646 to edge trigger flip flop 647.

The second highest priority interrupt signal, machine clock signal 641, is sent directly from machine clock 202 through isolation transformer 648 to a phase locked loop 649. Loop 649, which serves as bandpath filter and signal conditioner, sends a square wave signal to edge trigger flip flop 651. The second signal output (LOCK) serves to indicate whether loop 649 is locked onto a valid signal input or not.

The lowest priority interrupt signal, Real Time Clock signal 643, is generated by register 621. Register 621 which is loaded and stored by memory reference instructions from CPU module 500 is decremented by a clock signal in line 643 which may be derived from I/O Module clock 570. On the register count reaching zero, register 621 sends an interrupt signal to edge trigger flip flop 656. A spare interrupt 642 is also provided.

Setting of one or more of the edge trigger flip flops 647, 651, 654, 656 by the interrupt signals 640, 641, 642, 643 generates a signal (INT) via priority chip 659 to processor 542 of CPU Module 500 (FIG. 18a). On acknowledgement, processor 542, issues a signal (INTA) transferring the status of the edge trigger flip flops 647, 651, 654, 656 to a four bit latch 660 to generate an interrupt instruction code (RESTART) onto the data bus 508.

Each interrupt is assigned a unique RESTART instruction code. Should an interrupt of higher priority be triggered, a new interrupt signal (INT) and RESTART instruction code are generated resulting in a nesting of interrupt software routines whenever the interrupt recognition circuitry is enabled within the CPU 500.

Priority chip 659 serves to establish a handling priority in the event of simultaneous interrupt signals in accordance with the priority schedule described.

Once triggered, the edge trigger flip flop 647, 651, 654 or 656 must be reset in order to capture the next occurrence of the interrupt associated therewith. Each interrupt subroutine serves, in addition to performing the functions programmed, to reset the flip flops (through the writing of a coded byte in a uniquely selected address) and to re-enable the interrupt (through execution of a re-enabling instruction). Until re-enabled, initiation of a second interrupt is precluded while the first interrupt is in progress.

Lines 658 permit interrupt status to be interrogated by CPU module 500 on a memory reference instruction.

I/O Module 502 includes a suitable pulse generator or clock 570 for generating the various timing signals required by module 502. Clock 570 is driven by the pulse-like output $\phi_{1-1}$, $\phi_{2-1}$ of processor clock 552 (FIG. 19*a*). As described, clock 570 provides a reference clock pulse (in line 574) for synchronizing the output refresh data and is the source of clock pulses (in line 643) for driving Real Time register 621.

Figure 25:
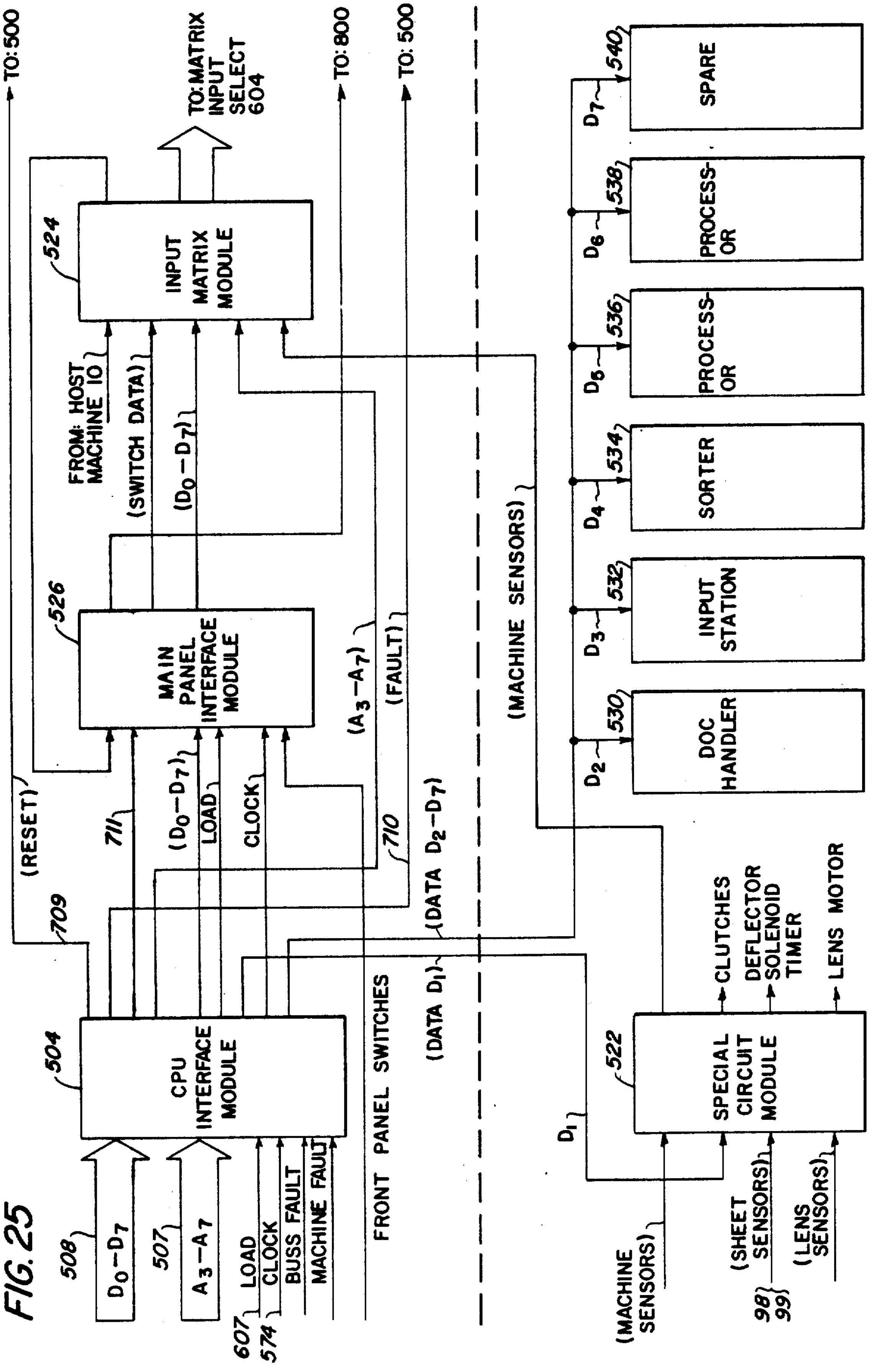
FIG. 25 is a block diagram of the apparatus interface and remote output connections.
Figure 26:
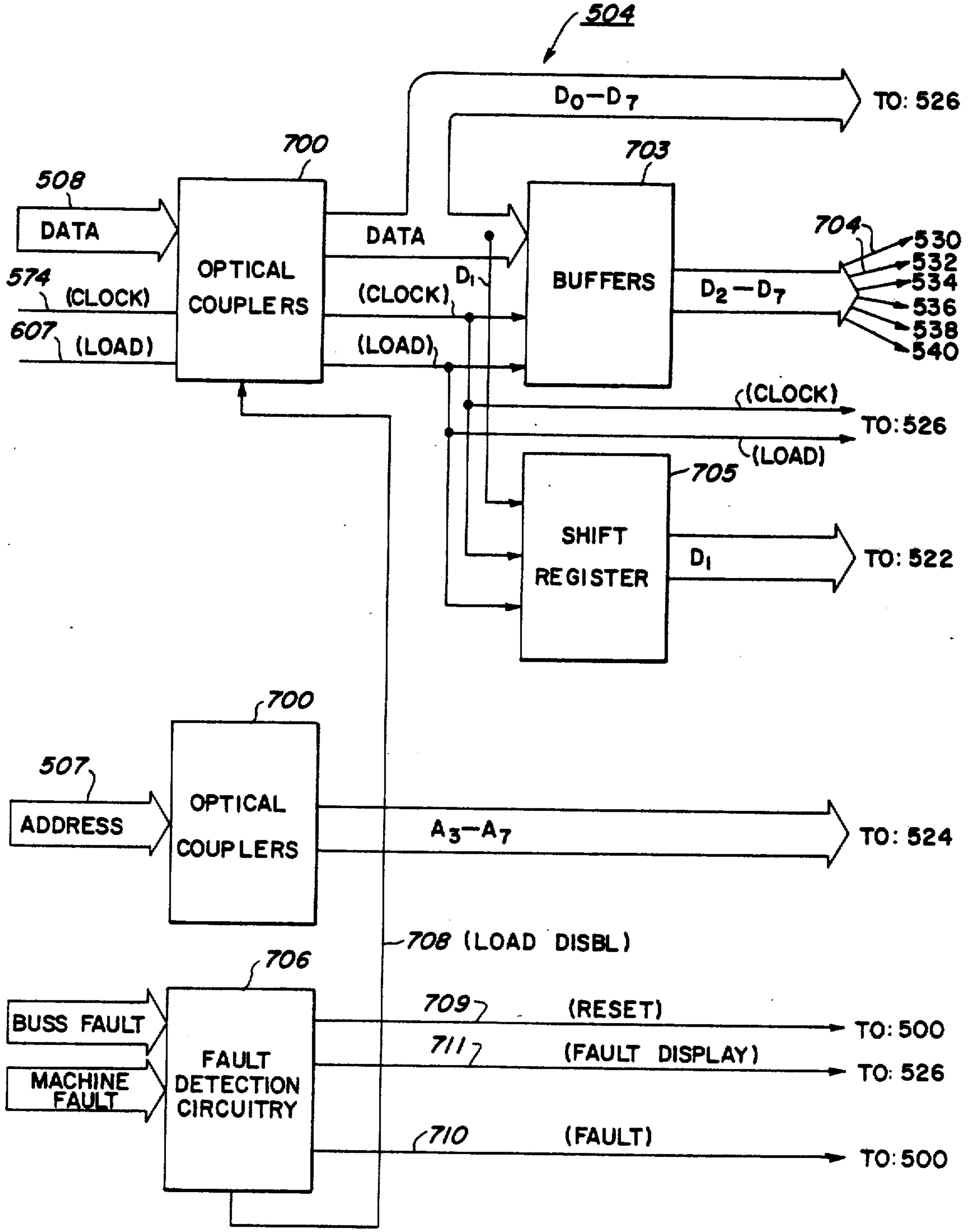
FIG. 26 is a block diagram of the CPU interface module.

CPU interface module 504 interfaces I/O module 502 with the host machine 10 and transmits operating data stored in RAM section 546 to the machine. Referring particularly to FIGS. 25 and 26, data and address information are inputted to module 504 through suitable means such as optical type couplers 700 which convert the information to single ended logic levels. Data in bus 508 on a signal from Refresh Control 605 in line 607 (LOAD), is clocked into module 546 at the reference clock rate in line 574 parallel by bit, serial by byte for a preset byte length, with each data bit of each successive byte being clocked into a separate data channel D0-D7. As best seen in FIG. 25, each data channel D0-D7 has an assigned output function with data channel D0 being used for operating the front panel lamps 830 in the digital display, (see FIG. 32), data channel D1 for special circuits module 522, and remaining data channels D2-D7 allocated to the host machine operating sections 530, 532, 534, 536, 538 and 540. Portions of data channels D1-D7 have bits reserved for front panel lamps and digital display.

Since the bit capacity of the data channels D2-D7 is limited, a bit buffer 703 (FIG. 26) is preferably provided to catch any bit overflow in data channels D2-D7.

Inasmuch as the machine output sections 530, 532, 534, 536, 538 and 540 are electrically a long distance away, i.e. remote, from CPU interface module 504, and the environment is electrically "noisy", the data stream in channels D2-D7 is transmitted to remote sections 530, 532, 534, 536, 538 and 540 via a shielded twisted pair 704. By this arrangement, induced noise appears as a differential input to both lines and is rejected. The associated clock signal for the data is also transmitted over line 704 with the line shielded carrying the return signal currents for both data and clock signals.

Data in channel $D_1$ destined for special circuits module 522 is inputted to shift register type storage circuitry 705 for transmittal to module 522. Display data ($D_0$-$D_7$) is also inputted to main panel interface module 526. Address information in bus 507 is converted to single ended output by couplers 700 and transmitted to Input Matrix Module 524 to address host machine inputs.

CPU interface module 504 includes fault detector circuitry 706 for monitoring both faults occurring in host machine 10 and faults or failures along the buses, the latter normally comprising a low voltage level or failure in one of the system power lines. Machine faults may comprise a fault in CPU module 500, a belt mistrack signal from sensor 27 (see FIG. 2), opening one of the machine doors or covers as responded to by conventional cover interlock sensors (910, FIG. 1*b*), a fuser over temperture as detected by sensor 175, etc. In the event of a bus fault, a reset signal (RESET) is generated automatically in line 709 to CPU module 500 (see FIGS. 17 and 18*a*) until the fault is removed. In the event of a machine fault, a signal is generated in line 710 to actuate a suitable relay (not shown) controlling power to all or a portion of host machine 10. A load disabling signal (LOAD DISBL) is inputted to DATA receiving optical couplers 700 via line 708 in the event of a fault in CPU module 500 to terminate input of data to host machine 10. Other fault conditions are monitored by the software background program. In the event of a fault, a signal is generated in line 711 to the digital display on control console 800 (via main panel interface module 526) signifying a fault.

Figure 27:
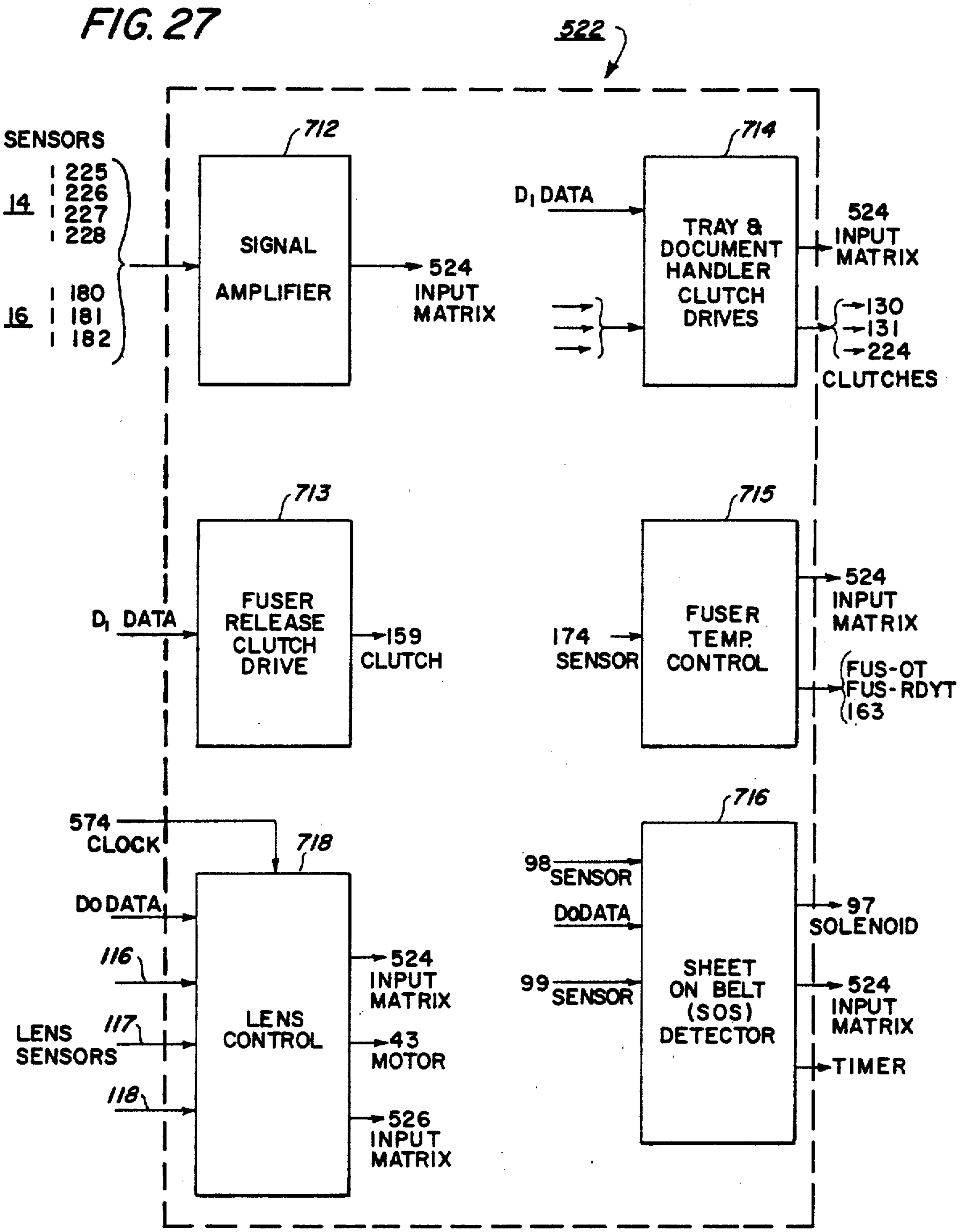
FIG. 27 is a block diagram of the apparatus special circuits module.

Referring particularly to FIGS. 25 and 27, special circuits module 522 comprises a collection of relatively independent circuits for either monitoring operation of and/or driving various elements of host machine 10. Module 522 incorporates suitable circuitry 712 for amplifying the output of sensors 225, 226, 227, 228 and 280, 281, 282 of sorter 14 and document handler 16 respectively; circuitry 713 for operating fuser release clutch 159; and circuitry 714 for operating main and auxiliary paper tray feed roll clutches 130, 131 and document handler feed clutch 244.

Additionally, fuser detection circuitry 715 monitors temperature conditions of fuser 150 as responded to by sensor 174. On overheating of fuser 150, a signal (FUS-OT) is generated to turn heater 163 off, actuate clutch 159 to separate fusing and pressure rolls 160, 161; trigger trap solenoid 158 to prevent entrance of the next copy sheet into fuser 150, and initiate a shutdown of host machine 10. Circuitry 715 also cycles fuser heater 163 to maintain fuser 150 at proper operating temperatures and signals (FUS-RDYT) host machine 10 when fuser 150 is ready for operation.

Circuitry 716 provides closed loop control over sensor 98 which responds to the presence of a copy sheet 3 on belt 20. On a signal from sensor 98, solenoid 97 is triggered to bring deflector 96 into intercepting position adjacent belt 20. At the same time, a backup timer (not shown) is actuated. If the sheet is lifted from the belt 20 by deflector 96 within the time allotted, a signal from sensor 99 disables the timer and a misstrip type jam condition of host machine 10 is declared and the machine is stopped. If the signal from sensor 99 is not received within the allotted time, a sheet on selenium (SOS) type jam is declared and an immediate machine stop is effected.

Circuitry 718 controls the position (and hence the image reduction effected) by the various optical elements that comprise main lens 41 in response to the reduction mode selected by the operator and the signal inputs from lens position responsive sensors 116, 117, 118. The signal output of circuitry 718 serves to operate lens drive motor 43 as required to place the optical elements of lens 41 in proper position to effect the image reduction programmed by the operator.

Figure 28:
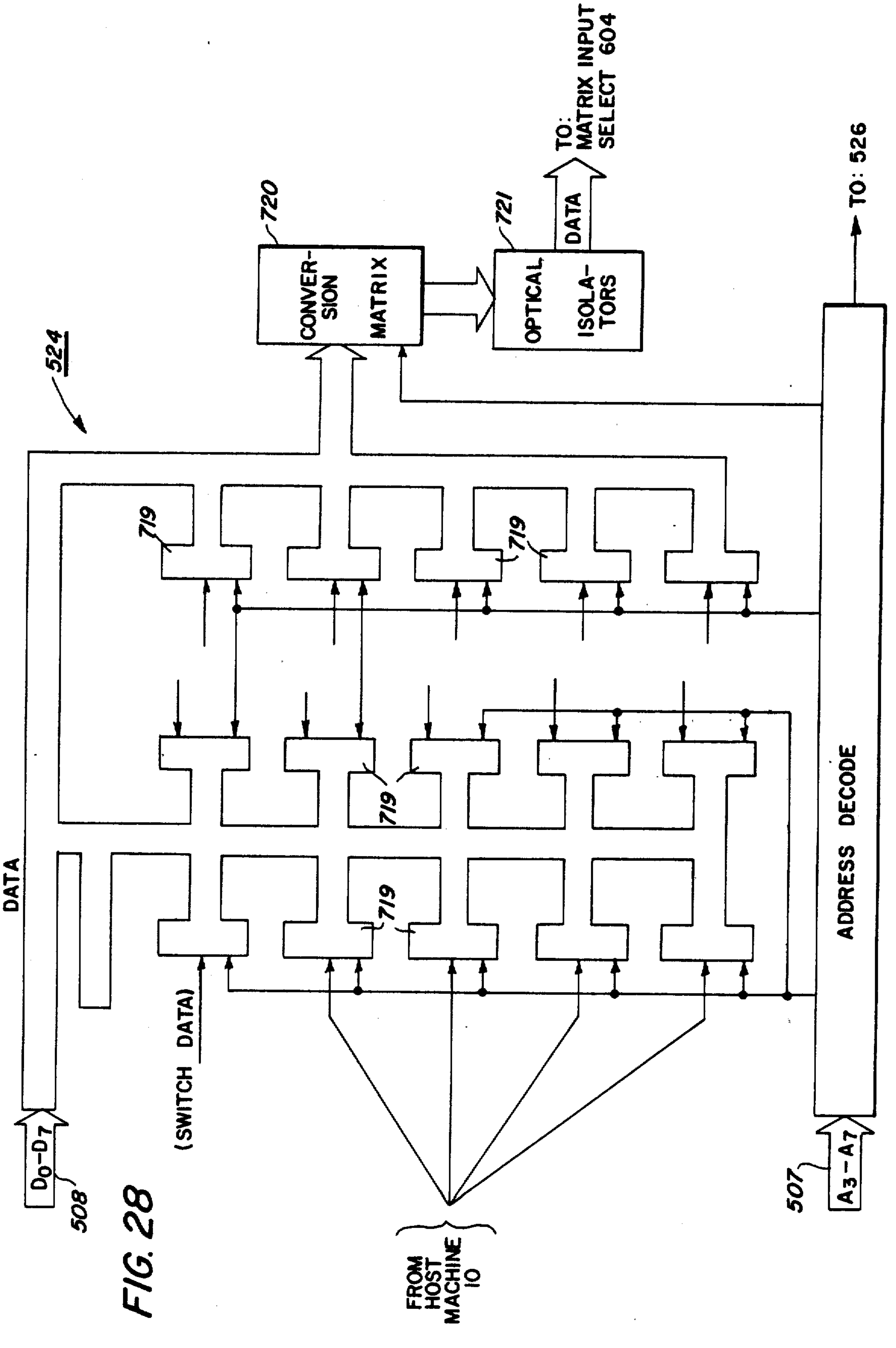
FIG. 28 is a block diagram of the main panel interface module.

Referring to FIG. 28, input matrix module 524 provides analog gates 719 for receiving data from the various host machine sensors and inputs (i.e. sheet sensors 135, 136; pressure sensor 157; etc), and data (SWITCH DATA) from the various switches on Console 800 (FRONT PANEL SWITCHES—FIG. 25) module 524 serving to convert the signal input to a byte oriented output for transmittal to I/O module 502 under control of Input Matrix Select 604 (FIG. **23*b*). The byte output to module 524 is selected by address information inputted on bus 507 and decoded on module 524. Conversion matrix 720, which may comprise a diode array, converts the input logic signals of "0" to logic "1" true. Data from input matrix module 524 is transmitted via optical isolators 721 to Input Matrix Select 604 of I/O module 502 (FIG. 23*b*). From there, the data is transmitted through Multiplexer 624 and buffers 620 to CPU Module 500**.

Figure 29:
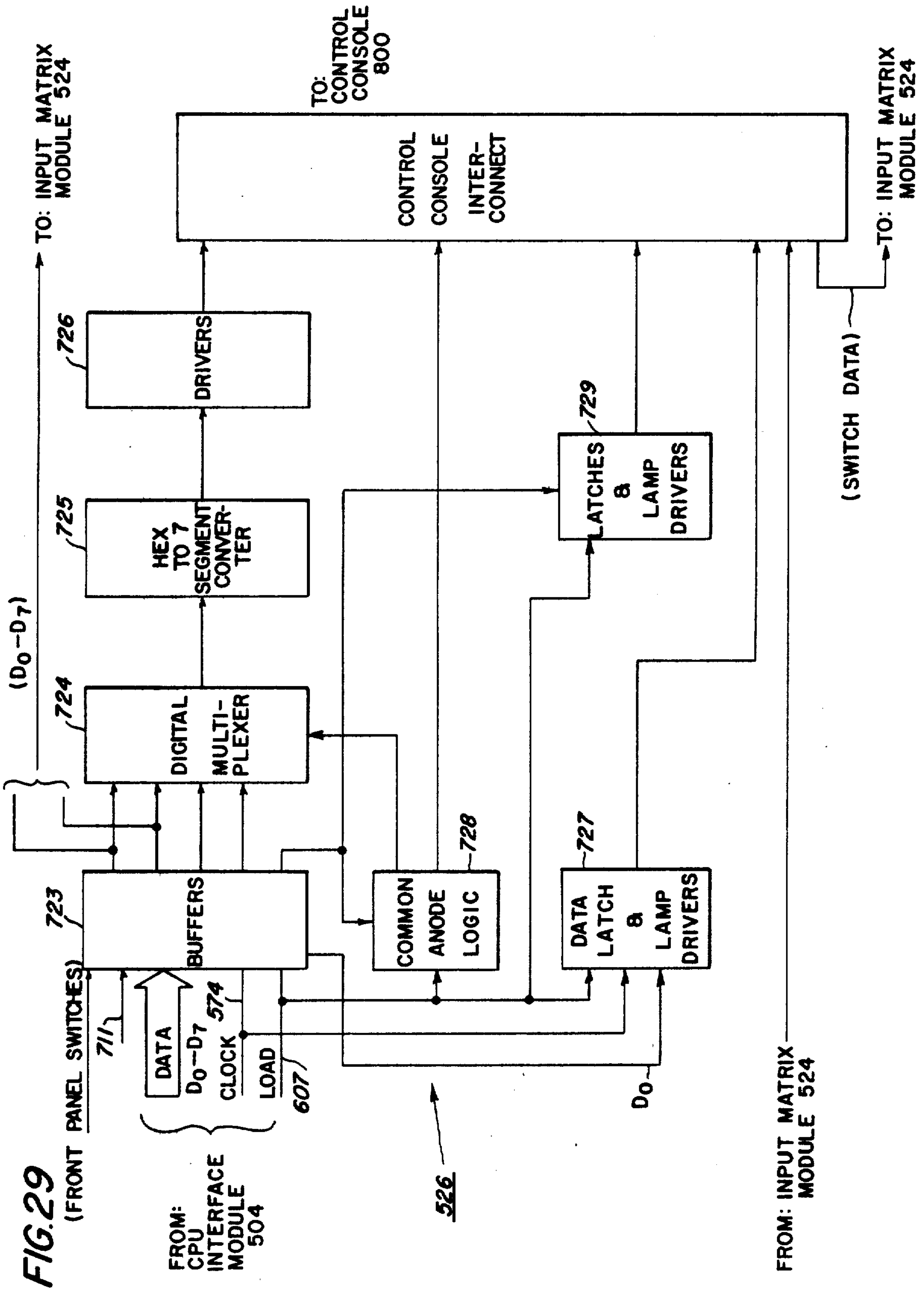
FIG. 29 is a block diagram of the input matrix module.

Referring particularly to FIG. 29, main panel interface module 526 serves as interface between CPU interface module 504 and operator control console 800 for display purposes and as interface between input matrix module 524 and the console switches. As described, data channels D0-D7 have data bits in each channel associated with the control console digital display or lamps. This data is clocked into buffer circuitry 723 and from there, for digital display, data in channels D1-D7 is inputted to multiplexer 724. Multiplexer 724 selectively multiplexes the data to HEX to 7 segment converter 725. Software controlled output drivers 726 are provided for each digit which enable the proper display digit in response to the data output of converter 725. This also provides blanking control for leading zero suppression or inter digit suppression.

Buffer circuitry 723 also enables through anode logic 728 the common digit anode drive. The signal (LOAD) to latch and lamp driver control circuit 729 regulates the length of the display cycle.

For console lamps 830, data in channel D0 is clocked to shift register 727 whose output is connected by drivers to the console lamps. Access by input matrix module 524 to the console switches and keyboard (FRONT PANEL SWITCHES) is through main panel interface module 526.

The machine output sections 530, 532, 534, 536, 538, 540 are interfaced with I/O module 502 by CPU interface module 504. At each interrupt/refresh cycle, data is outputted to sections 530, 532, 534, 536, 538, 540 at the clock signal rate in line 574 over data channels D2, D3, D4, D5, D6, D7 respectively.

Figure 30:
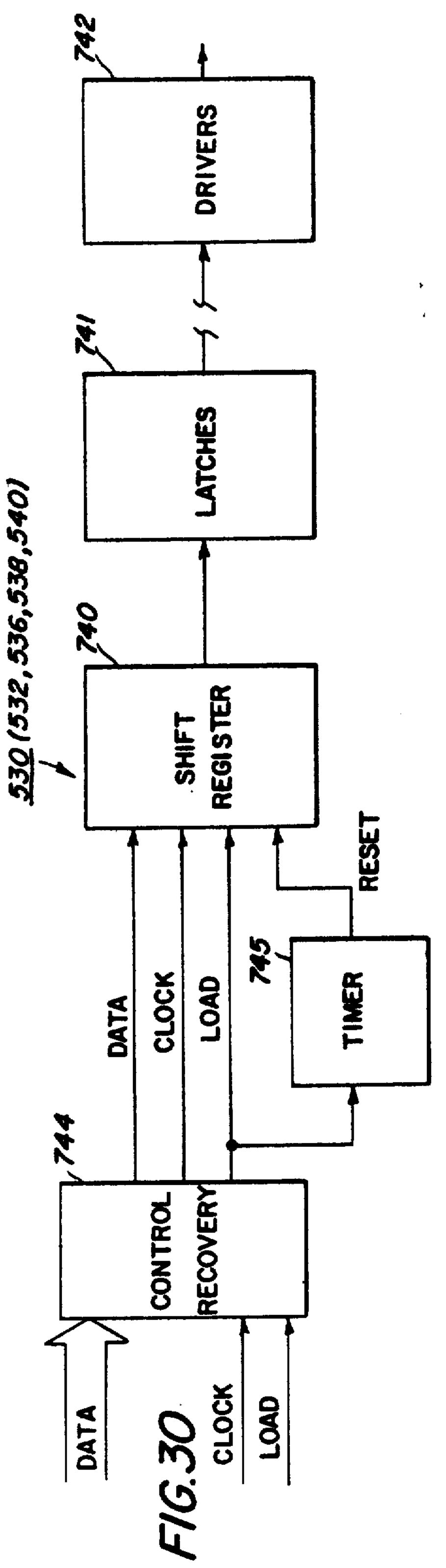
FIG. 30 is a block diagram of a typical remote.

Referring to FIG. 30, wherein a typical output section i.e. document handler section 530 is shown, data inputted to section 530 is stored in shift register/latch circuit combination 740, 741 pending output to the individual drivers 742 associated with each machine component. Preferably d.c. isolation between the output sections is maintained by the use of transformer coupled differential outputs and inputs for both data and clock signals and a shielded twisted conductor pair. Due to transformer coupling, the data must be restored to a d.c. waveform. For this purpose, control recovery circuitry 744, which may comprise an inverting/non-inverting digital comparator pair and output latch is provided.

The LOAD signal serves to lockout input of data to latches 741 while new data is being clocked into shift register 740. Removal of the LOAD signal enables commutation of the fresh data to latches 741. The LOAD signal also serves to start time 745 which imposes a maximum time limit within which a refresh period (initiated by Refresh Control 605) must occur. If refresh does not occur within the prescribed time limit, timer 745 generates a signal (RESET) which sets shift register 740 to zero.

With the exception of sorter section 534 discussed below, output sections 532, 536, 538 and 540 are substantially identical to document handler section 530.

Figure 31:
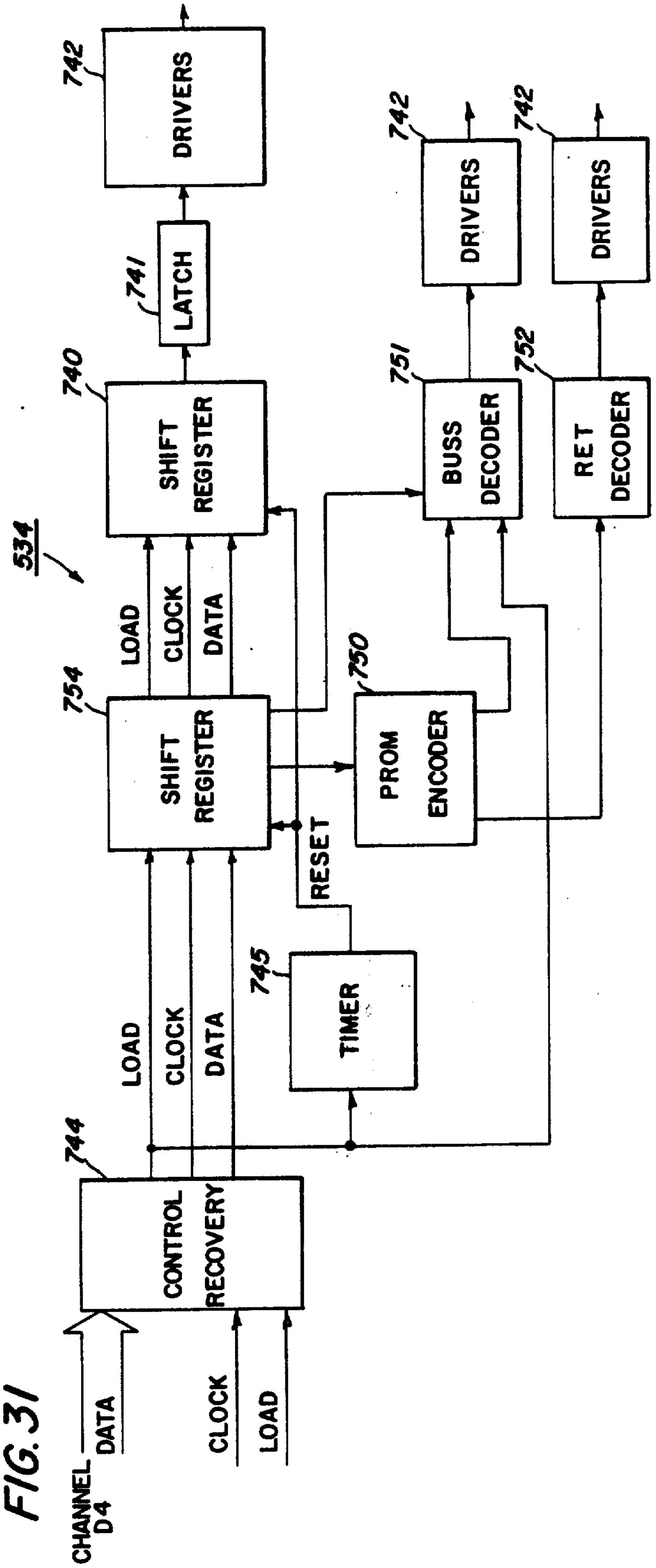
FIG. 31 is a block diagram of the sorter remote.

Referring to FIG. 31 wherein like numbers refer to like parts, to provide capacity for driving the sorter deflector solenoids 221, a decode matrix arrangement consisting of a Prom encoder 750 controlling buss decoder (BUSS DECODER) 751, and return decoder 752 (RET DECODER) is provided. The output of decoders 751, 752 drive the sorter solenoids 221 of upper and lower bin arrays 210, 211 respectively. Data is inputted to encoder 750 by means of shift register 754.

Figure 32:
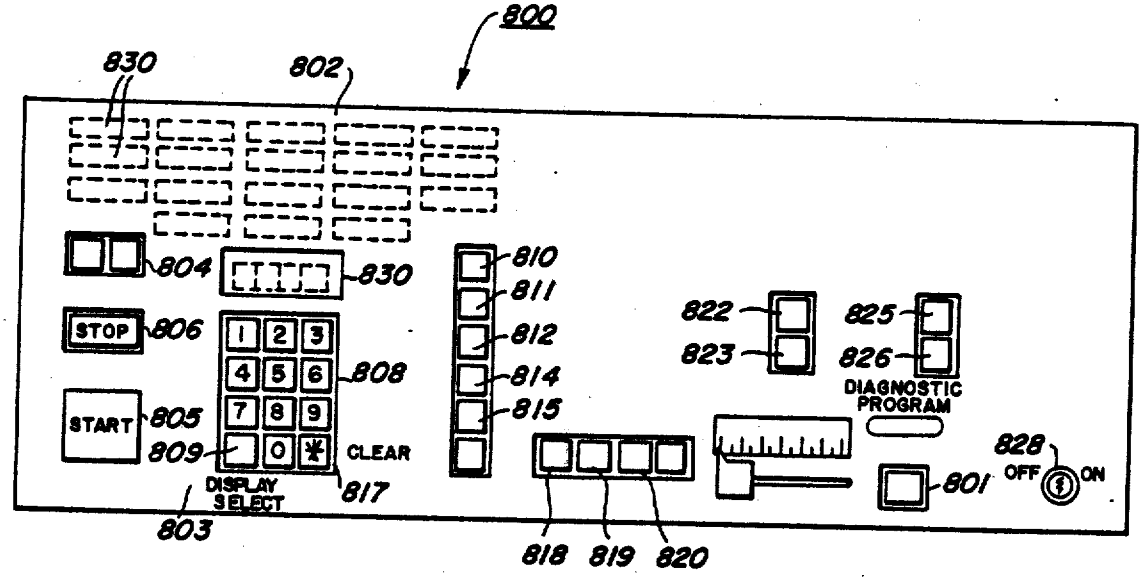
FIG. 32 is a view of the control console for inputting copy run instructions to the apparatus shown in FIG. 1.

Referring now to FIG. 32, control console 800 serves to enable the operator to program host machine 10 to perform the copy run or runs desired and to select the features to be utilized. At the same time, various indicators on console 800 reflect the operational condition of machine 10. Console 800 includes a bezel housing 802 suitably supported on host machine 10 at a convenient point with decorative front or face panel 803 on which the various machine programming buttons and indicators appear. A fixed number of console input selection devices are provided. Preferably, these devices are buttons which include power on/off buttons 804, start print (PRINT) buttons 805, stop print (STOP) button 806 and keyboard copy quantity selector 808. Furthermore, a series of feature select buttons consisting of auxiliary paper tray button 810, two sided copy button 811, copy lighter button 814, and copy darker button 815, are provided to select the desired features of the machine in carrying out the copy run. Additionally, image size selector buttons 818, 819, 820; multiple or single document select buttons 822, 823 for operation of document handler 16; and sorter sets or stacks buttons 825, 826 are provided. An on/off service selector 828 is also provided for activation during machine servicing.

Indicators comprise program display lamps 830 and displays such as READY, WAIT, SIDE 1, SIDE 2, ADD PAPER, CHECK STATUS PANEL, PRESS FAULT CODE, QUANTITY COMPLETED, CHECK DOORS, UNLOAD AUX TRAY, CHECK DOCUMENT PATH, CHECK PAPER PATH, JOB INCOMPLETE and UNLOAD SORTER. Other display information may be envisioned.

MACHINE OPERATION

As will appear, host machine 10 is conveniently divided into a number of operational states. The machine control program is divided into background routines and Foreground routines with operational control normally residing in the Background routine or routines appropriate to the particular machine state then in effect. The output buffer (DATA OUT) of RAM memory section 546 is used to transfer/refresh control data to the various remote locations in host machine 10, control data from both Background and Foreground routines being inputted to RAM memory section 546 for subsequent transmittal to host machine 10. Transmittal/refresh of control data presently in output buffer (DATA OUT) of section 546 is effected through Direct Memory access (DMA) under the aegis of a Machine Clock interrupt routine.

Foreground routine control data which includes a Run Event Table built in response to the particular copy run or runs programmed, is transferred to output buffer (DATA OUT) of RAM section 546 by means of a multiple prioritized interrupt system wherein the Background routine in process is temporarily interrupted while fresh Foreground routine control data is inputted to the RAM output buffer following which the interrupted Background routine is resumed.

The operating program for host machine 10 is divided into a collection of foreground tasks, some of which are driven by the several interrupt routines and background or non-interrupt routines. Foreground tasks are tasks that generally require frequent servicing, high speed response, or synchronization with the host machine 10. Background routines are related to the state of host machine 10, different background routines being performed with different machine states. A single background software control program (STCK) composed of specific sub-programs associated with the principal operating states of host machine 10 is provided. A byte called STATE contains a number indicative of the current operating state of host machine 10. The machine STATES are as follows:

| STATE NO. | MACHINE STATE | CONTROL SUBR. |
|---|---|---|
| 0 | Software Initialize | INIT |
| 1 | System Not Ready | NRDY |
| 2 | System Ready | RDY |
| 3 | Print | PRINT |
| 4 | System Running, Not Print | RUNNPRT |
| 5 | Service | TECHREP |

Figure 33:
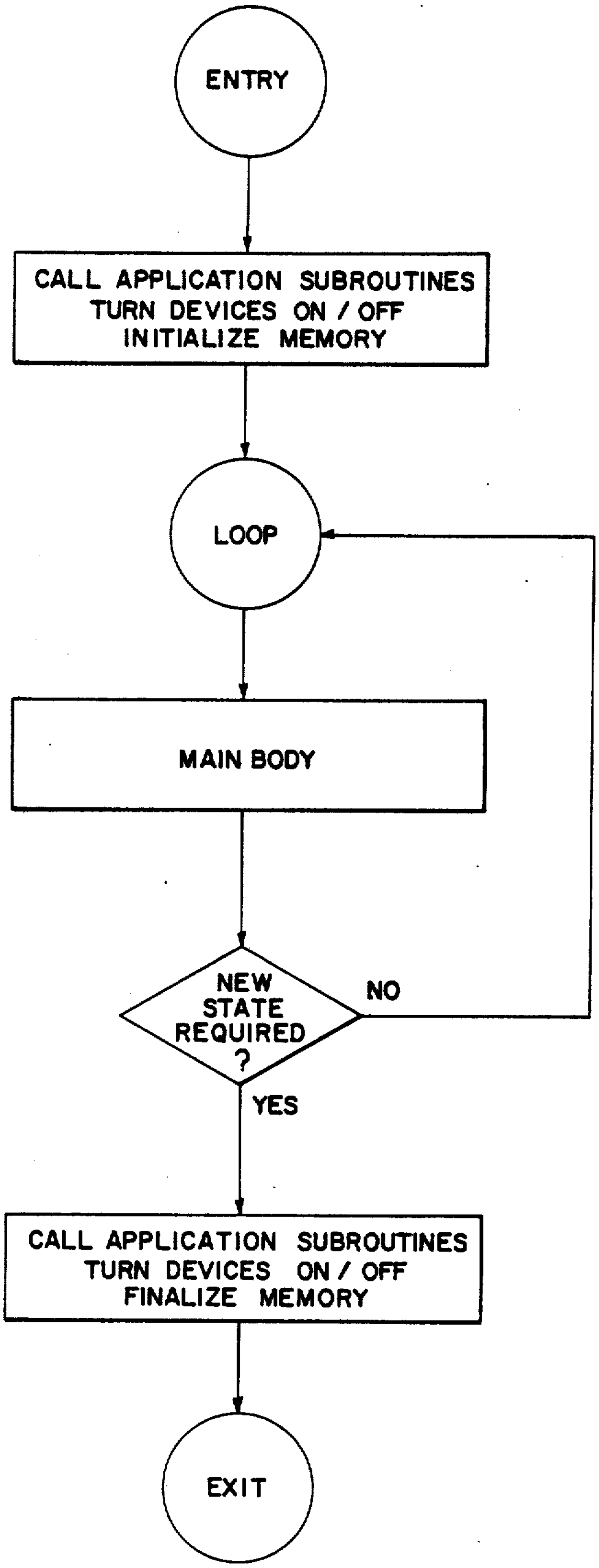
FIG. 33 is a flow chart illustrating a typical machine state.

Referring to FIG. 33, each STATE is normally divided into PROLOGUE, LOOP and EPILOGUE sections. As will be evident from the exemplary program STCK reproduced in TABLE I, entry into a given STATE (PROLOGUE) normally causes a group of operations to be performed, these consisting of operations that are performed once only at the entry into the STATE. For complex operations, a CALL is made to an applications subroutine therefor. Relatively simpler operations (i.e. turning devices on or off, clearing memory, presetting memory, etc.) are done directly.

Once the STATE PROLOGUE is completed, the main body (LOOP) is entered. The program (STCK) remains in this LOOP until a change of STATE request is received and honored. On a change of STATE request, the STATE EPILOGUE is entered wherein a group of operations are performed, following which the STATE moves into the PROLOGUE of the next STATE to be entered.

Figure 34:
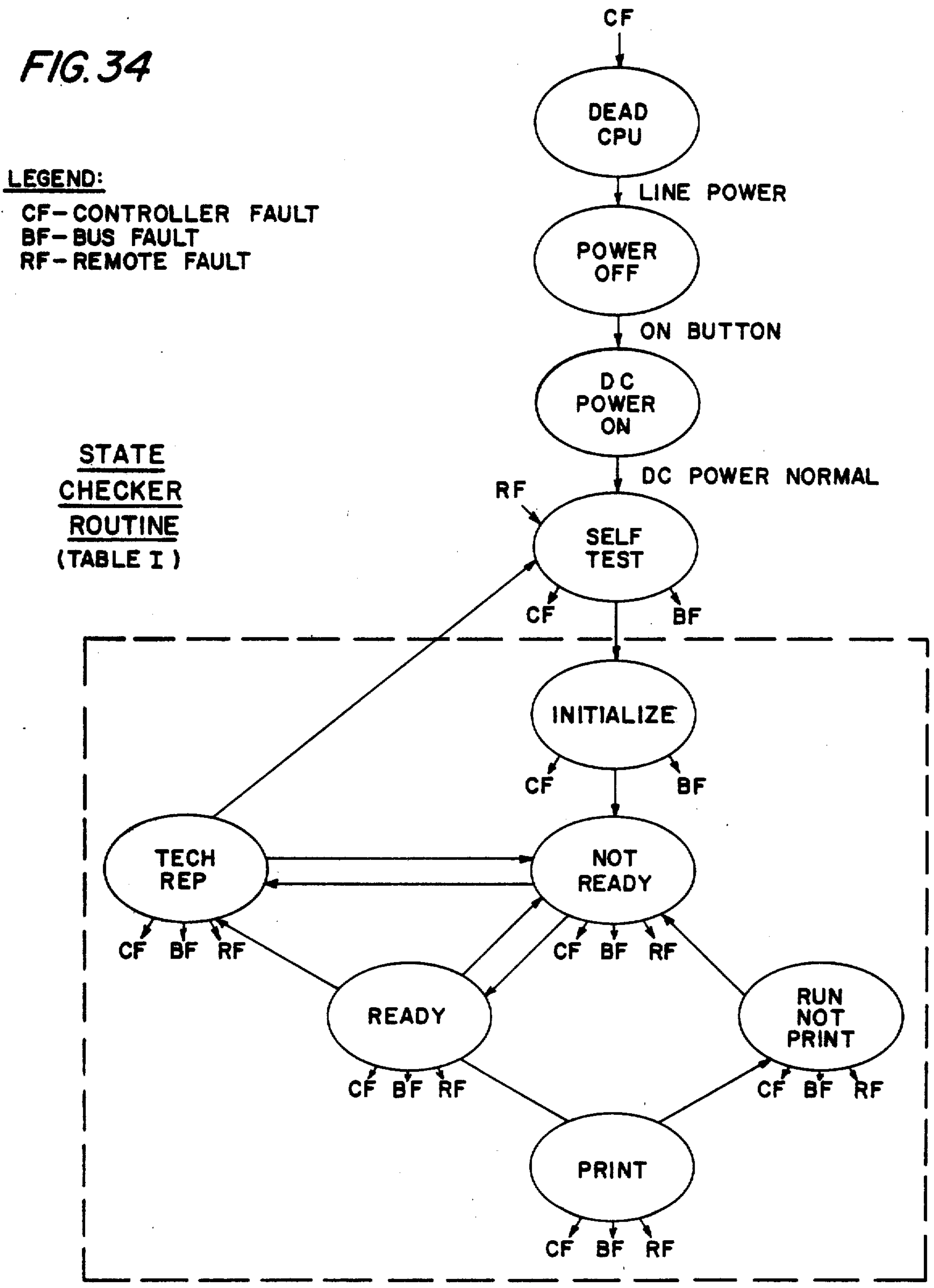
FIG. 34 is a flow chart of the machine state routine.

Referring to FIG. 34 (*a,b*) and the exemplary program (STCK) in TABLE I. On actuation of the machine POWER-ON button 804 (FIG. 32), the software Initialize STATE (INIT) is entered. In this STATE, the controller is initialized and a software controlled self test subroutine is entered. If the self test of the controller is successfully passed, the System Not Ready STATE (NRDY) is entered. If not, a fault condition is signaled.

In the System Not Ready STATE (NRDY), background subroutines are entered. These include setting of Ready flags, control registers, timers, and the like; turning on power supplies, the fuser, etc., initializing the Fault Handler, checking for paper jams (left over from a previous run), door and cover interlocks, fuser temperatures, etc. During this period, the WAIT lamp on console 800 is lit and operation of host machine 10 precluded.

When all ready conditions have been checked and found acceptable, the controller moves to the system ready state (RDY). The READY lamp on console 800 is lit and final ready checks made. Host Machine 10 is now ready for operation upon completion of input of a copy run program, loading of one or more originals 2 into document handler 16 (if selected by the operator), and actuation of START PRINT button 805. As will appear hereinafter, the next state is PRINT wherein the particular copy run programmed is carried out.

While the machine is completing a copy run, the controller normally enters the Run Not Print state (RUNNPRT) where the controller calculates the number of copies delivered, resets various flags, stores certain machine event information in the memory, as well as generally conditioning the machine for another copy run, if desired. The controller then returns to the System Not Ready state (NRDY) to recheck for ready conditions prepatory for another copy run, with the same state sequence being repeated until the machine is turned off by actuation of POWER OFF button 804 or a malfunction inspired shutdown is triggered. The last state (TECH REP) is a machine servicing state wherein certain service routines are made available to the machine/repair personnel, i.e. Tech Reps.

Referring particularly to FIG. 32 and Tables II, III, IV, V, VI and VII, the machine operator uses control console 800 to program the machine for the copy run desired. Programming may be done during either the System Not Ready (NRDY) or System Ready (RDY) states, although the machine will not operate during the System Not ready state should START PRINT button 805 be pushed. The copy run includes selecting (using keyboard 808) the number of copies to be made, and such other ancillary program features as may be desired, i.e. use of auxiliary paper tray 102, (push button 810), image size selection (push buttons 818, 819, 820), document handler/sorter selection (push buttons 822, 823, 825, 826), copy density (push buttons 814, 815), duplex or two sided copy button 811, etc. On completion of the copy run program, START PRINT button 805 is actuated to start the copy run programmed (presuming the READY lamp is on and an original or originals 2 have been placed in tray 233 of document handler 16 if the document handler has been selected).

With programming of the copy run instructions, controller 18 enters a Digit Input routine in which the program information is transferred to RAM section 546. The copy run program data passes via Main Panel Interface Module 526 to Input Matrix Module 524 and from there is addressed through Matrix Input Select 604, Multiplexer 624, and Buffers 620 of I/O Module 502 to RAM section 546 of CPU Module 500.

On entering PRINT STATE, a Run Event Table (FIG. 35) comprised of Foreground tasks is built for operating in cooperation with the background tasks the various components of host machine 10 in an integrated manner to produce the copies programmed. The run Event Table is formed by controller 18 through merger of a Fixed Pitch Event Table (TABLE II) (stored in ROM 545 and Non Volatile Memory 610) and a Variable Pitch Event Table (TABLE III) in a fashion appropriate to the parameters of the job selected.

The Fixed Pitch Event Table (TABLE II) is comprised of machine events whose operational timing is fixed during each pitch cycle such as the timing of bias to transfer roll 75, (TRN 2 CURR), actuating toner concentration sensor 65 (ADC ACT), loading roll 161 of fuser 150 (FUS*LOAD), and so forth, irrespective of the particular copy run programmed. The Variable Pitch Table (TABLE III) is comprised of machine events whose operational timing varies with the individual copy run programmed, i.e. timing of pitch fadeout lamp 44 (FO*ONBSE) and timing of flash illumination lamps 37 (FLSH BSE). The variable Pitch Table is built by the Pitch Table Builder (TABLE IV) from the copy run information programmed in by controller 18 (using the machine control program stored in ROM section 545 and Non-Volatile Memory 610), coupled with event address information from ROM section 545, sorted by absolute clock count (via the routine shown in TABLE V), and stored in RAM section 546 (via the routine shown in TABLE VI). The Fixed Pitch Event Table and Variable Pitch Table are merged with the relative clock count differences between Pitch events calculated to form a Run Event Table (TABLE VII).

Figure 35:
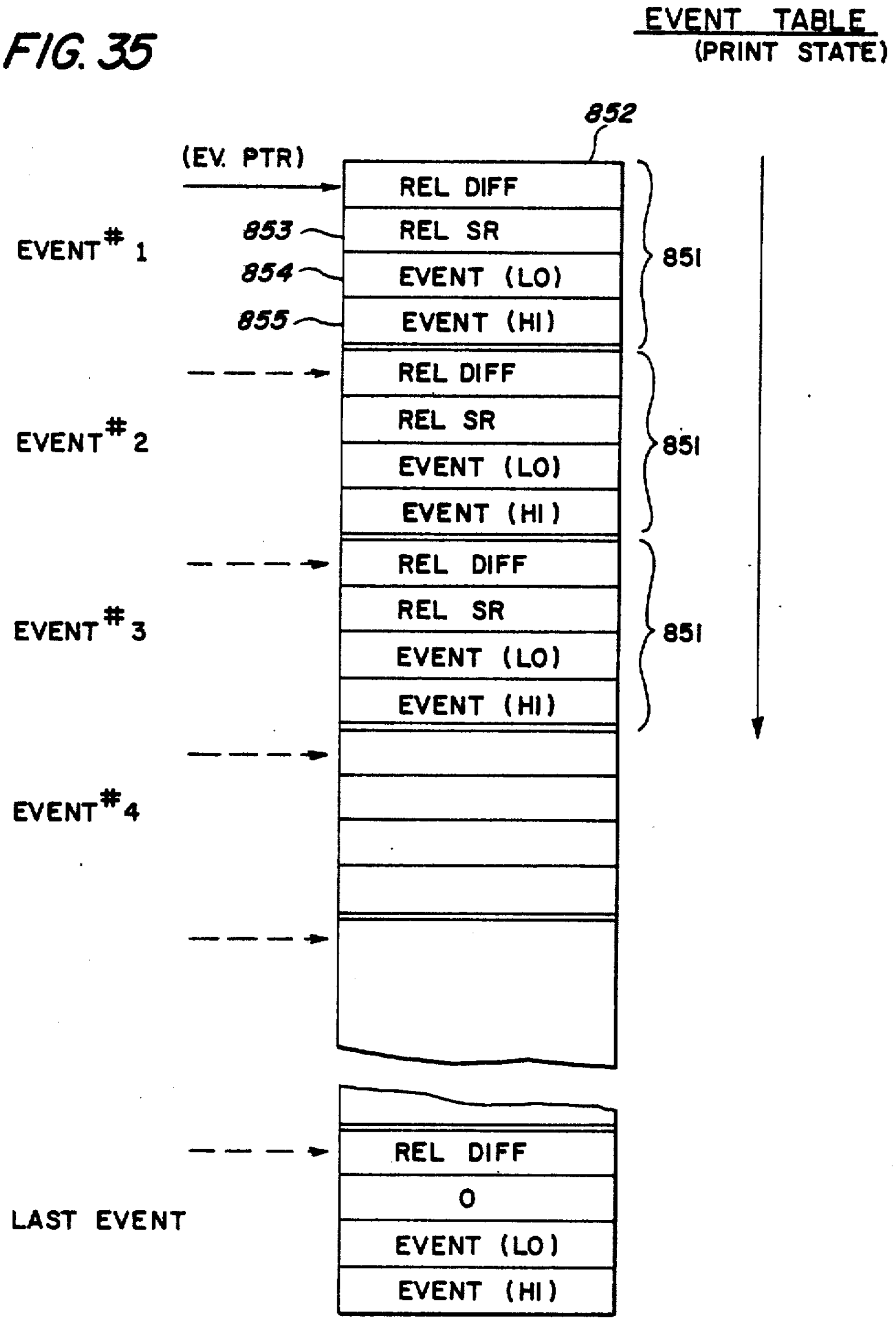
FIG. 35 is a view showing the event table layout.
Figure 36:
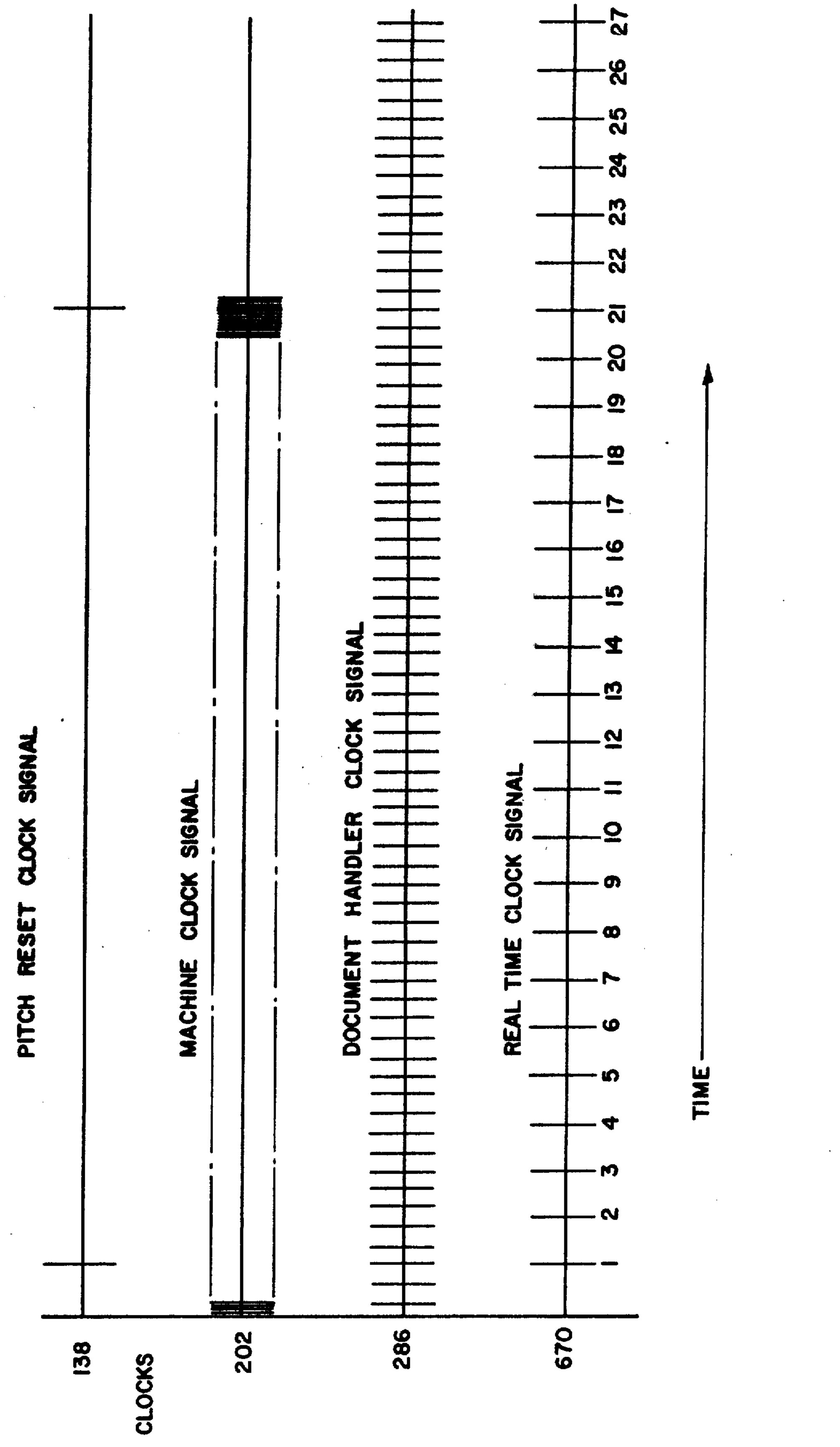
FIG. 36 is a chart illustrating the relative timing sequences of the clock interrupt pulses.
Figure 37:
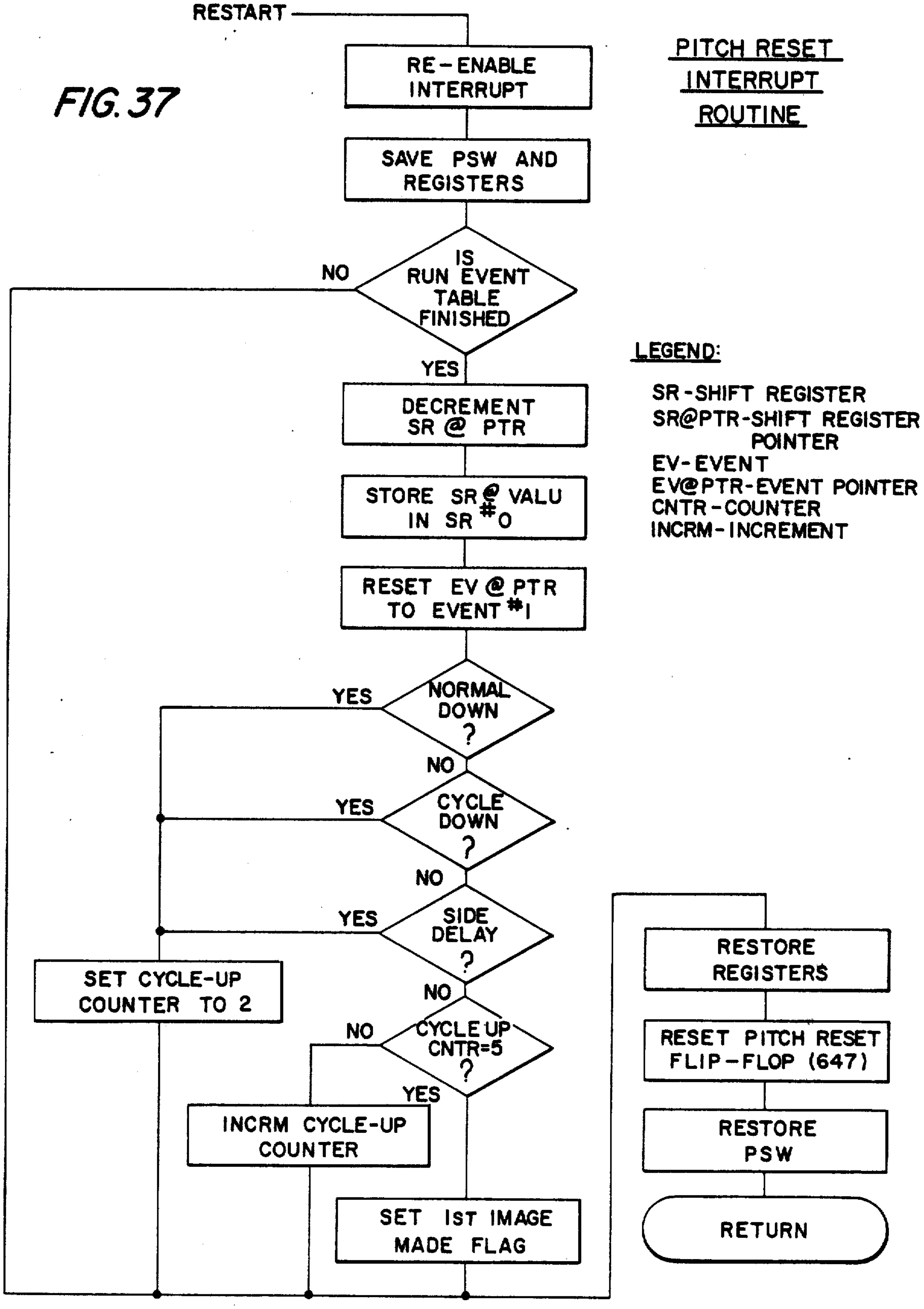
FIG. 37 is a flow charge of the pitch interrupt routine.

Referring particularly to FIG. 35, the Run Event Table consists of successive groups of individual events 851. Each event 851 is comprised of four data blocks, data block 852 containing the number of clock pulses (from machine clock 202) to the next scheduled pitch event (REL DIFF), data block 853 containing the shift register position associated with the event (REL SR), and data blocks 854, 855 (EVENT LO) (EVENT HI) containing the address of the event subroutine.

In machine states other than PRINT, data blocks 852, 853 (REL DIFF) (REL SR) are set to zero. Data blocks 854, 855 hold the address information for the Non-Print state event.

Control Data in the Run Event Table represents a portion of the foreground tasks and is transferred to the output buffer 546′ of RAM memory section 546 by the Pitch Reset and Machine Clock interrupt routines. Other control data, representing foreground tasks not in the Run Event Table is transferred to RAM output buffer 546′ by the Real Time Clock interrupt routine. Transfer of the remainder of the control data to output buffer 546′ is by means of background (non-interrupt) routines.

Transfer of control data from output buffer 546′ of RAM memory section 546 to the various locations in host machine 10 is through output Refresh via Direct Memory access (DMA) in response to machine clock interrupt signals as will appear. The interrupt routines are initiated by the respective interrupt signals.

Referring particularly to FIG. 23 and 35–37 and TABLES VII, VIII the interrupt having the highest priority, the Pitch Reset interrupt (signal 640), is operable only during the PRINT state, and occurs once each revolution of sheet register fingers 141 as responded to by sensor 146 of pitch reset clock 138. At each pitch reset interrupt signal, after a determination of priority by Priority Chip 659 in the event of multiple interrupt signals, an interrupt signal (INT) is generated. The acknowledgement signal (INTA) from processor 542 initiates the pitch reset interrupt routine.

On entering the pitch reset routine, the interrupt is re-enabled and the contents of the program working registers stored. A check is made to determine if building of the Run Event Table is finished. Also checks are made to insure that a new shift register schedules have been built and at least 910 clock counts since the last pitch reset have elapsed. If not, an immediate machine shutdown is initiated.

Presuming that the above checks are satisfactory, the shift register pointer (SR PTR), which is the byte variable containing the address of a pre-selected shift register position (SR O), is decremented by one and adjusted for overflow and the shift register contents are updated with a byte variable (SR+VALUV) containing the new shift register value to be shifted in following the pitch reset interrupt. The event pointer (EV*PTR), a two byte variable containing the full address of the next scheduled event, is reset to Event #1. The count in the C register equals the time to the first event.

Machine Cycle Down, Normal Down, and Side One Delay checks are made, and if negative, the count on a cycle up counter (CYC UP CT) is checked. If the count is less than a predetermined control count (i.e. 5), the counter (CYC UP CT) is incremented by one. When the count on the cycle up counter equals the control count, an Image Made Flag is set.

If a Normal Down, Cycle Down, or Side One Delay has been initiated, the cycle up counter (CYC UP CT)

is reset to a preset starting count (i.e. 2). The pitch reset interrupt routine is exited with restoration of the working registers and resetting of pitch reset flip flop 647.

The Machine Clock Interrupt routine, which is second in priority, is operative in all operational states of host machine 10. Although nominally driven by machine clock 202, which is operative only during Print state when processor main drive motor 34 is energized, machine clock pulses are also provided by phase locked loop 649 when motor 34 is stopped.

Figure 38:
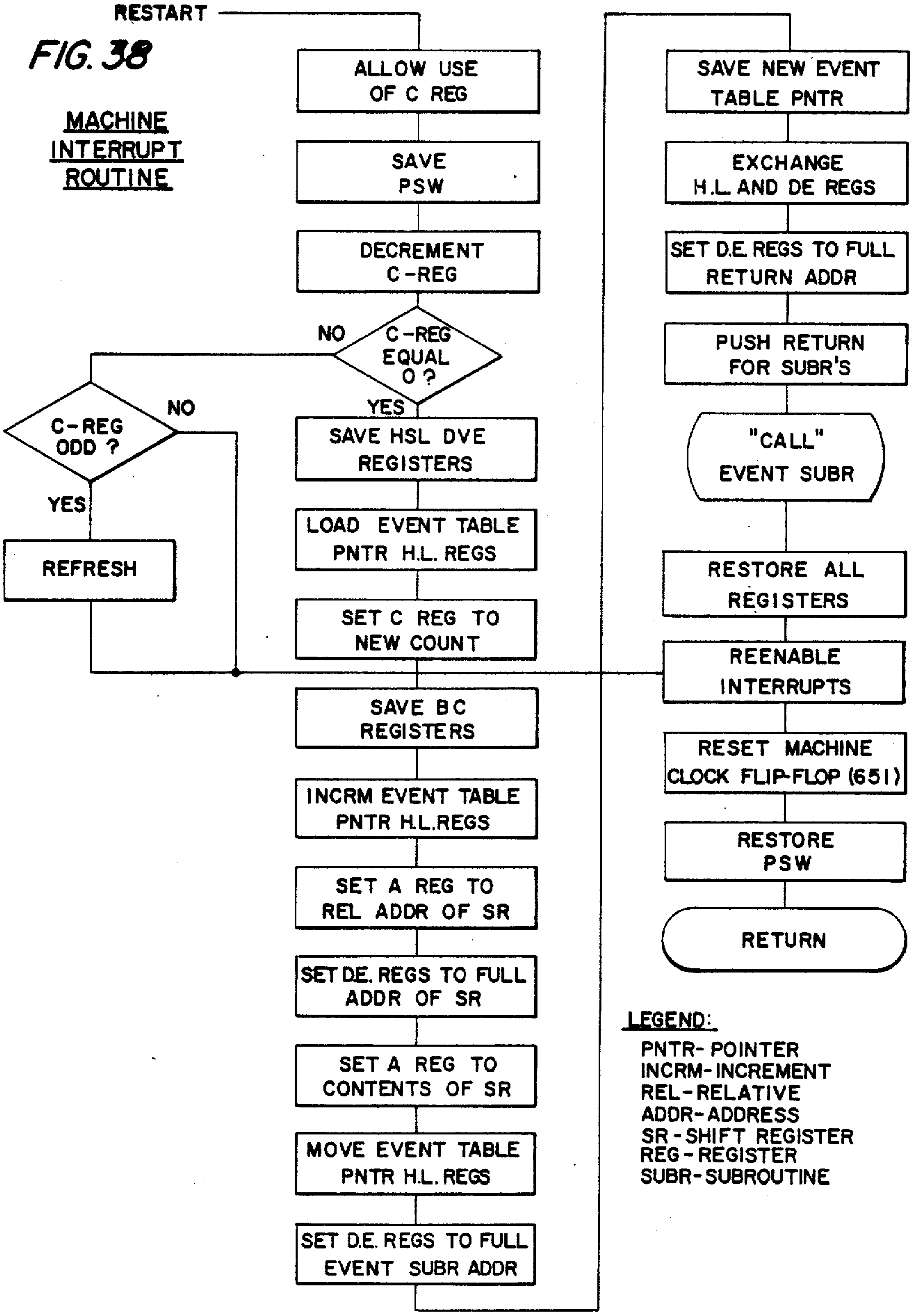
FIG. 38 is a flow chart of the machine clock interrupt routine.

Referring particularly to FIG. 38 and TABLE IX, entry to the Machine Clock interrupt routine there shown is by a signal (INTA) from processor 542 following a machine clock interrupt signal 642 as described earlier. On entry, the event control register (C REG) is obtained and the working register contents stored. The C REG is decremented by one, the register having been previously set to a count corresponding to the next event in the Event Run Table.

The control register (C REG) is checked for zero. If the count is not zero and is an odd number, an output refresh cycle is initiated to effect transfer/refresh of data in RAM output buffer 546' to host machine 10. If the number is even, or following an output refresh, the interrupt system is re-enabled, the machine clock interrupt flip flop 651 is reset and the working registers are restored. Return is then made to the interrupted routine.

If the control register (C REG) count is zero, the Event Pointer (EV*PTR), which identifies the clock count (in data block 852) for the next scheduled event (REL DIFF), is loaded and the control register (C REG) reset to a new count equal to the time to the next event. The Event Pointer (EV*PTR) is incremented to the relative shift register address for the event (REL SR, data block 853), and the shift register address information is set in appropriate shift registers (B, D, E, A registers).

The event Pointer (EV*PTR) is incremented successively to the event subroutine address information (EVENT LO) (EVENT HI) in the Event Run Table, and the address information therefrom loaded into a register pair (D & E registers). The Event Pointer (EV PTR) is incremented to the first data block (REL DIFF) of the next succeeding event in the Run Event Table, saved, and the register pair (H & L registers) that comprise the Event Pointer are loaded with the event subroutine address from the register pair (D & E registers) holding the information. The register pair (D & E registers) are set to the return address for the Event Subroutine. Using the address information, the Event Subroutine is called and the subroutine data transferred to RAM output buffer 546' for transfer to the host machine on the next Output Refresh.

Following this, the Machine Clock interrupt routine is exited as described earlier.

The Output Refresh cycle alluded to earlier functions, when entered, to transfer/refresh data from the output buffer of 546' RAM section 546 to host machine 10. Direct Memory Access (DMA) is used to insure a high data transfer rate.

On a refresh, Refresh Control 605 (see FIG. 23) raises the HOLD line to processor 542, which on completion of the operation then in progress, acknowledges by a HOLD A signal. With processor 542 in a hold mode and Address and Data buses 507, 508 released to I/O Module 502 (through operation of tri-state buffers 510, 511, 563, 570), the I/O module then sequentially accesses the output buffer 546' of RAM section 546 and transfers the contents thereof to host machine 10. Data previously transferred is refreshed.

The Real Time Interrupt, which carries the lowest priority, is active in all machine states. Primarily, the interrupt acts as an interval timer by decrementing a series of timers which in turn serve to control initiation of specialized subroutines used for control and error checking purposes.

Figure 39A:
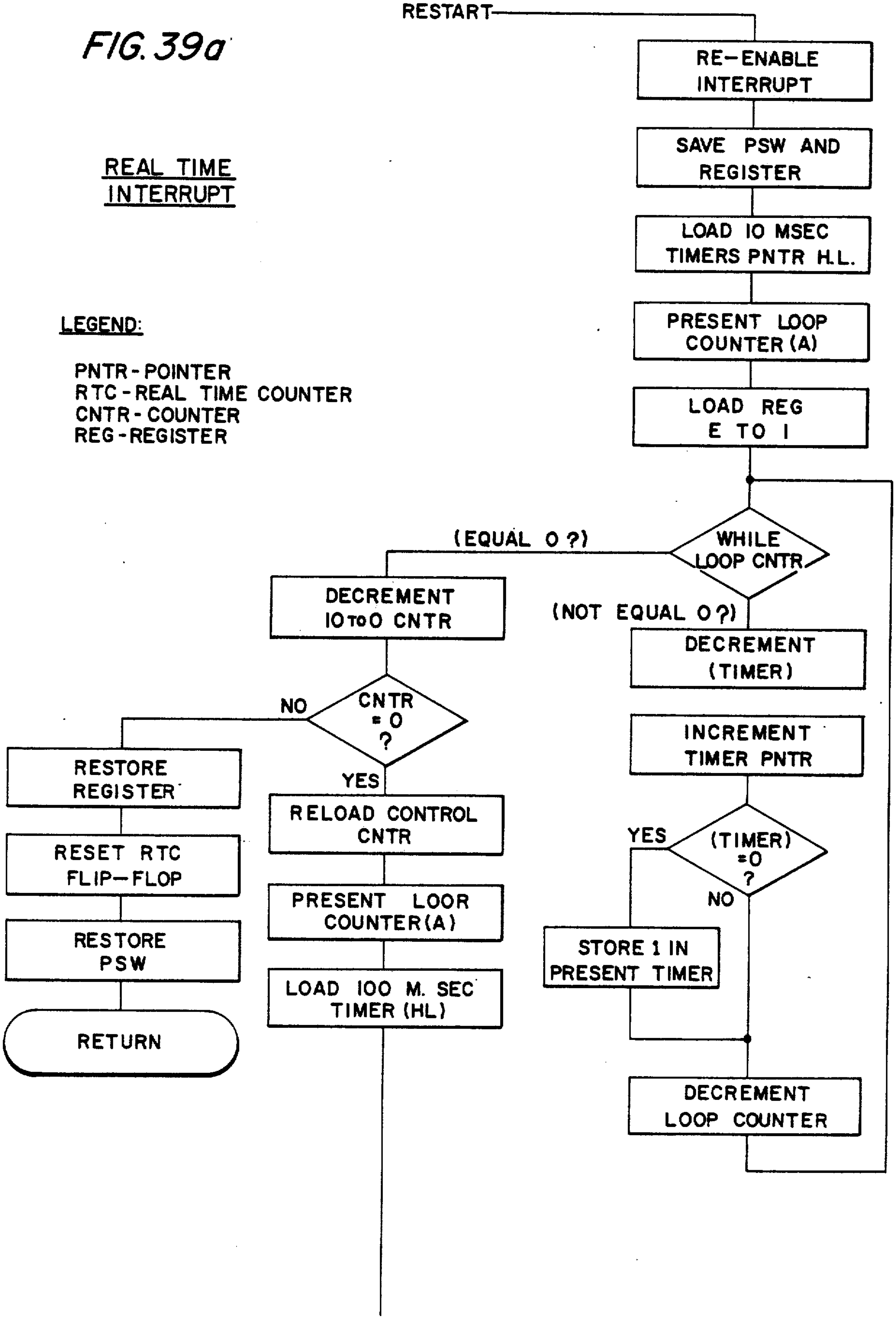
FIGS. 39*a* and 39*b* comprise a flow chart of the real time interrupt routines.
Figure 39B:
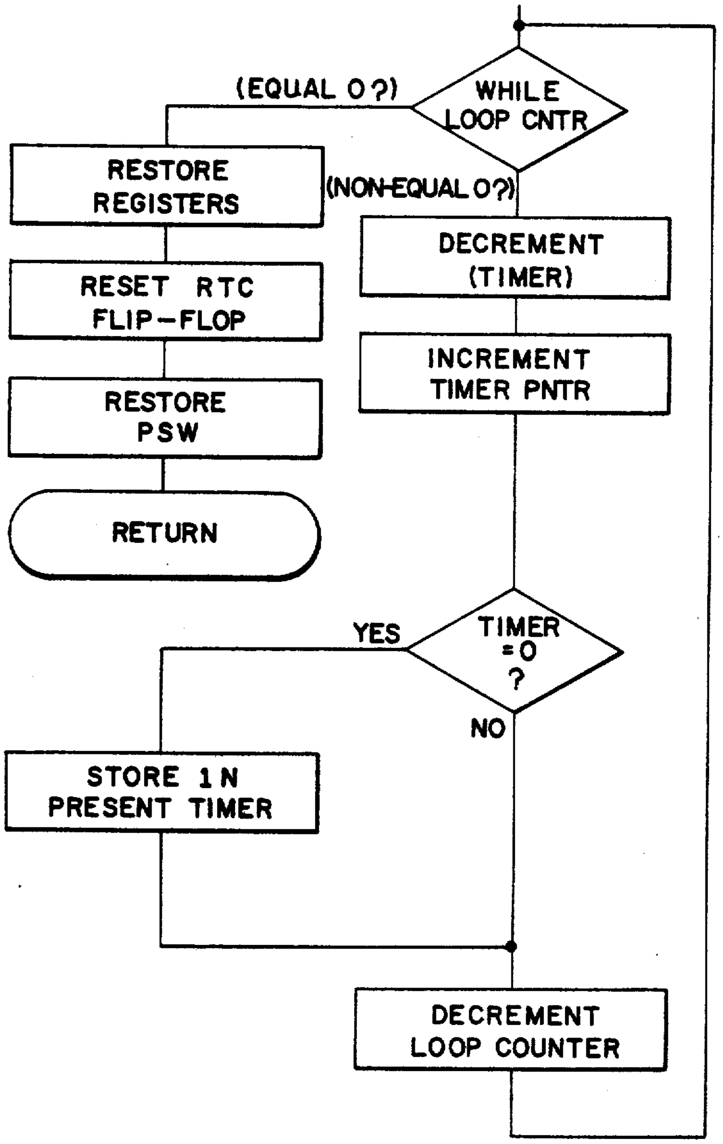
Figure 40A:
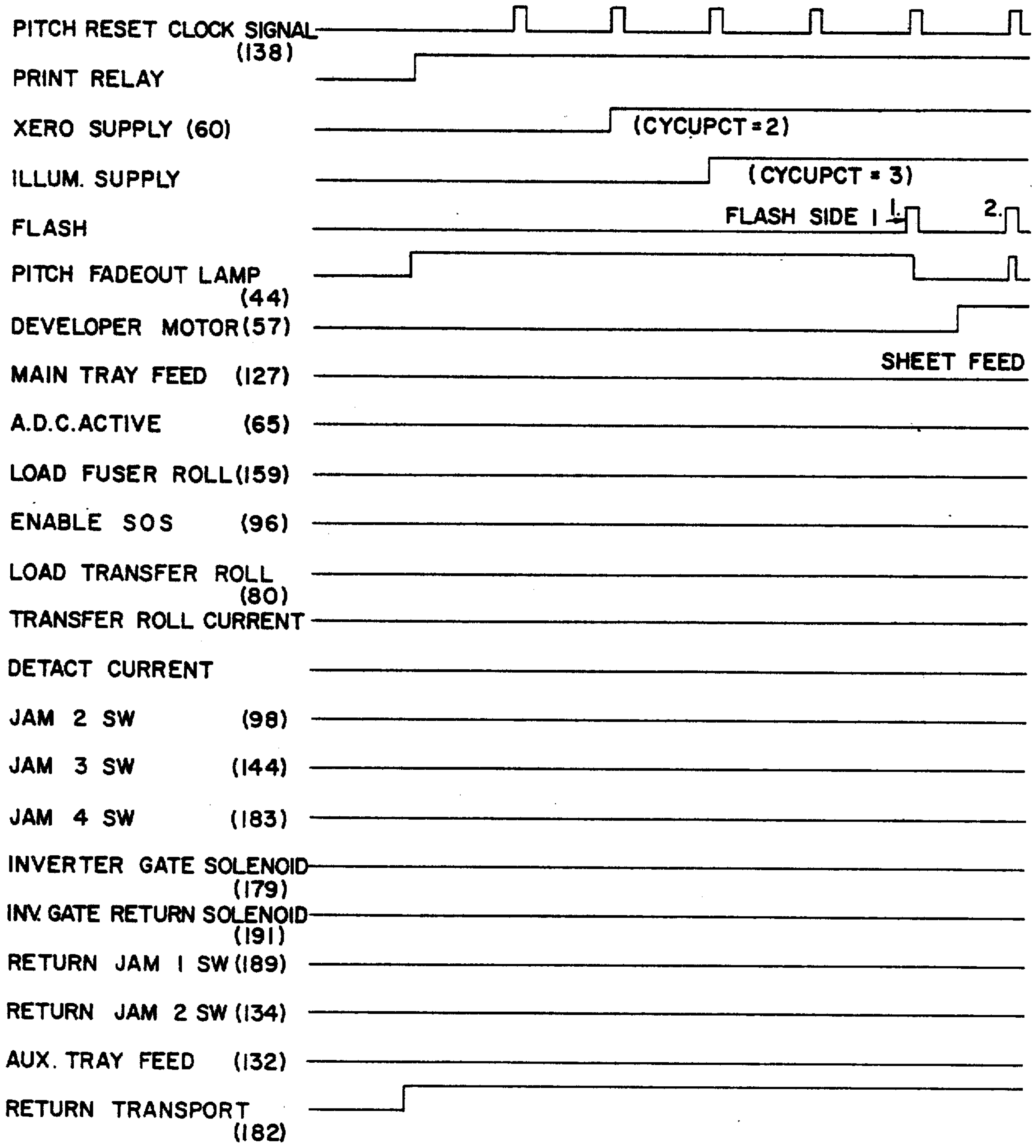
FIGS. 40*a*, 40*b*, 40*c* comprise a timing chart of the principal operating components of the host machine in an exemplary copy run.
Figure 40B:
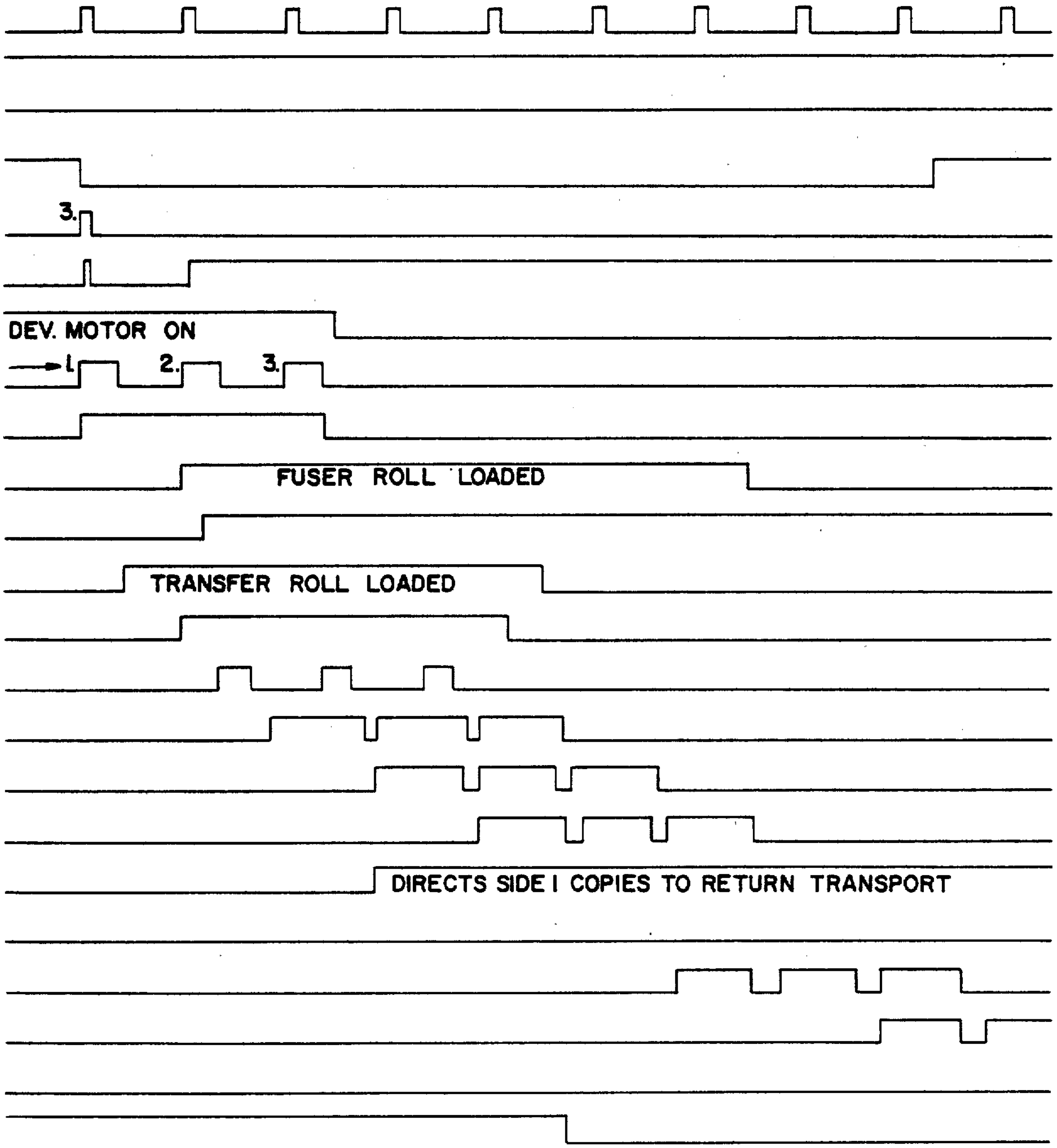
Figure 40C:
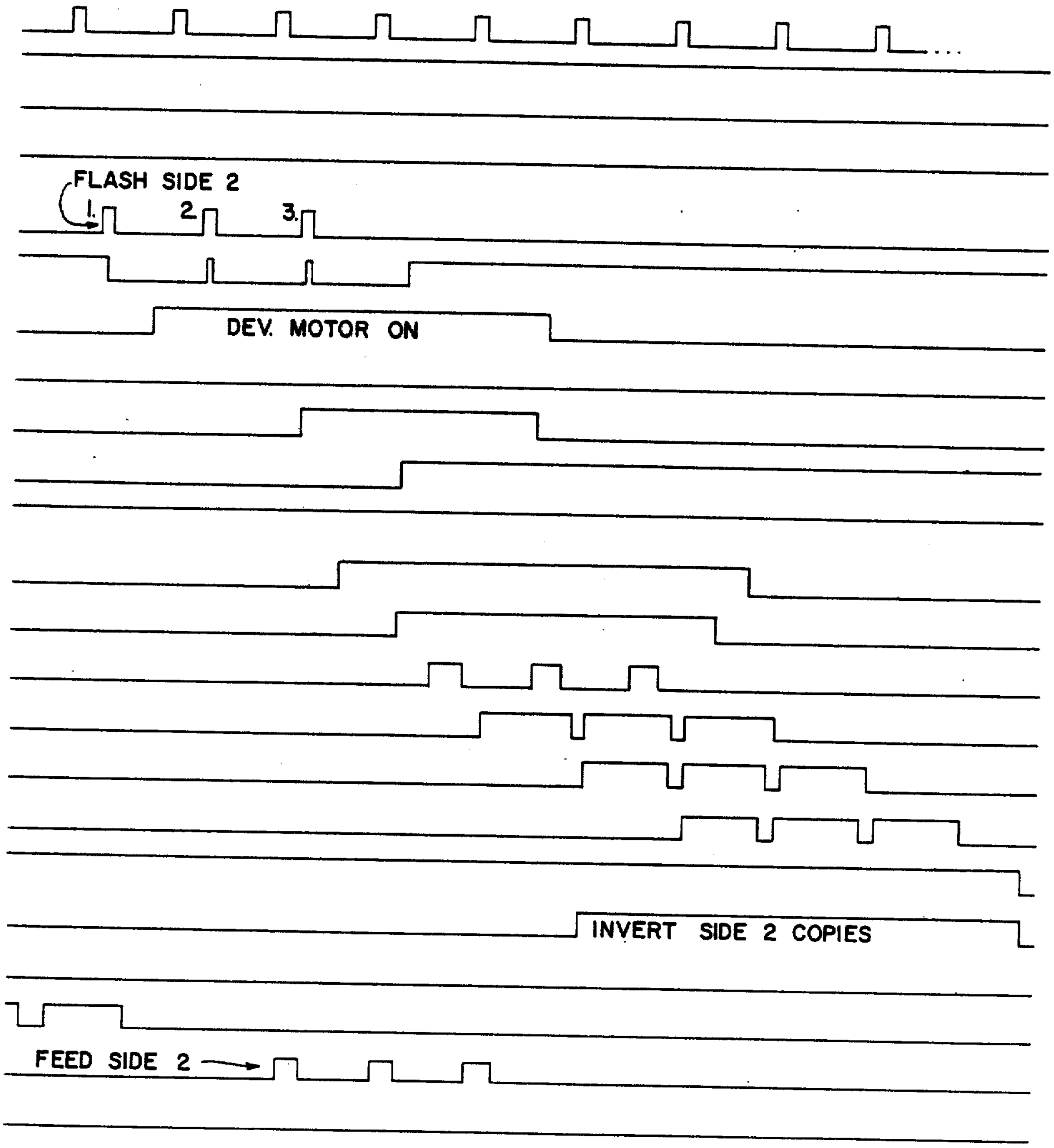

Referring particularly to FIG. 39 and TABLE X, the Real Time interrupt routine is entered in the same manner as the interrupt routines previously described, entry being in response to a specific RESTART instruction code assigned to the Real Time interrupt. On entry, the interrupt is re-enabled and the register contents stored. The timer pointer (PNTR) for the first class of timers (i.e. 10 msec TIMERS) is loaded, and a loop counter identifying the number of timers of this class (i.e. 10 msec TIMERS) preset. A control register (E REG) is loaded and a timer decrementing loop is entered for the first timer. The loop decrements the particular timer, increments the timer pointer (PNTR) to the location of the next timer in this class, checks the timer count, and decrements the loop counter. The decrementing loop routine is repeated for each timer in the class (i.e. 10 msec TIMERS) following which a control counter (CNTR) for the second group of timers (i.e. 100 msec TIMERS) is decremented by one and the count checked.

The control counter (CNTR) is initially set to a count equal to the number of times the first timer interval is divisible into the second timer interval. For example, if the first class of timers are 10 msec timers and the second timer class are 100 msec timers, the control counter (CNTR) is set at 10 initially and decremented on each Real Time interrupt by one down to zero.

If the count on the control counter (CNTR) is not zero, the registers are restored, Real Time interrupt flip flop 856 reset, and the routine exited. If the count on the control counter is zero, the counter is reloaded to the original maximum count (i.e. 10) and a loop is entered decrementing individually the second group of timers (i.e. 100 msec TIMERS). On completion, the routine is exited as described previously.

In the following TABLES:

"@"—is used to indicate flags, counters and subroutine names.

"#"—is used to indicate input signals.

"$"—is used to indicate output signals.

":"—is used to indicate macro instructions, system subroutines, system flags, and data, etc.

For further explanation of the mnemonics and particular instructions utilized by the following routines, the reader is directed to Intel Corporation's Programming Manual for the 8080 Microcomputer System.

TABLE I

```
                                  *NAR
                                  *
                                  *        I N I T I A L I Z E    S T A T E
                                  *
                                  *        INIT: SUBROUTINE
                                  *
                                  *        INITIALIZE STATE. EXECUTED AFTER EACH START OR RESTART.  SETS
                                  *        ALL POINTERS, FLAGS, AND DATA TO INITIAL VALUES REQUIRED TO
                                  *        START EXECUTION OF ANY CONTROL ALGORITHIMS.  ALWAYS EXITS TO
                                  *        'NOT READY' STATE.

                                  *        EPILOG

05 00000   3E0A     A    INIT:    MVI      A,10
05 00002   3252FD   N             STA      DIVD110                 INITIALIZE TO 10
05 00005   325SFC   N             STA      SLOWTOGL                INITIALIZE TO 10
05 00008   211907   N             LXI      H,EVOSTBY:              H&L= ADDR OF STBY EVENT TABLE
05 0000B   2264FD   N             SHLD     EVOPTR:                 SAVE FOR MACH CLK ROUTINE
05 0000E   21FFFF   A             LXI      H,X'FFFF'               INIT INSTRUMENTATION REMOTE
05 00011   2272FB   N             SHLD     INSOPTRR                  ADDR PNTR TO END OF RAM
05 00014   21FFFF   N             LXI      H,ADHORRMT-1            SET PNTR TO RAM CNTRL TABLE
05 00017   2278FB   N             SHLD     TABOSTRT                SAVE PNTR
05 0001A   3E7F     A             MVI      A,X'7F'                 INIT TO UN-BYPASS
05 0001C   328DFC   N             STA      JAMOBYPS                                    ALL JAM SWS
                              *
                              *        TIMER INITIALIZATION
                              *        MUST BE DONE BEFORE ANY TIMERS CAN BE USED
                              *
05 0001F   211FF5   A             LXI      H,AVAIL:+8+X'1F'        SET H&L TO END OF AVAIL: TABLE
05 00022   36FF     A             MVI      M,X'FF'                 STORE X'FF' IN LAST TABLE ADDR
05 00024   3E1F     A             MVI      A,31                    SET A-REG TO VALUE TO BE STORED
                                  REPEAT
05 00026   2D       A                 DCR      L                   STEP TO NEXT TABLE LOCATION
05 00027   77       A                 MOV      M,A                 STORE INITIALIZATION VALUE
05 00028   3D       A                 DCR      A                   STEP TO NEXT VALUE
05 00029   C22600   N             UNTIL:   CC,Z,S                  IS INITIALIZATION COMPLETE
05 0002C   2120FE   A             LXI      H,ADR(DATA,TIME:OUT)    TO INITIALIZE TIME:OUT TABLE
05 0002F   225FFD   N             SHLD     INPTR:                   SET IN/OUT POINTERS TO
05 00032   2261FD   N             SHLD     OUTPTR:                  BEGINNING OF TIME:OUT TABLE
                              *
                              *        INITIALIZE SPOOL
                              *        POINTERS
                              *
05 00035   2140FE   A             LXI      H,ADR(DATA,SPL:TBL)     SET PNTRS
05 00038   226AFD   N             SHLD     SPL:IN                                TO START
05 0003B   226CFD   N             SHLD     SPL:OUT                                        OF TABLE
                              *
                              *        CHECK IF PAPER WAS PRESENT WHEN POWER WENT DOWN
                              *
05 0003E   3AC9E2   A             RNVNIB   NVOJAMON                A = JAM INFO FROM POWER DOWN
05 00041   0F       A             RRC                              SET CARRY TO FDR JAM INFO
05 00042   D25A00   N             IF:      CC,C,S                  WAS THERE PAPER IN FDR AREA
05 00045   47       A                 MOV      B,A                 YES, SAVE JAM INFO
05 00046   213CFD   A                 SFBIT,P  FDROAJAM,FDROMJAM   SET FEEDER JAMS
05 00049   3E0C     A
05 0004B   B6       A
05 0004C   77       A
05 0004D   2121F9   A                 SFBIT,P  ONOX02,ONOX03       SIGNAL TRANSPT CL'RANCE REQ'D
05 00050   3E03     A
05 00052   B6       A
05 00053   77       A
05 00054   3E80     A                 SFLG     CLPOREQD            TELL FLT HNDLR CLEARANCE REQD
05 00056   3267F4   A
05 00059   78       A                 MOV      A,B                 RESTORE THE A-REG
                                  ENDIF
05 0005A   0F       A             RRC                              SET CARRY TO IMEDOON:
05 0005B   D27100   N             IF:      CC,C,S                  WAS THERE AN IMEDOON:
                              *
05 0005E   2EFF     A                 MVI      L,MSK(FBIT,LOPROFLT,JAM2OFLT,JAM3OFLT,JAM4OFLT,;
                                               JAM5OFLT,JAM6OFLT,RET1OFLT,RET2OFLT)
                              *                                SETS ALL JAM FBITS IN REG-L
05 00060   2603     A                 MVI      H,MSK(FBIT,SOSOJAM,MISSTRIP)
                              *                                SETS ADDITIONAL FBITS IN H
05 00062   223BFD   A                 SHLD     ADR(FBYT,PAP:1)     MOVE FBITS INTO FBYTES
05 00065   3E80     A                 SFLG     CLROREQD            TELL FLT HNDLR CLEARANCE REQD
05 00067   3267F4   A
05 0006A   2120F9   A                 SFBIT,P  TSOFUS,TSOX02       TURN ON UNDEDICATED MAP LAMPS
05 0006D   3E21     A
05 0006F   B6       A
05 00070   77       A
                                  ENDIF
                                  IF:      XBYT,A,AND,;            IS EITHER SRT JAM FLAG SET
05 00071   E60C     A                      MSK(NVBIT,NVOLOWOJ,NVOUPOJ),NZ  IN NVNIB
05 00073   CA8A00   N

05 00076   FE0C     A                 IF:      XBYT,A,EQ,;         YES, ARE BOTH SET
05 00078   C28300   N                          MSK(NVBIT,NVOLOWOJ,NVOUPOJ)
05 0007B   3E80     A                     SFLG     TWOOACT         TELL SRT THAT THERE WAS A JAM
05 0007D   3261F4   A
05 00080   C38700   N                 ELSE:
05 00083   0F       A                     RRC                      GET NVOLOWOJ TO SIGN BIT &
                                          IDIREAD  NVOLOWOJ
05 00084   3237F4   A                     MODFLG   LOWOMOD         TELL SRT IF UP OR LOW JAM
                                      ENDIF
05 00087   CD0000   N                 CALL     JAMOSET             LET SRT SET JAM FLAGS & LAMPS
                                  ENDIF
05 0008A   3E80     A             SFLG     SRTORDY                 SIGNAL SRT NOT IN USE (READY)
05 0008C   328CF7   A
05 0008F   3287F7   A             MODFLG   PROGORDY                SET PROG ROUTINE READY
05 00092   3268F4   A             MODFLG   2SDOENAB                ALLOW SELECTION OF DUPLEX MODE
```

```
05 00095   3EF2    A        MVI     A,X'F2'                  RE-ENABLE
                                                                   INTERRUPT
                                                                         SYSTEM
05 00097   3200E6  A        STA     RSINTFF1
05 0009A   FB      A        EI
05 0009B   CD0000  N        SBBIT/S NPFB#0H,24V$SPL'         PFB OFF (INVT'D) & 24V ON
05 0009E   02      A
05 0009F   E480    A
05 000A1   EE80    A
05 000A3   CD0000  N        STIMR   FLT#DLY,25000,FLT#CHK    START LENS FAULT TIMER
05 000A6   12      A
05 000A7   FA      A
05 000A8   0000    N
05 000AA   CD0000  N        CALL    DOC#CLP                  INITIALIZE DOC#NUM TO 1    (1)
05 000AD   327AFC  N        STA     CF#DIGIT                 ENABLE '0' IN QTY FLASHED  (2)
05 000B0   3E08    A        MVI     A,MSK(FBIT,POPORS)       TELL FLT ASSUME
                                                                      BRUSH HOUSE OPN
05 000B2   3286FC  N        STA     XP#PREV
05 000B5   3E02    A        MVI     A,INRDY                  INIT STCK
05 000B7   3254FD  N        STA     ISTATE!                          SYNCRONIZED BACKGROUND
05 000BA   3253FD  N        STA     STATE!                                 CONTROL LOOP
05 000BD   CD3702  N        CALL    NRDY:PRL                 INIT CONTROL TO NOT-READY STATE
                 ***********************************************************************
                 *                                                                     *
                 *  S Y C R O N I Z E D   B A C K G R O U N D   C O N T R O L   L O O P S  *
                 *                                                                     *
                 ***********************************************************************

                 *          PRIORTIES!
                 *                 FIRST      10MS TIME OUT REQUESTS
                 *                 SECOND     10MS CALLS
                 *                 THIRD      SPOOLED CALLS
                 *                 FOURTH     20MS CALLS
                 *                 FIFTH      100MS CALLS
                 *                 SIXTH      100MS TIME OUT REQUESTS

05 000C0   2151FD  A        LXI     H,ADR(DATA,SB!RQST)        SET MEM PNTR TO SB BYTE
                            REPEAT                             LOOP-3 FROM HLT ON ALL INTER'S
                                REPEAT                         LOOP-2 BACK AFTER EACH 100MS
                                    REPEAT                     LOOP-1 BACK AFTER EACH 20MS
05 000C3   7E      A                    MOV     A,M            A= SYNC BKGND REQUESTS FROM RTC
                                        ID!READ SB!RQST
05 000C4   07      A                    RLC                    TEST FOR 10MS
05 000C5   D2F700  N                    IF!     CC,C,S                        SB REQUEST
                 *
                 *                                             TIMER SERVICE REQUESTS
                 *                                             CALLS TIMED OUT TIMER SUBRS
                 *                                             USING WRAP ARRUND TABLE AND
                 *                                             IN/OUT PNTRS - RTCI SETS
                 *                                             INPTR! & ENTERS CALL ADDR
                 *
05 000C8   3A5FFD  N                WHILE!  XBYT,INPTR!,NE,OUTPTR! ARE PNTRS AT SAME TABL
05 000CB   2161FD  N
05 000CE   BE      A
05 000CF   CAE500  N

05 000D2   6E      A                    MOV     L,M        SET L-REG TO ADDR(L) IN TABLE
05 000D3   26FE    A                    MVI     H,HADR(DATA,TIME!OUT) MEM PNTR NOW SET TO
05 000D5   5E      A                    MOV     E,M             MOVE CALL ADDR(L) TO E
05 000D6   23      A                    INX     H               STEP TO NEXT TABLE BYTE
05 000D7   56      A                    MOV     D,M             MOVE CALL ADDR(H) TO D
05 000D8   23      A                    INX     H               STEP TO NEXT TABLE BYTE
05 000D9   7D      A                    MOV     A,L        PREPARE TO UPDATE PNTR
                                        ID!READ TIME!OUT   DYNAMIC TABLE CONTAINING ADDRS
                                        MODBYT  A,AND,!    ADJUST FOR END OF TABLE
                                                TIME!MSK
05 000DA   E62F    A                    STA     ADR(DATA,OUTPTR!) PNTR TO ADDR OF LAST SE
05 000DC   3261FD  A                    CALL    DE!IND     DO TIMEOUT CALL
05 000DF   CD0000  N                ENDWHILE               YES, ALL TIME OUTS SERVICED
05 000E2   C3C800  N                                       END TIMER SECTION
                 *
05 000E5   2A55FD  N                LHLD    10!CALLS       GET PROPER 10MS CALL TABLE
05 000E8   CDC000  N                CALL    HL!IND         DO 10MS CALLS
05 000EB   2151FD  A                LXI     H,ADR(DATA,SB!RQST) SET MEM PNTR TO SB BYTE
05 000EE   F3      A                DI
05 000EF   7E      A                MODBYT  H,AND, 10!RQST REMOVE 10MS REQUEST
05 000F0   E67F    A
05 000F2   77      A
                                    ID!ALTR SB!RQST
                                    EI                     (WATCH OUT FOR UNPRINTABLE NOT)
05 000F3   FB      A                                       DO ANY SPOOLED ROUTINES
05 000F4   C31501  N            ELSE!
05 000F7   3A6AFD  N                IF!     XBYT,SPL!IN,NE,SPL!OUT
05 000FA   216CFD  N
05 000FD   BE      A
05 000FE   CA1101  N
                                        MOV     L,M
05 00101   6E      A                    MVI     H,HADR(DATA,SPL!TBL)
05 00102   26FE    A                    MOV     E,M
05 00104   5E      A                    INX     H
05 00105   23      A                    MOV     D,M
05 00106   56      A                    INX     H
05 00107   23      A                    MOV     A,L
05 00108   7D      A                    MODBYT  A,AND,SPL!MSK
05 00109   E64F    A                    STA     ADR(DATA,SPL!OUT)
05 0010B   326CFD  A                    CALL    DE!IND
05 0010E   CD0000  N                ENDIF
                                    LXI     H,ADR(DATA,SB!RQST)
05 00111   2151FD  A                MOV     A,M
05 00114   7E      A            ENDIF
                                ID!READ SB!RQST
                                RLC                                TEST FOR 20MS
05 00115   07      A            RLC                                          SB REQUEST
05 00116   07      A            IF!         CC,C,S                 SET MEM PTR TO CALL IN 20MS TAB
05 00117   D24201  N                LHLD    20PNTR                 MOVE CALL ADDR(L) TO E
05 0011A   2A59FD  N                MOV     E,M                    STEP MEM PTR TO ADDR(H)
05 0011D   5E      A                INX     H                      IS POINTER AT END OF TABLE
05 0011E   23      A                IF!     XBYT,M,EQ,X'FF'
05 0011F   7E      A
```

```
05 00120  FEFF     A
05 00122  C23701   N
05 00125  2A57FD   N              LHLD     20IPNTR    YES, SET MOVING POINTER
05 00128  2259FD   N              SHLD     20PNTR          BACK TO BEGINNING OF TABLE
05 0012B  2151FD   A              LXI      H,ADR(DATA,SBIRQST)      SET MEM PNTR TO
05 0012E  F3       A              DI
05 0012F  7E       A              MODBYT   H,AND, 20IRQST REMOVE 20MS REQUEST
05 00130  E6BF     A
05 00132  77       A
                                  IDIALTR  SBIRQST
05 00133  FB       A              EI
05 00134  C34201   N          ELSE:
05 00137  56       A              MOV      D,M        NO, MOVE CALL ADDR(H) TO D
05 00138  23       A              INX      H               STEP TO NEXT CALL IN TABLE
05 00139  2259FD   N              SHLD     20PNTR          SAVE FOR NEXT LOOP-1
05 0013C  CD0000   N              CALL     DEIIND
05 0013F  2151FD   A              LXI      H,ADR(DATA,SBIRQST) SET MEM PNTR TO SB BY
                              ENDIF
                          ENDIF
05 00142  7E       A      UNTIL:   XBYT,M,AND,20IRQST,Z  MORE 20MS CALLS TO DO  (LOOP-1)
05 00143  E640     A
05 00145  C2C300   N
                          IDIREAD  SBIRQST
05 00148  7E       A      IF:      XBYT,M,AND,100IRQST,NZ TEST FOR 100MS SB REQUEST
05 00149  E620     A
05 0014B  CA9E01   N
                              IDIREAD  SBIRQST
05 0014E  2A5DFD   N          LHLD     100PNTR              SET MEM PNTR TO CALL IN 100 TAB
05 00151  5E       A          MOV      E,M                  MOVE CALL ADDR(L) TO E
05 00152  23       A          INX      H                    STEP MEM PNTR TO ADDR(H)
05 00153  7E       A          IF:      XBYT,M,EQ,X'FF'      IS PNTR AT END OF TABLE
05 00154  FEFF     A
05 00156  C29301   N
05 00159  2A5BFD   N              LHLD     100IPNTR     YES, SET MOVING PNTR BACK
05 0015C  225DFD   N              SHLD     100PNTR           TO BEGINNING OF TABLE
                   *
                   *                                100MS TIMER SERVICE
                   *                                 DECREMENTS TIMERS AND CALLS
                   *                                 SUBROUTINE REQUESTED WHEN
                   *                                 TIMER TIMES OUT
                   *                                 USES 3 TABLES ON 3 CONSECUTIVE
                   *                                 RAM PAGES -100ICNT W/TIMER
                   *                                           -100ILS W/ADDR(L)
                   *                                           -100ILS W/ADDR(H)
                   *                                 ADDR IS FOR REQSTED SUBR
                   *
05 0015F  2130FA   N          LXI      H,100ICNT    STARTING ADDR OF 100MS TIMERS
05 00162  1614     A          MVI      D,100ITMAX   D-REG SET TO QTY OF 100MS TMRS

                   *                                CONDITIONAL HOLD OF 100MS TMRS

05 00164  3A45FD   A          IF:      FBIT,STDBOPNB,T IS STAND-BY RELAY OPEN
05 00167  E640     A
05 00169  CA6E01   N
                                  MVI      D,100ITMAX; YES, HOLD SPECIFIED NUMBER
05 0016C  1611     A                       -HOLDTMRS           OF TIMERS
                              ENDIF
                   *
                              REPEAT                    LOOP TO DECR & SERVICE TIMEOUTS
05 0016E  7E       A              IF:      VBYT,M,NZ IS TIMER ACTIVE
05 0016F  A7       A
05 00170  CA8201   N
05 00173  35       A                  DCR      M      DECR TIMER
05 00174  C28201   N                  IF:      CC,Z,S HAS TIMER TIMED OUT
05 00177  D5       A                      PUSH     D      SAVE # TIMERS TO SERVICE
05 00178  E5       A                      PUSH     H      SAVE ADDR OF CURRENT TIMER
05 00179  24       A                      INR      H      STEP TO NEXT RAM PAGE
05 0017A  5E       A                      MOV      E,M    MOVE CALL ADDR(L) TO E
05 0017B  24       A                      INR      H      STEP TO NEXT RAM PAGE
05 0017C  56       A                      MOV      D,M    MOVE CALL ADDR(H) TO D
05 0017D  CD0000   N                      CALL     DEIIND
05 00180  E1       A                      POP      H      RECALL ADDR OF CURRENT TMR
05 00181  D1       A                      POP      D      RECALL NUMBER OF TIMERS
                   *                                          YET TO BE SERVICED
                                  ENDIF
                              ENDIF
05 00182  23       A              INX      H          STEP TO NEXT TIMER ADDR
05 00183  15       A              DCR      D          DECR NUMBER OF 100MS TIMERS
05 00184  C26E01   N          UNTIL:   CC,Z,S         HAVE ALL TIMERS BEEN SERVICED
                   *                                  END 100MS TIMER SECTION
05 00187  2151FD   A          LXI      H,ADR(DATA,SBIRQST) SET MEM PNTR TO SB BYTE
05 0018A  F3       A          DI
05 0018B  7E       A          MODBYT   H,AND, 100IRQST REMOVE 100MS REQUEST
05 0018C  E60F     A
05 0018E  77       A
                              IDIALTR  SBIRQST
05 0018F  FB       A              EI
05 00190  C39E01   N          ELSE:
05 00193  56       A              MOV      D,M          NO, MOVE CALL ADDR(H) TO D
05 00194  23       A              INX      H                 STEP PNTR TO NEXT CALL
05 00195  225DFD   N              SHLD     100PNTR           SAVE FOR NEXT LOOP-2
05 00198  CD0000   N              CALL     DEIIND
05 0019B  2151FD   A              LXI      H,ADR(DATA,SBIRQST) SET MEM PNTR TO SB BYTE
                              ENDIF
                          ENDIF
05 0019E  7E       A      UNTIL:   VBYT,M,Z                  MORE SB CALLS TO DO  (LOOP-2)
05 0019F  A7       A
05 001A0  C2C300   N
                          IDIREAD  SBIRQST
05 001A3  76       A      HLT                                COOL IT UNTIL INTERRUPT RESTART
05 001A4  CAC300   N  UNTIL:   CC,Z,C                        WAS INTERRUPT RTC  (LOOP-3)
05 001A7  F3       A  DI                                     ONLY KIDDING BEFORE, BUT THIS
05 001A8  76       A  HLT                                     TIME REALLY STOP (ABORT)
```

```
                                  *
                                  *       SUBR TO SET CALL TABLE POINTERS
                                  *       CALLED BY EACH STATE PROLOG
                                  *
                                  *       POSITION SB:TABLE POINTER
                                  *
05 001A9   3A53FD   N   SB:PNTRS LDA      STATE:              WHAT STATE IS WANTED
05 001AC   110600   A            LXI      D,X'06'             LOAD D&E WITH SKIP NUMBER
05 001AF   210501   N            LXI      H,SB:TABLE-X'06'    H&L=6'<' TABLE ADDR
                                 REPEAT
05 001B2   19       A              DAD      D                 SKIP THREE WORDS
05 001B3   3D       A              DCR      A                 DECR STATE LOOP COUNTER
05 001B4   F2B201   N            UNTIL:   CC,S,S              IS POINTER AT CORRECT STATE
                                  *
                                  *       TRANSFER ADDRS TO VARIABLE SB POINTERS
                                  *
05 001B7   1155FD   N            LXI      D,10:CALLS          SET D&E TO FIRST OF SB PNTRS
05 001BA   0602     A            MVI      B,2                 LOAD 10:CALLS
05 001BC   CDCE01   N            CALL     MV:WORDS                          & 20:PNTR
05 001BF   2B       A            DCX      H                   ADJUST 'FROM' PNTR
05 001C0   2B       A            DCX      H                                    BACK 1 WORD
05 001C1   0602     A            MVI      B,2                 LOAD 20PNTR
05 001C3   CDCE01   N            CALL     MV:WORDS                          & 100:PNTR
05 001C6   2B       A            DCX      H                   ADJUST 'FROM' PNTR
05 001C7   2B       A            DCX      H                   ,                BACK 1 WORD
05 001C8   CDCC01   N            CALL     MV:WORD             LOAD 100PNTR
                                 10:ALTR  10:CALLS,20:PNTR,20PNTR,;  DATA WORDS MODIFIED
                                          100:PNTR,100PNTR      BY THIS SUBR
05 001CB   C9       A            RET
                                  *NAR
                                  *
                                  *       MV:WORD/MV:WORDS SUBROUTINES
                                  *
                                  *       SUBR TO TRANSFER WORDS (2BYTES) FROM MEMORY POINTED TO BY <H&L>
                                  *        TO MEMORY POINTED TO BY <D&E>. CALL MV:WORD FOR 1 TRANSFER,
                                  *        AND CALL MV:WORDS (WITH B-REG # WORDS TO TRANSFER) FOR
                                  *        MULTIPLE TRANSFERS. USES ALL BUT C-REG.
                                  *
05 001CC   0601     A   MV:WORD  MVI      B,1                 B= # WORDS TO BE MOVED
                        MV:WORDS REPEAT
05 001CE   7E       A              MOV      A,M               A= 1ST 'FROM' BYTE
05 001CF   12       A              STAX     D                 STORE IN 1ST 'TO' LOCATION
05 001D0   23       A              INX      H                 ADVANCE 'FROM'
05 001D1   13       A              INX      D                              AND 'TO' PNTRS
05 001D2   7E       A              MOV      A,M               A= 2ND 'FROM' BYTE
05 001D3   12       A              STAX     D                 STORE IN 2ND 'TO' LOCATION
05 001D4   23       A              INX      H                 ADVANCE 'FROM'
05 001D5   13       A              INX      D                              AND 'TO' PNTRS
05 001D6   05       A              DCR      B                 DECRM # OF WORDS CNTR
05 001D7   C2CE01   N            UNTIL:   CC,Z,S              LOOP UNTIL ALL WORDS TRANSFERRD
05 001DA   C9       A            RET
                                  *
                                  *       TABLE OF SB CALL POINTERS
                                  *       FOR EACH STATE
                                  *
05 001DB   0906     N   SB:TABLE DW       COMP10
05 001DD   0A06     N            DW       COMP20
05 001DF   1206     N            DW       COMP100
05 001E1   B105     N            DW       TREP10
05 001E3   B505     N            DW       TREP20
05 001E5   C305     N            DW       TREP100
05 001E7   4202     N            DW       NRDY10
05 001E9   4602     N            DW       NRDY20
05 001EB   5202     N            DW       NRDY100
05 001ED   AF02     N            DW       RDY10
05 001EF   B302     N            DW       RDY20
05 001F1   BF02     N            DW       RDY100
05 001F3   AB03     N            DW       PRNT10
05 001F5   B203     N            DW       PRNT20
05 001F7   C803     N            DW       PRNT100
05 001F9   1905     N            DW       RUNN10
05 001FB   1D05     N            DW       RUNN20
05 001FD   2F05     N            DW       RUNN100

                                  *
                                  *       SUBR TO DO EPILOGS & PROLOGS LAST CALL IN EVERY 100MS TABLE
                                  *
05 001FF   2153FD   A   STAT:CHG LXI      H,ADR(DATA,STATE:)  A= PRESENT STATE # IF UNCHANGED
05 00202   7E       A            MOV      A,M                  OR NEXT STATE IF CHANGED
05 00203   23       A            INX      H                   H&L= ADDR 'FORMER STATE' GLOBAL
05 00204   BE       A            IF:      XBYT,A,NE,M         HAS THERE BEEN A STATE CHANGE
05 00205   CA3602   N
                                      ID:READ  STATE:,:STATE:
05 00208   46       A                 MOV      B,M            YES, B= FORMER STATE
05 00209   77       A                 MOV      M,A            UPDATE 'FORMER' TO 'PRESENT'
                                      ID:ALTR  :STATE:
05 0020A   78       A                 CASE:    VBYT,B         DO EPILOG FOR FORMER STATE
05 0020B   111F02   N
05 0020E   FE06     A
05 00210   C00000   N
05 00213   1806     N                     C,0      COMP:EPL   COMPONENT CONTROL STATE
05 00215   0805     N                     C,1      TREP:EPL   TECH REP STATE
05 00217   7A02     N                     C,2      NRDY:EPL   NOT-READY STATE
05 00219   E302     N                     C,3      RDY:EPL    READY STATE
05 0021B   E603     N                     C,4      PRNT:EPL   PRINT STATE
05 0021D   4105     N                     C,5      RUNN:EPL   SYSTEM RUNNING, NOT PRINT STATE
                                      ENDCASE
05 0021F   3A53FD   N                 CASE:    VBYT,STATE:    DO PROLOG FOR PRESENT STATE
05 00222   113602   N
05 00225   FE06     A
05 00227   CD0000   N
05 0022A   FF05     N                     C,0      COMP:PRL   COMPONENT CONTROL STATE
```

```
 05 0022C   A505     N                    C,1       TREP:PRL               TECH REP STATE
 05 0022E   3702     N                    C,2       NRDY:PRL               NOT-READY STATE
 05 00230   A602     N                    C,3       RDY:PRL                READY STATE
 05 00232   1603     N                    C,4       PRNT:PRL               PRINT STATE
 05 00234   0805     N                    C,5       RUNN:PRL               SYSTEM RUNNING, NOT PRINT STATE
                                       ENDCASE
                                  ENDIF
 05 00236   C9       A                    RET                              .RETURN TO 100 MSEC SYNC BKGND
                              *NAR
                              *
                              *           N O T   R E A D Y   S T A T E
                              *
                              *           NOT READY STATE- EXECUTES AFTER INITIALIZE UNTIL ALL READY CONDITIONS
                              *           ARE MET.  THIS STATE CAN ALSO BE ENTERED FROM 'RUN NOT PRINT','READY'
                              *           AND 'TECH REP'.  CONTROL EXITS TO EITHER 'READY' OR 'TECH REP' STATES.

                              *           PROLOG

 05 00237   CDA901   N        NRDY:PRL    CALL       SB:PNTRS                  SYNC BKG PNTRS TO NEW STATE
 05 0023A   CD0000   N                    STIMR      INST@TMR,1000,NEXT@FLT    UPDATES INST FLT CODE IN STBY
 05 0023D   49       A
 05 0023E   64       A
 05 0023F   0000     N
 05 00241   C9       A                    RET

                              *           CALLS FOR NOT READY 10 MS SYN BACKGROUND

 05 00242   CD0000   N        NRDY10      CALL       ADH@CTRL
 05 00245   C9       A                    RET

                              *           CALLS FOR NOT READY 20 MS SYN BACKGROUND

 05 00246   0000     N        NRDY20      DW         NRDY@SWS
 05 00248   0000     N                    DW         MN@ELVPS
 05 0024A   0000     N                    DW         DSPL@CTL
 05 0024C   0000     N                    DW         LMP@CTRL
 05 0024E   0000     N                    DW         INSTRU
 05 00250   FFFF     A                    DW         X'FFFF'                END OF TABLE

                              *           CALLS FOR NOT READY 100 MS SYN BACKGROUND

 05 00252   0000     N        NRDY100     DW         NRILK@CK
 05 00254   0000     N                    DW         RED@BGND
 05 00256   0000     N                    DW         DVL@DUMP
 05 00258   0000     N                    DW         RECAPER
 05 0025A   0000     N                    DW         BIN@CHK                1
 05 0025C   0000     N                    DW         MINIPHS1               2
 05 0025E   0000     N                    DW         BIL@JMP@
 05 00260   0000     N                    DW         FUS@ROUT
 05 00262   0000     N                    DW         FLT@100                1
 05 00264   0000     N                    DW         FLT@CTRL               2
 05 00266   0000     N                    DW         FLT@CLRN               3
 05 00268   0000     N                    DW         PROG2SJM
 05 0026A   0000     N                    DW         2SD@STBY
 05 0026C   0000     N                    DW         XMM@STBY
 05 0026E   0000     N                    DW         JAM@RST
 05 00270   0000     N                    DW         KEY@CNTR
 05 00272   0000     N                    DW         TST@LP4
 05 00274   84C2     N                    DW         HRDY:CHG               TEST IF OK TO
 05 00276   FF01     N                    DW         STAT:CHG                          LEAVE NOT READY
 05 00278   FFFF     A                    DW         X'FFFF'                END OF TABLE

                              *           EPILOG

 05 0027A   CDC000   N        NRDY:EPL    COBIT,S    WAIT@                  INSURE WAIT OFF AT NRDY EXIT
 05 0027D   E9FE     A
 05 0027F   AF       A                    CFLG       STRT:PRT               DIS-ABLE TRANSFER TO 'PRINT'
 05 00280   3258F4   A
 05 00283   C9       A                    RET

                              *
                              *           SUBR FOR 'NOT-READY' 100MS SYNC BKGND
                              *            TESTS FOR CHANGE TO 'READY' OR 'TREP REP'
                              *
 05 00284   CDCF05   N        NRDY:CHG    CALL       TREP:CHG               TEST FOR STATE CHANGE TO :TREP
 05 00287   7E       A                    IF:        XBYT,M,ME,:TREP        DID IT CHANGE TO :TREP STATE
 05 00288   FE01     A
 05 0028A   CA9302   N
                                               ID:READ   STATE:
 05 0028D   CD9402   N                         CALL      RDYTEST:           TEST ALL 'READY' FLAGS
 05 00290   CD0803   N                         CALL      NRDY:RDY           MOVE TO EITHER :NRDY OR :RDY
                                          ENDIF
 05 00293   C9       A                    RET

                              *
                              *           SUBR TO TEST ALL 'READY' FLAGS IN A LOOP
                              *
 05 00294   2184F7   A        RDYTEST:    LXI        H,RDYFLGS:             H&L= START ADDR OF READY FLAGS
 05 00297   0609     A                    MVI        B,RDYFNUM:             B= # OF READY FLAGS TO CHK
                                          REPEAT
 05 00299   7E       A                         MOV       A,M                A= <PRESENT READY FLAG>
 05 0029A   07       A                         RLC                          SET C IF FLAG SET (READY)
 05 0029B   DAA002   N                         IF:       CC,C,C             IS PRESENT FLAG INDICATING RDY
 05 0029E   0601     A                              MVI       B,1           NO, DON'T TEST ANY FURTHER
                                               ENDIF
 05 002A0   23       A                         INX       H                  MOVE TO NEXT FLAG LOCATION
 05 002A1   05       A                         DCR       B                  DECRM LOOP CNTR (# READY FLAGS)
 05 002A2   C29902   N                    UNTIL:     CC,Z,S                 LOOP UNTIL ALL FLAGS CHKED
                                          ID:READ    LENS@RDY,ELV@RDY,FUS@RDY,/    FLAGS READ
                                                     PROG@RDY,ILCK@RDY,XMM@RDY,/
                                                     FLT@RDY,ADH@NMOV,SRT@RDY
 05 002A5   C9       A                    RET                              RETURN
```

```
                               *NAR
                               *
                               *          R E A D Y    S T A T E
                               *
                               *          READY STATE- EXECUTES WHEN MACHINE IS READY TO GO INTO PRINT STATE.
                               *          CONTROL CAN GO BACK TO 'NOT READY' OR GO TO 'TECH REP' IF REQUIRED.

                               *          PROLOG

05 002A6     CD0000     N      RDY:PRL    SOBIT,S     READY$
05 002A9     E701       A
05 002AB     CDA901     N                 CALL        SB:PNTRS                     SYNC BKG PNTRS TO NEW STATE
05 002AE     C9         A                 RET

                               *          CALLS FOR READY 10MS SYN BACKGROUND

05 002AF     CD0000     N      RDY10      CALL        ADHOCTRL
05 002B2     C9         A                 RET

                               *          CALLS FOR READY 20MS SYN BACKGROUND

05 002B3     0000       N      RDY20      DW          RDY@SWS
05 002B5     0000       N                 DW          HN@ELVRS
05 002B7     0000       N                 DW          DSPL@CTL
05 002B9     0000       N                 DW          LMP@CTRL
05 002BB     0000       N                 DW          INSTRU
05 002BD     FFFF       A                 DW          X'FFFF'                      END OF TABLE

                               *          CALLS FOR READY 100MS SYN BACKGROUND

05 002BF     0000       N      RDY100     DW          BIN@CHK                      1
05 002C1     0000       N                 DW          MINIPHS1                     2
05 002C3     0000       N                 DW          BIL@JMPO
05 002C5     0000       N                 DW          DVL@DUMP
05 002C7     0000       N                 DW          RECAPEP
05 002C9     0000       N                 DW          FUS@ROUT                     1
05 002CB     0000       N                 DW          FLT@100                      2
05 002CD     0000       N                 DW          FLT@CTRL
05 002CF     0000       N                 DW          NRILK@CK
05 002D1     0000       N                 DW          REO@BGND
05 002D3     0000       N                 DW          2SD@STRY
05 002D5     0000       N                 DW          XMH@STRY
05 002D7     0000       N                 DW          JAM@RST
05 002D9     0000       N                 DW          KEY@CNTR
05 002DB     0000       N                 DW          TST@LP4
05 002DD     E9C2       N                 DW          RDY:CHG                      TEST IF OK TO LEAVE READY
05 002DF     FFC1       N                 DW          STAT:CHG                     END OF TABLE
05 002E1     FFFF       A                 DW          X'FFFF'

                               *          EPILOG

05 002E3     CD0000     N      RDY:EPL    COBIT,S     READY$
05 002E6     E7FE       A
05 002E8     C9         A                 RET

                               *          CHANGE OF STATE ROUTINES

                               *
                               *          SUBR FOR 'READY' 100MS SYNC BKGND
                               *           TESTS FOR CHANGE TO 'NOT-READY' OR 'TECH REP'
                               *
05 002E9     CD0F05     N      RDY:CHG    CALL        TREP:CHG                     TEST FOR STATE CHANGE TO :TREP
05 002EC     7E         A                 IF:         XBYT,M,NE,:TREP              DID IT CHANGE TO :TREP STATE
05 002ED     FE01       A
05 002EF     CA0A03     N

                                             ID:READ     STATE:
                                             CALL        RDYTEST:                  TEST ALL 'READY' FLAGS
05 002F2     CD9402     N                    CALL        NRDY:RDY                  MOVE TO EITHER :NRDY OR :RDY
05 002F5     CD0B03     N                    IF:         FLG,STRT:PRT,T            IS START PRINT REQUESTED
05 002F8     3A5BF4     A
05 002FB     07         A
05 002FC     D20A03     N
05 002FF     2153FD     A                       LXI         H,ADR(DATA,STATE:)     SET MEM PNTR
05 00302     7E         A                       IF:         XBYT,M,EQ,:RDY         OK TO GO TO PRINT
05 00303     FE03       A
05 00305     C20A03     N

                                                   ID:READ     STATE:
05 00308     3604       A                          MVI         M,:PRNT             CHG TO PRT STATE
                                                   ID:ALTR     STATE:
                                                ENDIF
                                             ENDIF
                                  ENDIF
05 0030A     C9         A                 RET

                               *
                               *          SUBR TO USE INFO FROM 'RDYTEST' AND EXECUTE THE PROPER CHANGE OF STATE
                               *
05 0030B     2153FD     A      NRDY:RDY   LXI         H,ADR(DATA,STATE:)           SET MEM PNTR
05 0030E     3603       A                 MVI         M,:RDY                       ASSUME GOING TO 'READY' STATE
                                          ID:ALTR     STATE:
05 00310     DA1503     N                 IF:         CC,C,C                       ARE ALL 'READY' FLAGS SET
05 00313     3602       A                    MVI         M,:NRDY                   NO, MOVE TO 'NOT-READY' STATE
                                             ID:ALTR     STATE:
                                          ENDIF
05 00315     C9         A                 RET
                               *NAR
                               *
                               *          P R I N T    S T A T E
                               *
                               *          PRINT STATE- EXECUTES WHILE MACHINE IS PRODUCING COPIES.
                               *          ENTERED FROM 'READY' AND EXITS TO 'RUN NOT PRINT'.

                               *          PROLOG
```

```
05 00316   2160FE   N   PRNT:PRL CLR:MEM   16,SHIFTREG                   CLEAR SHIFT REGISTER
05 00319   0610     A
05 0031B   CD0000   N
05 0031E   3E60     A            MVI       A,LADR(DATA,SHIFTREG)         FORCE SHIFT REG TO START AT
05 00320   3263FD   A            STA       ADR(DATA,SR0PTR))             BEGINNING OF SHIFTREG TABLE
                                 CLR:MEM   SD1ODLY-TIME0DN1+1,)          CLEAR THE FOLLOWING FLAGS
05 00323   21A7F4   A                      ADR(FLG,TIME0DN1)
05 00326   0609     A
05 00328   CD0000   N
                                 ID:CLR    TIME0DN1,IMED0DN1,)
                                           CYCL0DN1,NORM0DN1,QWIK1OUT,)
                                           IMGMADF1,SD1OTIMO,SD1ODLY
05 0032B   3E80     A            SFLG      9108DONE                      ALLOW FIRST PITCH RESET
05 0032D   326FF4   A
05 00330   AF       A            XRA       A
05 00331   3266FD   N            STA       CYCUPCT1                      INIT CYCLE-UP CNTR TO 0
05 00334   3269FD   N            STA       SR0VALU1                      INIT 'NEW SR VALUE' TO 0
05 00337   3250FA   N            STA       PLL0INFO                      INIT PLL SHUTDOWN CONTROL TO 0
05 0033A   3265FD   N            STA       SMPL0CT1                      INIT SAMPLE COPY CNTR TO 0
05 0033D   3E03     A            MVI       A,3
05 0033F   3267FD   N            STA       NO1MGCT1                      INIT 'NO IMAGE CNTR' TO 3
05 00342   CD0000   N            CALL      SRSK                          SHIFT REG SCHEDULER (INIT SR#0)
05 00345   CD0000   N            CALL      TIM0MOD                       CALC SHIFTED IMAGE VALUES   (1)
05 00348   CD0000   N            STIMR     9351THR,810,RETURN)           SET 'OVER-RUN EVENT' TIMER  (2)
05 0034B   22       A
05 0034C   51       A
05 0034D   0000     N
05 0034F   CD0000   N            CALL      TBLD0PPT                      BUILD NEW PITCH TABLE       (3)
05 00352   CD0000   N            SOBIT,S   PRNT0RLY,PR0COOL              PRINT RELAY & COOLING FAN ON
05 00355   02       A
05 00356   EA08     A
05 00358   F608     A
05 0035A   AF       A            CTIMR     PR0COOL                       CLEAR COOLING FAN TIMER
05 0035B   3232FA   N
05 0035E   CD0000   N            COBIT,S   NPF0O0N                       TURN OFF PFO (INVERTED DRIVER)
05 00361   E47F     A
05 00363   3AE0F4   A            IF:       FLG,ADH0SELC,T
05 00366   07       A
05 00367   D27003   N
05 0036A   CD0000   N                 CALL      ADH0MOTN
05 0036D   C37503   N            ELSE:
05 00370   3E80     A                 SFLG      ADH0WTEN
05 00372   320CF4   A
                                 ENDIF
05 00375   CD0000   N            CALL      TRH0BOD
05 00378   CD0000   N            CALL      PAP0SIZE                      CHK PAPER WIDTH FOR FUSER   (1)
05 0037B   CD0000   N            CALL      EDGE0FD                       CHK WHICH EDGE FADE OUT     (2)
05 0037E   CD0000   N            CALL      PAP0PRL3
05 00381   CD0000   N            CALL      PROG0UP                       PROG INITIALIZATION SUBR
05 00384   CD0000   N            CALL      PROG0UP1
05 00387   CD0000   N            CALL      FDR0PRT                       CHECK FEEDER SELECTION
05 0038A   CD0000   N            CALL      BLG0BKPT                      READ BILLING BREAK-POINTS
05 0038D   CD0000   N            CALL      DO0ELV                        CAUSE ELV TO EXECUTE
05 00390   3A54F4   A            IF:       FLG,SRT0SEL,T                 IS SORTER BEING USED
05 00393   07       A
05 00394   D29F03   N
05 00397   CD0000   N                 CALL      SRT0INIT                 INITIALIZE SORTER JAM DETECT
                                      MVI       A,MSK(NVBIT,NV0FJAM,)    SETS ALL 4 JAM CONDITIONS
05 0039A   3E0F     A                           NV0IMED,NV0LOW0J,NV0UP0J)
05 0039C   C3A403   N            ELSE:
05 0039F   3AC9E2   A                 RNVNIB    NV0JAM0N                 READ SAVED PREVIOUS SRT JAMS
                                      MODBYT    A,OR,MSK(NVBIT,)         & SET IMED ON & FOR JAM
05 003A2   F603     A                           NV0FJAM,NV0IMED)
                                 ENDIF
05 003A4   32C9E2   A            WNVNIB    NV0JAM0N                      STORE IN CASE OF PWR DN
                                 ID:ALTR   NV0FJAM,NV0IMED,NV0LOW0J,)    SEE ABOVE IF:/ELSE:
                                           NV0UP0J
05 003A7   CDA901   N            CALL      SB:PNTRS                      SYNC BKG PNTRS TO NEW STATE
05 003AA   C9       A            RET

                        *        CALLS FOR PRINT 10 MS SYN BACKGROUND

05 003AB   CD0000   N   PRNT10   CALL      ADH0CTRL
05 003AE   CDC004   N            CALL      PRT1IMD
05 003B1   C9       A            RET

                        *        CALLS FOR PRINT 20 MS SYN BACKGROUND

05 003B2   0000     N   PRNT20   DW        PRT0SWS
05 003B4   0000     N            DW        TON0DIS
05 003B6   0000     N            DW        PAP0TGL3
05 003B8   0000     N            DW        LMP0CTRL
05 003BA   0000     N            DW        FDR0BKFD
05 003BC   0000     N            DW        SORTER0
05 003BE   0000     N            DW        ELV0PRNT
05 003C0   0000     N            DW        SOS0JMDT
05 003C2   0000     N            DW        DSPL0CTL
05 003C4   0000     N            DW        INSTRU
05 003C6   FFFF     A            DW        X'FFFF'                       END OF TABLE

                        *        CALLS FOR PRINT 100 MS SYN BACKGROUND

05 003C8   0000     N   PRNT100  DW        BILK0CK
05 003CA   0000     N            DW        2SD0RUN
05 003CC   0000     N            DW        LITE0OFF
05 003CE   0000     N            DW        XMM0PRNT
05 003D0   0000     N            DW        FUS0RDUT
05 003D2   0000     N            DW        READY0CK
05 003D4   0000     N            DW        JAM0RST
05 003D6   0000     N            DW        MINIPHS0
05 003D8   4F06     N            DW        SMPL0CPY
05 003DA   0000     N            DW        RXCYCLON                      STUB IN US IMG
```

```
05 003DC     0000     N                DW       KEY$CNTR
05 003DE     0000     N                DW       TST@LP4
05 003E0     2C04     N                DW       PRT:CHG              TEST IF OK TO
05 003E2     FF01     N                DW       STAT:CHG                     LEAVE PRINT
05 003E4     FFFF     A                DW       X'FFFF'              END OF TABLE
                               *       EPILOG

05 003E6     CD0000   N      PRNT:EPL  CALL     AX@EPTY              (1)
05 003E9     CD0000   N                CALL     FDM@EPL3             (2)
05 003EC     CD0000   N                CALL     FDA@EPL3             (3)
05 003EF     CD0000   N                CALL     TRN@EPL3
05 003F2     CD0000   N                CALL     OVL@NRDY
                                       COBIT,S  FUS$CAPL,FUS@LOAD,ILLM$SPL,;
05 003F5     CD0000   N                         EFO$11,EFO$12$5,SMPL$CPY,READY$
05 003F8     07       A
05 003F9     E6F7     A
05 003FB     EDFD     A
05 003FD     F2F7     A
05 003FF     ECF7     A
05 00401     EBF7     A
05 00403     E2FE     A
05 00405     E7FE     A
05 00407     CD0000   N                SOBIT,S  NPFO$ON              TURN OFF PFO (INVERTED DRIVER)
05 0040A     E480     A
05 0040C     AF       A                CFLG     ELV@AUTO             DISABLE AUTO-TRAY SWITCHING
05 0040D     3222F4   A
05 00410     CD0000   N                CALL     PAP@EPL3
05 00413     CD1704   N                CALL     ABORT
05 00416     C9       A                RET

                               *
                               *       SUBROUTINE
                               *

05 00417     F3       A      ABORT     DI                            TURN OFF INTERRUPT SYSTEM
05 00418     AF       A                CFLG     TBLD@FIN             SIGNAL NEW PITCH TABLE REQ'D
05 00419     325DF4   A
05 0041C     211907   N                LXI      H,EV@STBY1           ADDR OF STBY EVENT TABLE
05 0041F     2264FD   N                SHLD     EV@PTR1              SAVE FOR MACH CLK ROUTINE
05 00422     CD0000   N                COBIT,S  BTR$LOAD,PRNT$RLY    UN-LOAD BTR & DROP PRINT RELAY
05 00425     02       A
05 00426     E17F     A
05 00428     EAF7     A
05 0042A     FB       A                EI
05 0042B     C9       A                RET
05 0042C     3A66FD   N      PRT:CHG   IF:      XBYT,CYCUPCT1,EQ,2   CHECK FOR PROLOG 2 OR CYCLE OUT
05 0042F     FEC2     A
05 00431     C23C04   N
05 00434     3E80     A                   SFLG     PRT$PRO2          YES, SET 'PRINT PROLOG 2' FLAG
05 00436     3271F4   A
05 00439     C37004   N                ORIF:    XBYT,A,EQ,3          NO, IS CYCLE UP CNTR=3
05 0043C     FEC3     A
05 0043E     C27004   N
05 00441     3A71F4   A                ANDIF:   FLG,PRT$PRO2,T       YES, AND IS PROLOG 2 FLAG SET
05 00444     07       A
05 00445     D27004   N
05 00448     AF       A                   CFLG     PRT@PRO2          YES, DO PROLOG 2 AND CLR FLAG
05 00449     3271F4   A
                               *
                               *       PRINT STATE BACKGROUND- PROLOG 2
                               *
05 0044C     CD0000   N                   CALL     PAP@PRL2          RETN XPORT OFF IF NOT SIDE 1
05 0044F     CD0000   N                   CALL     PROG@UP2
05 00452     3AADF4   A                   IF:      FLG,IMGMADE1,T    HAS 1ST IMAGE BEEN MADE
05 00455     07       A
05 00456     D25C04   N
05 00459     CD0000   N                      CALL     PROG@UP        YES, CALL PROG INITIALIZATION
                                          ENDIF
05 0045C     3A57FA   N                   IF:      VBYT,MINIBYTE,NZ  IS MINI-PHYSICAL ACTIVE
05 0045F     A7       A
05 00460     CA7004   N
05 00463     AF       A                      CFLG     DSPL@1ST       YES, ENABLE DISPLAY UPDATE
05 00464     329AF4   A
05 00467     3C       A                      INR      A              DISPLAY QUANTITY
05 00468     3250FA   N                      STA      DSPL@ST1        COMPLETE
05 0046B     3E06     A                      MVI      A,6            SET DOCUMENT TOTAL TO
05 0046D     326FFA   N                      STA      DOC@TOTL        6 FOR ADH DOCUMENT CHECK
                                          ENDIF
                                       ENDIF

                               *       END PROLOG2

                               *
                               *       BUILD FLAG BYTE
                               *
05 00470     0608     A                MVI      B,8                  NUMBER OF FLAGS REQ'D
05 00472     AF       A                XRA      A                    CLEAR A-REG
05 00473     57       A                MOV      D,A                  CLEAR D-REG
05 00474     21A9F4   A                LXI      H,ADR(FLG,IMED@DN1)  STARTING ADDR OF PRT:CHG FLAGS
                                       REPEAT
05 00477     7E       A                   MOV      A,M               LOAD A W/CONTENTS OF FLAG ADDR
05 00478     07       A                   RLC                        ROTATE FLAG(D7) INTO CARRY
05 00479     7A       A                   MOV      A,D               LOAD A W/FLAGS BILT INTO BYTE
05 0047A     17       A                   RAL                        PUT FLAG IN D0 & SHIFT LEFT
05 0047B     57       A                   MOV      D,A               SAVE RESULT IN D-REG
05 0047C     23       A                   INX      H                 STEP TO NEXT FLAG
05 0047D     05       A                   DCR      B                 DECR NUMBER OF FLAGS REQ'D
05 0047E     C27704   N                UNTIL:   CC,Z,S               LOOP UNTIL ALL FLAGS IN BYTE
                                       !DIREAD  IMED@DN1,CYCL@DN1,NORM@DN1,;  FLAGS READ
                                                QWIK1OUT,IMGMADE1,SD1@TIMO,;
                                                SD1@DLY,ADH@SELC
                               *
                               *       TEST FOR STATE CHANGE TO !RUNN
```

```
                                    *
05 00481   3A67FD  N                LDA       N8IMGCTI                  M8V CURRENT N8 IMAGE C8UNTER
05 00484   5F      A                M8V       E,A                       T8 THE E-REG
05 00485   060E    A                MVI       B,14                      L88P CNTR F8R STATE CHG TESTS
05 00487   21E104  N                LXI       H,CYC18UT                 TABLE ADDR 8F PRT!CHG TESTS
                                    REPEAT
05 0048A   7A      A                   M8V       A,D                    M8V FLAG BYTE T8 THE A-REG
05 0048B   A6      A                   M8DBYT    A,AND,M                MASK F8R DESIRED FLAGS
05 0048C   23      A                   INX       H                      STEP T8 STATUS TEST
05 0048D   AE      A                   M8DBYT    A,X8R,M                TEST FLAG STATUS
05 0048E   C29F04  N                   IF!       CC,Z,S                 DID TEST PASS
05 00491   23      A                      INX       H                   YES, STEP T8 N8IMGCTI TEST
05 00492   78      A                      IF!       XBYT,E,GE,M         IS N8IMGCTI AT C8RRECT VALUE
05 00493   BE      A
05 00494   DA9E04  N
05 00497   3E05    A                         MVI       A,!RUNN          YES, CHANGE STATE
05 00499   3253FD  N                         STA       STATE!            T8 RUN N8T PRINT
05 0049C   0601    A                         MVI       B,1              F8RCE END 8F TESTS (EARLY 8UT)
                                          ENDIF
05 0049E   2B      A                      DCX       H                   ADJ PNTR BACK T8 N8 IMG TEST
                                       ENDIF
05 0049F   23      A                   INX       H                      STEP 8VER N8 IMG TEST
05 004A0   23      A                   INX       H                      STEP T8 MASK F8R NEXT TEST
05 004A1   05      A                   DCR       B                      DECR L88P C8UNTER
05 004A2   C28A04  N                UNTIL!    CC,Z,S                    ALL TESTS C8MPLETE 8R STATE CHG
                                    *
05 004A5   7A      A                M8V       A,D                       M8V FLAG BYTE T8 A-REG
05 004A6   E662    A                M8DBYT    A,AND,D6!D5!D1            MASK AND TEST F8R FLAGS TRUE
                                    ID!READ   N8RM8DN!,CYCL8DN!,SD!8DLY F8RM AB8VE BYTE BUILD
05 004A8   CABF04  N                IF!       CC,Z,C                    ARE ANY FLAGS TRUE
05 004AB   2166FD  A                   LXI       H,ADR(DATA,CYCUPCT!)   PREPARE T8 TEST 8R M8DIFY
05 004AE   7E      A                   IF!       XBYT,M,GF,3            HAS PR8G PUSHED IT T8 0
05 004AF   FE03    A
05 004B1   DAB604  N
                                          ID!READ   CYCUPCT!
05 004B4   3602    A                      MVI       M,2                 N8, F8RCE CYCLE-UP M8DE AGAIN
                                          ID!ALTR   CYCUPCT!
                                       ENDIF
05 004B6   CD0000  N                   C8BIT,S   ILLM*SPL               ILLM SPL 8FF DURING DEAD CYCLE
05 004B9   F2F7    A
05 004BB   AF      A                   CFLG      SMPL8FLG               CANCEL SAMPLE C8PY SEQUENCE
05 004BC   324CF4  A
                                    ENDIF
05 004BF   C9      A                RET


                           PRT!IMD  IF!       FLGS,IMED8DN!,AND,,       IS IMEDIATE D8WN REQUESTED
05 004C0   3AA9F4  A                          TBLDSFIN,T                 AND HAS PR8B BEEN DETECTED
05 004C3   2150F4  A
05 004C6   A6      A
05 004C7   F2D004  N
05 004CA   CD1704  N                   CALL      AB8RT
05 004CD   C3E004  N                ARIF!     FLG,TIMF8DN!,T            IF TIMED DWN REQ'D DR8P 8UT
05 004D0   3AA7F4  A
05 004D3   07      A
05 004D4   D2E004  N
05 004D7   21E1FF  A                   C8BIT     BTP8L8AD                BIAS TRANS R8LL (ASAP)
05 004DA   3E7F    A
05 004DC   F3      A
05 004DD   A6      A
05 004DE   77      A
05 004DF   F8      A
                                    ENDIF
05 004E0   C9      A                RET
                           *
                           *                                            D7 6 5 4 3 2 1 0 (X=D8N'T CARE)
                           *
                           *                  TABLE 8F FLAG STATUS TESTS  I C N G I 8 S A   N C
                           *                   AND N8 IMAGE C8UNTER VALUES M Y 8 W M D D D   8 8
                           *                   USED T8 DETERMINE IF STATE  E C R I G 1 1 H     U   T N
                           *                   SH8ULD CHANGE FR8M PRINT T8 D L M K M 8 8 8   I N   E U
                           *                   RUN N8T PRINT               8 8 8 ! A T D S   M T   S M
                           *                                               D D D 8 D I L E   A E   T B
                           *                                               N N N U E M Y L   G R     E
                           *                                               ! ! ! T ! 8   C   E       R
                           *
05 004E1   48      A       CYC18UT  DB        D6!D3                     X 1 X X 0 X X X   00      1
05 004E2   40      A                DB        D6
05 004E3   00      A                DB        0
05 004E4   5C      A                DB        D6!D4!D3!D2               X 1 X 0 1 1 X X   16      2
05 004E5   4C      A                DB        D6!D3!D2
05 004E6   10      A                DB        16
05 004E7   5C      A                DB        D6!D4!D3!D2               X 1 X 0 1 0 X X   11      3
05 004E8   48      A                DB        D6!D3
05 004E9   08      A                DB        11
05 004EA   68      A                DB        D6!D5!D3                  X 0 1 X 0 X X X   00      4
05 004EB   20      A                DB        D5
05 004EC   00      A                DB        0
05 004ED   75      A                DB        D6!D5!D4!D2!D0            X 0 0 0 X 1 X 0   36      5
05 004EE   04      A                DB        D2
05 004EF   24      A                DB        36
05 004F0   75      A                DB        D6!D5!D4!D2!D0            X 0 0 0 X 1 X 1   20      6
05 004F1   05      A                DB        D2!D0
05 004F2   14      A                DB        20
05 004F3   70      A                DB        D6!D5!D4!D3!D2!D0         X 0 1 0 1 1 X 0   36      7
05 004F4   2C      A                DB        D5!D3!D2
05 004F5   24      A                DB        36
05 004F6   70      A                DB        D6!D5!D4!D3!D2!D0         X 0 1 0 1 1 X 1   20      8
05 004F7   2D      A                DB        D5!D3!D2!D0
05 004F8   14      A                DB        20
05 004F9   75      A                DB        D6!D5!D4!D2!D0            X 0 0 0 X 0 X 0   21      9
05 004FA   00      A                DB        0
```

```
05 004FB   15      A             DB        21
05 004FC   7D      A             DB        D6|D5|D4|D3|D2|D0           X 0 1 0 1 0 X 0   21   10
05 004FD   28      A             DB        D5|D3
05 004FE   15      A             DB        21
05 004FF   75      A             DB        D6|D5|D4|D2|D0              X 0 0 0 X 0 X 1   13   11
05 00500   01      A             DB        D0
05 00501   0D      A             DB        13
05 00502   7D      A             DB        D6|D5|D4|D3|D2|D0           X 0 1 0 1 0 X 1   13   12
05 00503   29      A             DB        D5|D3|D0
05 00504   00      A             DB        13
05 00505   10      A             CB        D4                          X X X 1 X X X X   11   13
05 00506   10      A             DB        D4
05 00507   0B      A             CB        11
05 00508   80      A             DB        D7                          1 X X X X X X X   00   14
05 00509   80      A             DB        D7
05 0050A   00      A             DB        0
                       *NAR
                       *
                       *         R U N   N O T   P R I N T   S T A T E
                       *
                       *         RUN NOT PRINT- EXECUTES WHILE MACHINE IS COMPLETING A COPY RUN.
                       *         ENTERED FROM 'PRINT' AND EXITS TO 'NOT READY'.

                       *         PROLOG

05 0050B   CD0000  N   RUNN:PRL  CALL      DO8ELV                      CAUSE ELV TO EXECUTE
05 0050E   CD0000  N             STIMR     RUNNITMR,2500,RUNN8CHG      STAY IN RUNN 2.5 SEC
05 00511   2F      A
05 00512   FA      A
05 00513   7505    N                                                   SYNC BKG PNTRS TO NEW STATE
05 00515   CDA901  N             CALL      SB:PNTRS
05 00518   C9      A             RET

                       *         CALLS FOR RUN NOT PRINT 10 MS SYN BACKGROUND

05 00519   CD0000  N   RUNN10    CALL      ADH8CTPL
05 0051C   C9      A             RET

                       *         CALLS FOR RUN NOT PRINT 20 MS SYN BACKGROUND

05 0051D   0000    N   RUNN20    DW        RUNN8SWS
05 0051F   0000    N             DW        SORTERS
05 00521   0000    N             DW        SOSBJMOT
05 00523   0000    N             DW        FLV8PRNT
05 00525   0000    N             DW        LMP8CTRL
05 00527   0000    N             DW        PAP8TGL4
05 00529   0000    N             DW        DSPL8CTL
05 0052B   0000    N             DW        INSTRU                      END OF TABLE
05 0052D   FFFF    A             DW        X'FFFF'

                       *         CALLS FOR RUN NOT PRINT 100 MS SYN BACKGROUND

05 0052F   0000    N   RUNN100   DW        JAM8RST
05 00531   0000    N             DW        RILK8CK
05 00533   0000    N             DW        FUS8ROUT
05 00535   0000    N             DW        2SD8RUN
05 00537   0000    N             DW        XMM8PRNT
05 00539   0000    N             DW        LITE8OFF
05 0053B   0000    N             DW        TST8LP4                     TEST IF OK TO LEAVE RUN NOT PRT
05 0053D   FF01    N             DW        STAT:CHG                    END OF TABLE
05 0053F   FFFF    A             DW        X'FFFF'

05 00541   CD0000  N   RUNN:EPL  CALL      DEL8CK                      CALC COPIES DELIVERED
05 00544   CD0000  N             CALL      PAP8EPL4                    'RUNNPRT' PAPER PATH MOP UP SUB
05 00547   CD0000  N             CALL      MOT8OFF                     TURN OFF SORTER MOTORS
05 0054A   CD0000  N             CALL      DO8ELV                      CAUSE ELV TO EXECUTE
05 0054D   AF      A             CFLG      AXFD8FLT                    RESET FOR USE DURING NEXT RUN
05 0054E   323FF4  A
05 00551   2123FC  A             CFBIT,P   TF8XMMO                     STOP BLINKING OF XMM 'OTHER'
05 00554   3EFE    A
05 00556   A6      A
05 00557   77      A
05 00558   CD0000  N             COBIT,S   SOS$SMPL
05 0055B   ECFD    A
05 0055D   CD7805  N             CALL      NV8JAM                      STORE RECAP DATA IN RAM
05 00560   CD0000  N             CALL      RCP8STRE
05 00563   CD0000  N             CALL      ADH8MOTF
05 00566   3E08    A             MVI       A,8                         SET COUNTER FOR 7 TIMEOUTS
05 00568   3285FA  N             STA       COOLCNT
05 0056B   CD0000  N             CALL      PR8FAN                      (1)
05 0056E   CD0000  N             CALL      FLT8EPL5                    (2) LOG HISTORY DATA FOR RUN
05 00571   CD0000  N             CALL      HIST8FLE                    (3)
05 00574   C9      A             RET

05 00575   2153FD  N   RUNN8CHG  LXI       H,STATE1                    SET H&L TO ADDR OF STATE1
05 00578   3602    A             MVI       M,1NRDY                     CHANGE STATE1 TO NOT READY
                                 IDIALTR   STATE1
05 0057A   C9      A             RET
05 0057B   3A66F4  A   NV8JAM    RFLG      UP8JAM                      LOAD A WITH SRT UPPER JAM FLAG
05 0057E   07      A                                                   & SAVE IT IN THE CARRY BIT
                       *                                               LOAD A WITH SRT LOWER JAM FLAG
05 0057F   3A36F4  A             LDAFLG    LOW8JAM                     & MOVE CARRY &
05 00582   17      A             RAL                                   LOW8JAM INTO THEIR POSITIONS
05 00583   17      A             RAL
05 00584   07      A             RLC
05 00585   07      A             RLC                                   MASK FOR DESIRED BITS
                                 MODBYT    A,AND,MSK(NVBIT,(
                                           NV8LOW8J,NV8UP8J)
05 00586   E60C    A                                                   & SAVE IT IN THE B-REG
05 00588   47      A             MOV       B,A                         WAS THERE AN IMED ON CONDITION
05 00589   3AA9F4  A             IF1       FLG,IMFD8ON1,T
05 0058C   07      A
05 0058D   D29605  N                                                   YES,RESTORE A-REG
05 00590   78      A                   MOV       A,B
```

```
                                              MODBYT    A,OR,MSK(NVBIT,NVBFJAM,;  & SET NV JAM BITS
05 00591   F603     A                                   NV@IMED)
05 00593   C3A105   N                    ELSE:
05 00596   3A3CFD   A                         IF:       FBITS,FOR@AJAM,OR,FOR@MJAM,T IS EITHER JAM CONDITION TRUE
05 00599   E60C     A
05 0059B   CA9F05   N
05 0059E   37       A                              STC                                    YES,SET CARRY
                                              ENDIF
05 0059F   17       A                         RAL                                         ROTATE INTO DO
05 005A0   B0       A                         MODBYT    A,OR,B                            'OR' IN SRT JAM BITS
                                         ENDIF
05 005A1   32C9E2   A                    WNVNIB     NV@JAM#N
                                         ID:ALTR    NVBFJAM,NV@IMED,NV@LOW@J,NV@UP@J
05 005A4   C9       A                    RET                                              RETURN TO STATE CHECKER
                               *NAR
                               *
                               *         T E C H    R E P    S T A T E
                               *
                               *         THE TECH REP STATE IS ENTERED WHEN THE SERVICE KEY IS ON IN
                               *         'NOT READY' & 'READY' STATES. THIS ALLOWS THE TECH REP TO PERFORM SUCH
                               *         TASKS AS ACCESS NON-VOLATILE MEMORY & COMPONENT CONTROL.

                               *
                               *         PROLOG
                               *
05 005A5   CD0000   N          TREP:PRL  CBBIT,S    WAIT$                                 INSURE WAIT OFF AT TREP ENTRANC
05 005A8   E9FE     A
05 005AA   CD0000   N                    CALL       DGN@PRL                               DIAGNOSTIC PROLOG
05 005AD   CDA901   N                    CALL       SB:PNTRS                              SYNC BKG PNTRS TO NEW STATE
05 005B0   C9       A                    RET

                               *         CALLS FOR TECH REP 10MS SYN BACKGROUND

05 005B1   CD0000   N          TREP10    CALL       ADH@CTRL
05 005B4   C9       A                    RET

                               *         CALLS FOR TECH REP 20MS SYN BACKGROUND

05 005B5   0000     N          TREP20    DW         TREP@SWS
05 005B7   0000     N                    DW         MN@ELVRS
05 005B9   0000     N                    DW         LMP@CTRL
05 005BB   0000     N                    DW         DSPL@CTL
05 005BD   0000     N                    DW         DGN@BKG
05 005BF   0000     N                    DW         INSTRU
05 005C1   FFFF     A                    DW         X'FFFF'                              END OF TABLE

                               *         CALLS FOR TECH REP 100MS SYN BACKGROUND

05 005C3   0000     N          TREP100   DW         WRILK@CK
05 005C5   0000     N                    DW         PSD@STPY
05 005C7   0000     N                    DW         XMM@STPY
05 005C9   0000     N                    DW         RED@BGND
05 005CB   0000     N                    DW         RIN@CHK
05 005CD   0000     N                    DW         JAM@RST
05 005CF   0000     N                    DW         OVL@DUMP
05 005D1   0000     N                    DW         FUS@RDUT
05 005D3   0000     N                    DW         TST@LP4
05 005D5   DF05     N                    DW         TREP:CHG                             TEST IF OK TO
05 005D7   FF01     N                    DW         STAT:CHG                                                 LEAVE TREP REP
05 005D9   FFFF     A                    DW         X'FFFF'                              END OF TABLE
                               *
                               *         EPILOG  (TECH REP STATE)
                               *
05 005DB   CD0000   N          TREP:EPL  CALL       DGN@EPL                               DIAGNOSTIC EPILOG
05 005DE   C9       A                    RET

                               *         CHANGE OF STATE CHECK

05 005DF   2153FD   A          TREP:CHG  LXI        H,ADR(DATA,STATE:)                    PREPARE FOR POSSIBLE STATE CHG
05 005E2   7E       A                    IF:        XBYT,M,NE,:COMP                       DO NOT CHG STATE IF IN COMP
05 005E3   FE00     A
05 005E5   CAFE05   N
05 005E8   3A49F4   A                         IF:       FLG,SER@ACT,T                      IF SERVICE KEY IS ON AND IF
05 005EB   07       A
05 005EC   D2FC05   N
05 005EF   3A20FC   A                         ANDIF:    FBIT,DGN@PRT@,F                    IN DIAG PRINT PROGRAM
05 005F2   E602     A
05 005F4   C2FC05   N
05 005F7   3601     A                              MVI       M,:TREP                      CHG TO TREP STATE
05 005F9   C3FE05   N                         ELSE:                                       IF KEY IS TURNED OFF
05 005FC   3602     A                              MVI       M,:NRDY                      CHG TO NOT READY STATE
                                              ENDIF
                                              ID:ALTR   STATE:
                                         ENDIF
05 005FE   C9       A                    RET
```

TABLE II

```
                               *         FIXED PITCH EVENT TABLE
                               *
                               *         EVENTS MUST BE IN SEQUENTIAL ORDER STARTING
                               *         WITH THE EVENT CLOSES TO PITCH RESET FIRST
                               *
                               *         THERE CAN BE NO MORE THAN 256 COUNTS BETWEEN EVENTS
                               *
                               *         FORMAT OF EVENTS FOR EVENT TABLE
                               *
                               *         EVENT     X,Y,Z
                               *         WHERE:
```

```
107                          *        X * ABSOLUTE COUNTS FROM RESET
108                          *        Y * SHIFT REGISTER NEEDED IN EVENT
109                          *        Z * EVENT NAME
110                          *
111                          *
112                          *        PITCH EVENTS
113                          *
114                                   TABLE
115  05 0001E   0200    A             EVENT    2,3,TRN2CURR
     05 00020   03      A
     05 00021   0000    N
116  05 00023   0300    A             EVENT    3,2,ADC8ACT
     05 00025   02      A
     05 00026   0000    N
117  05 00028   0400    A             EVENT    4,3,FDR5AFLT
     05 0002A   03      A
     05 0002B   0000    N
118  05 0002D   0700    A             EVENT    7,0,SPLYS8ON
     05 0002F   00      A
     05 00030   0000    N
119  05 00032   0800    A             EVENT    8,2,FDR1AXFD
     05 00034   02      A
     05 00035   0000    N
120  05 00037   0A00    A             EVENT    10,3,FUS8LOAD
     05 00039   03      A
     05 0003A   0000    N
121  05 0003C   3000    A             EVENT    48,8,DECG8INV      DECISION GATE FOR INVTD COPIES
     05 0003E   08      A
     05 0003F   0000    N
122  05 00041   3600    A             EVENT    54,5,FUS8NTLD      FUSER LOADED TEST
     05 00043   05      A
     05 00044   0000    N
123  05 00046   5500    A             EVENT    85,3,FDR6MFLT
     05 00048   03      A
     05 00049   0000    N
124  05 0004B   5900    A             EVENT    89,2,FDR2MNFD
     05 0004D   02      A
     05 0004E   0000    N
125  05 00050   5D00    A             EVENT    93,8,JAM68NON      PAPER PATH JAM SW PITCH EVENT
     05 00052   08      A
     05 00053   0000    N
126  05 00055   7600    A             EVENT    118,9,JAM58INV     PAPER PATH JAM SW PITCH EVENT
     05 00057   09      A
     05 00058   0000    N
127  05 0005A   7800    A             EVENT    120,0,FSH8OFF
     05 0005C   00      A
     05 0005D   0000    N
128  05 0005F   8700    A             EVENT    135,0,PROG8HST     PROG HISTORY FILE UPDATE
     05 00061   00      A
     05 00062   0000    N
129  05 00064   8F00    A             EVENT    143,6,JAM48CHK     PAPER PATH JAM SW PITCH EVENT
     05 00066   06      A
     05 00067   0000    N
130  05 00069   AA00    A             EVENT    170,10,RET28CHK    PAPER PATH JAM SW PITCH EVENT
     05 0006B   0A      A
     05 0006C   0000    N
131  05 0006E   CF00    A             EVENT    207,3,SOS8CLN
     05 00070   03      A
     05 00071   0000    N
132  05 00073   D100    A             EVENT    209,2,TRN5CURR
     05 00075   02      A
     05 00076   0000    N
133  05 00078   E300    A             EVENT    227,5,JAM38CHK     PAPER PATH JAM SW PITCH EVENT
     05 0007A   05      A
     05 0007B   0000    N
134  05 0007D   0901    A             EVENT    265,2,FDR3AEDG     ENABLE AUX FOR WT SENSOR
     05 0007F   02      A
     05 00080   0000    N
135  05 00082   0B01    A             EVENT    267,4,JAM28CHK     PAPER PATH JAM SW PITCH EVENT
     05 00084   04      A
     05 00085   0000    N
136  05 00087   0E01    A             EVENT    270,8,RET18CHK     PAPER PATH JAM SW PITCH EVENT
     05 00089   08      A
     05 0008A   0000    N
137  05 0008C   6901    A             EVENT    361,3,TRN3DTCK
     05 0008E   03      A
     05 0008F   0000    N
138  05 00091   6C01    A             EVENT    364,2,FDR4MEDG     ENABLE MAIN WT SENSOR
     05 00093   02      A
     05 00094   0000    N
139  05 00096   B901    A             EVENT    441,9,JAM68INV     PAPER PATH JAM SW PITCH EVENT
     05 00098   09      A
     05 00099   0000    N
140  05 0009B   C201    A             EVENT    450,4,FUS8UNLD
     05 0009D   04      A
     05 0009E   0000    N
141  05 000A0   C301    A             EVENT    451,2,TRN1ROLL
     05 000A2   02      A
     05 000A3   0000    N
142  05 000A5   F401    A             EVENT    500,0,DPM8SMPL
     05 000A7   00      A
     05 000A8   0000    N
143  05 000AA   0E02    A             EVENT    526,3,TRN4DTCK
     05 000AC   03      A
     05 000AD   0000    N
144  05 000AF   1B02    A             EVENT    539,0,DVLV8OFF     TURN OFF VAR DFNS DEVELOPERS
     05 000B1   00      A
     05 000B2   0000    N
145  05 000B4   5802    A             EVENT    600,0,BIL8PLOP     TEST FOR PLATEN OPEN      (BLO)
     05 000B6   00      A
     05 000B7   0000    N
```

```
05 000B9    7602   A   EVENT   630,5,INVTRCTL    INVTR GATE & RETURN CONTROL
05 000BB    05     A
05 000BC    0000   N
05 000BE    8A02   A   EVENT   650,6,DECG0N0N    DECISION GATE FOR NON-INVTO
05 000C0    06     A
05 000C1    0000   N
05 000C3    9A02   A   EVENT   666,0,JAM0DLY
05 000C5    00     A
05 000C6    0000   N
05 000C8    BC02   A   EVENT   700,7,JAMS0N0N    PAPER PATH JAM SN PITCH EVENT
05 000CA    07     A
05 000CB    0000   N
05 000CD    2003   A   EVENT   800,0,PROGMODE
05 000CF    00     A
05 000D0    0000   N
05 000D2    2203   A   EVENT   802,0,FSH0ENB
05 000D4    00     A
05 000D5    0000   N
05 000D7    5003   A   EVENT   848,0,DVB0VAR     TURN ON VARIABLE-BIAS DEVELOPER
05 000D9    00     A
05 000DA    0000   N
05 000DC    5203   A   EVENT   850,4,SRSK0EV     INIT SRSK & SRT MOTOR
05 000DE    04     A
05 000DF    0000   N
05 000E1    5403   A   EVENT   852,0,PECOFFEV    TURN OFF POST EXP. COROTRON
05 000E3    00     A
05 000E4    0000   N
05 000E6    8C03   A   EVENT   908,0,PECONEV     TURN ON POST EXP COROTRON
05 000E8    00     A
05 000E9    0000   N
05 000EB    8EC3   A   EVENT   910,0,9100EV
05 000ED    00     A
05 000EE    0000   N
05 000F0    9003   A   EVENT   912,0,DGN0HCNT
05 000F2    00     A
05 000F3    0000   N
05 000F5    A703   A   EVENT   935,0,OVER0RUN
05 000F7    00     A
05 000F8    0000   N
                       ENDTABLE
```

TABLE III

```
                          *
                          *     VARIABLE PITCH EVENT TABLE
                          *
         00000001         FLSH0BSE   EQU   1
         00000019         FO00N0SE   EQU   25
         00000064         FO00FFBS   EQU   100
05 00000    0100   A      ROM0FSH    DW    FLSH0BSE
05 00002    00     A                 DB    0
05 00003    0000   N                 DW    FSH00N
05 00005    6400   A      ROM00FF    DW    FO00FFBS
05 00007    00     A                 DB    0
05 00008    0000   N                 DW    FO00FF
05 0000A    1900   A      ROM00N     DW    FO00NBSE
05 0000C    00     A                 DB    0
05 0000D    0000   N                 DW    FO00N
05 0000F    0100   A      ROM0FSHS   DW    FLSH0BSE
05 00011    00     A                 DB    0
05 00012    0000   N                 DW    FSH00N0S
05 00014    6400   A      ROM00FFS   DW    FO00FFBS
05 00016    00     A                 DB    0
05 00017    0000   N                 DW    FO00FF0S
05 00019    1900   A      ROM00NS    DW    FO00NBSE
05 0001B    00     A                 DB    0
05 0001C    0000   N                 DW    FO00N0S
                          *
```

TABLE IV

```
         00000396         BASE0CNT SET   918             #CLK CNTS/PITCH
         0000038E         SAFE0CNT SET   910             MIN # CLK CNTS/PITCH
                          *
                          *        PITCH TABLE BUILDER
                          *
                          *        BUILD VARIABLE PITCH EVENT TABLE INTO RAM
                          *        FROM ROM DATA + REDUCTION ADJUST & FO TRIM
                          *
05 000FA    2A0000   N    TBLD0PRT LHLD  ROM0FSH         H&L= BASE CNT OF FLASH
05 000FD    EB       A             XCHG                  D&E= BASE CNT OF FLASH
05 000FE    2A9AFC   N             LHLD  1FLSH00N        H&L= RED ADJ
05 00101    19       A             DAD   D               H&L= BASE + ADJ
05 00102    2244FC   N             SHLD  RAM0FSH         RAM0FSH = BASE + ADJ
                          *
05 00105    2A0500   N             LHLD  ROM00FF         H&L= BASE CNT OF FO OFF
05 00108    EB       A             XCHG                  D&E= BASE CNT OF FO OFF
05 00109    2A9CFC   N             LHLD  1FO00FF         H&L= RED ADJ + TRIM ADJ
05 0010C    19       A             DAD   D               H&L= BASE + ADJ
05 0010D    2249FC   N             SHLD  RAM00FF         RAM00FF = BASE + ADJ
                          *
05 00110    2A0A00   N             LHLD  ROM00N          H&L= BASE CNT OF FO ON
05 00113    EB       A             XCHG                  D&E= BASE CNT OF FO ON
05 00114    2A9EFC   N             LHLD  1FO00N          H&L= RED ADJ + TRIM ADJ
05 00117    19       A             DAD   D               H&L= BASE + ADJ
05 00118    CDEA02   N             CALL  ON0MOD          CALL MOD ROUTINE TO MOD IF<0
```

```
05 0011B   224EFC  N          SHLD    RAM00N              RAM00N = RESULTS OF ABOVE
                          *
05 0011E   3A31F4  A          IF:     FLG,IMG0SFT,T       IS THERE IMAGE SHIFT
05 00121   07      A
05 00122   D25601  N
05 00125   3E06    A             MVI     A,6              YES,# OF VAR EVENTS TO USE = 6
05 00127   47      A             MOV     B,A              SET UP B-REG FOR LOOP CONTROL
05 00128   3262FA  N             STA     TBLD0NUM         STORE # OF VAR EVENTS
05 0012B   3D      A             DCR     A                SET UP # OF TIMES TO GO
05 0012C   3263FA  N             STA     TBLD0TMP         THRU SORT
                          *
05 0012F   2A0F00  N             LHLD    ROM0FSHS         UPDATE ROM0FSHS TO
05 00132   EB      A             XCHG                     INCLUDE RED MODE ADJ + SHIFT
05 00133   2AA0FC  N             LHLD    2FLSH00N         ADJ AND SAVE FOR THE
05 00136   19      A             DAD     D                IMAGE SHIFT
05 00137   2253FC  N             SHLD    RAM0FSHS         FLASH EVENT
                          *
05 0013A   2A1400  N             LHLD    ROM0OFFS         UPDATE ROM0OFFS TO INCLUDE
05 0013D   EB      A             XCHG                     RED MODE ADJ + TRIM ADJ +
05 0013E   2AA2FC  N             LHLD    2F00OFF          SHIFT ADJ AND SAVE
05 00141   19      A             DAD     D                FOR THE IMAGE SHIFT
05 00142   2258FC  N             SHLD    RAM0OFFS         FADE OUT EVENT
                          *
05 00145   2A1900  N             LHLD    ROM00NS          UPDATE ROM00NS TO INCLUDE
05 00148   EB      A             XCHG                     RED MODE ADJ + TRIM ADJ +
05 00149   2AA4FC  N             LHLD    2FF00N           SHIFT ADJ
05 0014C   19      A             DAD     D
05 0014D   CDEA02  N             CALL    0N0MOD           CALL MOD ROUTINE TO MOD IF <0
05 00150   225DFC  N             SHLD    RAM00NS          SAVE THE RESULTS
                          *
05 00153   C36001  N          ELSE:                       IF IMAGE SHIFT NOT SET
05 00156   3E03    A             MVI     A,3              #OF VAR EVENTS TO USE = 3
05 00158   47      A             MOV     B,A
05 00159   3262FA  N             STA     TBLD0NUM         SET UP B-REG FOR LOOP CONTROL
05 0015C   3D      A             DCR     A                STORE # OF VAR EVENTS & SETUP
05 0015D   3263FA  N             STA     TBLD0TMP         #OF TIMES TO GO THRU SORT
                              ENDIF
                          *

                          *           SUBROUTINE TO DETERMINE IF MODIFIED F0 ON EVENT
                          *           CLK COUNT IF CLK COUNT RESULTS ARE NEGATIVE OR 0
                          *
                          *
05 002EA   7C      A      0N0MOD  MOV     A,H             A= MS PART OF ABS CLK COUNT
05 002EB   07      A              RLC                     CARRY= SIGN OF ABS CLK COUNT
05 002EC   D20203  N              IF:     CC,C,S          IS THE ABS CLK CNT NEG
05 002EF   119603  A                 LXI     D,BASE0CNT   YES,ADD # CLK COUNTS PER PITCH
05 002F2   19      A                 DAD     D            TO NEG #
05 002F3   118E03  A                 IF:     XWRD,H,GE,SAFE0CNT   IS RESULTS GE SAFE # CLK/PITCH
05 002F6   CD0000  N
05 002F9   DAFF02  N
05 002FC   210100  A                    LXI     H,1       YES,MOVE TO TURN ON LATER
                                     ENDIF
05 002FF   C30E03  N              ORIF:   XWRD,H,EQ,0     IF RESULTS = 0, MOVE LATER IN
05 00302   110000  A
05 00305   CD0000  N
05 00308   C20E03  N
05 0030B   210100  A                 LXI     H,1          PITCH BECUASE EVENT MUST BE > 0
                                  ENDIF
05 0030E   C9      A              RET
                                  END
CONTROL SECTION SUMMARY: 01 00000   PT 0     02 00000   PT 0     03 00000   PT 0     04 OFFD8   PT 2
                         05 0030F   PT 1
* NO UNDEFINED SYMBOLS
*    ERROR SEVERITY LEVEL: 0
* NO ERROR LINES
```

TABLE V

```
                          *
                          *        SORTS VARIABLE RAM EVENT TABLE BY
                          *        ABS CLK COUNT & LOWEST ENDS IN EV0RAM
                          *
                          *        SORTS ONLY 1ST 3 IF NO IMAGE SHIFT, OTHERWISE SORTS ALL 6
                          *
05 0017E   2144FC  N       LXI     H,EV0RAM               H&L= ADDR OF TOP OF VAR RAM TBL
05 00181   3A63FA  N       WHILE:  XBYT,TBLD0TMP,NE,0     TIMES TO GO THRU OUTER LOOP
05 00184   FE00    A
05 00186   CAFD01  N
05 00189   3253FA  N          STA     IN0LP0CT            INTER LOOP CNT=OUTER LOOP CNT
05 0018C   3E80    A          SFLG    TBLD01ST            SET 1ST FLAG FOR THIS POSITION
05 0018E   325EF4  A
05 00191   2252FB  N          SHLD    FIX0ADDR            ADDR OF POSITION TO FULL
05 00194   B7      A          ORA     A                   CLEAR Z CONDITION BIT
05 00195   CAEF01  N          WHILE:  CC,Z,C
05 00198   5E      A             MOV     E,M              E= LS PART OF ABS CLK COUNT
05 00199   23      A             INX     H
05 0019A   56      A             MOV     D,M              D= MS PART OF ABS CLK COUNT
05 0019B   D5      A             PUSH    D                STORE ABS CLK CNT OF FILL POS
05 0019C   3A5EF4  A             IF:     FLG,TBLD01ST,T   IS IT 1ST TIME FOR THIS POS
05 0019F   07      A
05 001A0   D2AE01  N
05 001A3   AF      A                CFLG    TBLD01ST      YES, CLEAR ITS FLAG
05 001A4   325EF4  A
05 001A7   23      A                INX     H             AND INCREMENT
05 001A8   23      A                INX     H             POINTER TO LS PART OF
05 001A9   23      A                INX     H             ABS CLK COUNT OF NEXT
05 001AA   23      A                INX     H             EVENT
05 001AB   C38601  N             ELSE:
```

```
05 001AE   2A5CFB   N              LHLD      VAR@ADDR          H&L= ADDR
05 001B1   23       A              INX       H                 OF LS PART OF
05 001B2   23       A              INX       H                 ABS CLK COUNT TO
05 001B3   23       A              INX       H                 COMPARE TO FILL
05 001B4   23       A              INX       H                 POSITION
05 001B5   23       A              INX       H
                                ENDIF
05 001B6   225CFB   N           SHLD      VAR@ADDR             STORE POINTER TO COMPARE EVENT
05 001B9   5E       A           MOV       E,M                  E= LS PART OF COMPARE ABS CLK
05 001BA   23       A           INX       H
05 001BB   56       A           MOV       D,M                  D= MS PART OF COMPARE ABS CLK
05 001BC   E1       A           POP       H                    H&L= ABS CLK COUNT OF FILL POS
05 001BD   EB       A           IF:       XWRD,D,LT,H          IS CLK OF COMPARE < FILL
05 001BE   CD0000   N
05 001C1   D2E501   N
05 001C4   2A5CFB   N              LHLD      VAR@ADDR          YES, SWITCH THE 2 EVENTS
05 001C7   EB       A              XCHG                        D&E= ADDR LOWER CLK VALUE
05 001C8   2A52FB   N              LHLD      FIX@ADDR          H&L= ADDR LARGER CLK VALUE
05 001CB   3EFB     A              MVI       A,-5              INITIALIZE LOOP COUNTER TO 5
05 001CD   3265FA   N              STA       TSW@NUM           WHICH = # OF ITEMS TO MOVE
05 001D0   B7       A              ORA       A                 CLEAR Z CONDITION BIT
05 001D1   CAE501   N              WHILE:    CC,Z,C
05 001D4   1A       A                 LDAX      D              A= CONTAINS OF COMPARE EVENT
05 001D5   46       A                 MOV       B,M            B= CONTAINS OF FILL EVENT
05 001D6   77       A                 MOV       M,A            UPDATE FILL POS
05 001D7   78       A                 MOV       A,B            UPDATE COMPARE POS
05 001D8   12       A                 STAX      D              WITH NEW VALUE
05 001D9   13       A                 INX       D              MOVE POINTERS TO
05 001DA   23       A                 INX       H              NEXT ITEM
05 001DB   3A65FA   N                 LDA       TSW@NUM        INC MOVE
05 001DE   3C       A                 INR       A              LOOP CONTROL
05 001DF   3265FA   N                 STA       TSW@NUM        COUNTER
05 001E2   C3D101   N              ENDWHILE
                                ENDIF
05 001E5   2153FA   N           DECBYT    IN@LP@CT             DECRM INNER LOOP CNTR
05 001E8   35       A
05 001E9   2A52FB   N           LHLD      FIX@ADDR             H&L= ADDR OF FILL POSITION
05 001EC   C39501   N        ENDWHILE
05 001EF   110500   A        LXI       D,5                     MOVE H&L TO LOOK AT NEXT EVENT
05 001F2   19       A        DAD       D                       POSITION TO FILL
05 001F3   3A63FA   N        LDA       TBLD@TMP                DECREMENT # OF EVENTS
05 001F6   3D       A        DCR       A                       TO SORT
05 001F7   3263FA   N        STA       TBLD@TMP
05 001FA   C38101   N     ENDWHILE
```

TABLE VI

```
                         *
                         *    MOVE THE SR# & EVENT ADDR FROM ROM TABLE
                         *    TO RAM TABLE. MOVES ONLY THE FIRST 3 IF
                         *    NO IMAGE SHIFT, OTHERWISE MOVES ALL 6
                         *
05 00160   1144FC   N     LXI       D,RAM@FSH               D&E = ADDR OF RAM TABLE
05 00163   210000   N     LXI       H,ROM@FSH               H&L = ADDR OF ROM TABLE
05 00166   B0       A     ORA       B                       CLEAR Z CONDITION BIT
05 00167   CA7E01   N     WHILE:    CC,Z,C
05 0016A   23       A        INX       H                    INCREMENT H&L AND D&E
05 0016B   23       A        INX       H                    POINTERS OVER THE
05 0016C   13       A        INX       D                    ABS CLK COUNT
05 0016D   13       A        INX       D
05 0016E   7E       A        MOV       A,M                  LOAD A WITH SR#
05 0016F   12       A        STAX      D                    STORE SR# IN RAM TABLE
05 00170   23       A        INX       H                    MOVE POINTERS TO LS
05 00171   13       A        INX       D                    ADDR OF EVENT
05 00172   7E       A        MOV       A,M                  LOAD A WITH LS ADDR OF EVENT
05 00173   12       A        STAX      D                    & STORE IT IN RAM TABLE
05 00174   23       A        INX       H                    MOVE POINTERS TO MS
05 00175   13       A        INX       D                    ADDR OF EVENT
05 00176   7E       A        MOV       A,M                  MOVE MS ADDR OF EVENT
05 00177   12       A        STAX      D                    TO RAM
05 00178   23       A        INX       H                    MOVES POINTERS TO
05 00179   13       A        INX       D                    LS PART OF ABS CLK COUNT
05 0017A   05       A        DCR       B                    DECREMENT LOOP COUNTER
05 0017B   C36701   N     ENDWHILE
                         *
```

TABLE VII

```
                         *
                         *    MERGE VARIABLE PITCH EVENT TABLE & FIXED EVENT
                         *    TAPLE CALCULATING THE REL DIFFERENCE WITH THE
                         *    RESULTS GOING INTO THE RUN EVENT TABLE
                         *
05 001FD   2A44FC   N     LHLD      EV@RAM                  INITIALIZE VAR@CLK TO ABS CLK
05 00200   225EFB   N     SHLD      VAR@CLK                 COUNT OF 1ST VAR PITCH EVENT
05 00203   2144FC   N     LXI       H,EV@RAM                INITIALIZE VAR@ADDR TO ADDR OF
05 00206   225CFB   N     SHLD      VAR@ADDR                1ST VAR PITCH EVENT
05 00209   211E00   N     LXI       H,EV@ROM                INITIALIZE FIX@ADDR TO ADDR OF
05 0020C   2252FB   N     SHLD      FIX@ADDR                1ST FIXED PITCH EVENT
05 0020F   3E80     A     SFLG      TBLD@1ST                NOTES 1ST EVENT TO RUN TABLE
05 00211   325EF4   A
05 00214   3E2C     A     MVI       A,TABLENUM              INITIALIZE TSW@NUM TO # OF
05 00216   3265FA   N     STA       TSW@NUM                 EVENTS IN FIXED PITCH TABLE
05 00219   2A1E00   N     LHLD      FV@ROM                  INITIALIZE D&E WITH ABS CLOCK
05 0021C   EB       A     XCHG                              COUNT OF 1ST FIXED EVENT
05 0021D   AF       A     CFLG      VAR@DONE                FLAG DENOTES VAR EVENTS
05 0021E   3259F4   A
```

```
05 00221  3A59F4  A     WHILE!    FLG,VAR@DONE,F            WHILE THERE ARE MORE VAR EVENTS
05 00224  07      A
05 00225  DA6F02  N
05 00228  2A5EFB  N       IF!       XWRD,VAR@CLK,LE,D         IS VAR CLK CNT <= FIXED CLK CNT
05 0022B  CD0000  N
05 0022E  DA3402  N
05 00231  C25902  N
05 00234  2A5CFB  N           LHLD      VAR@ADDR              YES, H&L= VAR EVENT ADDR
05 00237  CD9302  N           CALL      TBLD@UPD              PLACE VAR EVENT AT END RUN TBL
05 0023A  3A62FA  N           LDA       TBLD@NUM              DECREMENT # OF
05 0023D  3D      A           DCR       A                     VARIABLE EVENTS LEFT
05 0023E  3262FA  N           STA       TBLD@NUM              TO MERGE
05 00241  C24C02  N           IF!       CC,Z,S                DID TBLD@NUM GO TO 0
05 00244  3E80    A              SFLG      VAR@DONE           YES,DENOTE NO MORE VAR EVENTS
05 00246  3259F4  A
05 00249  C35602  N           ELSE!
05 0024C  225CFB  N              SHLD      VAR@ADDR           STORE ADDR OF NEXT VAR EVENT
05 0024F  5E      A              MOV       E,M                UPDATE VAR@CLK TO
05 00250  23      A              INX       H                  VALUE OF ABS CLK COUNT
05 00251  56      A              MOV       D,M                OF PRESENT VARIABLE
05 00252  EB      A              XCHG                         EVENT
05 00253  225EFB  N              SHLD      VAR@CLK
                              ENDIF
05 00256  C36602  N       ELSE!                               IF FIXED TABLE CLK COUNT IS
05 00259  2A52FB  N           LHLD      FIX@ADDR              LESS THEN VAR TABLE UPDATE THE
05 0025C  CD9302  N           CALL      TBLD@UPD              RUN TABLE WITH THAT EVENT
05 0025F  2252FB  N           SHLD      FIX@ADDR              UPDATE TO NEXT FIXED EVENT
05 00262  2165FA  N           LXI       H,TSW@NUM             DECREMENT # OF FIXED EVENTS
05 00265  35      A           DCR       M                     LEFT
                          ENDIF
05 00266  2A52FB  N       LHLD      FIX@ADDR
05 00269  5E      A       MOV       E,M                       UPDATE D&L TO =
05 0026A  23      A       INX       H                         ABS CLK CNT VALUE
05 0026B  56      A       MOV       D,M                       OF PRESENT FIXED TABLE
05 0026C  C32102  N     ENDWHILE
05 0026F  3EFF    A     MVI       A,X'FF'                     CLEAR Z CONDITION
05 00271  B7      A     ORA       A                           BIT FOR LOOP
05 00272  2A52FB  N     LHLD      FIX@ADDR                    NO MORE VAR EVENTS, USE FIXED
05 00275  CA8402  N     WHILE!    CC,Z,C                      DONE WITH FIXED TABLE
05 00278  CD9302  N       CALL      TBLD@UPD                  NO,UPDATE RUN TABLE
05 0027B  EB      A       XCHG                                SAVE H&L IN D&E
05 0027C  2165FA  N       LXI       H,TSW@NUM                 DECREMENT # OF FIXED
05 0027F  35      A       DCR       M                         EVENTS LEFT
05 00280  EB      A       XCHG                                RESTORE H&L
05 00281  C37502  N     ENDWHILE
05 00284  2A58FB  N     LHLD      P@TBL@A                     H&L=ADDR OF LAST MS ADDR IN RUN
05 00287  2B      A     DCX       H                           MOVE H&L POINTER BACK TO POINT
05 00288  2B      A     DCX       H                           AT THE BEGINNING OF THE LAST
05 00289  2B      A     DCX       H                           EVENT (OVER@RUN) & STORE IT
05 0028A  2264FD  N     SHLD      EV@PTR!                     FOR MACH CLK INTERRUPT HANDLER
05 0028D  3E80    A     SFLG      TBLD@FIN                    DENOTES PITCH TABLE IS COMPLETE
05 0028F  325DF4  A
05 00292  C9      A     RET

                  *     SUBROUTINE TO CALCULATE REL DIFFERENCE BETWEEN
                  *     2 EVENTS & MOVE REST OF TABLE TO RUN TABLE
                  *
05 00293  3A5EF4  A  TBLD@UPD IF!   FLG,TBLD@1ST,T            THIS IS THE FIRST EVENT
05 00296  07      A
05 00297  D2AF02  N
05 0029A  AF      A       CFLG      TBLD@1ST                  YES, CLR FLAG TO KEEP OUT
05 0029B  325EF4  A
05 0029E  7E      A       MOV       A,M                       A= LS OF 1ST EVENT ABS CLK CNT
05 0029F  3251FA  N       STA       EV@1@TIM                  USED AT PITCH PESET
05 002A2  5F      A       MOV       E,A                       E=LS OF 1ST EVENT ABS CLK CNT
05 002A3  23      A       INX       H                         H&L=ADDR OF MS ABS CLK CNT
05 002A4  56      A       MOV       D,M                       D=MS OF 1ST EVENT ABS CLK CNT
05 002A5  EB      A       XCHG                                D&E= ADDR OF MS ABS CLK CNT
05 002A6  2256FB  N       SHLD      LCLK@CNT                  STORE ABS CLK OF 1ST EVENT
05 002A9  21E8FE  N       LXI       H,EV@BASE!                H&L = ADDR OF PUN TABLE
05 002AC  C3D802  N     ELSE!
05 002AF  5E      A       MOV       E,M                       E=LS CLK CNT OF NEW EVENT
05 002B0  23      A       INX       H                         H&L= ADDR OF MS ABS CLK CNT
05 002B1  56      A       MOV       D,M                       D=MS CLK CNT OF NEW EVENT
05 002B2  E5      A       PUSH      H                         SAVE ADDR OF MS ABS CLK CNT
05 002B3  2A56FB  N       IF!       XWRD,LCLK@CNT,GE,D        IS LAST CLK CNT GE NEW CLK CNT
05 002B6  CD0000  N
05 002B9  DAC502  N
05 002BC  23      A           INX       H                     H&L= LAST CLK CNT + 1
05 002BD  2256FB  N           SHLD      LCLK@CNT              STORE IT FOR NEXT TIME
05 002C0  3E01    A           MVI       A,1                   PUT THIS EVENT AT THE NEXT CLK
05 002C2  C3CC02  N       ELSE!
05 002C5  45      A           MOV       B,L                   B=LS CLK CNT OF LAST EVENT
05 002C6  EB      A           XCHG                            H&L=ABS CLK CNT OF NEW EVENT
05 002C7  2256FB  N           SHLD      LCLK@CNT              STORE IT FOR THE NEXT TIME
05 002CA  7D      A           MOV       A,L                   A=LS CLK CNT OF NEW EVENT
05 002CB  90      A           SUB       B                     FIND DIFF (ONLY NEED LS IF CLK
                          ENDIF                               CNTS BETWEEN EVENTS <256)
05 002CC  D1      A       POP       D                         D&E=ADDR OF MS OF CLK OF NEW EV
05 002CD  2A58FB  N       LHLD      P@TBL@A                   H&L= ADDR OF END OF LAST RUN EV
05 002D0  2B      A       DCX       H                         MOVE H&L POINTER
05 002D1  2B      A       DCX       H                         TO REL DIFF OF LAST
05 002D2  2B      A       DCX       H                         EVENT IN RUN TABLE
05 002D3  77      A       MOV       M,A                       MOVE REL DIFF TO RUN TABLE
05 002D4  23      A       INX       H                         INCREMENT RUN TABLE
05 002D5  23      A       INX       H                         POINTER OVER LAST
05 002D6  23      A       INX       H                         EVENT
05 002D7  23      A       INX       H
                        ENDIF
05 002D8  23      A     INX       H                           H&L= ADDR OF SR# IN RUN TABLE
05 002D9  13      A     INX       D                           D&E= ADDR OF SR#
05 002DA  1A      A     LDAX      D                           MOVE SR# FROM TABLE TO
```

```
05 002DB   77      A            MOV     M,A                   RUN TABLE
05 002DC   23      A            INX     H                     MOVE POINTERS TO LS 8 BITS
05 002DD   13      A            INX     D                     OF EVENT ADDR
05 002DE   1A      A            LDAX    D                     MOVE LS 8 BITS OF ADDR
05 002DF   77      A            MOV     M,A
05 002E0   23      A            INX     H                     MOVES POINTER TO MS 8 BITS
05 002E1   13      A            INX     D                     OF EVENT ADDR
05 002E2   1A      A            LDAX    D                     MOVES MS 8 BITS OF ADDR
05 002E3   77      A            MOV     M,A
05 002E4   2258FB  N            SHLD    P@TBL@A               STORE ADDR OF RUN TABLE
05 002E7   13      A            INX     D                     POINTER TO LS 8 BITS OF CLK CNT
05 002E8   EB      A            XCHG                          H&L= ADDR OF LS 8 BITS OF CLK
05 002E9   C9      A            RET
                      *
                      *         SUBROUTINE TO DETERMINE IF MODIFIED FB ON EVENT
                      *         CLK COUNT IF CLK COUNT RESULTS ARE NEGATIVE OR 0
                      *
05 002EA   7C      A  ON@MOD    MOV     A,H                   A= MS PART OF ABS CLK COUNT
05 002EB   07      A            RLC                           CARRY= SIGN OF ABS CLK COUNT
05 002EC   D20203  N            IF:     CC,C,S                IS THE ABS CLK CNT NEG
05 002EF   119603  A              LXI     D,BASE@CNT          YES,ADD # CLK COUNTS PER PITCH
05 002F2   19      A              DAD     D                   TO NEG #
05 002F3   118E03  A              IF:     XWRD,H,GE,SAFE@CNT  IS RESULTS GE SAFE # CLK/PITCH
05 002F6   C00000  N
05 002F9   DAFF02  N
05 002FC   210100  A                LXI     H,1               YES,MOVE TO TURN ON LATER
                                  ENDIF
05 002FF   C30E03  N            ORIF:   XWRD,H,EQ,0           IF RESULTS = 0, MOVE LATER IN
05 00302   110000  A
05 00305   C00000  N
05 00308   C20E03  N
05 0030B   210100  A              LXI     H,1                 PITCH BECUASE EVENT MUST BE > 0
                                ENDIF
05 0030E   C9      A            RET
                                END
CONTROL SECTION SUMMARY: 01 00000   PT 0    02 00000   PT 0    03 00000   PT 0    04 0FFD8   PT 2
                         05 0030F   PT 1
* NO UNDEFINED SYMBOLS
*     ERROR SEVERITY LEVEL: 0
* NO ERROR LINES
```

TABLE VIII

```
                      *
                      * PITCH RESET INTERRUPT HANDLER
                      *
06 000F9   FB      A  RSET:   EI                                RE-ENABLE INTERRUPTS
06 000FA   F5      A          PUSH    PSW                       SAVE A-REG & CONDITION BITS
06 000FB   3A5DF4  A          IF:     FLG,TBLD@FIN,T            IS PITCH TABLE BUILD FINISHED
06 000FE   07      A
06 000FF   D26201  N
06 00102   E5      A            PUSH    H                       SAVE H&L
                                IF:     FLGS,SR@DONE,;          YES, IS THERE A NEW SR VALUE
06 00103   3A4DF4  A                    AND,910@DONE,T          YES, DID 910 EVENT GET DONE
06 00106   216FF4  A
06 00109   A6      A
06 0010A   F25501  N
06 0010D   AF      A              CFLG    910@DONE              YES, RESET & MACH CLK TIMING OK
06 0010E   326FF4  A
06 00111   324DF4  A              MODFLG  SR@DONE               CLR FLAG UNTIL NEXT SR EVENT
06 00114   2163FD  A              LXI     H,ADR(DATA,SR@PTR:)   LOAD RELATIVE
06 00117   7E      A              MOV     A,M                              PNTR TO SR #0
06 00118   C60F    A              MODBYT  A,ADD,15              MOVE PNTR BACK
06 0011A   E66F    A              MODBYT  A,AND,SR@ADJ:                      BY 1 (CIRCULAR)
06 0011C   77      A              MOV     M,A                   SAVE NEW REL SR PNTR IN SR@PTR:
06 0011D   26FE    A              MVI     H,HADR(DATA,SHIFTREG) H&L= ABS ADDR
06 0011F   6F      A              MOV     L,A                                OF SR #0
06 00120   3A69FD  A              LDA     ADR(DATA,SR@VALU:)    A= NEW SR VALUF FROM SRSK
06 00123   77      A              MOV     M,A                   UPDATE CONTENTS OF SR#0
06 00124   3A51FA  A              LDA     ADR(DATA,EV@1@TIM)    INIT MCLK:CNT
06 00127   326EFD  A              STA     ADR(DATA,MCLK:CNT)                TO 1ST EVENT TIME
06 0012A   21E8FE  A              LXI     H,ADR(DATA,EV@BASE:)  INIT EV@PTR:
06 0012D   2264FD  A              SHLD    ADR(DATA,EV@PTR:)                 TO 1ST EVENT ADDR
                                  IF:     FLGS,NORM@DN:,;       IS NORMAL SHUTDOWN REQUESTED
                                          AND,CYCL@DN:,;        NO, IS CYCLE-DOWN REQUESTED
06 00130   3AABF4  A                      AND,SD1@DLY,F         NO, IS PROC DEAD CYCLING
06 00133   21AAF4  A
06 00136   B6      A
06 00137   21AFF4  A
06 0013A   B6      A
06 0013B   FA5201  N
06 0013E   2166FD  A                LXI     H,ADR(DATA,CYCUPCT:) NO, LOAD CYCLE-UP CNTR
06 00141   7E      A                IF:     XBYT,M,NE,5         IS PROC IN CYCLE-UP MODE
06 00142   FE05    A
06 00144   CA5201  N
06 00147   FE04    A                  IF:     XBYT,A,EQ,4       YES, IS IT RDY TO MAKE 1ST IMG
06 00149   C25101  N
06 0014C   3E80    A                    SFLG    IMGMADE:        YES, SIGNAL 1ST IMAGE MADE
06 0014E   32ADF4  A
                                      ENDIF
06 00151   34      A                  INR     M                 INCRM CYCLE-UP CNTR (UNTIL= 5)
                                    ENDIF
                                  ENDIF
06 00152   C36101  N          ELSE:                             NEW SR VALUE NOT AVAILABLE
06 00155   3E80    A            SFLG    IMED@DN:                REQUEST AN IMED SHUTDOWN
06 00157   32A9F4  A
06 0015A   2132FD  A            SFBIT,P E@PR@FLT                SIGNAL EARLY PITCH RESET FAULT
06 0015D   3E40    A
06 0015F   B6      A
06 00160   77      A
```

```
                                   ENDIF
06 00161   E1       A              POP      H                       RESTORE H&L
                                 ENDIF
06 00162   3EFE     A            MVI      A,RSETFF!                 RESET PITCH RESET
06 00164   3200E6   A            STA      ADR(EQU,RSINTFF!)            INT FLIP-FLOP
06 00167   F1       A            POP      PSW                       RESTORE A-REG & CONDITION BITS
06 00168   C9       A            RET                                RETURN TO INTERRUPTED ROUTINE
```

TABLE IX

```
                         *
                         * MACHINE CLOCK INTERRUPT HANDLER
                         *

        06 0002B                 ORIGIN   X'38'                     INTERRUPT TRAP CELL LOCATION

06 00038   F5       A    MCLK!   PUSH     PSW                       SAVE A-REG & CONDITION CODES
06 00039   3A6EFD   A            LDA      ADR(DATA,MCLK!CNT)        IS THERE
06 0003C   3D       A            DCR      A                             A PITCH
06 0003D   C26600   N            IF!      CC,Z,S                           EVENT TO DO
06 00040   E5       A               PUSH     H                      YES, SAVE
06 00041   D5       A               PUSH     D                          ALL REMAINING
06 00042   C5       A               PUSH     B                                  REGS
06 00043   2A64FD   A               LHLD     ADR(DATA,EVOPTR!)      H&L= 1ST LOC OF NEXT PE TO DO
06 00046   7E       A               MOV      A,M                    SAVE RELATIVE DIFFERENTIAL TO
06 00047   326EFD   A               STA      ADR(DATA,MCLK!CNT)      NEXT EVENT (# CLOCK COUNTS)
06 0004A   23       A               INX      H                      MOVE PNTR TO RFL SR IN TABLE
06 0004B   3A63FD   A               LDA      ADR(DATA,SR0PTR!)      LOAD REL POSITION OF SR #0
06 0004E   86       A               MODBYT   A,ADD,M                C= LS PORTION OF ADDR OF THE
06 0004F   E66F     A               MODBYT   A,AND,SR0ADJ!           REQUESTED SHIFT REGISTER
06 00051   4F       A               MOV      C,A                     POSITION (FOR USE WITHIN PE)
06 00052   06FE     A               MVI      B,HADR(SHIFTREG)       B&C= ADDR REQUESTED SR POSITION
06 00054   0A       A               LDAX     B                      A= <REQUESTED SR POSITION>
06 00055   23       A               INX      H                      E= LS PORTION OF ADDR OF THE
06 00056   5E       A               MOV      E,M                     REQUESTED PITCH EVENT
06 00057   23       A               INX      H                      D= MS PORTION OF ADDR OF THE
06 00058   56       A               MOV      D,M                     REQUESTED PITCH EVENT
06 00059   23       A               INX      H                      SAVE PNTR TO
06 0005A   2264FD   A               SHLD     ADR(DATA,EVOPTR!)                NEXT PITCH EVENT
06 0005D   CD0000   N               CALL     DE!INO                 VECTOR TO REQUESTED PITCH EVENT
06 00060   C1       A               POP      B                      RESTORE
06 00061   D1       A               POP      D                          SAVED
06 00062   E1       A               POP      H                             REGISTERS
06 00063   C37000   N            ELSE!
06 00066   326EFD   A               STA      ADR(DATA,MCLK!CNT)     NO PE; SAVE DECRM'D 'MCLK!CNT'
06 00069   0F       A               RRC                             IS IT TIME FOR
06 006A    D27000   N               IF!      CC,C,S                         A REFRESH
06 0006D   3202E6   A                  REFRESH                      YES, REFRESH REMOTES (1 MSEC)
                                    ENDIF
                                 ENDIF
06 00070   FB       A            EI                                 RE-ENABLE INTERRUPT SYSTEM
06 00071   3EFD     A            MVI      A,MCLKFF!                 RESET MCLK
06 00073   3200E6   A            STA      ADR(EQU,RSINTFF!)            INTERRUPT FLIP-FLOP
06 00076   F1       A            POP      PSW                       RESTORE A-REG & CONDITION CODES
06 00077   C9       A            RET                                RETURN TO INTERRUPTED ROUTINE
```

TABLE X

```
                         *
                         * REAL TIME CLOCK INTERRUPT HANDLER
                         *

06 00081   FB       A    RTC!    EI                                 RE-ENABLE INTERRUPTS
06 00082   F5       A            PUSH     PSW                       SAVE A-REG & CONDITION BITS
06 00083   3EF7     A            MVI      A,RTCFF!                  RESET RTC
06 00085   3200E6   A            STA      ADR(EQU,RSINTFF!)            INTERRUPT FLIP-FLOP
06 00088   D5       A            PUSH     D                         SAVE D&E REGS
06 00089   E5       A            PUSH     H                         SAVE H&L REGS
06 0008A   C5       A            PUSH     B                         SAVE 'B' REGISTER
                         *
06 0008B   2150FD   N            DECBYT   GLB!TIMR                  DECREMENT THE CLOCK CELL
06 0008E   35       A
06 0008F   7E       A            MOV      A,M                       A = <GLB!TIMR> ( 0 TO 255 )
06 00090   23       A            INX      H                         MEM. PTR. TO S0!RQST BYTE
06 00091   E601     A            IF!      XBYT,A,AND,X'01',NZ       IS IT 20 MSEC TIME YET
06 00093   CA9D00   N
06 00096   7E       A               MODBYT   M,OR,10!RQST!20!RQST   YES - BOTH 10 AND 20 BKGD
06 00097   F6C0     A
06 00099   77       A
06 0009A   C3A100   N            ELSE!
06 0009D   7E       A               MODBYT   M,OR,10!RQST           NO - 10 BKGD ONLY
06 0009E   F680     A
06 000A0   77       A
                                 ENDIF
06 000A1   23       A            INX      H                         MEM. PTR. TO DIVD!10 CNTR
06 000A2   35       A            DCR      M                         DECREMENT 10 TO 0 COUNTER
06 000A3   C2AD00   N            IF!      CC,Z,S                    HAS 100 MSEC PASSED
06 000A6   360A     A               MVI      M,10                   YES - RESET THE 10 TO 0 COUNTER
06 000A8   2B       A               DCX      H                      MEM. PTR. BACK TO S0!RQST
06 000A9   7E       A               MODBYT   M,OR,100!RQST          ADD 100 BKGD TO REQUEST BYTE
06 000AA   F620     A
06 000AC   77       A
                                 ENDIF                              NOW CHECK FOR TIME OUTS
                                 REPEAT                             LOAD 'B' WITH QUANTITY TO LOOK
06 000AD   2150FD   N               LXI      H,GLB!TIMR             FOR (CLOCK CELL VALUE)
06 000B0   46       A               MOV      B,M
```

```
06 000B1   16FB     A        MVI      D,COUNT!        SET 'D' FOR TABLE TO SEARCH
06 000B3   CD0000   N        CALL     FIND:LOC        GO LOOK IN ACTIVE LIST
06 000B6   CAF000   N        IF!      CC,Z,C          HAS A MATCH BEEN FOUND
06 000B9   E5       A          PUSH     H             YES - SAVE LOCATION ON STACK
06 000BA   26FC     A          MVI      H,ID!         SEGWAY MEM PTR TO ID! TABLE
06 000BC   5E       A          MOV      E,M           NOW ASSEMBLE
06 000BD   1600     A          MVI      D,0           ADDRESS OF TIMER
06 000BF   21C8F4   A          LXI      H,TMR!FLOS    FLAG INTO THE
06 000C2   19       A          DAD      D             MEMORY POINTER
06 000C3   0600     A          MVI      B,0           GET SET TO CLEAR THE FLAG
06 000C5   F3       A          DI                     NO INTERRUPTIONS NOW, PLEASE
06 000C6   7E       A          MOV      A,M           GET FLAG
06 000C7   07       A          RLC                    INTO THE CARRY BIT
06 000C8   D2EC00   N          IF!      CC,C,S        IS FLAG SET
06 000CB   70       A            MOV      M,B         YES - RESET AND NOW
06 000CC   FB       A            EI                   EVERYBODY CAN INTERRUPT AGAIN
06 000CD   E1       A            POP      H           LOCATION FROM STACK TO MEM PTR
06 000CE   26FD     A            MVI      H,LS!ADDR   SEGWAY MEM PTR TO LS! TABLE
06 000D0   5E       A            MOV      E,M         GET LS TIME-OUT ADDRESS
06 000D1   24       A            INR      H           SEGWAY MEM PTR TO MS! TABLE
06 000D2   56       A            MOV      D,M         GET MS TIME-OUT ADDRESS
06 000D3   45       A            MOV      B,L         LOCATION TO 'B' TEMPORARILY
06 000D4   2A5FFD   N            LHLD     INPTR!      STUFF TIME-OUT ADDRESS INTO
06 000D7   73       A            MOV      M,E         INTO TABLE OF TIME-OUT
06 000D8   23       A            INX      H           ADDRESSES THAT IS CHECKED
06 000D9   72       A            MOV      M,D         FOR ENTRIES EVERY 10 MSECONDS
06 000DA   23       A            INX      H           BY THE STATE CHECKER
06 000DB   7D       A            MODBYT   L,AND,TIME!MSK  FORCE A CIRCULAR TABLE
06 000DC   E62F     A
06 000DE   6F       A
06 000DF   225FFD   N            SHLD     INPTR!      SAVE NEW ADDRESS LOCATION
06 000E2   58       A            MOV      E,B         LOCATION BACK TO 'E'
06 000E3   CD0000   N            CALL     DEACTIV!    TAKE OUT OF ACTIVE TIMER LIST
06 000E6   CD0000   N            CALL     PUT!        AND MAKE LOCATION AVAILABLE
06 000E9   C3EE00   N          ELSE!                  * * * FLAG IS NOT SET SO
06 000EC   FB       A            EI                     LET INTERRUPTIONS OCCUR
06 000ED   E1       A            POP      H             MAKE THE STACK RIGHT AND
                               ENDIF                    FORCE NON-ZERO CONDITION TO
06 000EE   F601     A          MODBYT   A,OR,1          STAY IN UNTIL LOOP
                             ENDIF                    * * * NO MATCH - RTC COMPLETE
06 000F0   C2AD00   N      UNTIL!   CC,Z,S            WILL FALL THROUGH THIS CRACK
                     *
06 000F3   E1       A      POP      H                 RESTORE THE
06 000F4   44       A      MOV      B,H               'B' REGISTER
06 000F5   E1       A      POP      H                 RESTORE H&L REGS
06 000F6   D1       A      POP      D                 RESTORE D&E REGS
06 000F7   F1       A      POP      PSW               RESTORE A-REG & CONDITION CODES
06 000F8   C9       A      RET                        RETURN TO 'FLOAT' BACKGROUND
                     *
```

TABLE XI

```
                     ***************************************************************************
                     * COMMON SWITCH SCAN SUBR-  ENTER WITH SWITCH BYTE IN A-REG (FROM BIT OR BYTE  *
                     *   FILTERING SUBROUTINES), ADDR OF PRIOR SWITCH CONDITION BYTE IN MEMORY (H&L *
                     *   REGS), AND E-REG SET TO SWITCH BYTE (AND 'CASE!' GROUP) NUMBER (5 TO 0).   *
                     ***************************************************************************

05 0007D   47       A   SWS@SCAN MOV      B,A                 B= LATEST 'READ' DATA
05 0007E   7E       A            MOV      A,M                 A= PRIOR 'READ' DATA
05 0007F   70       A            MOV      M,B                 UPDATE 'PRIOR' TO 'LATEST'
05 00080   A8       A            MODBYT   A,XOR,B             A= 1 WHERE SWS JUST CHANGED
05 00081   A0       A            IF!      XBYT,A,AND,B,NZ     WERE ANY SWS JUST PUSHED
05 00082   CA5501   N
05 00085   26FF     A              MVI      H,X'FF'           YES, INIT BIT POSITION CNTR
                                   REPEAT                     LOOP 'UNTIL' NO BITS= 1 IN BYTE
05 00087   24       A                INR      H               H= POSITION OF SW (D0 TO D7)
05 00088   17       A                RAL                      PUT SW INFO INTO 'C' BIT
05 00089   D25101   N                IF!      CC,C,S          HAS THIS SW JUST BEEN PUSHED
05 0008C   F5       A                  PUSH     PSW           YES, SAVE
05 0008D   D5       A                  PUSH     D                  REGS OVER
05 0008E   E5       A                  PUSH     H                       'CASE!'
05 0008F   7B       A                  MOV      A,E           RELOAD 'BYTE #' CNTR
05 00090   E61F     A                  ANI      X'1F'         ELLIM.PASS.OF POSITIVE #
05 00092   07       A                  RLC                    MULTIPLE
05 00093   07       A                  RLC                         A-REG
05 00094   07       A                  RLC                               BY 8
05 00095   84       A                  CASE!    XBYT,A,ADD,H  USE BYTE # & BIT # AS A PNTR
05 00096   114E01   N
05 00099   FE58     A
05 0009B   CD0000   N

                     ********************************************************
                     * ACTIVE SWITCHES FOR STAND-BY (NOT READY & READY STATES)  *
                     ********************************************************
05 0009E   0000     N                     C,00     DIGIT@IN     DIGIT 1
05 000A0   0000     N                     C,01     DIGIT@IN     DIGIT 2
05 000A2   0000     N                     C,02     DIGIT@IN     DIGIT 3
05 000A4   0000     N                     C,03     DIGIT@IN     DIGIT 4
05 000A6   0000     N                     C,04     DIGIT@IN     DIGIT 5
05 000A8   0000     N                     C,05     DIGIT@IN     DIGIT 6
05 000AA   0000     N                     C,06     DIGIT@IN     DIGIT 7
05 000AC   0000     N                     C,07     DIGIT@IN     DIGIT 8
                     *
05 000AE   0000     N                     C,08     DIGIT@IN     DIGIT 9
05 000B0   0000     N                     C,09     KYBD@O       DIGIT 0
05 000B2   0000     N                     C,10     RECALL@
05 000B4   0000     N                     C,11     @CLEAR       CLEAR
05 000B6   0000     N                     C,12     IMAG@SFT     IMAGE SHIFT
05 000B8   9301     N                     C,13     SPARE
05 000BA   0000     N                     C,14     STRT@PRT     START PRINT
05 000BC   0000     N                     C,15     STOP@PRT     STOP PRINT
```

```
                                         *
05 0008E   0000    N                                  C,16      VARØDENS     VARIABLE DENSITY
05 000C0   0000    N                                  C,17      AXØTRAY      AUX TRAY
05 000C2   9301    N                                  C,18      SPARE
05 000C4   9301    N                                  C,19      SPARE
05 000C6   9301    N                                  C,20      SPARE
05 000C8   0000    N                                  C,21      PECØØN       PASTE UP SUPPRESSIØN
05 000CA   0000    N                                  C,22      2SDØCPY      2 SIDED COPY
05 000CC   9301    N                                  C,23      SPARE
                                         *
05 000CE   9401    N                                  C,24      RX
05 000D0   9401    N                                  C,25      RX
05 000D2   9401    N                                  C,26      RX
05 000D4   9401    N                                  C,27      RX
05 000D6   0000    N                                  C,28      98ØREDN      98% REDUCTIØN
05 000D8   0000    N                                  C,29      74ØREDN      74% REDUCTIØN
05 000DA   0000    N                                  C,30      65ØREDN      65% REDUCTIØN
05 000DC   0000    N                                  C,31      RXØZØØM      RANK ZØØM LENS
                                         *
05 000DE   0000    N                                  C,32      ADHØJREC     ADH JØB RECØVERY
05 000E0   0000    N                                  C,33      ADHØMULT     ADH MULTIPLE FEED
05 000E2   0000    N                                  C,34      ADHØSGNL     ADH SINGLE FEED
05 000E4   9401    N                                  C,35      RX
05 000E6   0000    N                                  C,36      SRTØJØBS     SØRTER JØB SUPPLEMENT
05 000E8   0000    N                                  C,37      SRTØSETS     SØRTER SETS
05 000EA   0000    N                                  C,38      SRTØSTKS     SØRTER STACKS
05 000EC   9301    N                                  C,39      SPARE
                                         *
05 000EE   9301    N                                  C,40      SPARE
05 000F0   9301    N                                  C,41      SPARE
05 000F2   9301    N                                  C,42      SPARE
05 000F4   9301    N                                  C,43      SPARE
05 000F6   0000    N                                  C,44      SERVICE      TECH REP KEY SWITCH
05 000F8   0000    N                                  C,45      FAULTØCD     DISPLAY FAULT CØDE
05 000FA   0000    N                                  C,46      LVDGNPRG     LEAVE DIAGNØSTIC PRØGRAM
05 000FC   9301    N                                  C,47      SPARE
                                         **********************************
                                         * ACTIVE SWITCHES FØR PRINT STATE *
                                         **********************************
05 000FE   0000    N                                  C,48      RECALLØ      RECALL QUANTITY
05 00100   0000    N                                  C,49      ADHØPMUL     ADH MULTIPLE FEED
05 00102   0000    N                                  C,50      ADHØPSIN     ADH SINGLE FEED
05 00104   9301    N                                  C,51      SPARE
05 00106   0000    N                                  C,52      SMPLØCPY     SAMPLE CØPY (START PRINT)
05 00108   0000    N                                  C,53      PRTØSTØP     STØP PRINT
05 0010A   0000    N                                  C,54      CNTRØRST     DIAGNØSTIC CØUNTER RESET
05 0010C   0000    N                                  C,55      AXØPRNT      AUX TRAY
                                         ************************************************************************
                                         * ACTIVE SWITCHES FØR TECH REP (NØT READY,READY STATES)                *
                                         ************************************************************************
05 0010E   0000    N                                  C,56      DIGITØTR     DIGIT 1
05 00110   0000    N                                  C,57      DIGITØTR     DIGIT 2
05 00112   0000    N                                  C,58      DIGITØTR     DIGIT 3
05 00114   0000    N                                  C,59      DIGITØTR     DIGIT 4
05 00116   0000    N                                  C,60      DIGITØTR     DIGIT 5
05 00118   0000    N                                  C,61      DIGITØTR     DIGIT 6
05 0011A   0000    N                                  C,62      DIGITØTR     DIGIT 7
05 0011C   0000    N                                  C,63      DIGITØTR     DIGIT 8
                                         *
05 0011E   0000    N                                  C,64      DIGITØTR     DIGIT 9
05 00120   0000    N                                  C,65      KYBDØDTR     DIGIT 0
05 00122   0000    N                                  C,66      DRECALLØ
05 00124   0000    N                                  C,67      DCLEARØ
05 00126   0000    N                                  C,68      SERVICE      TECH REP KEY SWITCH
05 00128   0000    N                                  C,69      DIAGØPRG     DIAGNØSTIC PRØGRAM
05 0012A   0000    N                                  C,70      STRTØDG      START PRINT
05 0012C   0000    N                                  C,71      STØPØDG      STØP PRINT
                                         ************************************************************************
                                         *  ACTIVE SWITCHES FØR MINI PHYSICAL (NØT READY & READY STATE)         *
                                         ************************************************************************
05 0012E   0000    N                                  C,72      MINIØMIS     MISFEED CLEAR
05 00130   0000    N                                  C,73      RECALLØ      RECALL QUANTITY
05 00132   9301    N                                  C,74      SPARE
05 00134   0000    N                                  C,75      FAULTØCD     DISPLAY FAULT CØDE
05 00136   0000    N                                  C,76      LVDGNPRG     LEAVE DIAGNØSTIC PRØGRAM
05 00138   0000    N                                  C,77      MINIØPRT     MINI PHYSICAL AT PRINT
05 0013A   0000    N                                  C,78      STØPØPRT     STØP PRINT
05 0013C   0000    N                                  C,79      ADHØJREC     ADH JØB RECØVERY
                                         ************************************************************************
                                         * ACTIVE SWITCHES FØR MINI PHYSICAL (PRINT STATE & RUNNØT PRINT STATE) *
                                         ************************************************************************
05 0013E   9301    N                                  C,80      SPARE
05 00140   9301    N                                  C,81      SPARE
05 00142   0000    N                                  C,82      RECALLØ      RECALL QUANTITY
05 00144   9301    N                                  C,83      SPARE
05 00146   9301    N                                  C,84      SPARE
05 00148   9301    N                                  C,85      SPARE
05 0014A   9301    N                                  C,86      SPARE
05 0014C   0000    N                                  C,87      PRTØSTØP     STØP PRINT
                                                    ENDCASE
05 0014E   E1      A                              PØP        H              RESTØRE
05 0014F   D1      A                              PØP        D                     SAVED
05 00150   F1      A                              PØP        PSW                          REGS
                                               ENDIF
05 00151   B7      A                      UNTIL!     XBYT,A,ØR,A,Z          END WHEN NØ BITS IN THIS BYTE
05 00152   C28700  N
                                    ENDIF
05 00155   C9      A                RET                                     RETURN TØ STDBY ØR PRINT BKGND
```

TABLE XII

```
                                  *
                                  * ROUTINE CALLED BY SWITCH SCAN WHEN DIAGNOSTIC PROGRAM BUTTON IS PUSHED
                                  * IN NON TECH REP STATES
                                  *
05 001F4   3A4EFA   N   LVDGNPRG IF!       VBYT,DGNBNUM,NZ              IS THERE AN ACTIVE DGN PROGRAM
05 001F7   A7       A
05 001F8   CA0102   N
05 001FB   CD2703   N               CALL       DGNBABT                  ABORT OPERATING DGN PRG
05 001FE   C30602   N            ELSE!
05 00201   3E80     A               SFLG       SERBACT                  SIGNAL STCK TO GO TO TECH-REP
05 00203   3249F4   A
                                 ENDIF
05 00206   C9       A            RET
                                  *
                                  *      ROUTINE CALLED WHEN SERVICE KEY IS TURNED 'ON'
                                  *
05 00207   CD0000   N   SERVICE  STIMR     KEYBREL,250,KEYBOFF          LOOK FOR KEY RELEASE
05 0020A   45       A
05 0020B   19       A
05 0020C   2A02     N
05 0020E   3A18F4   A            IF!       FLG,DGNBERR,T                IS THERE ERROR PENDING
05 00211   07       A
05 00212   D22902   N
05 00215   3A4EFA   N            ANDIF!    VBYT,DGNBNUM,Z               WAS IT A PROGRAM # ENTRY ERROR
05 00218   A7       A
05 00219   C22902   N
05 0021C   3A4FFA   N               LDA        DGBSAV
05 0021F   326DFC   N               STA        DGBDIGIT                 PUT DISPLAY BACK
05 00222   AF       A               CFLG       DGNBERR                  CANCEL ERROR
05 00223   3218F4   A
05 00226   CD4101   N               CALL       DIAGBPRG                 GIVE NUMBER RETRY FOR VALID
                                  *                                     ENTRY
                                 ENDIF
05 00229   C9       A            RET
                                  *
                                  *      ROUTINE CALLED TO LOOK FOR KEY TURN OFF
                                  *
05 0022A   2E28     A   KEYBOFF  IF!         IBIT,SERVICE#,T
05 0022C   CD0000   N
05 0022F   D23C02   N
05 00232   CD0000   N               STIMR      KEYBREL,250,KEYBOFF      KEY STILL ON
05 00235   45       A
05 00236   19       A
05 00237   2A02     N
05 00239   C35E02   N            ORIF!     VBYT,DGNBNUM,NZ              IS DGN PROGRAM ACTIVE
05 0023C   3A4EFA   N
05 0023F   A7       A
05 00240   CA5E02   N
05 00243   CD7103   N               CALL       NVTBOCK
05 00246   CA5E02   N               IF!        CC,Z,C                   CLEAR IF NOT DISCLOSED
05 00249   3A53FD   N                  IF!        XBYT,STATE!,LT,IPRNT  IS IT A RUNNING STATE
05 0024C   FE04     A
05 0024E   D25702   N
05 00251   CD2703   N                     CALL       DGNBABT            YES ABORT DIAGNOSTIC PROGRAM
05 00254   C35E02   N                  ELSE!
05 00257   CD0000   N                     STIMR      KEYBREL,250,KEYBOFF KEEP LOOKING AT KEY RELEASE
05 0025A   45       A
05 0025C   2A02     N
                                  *                                     UNTIL MACHINE STOPS
                                       ENDIF
                                    ENDIF
                                 ENDIF
05 0025E   C9       A            RET
                                  *
                                  *      ROUTINE CALLED IN TECH-REP STATE PROLOGUE
                                  *
05 0025F   CDC802   N   DGNBPRL  CALL      DSPLBDC                      PUT DC-- IN DISPLAY
05 00262   3E80     A            SFLG      DSPLBDGN                     USE DIAGNOSTIC DISPLAY
05 00264   321FF4   A
05 00267   3A63FC   N            LDA       PREVBIN+1
05 0026A   F604     A            ORI       X'04'                        INHIBIT IMMEDIATE CALL TO
05 0026C   3263FC   N            STA       PREVBIN+1                    DIAGBPRG
05 0026F   C9       A            RET
                                  *
```

TABLE XIII

```
                                  *
                                  *
                                  * ROUTINE CALLED BY SWITCH SCAN WHEN DIAGNOSTIC PROGRAM BUTTON IS PUSHED
                                  * IN TECH REP STATE ONLY
                                  *
05 00141   3A4EFA   N   DIAGBPRG IF!       VBYT,DGNBNUM,NZ              IS DGN PROGRAM ACTIVE
05 00144   A7       A
05 00145   CA7A01   N
05 00148   3A53FD   N               IF!        XBYT,STATE!,EQ,ICOMP     IS IT COMP CTRL STATE
05 0014B   FE00     A
05 0014D   C25601   N
05 00150   CD0000   N                  CALL       COMPICHG              TELL STATE CK TO GO TO TRP
05 00153   C37701   N               ELSE!
05 00156   CD0000   N                  CTIMR      DSPLBTIM              CLEAR DIAG PRG 20,21,22 TIMER
05 00159   4A       A
05 0015A   AF       A                  XRA        A
05 0015B   326EFB   N                  STA        FALTBPTR              SET UP FOR RESTART OF PRG. 20
05 0015E   3A4EFA   N                  IF!        XBYT,DGNBNUM,NE,DGNPRG29 DIAG 29 NOT ACTIVE
05 00161   FE10     A
05 00163   CA7101   N
05 00166   3A4EFA   N                  ANDIF!     XBYT,DGNBNUM,NE,DGNPRG28 DIAG 28 NOT ACTIVE
```

```
05 00169   FE0F     A
05 0016B   CA7101   N
05 0016E   C37401   N               ELSE:                              CLEAN UP OPERATING ADH DIAGNOST
05 00171   CD0000   N                   CALL      ADH29EPL             ABORT ADH SKEW TEST
                                    ENDIF
05 00174   CDCB02   N               CALL     DSPL0DC                   PUT DC-- IN DISPLAY
                                ENDIF
05 00177   C3F301   N        ORIF:     FLG,DGN0ERR,T                   IF ERROR IS PENDING
05 0017A   3A18F4   A
05 0017D   07       A
05 0017E   D28701   N
05 00181   CDCB02   N            CALL      DSPL0DC                     PUT DC-- IN DISPLAY
05 00184   C3F301   N        ORIF:     XWRD,DGN0DSPL,EQ,X'DC00'
05 00187   1100DC   A
05 0018A   2A6BFC   N
05 0018D   CD0000   N
05 00190   C29A01   N
05 00193   AF       A            CFLG      SER0ACT                     EXIT TECH REP STATE
05 00194   3249F4   A
05 00197   C3F301   N        ELSE:
05 0019A   2600     A            MVI       H,0
05 0019C   CD0000   N            CALL      4BCDIBIN                    CONVERT TO BINARY
05 0019F   7D       A            IF:       XBYT,L,GE,LST0NKEY+1
05 001A0   FE25     A
05 001A2   DAA801   N
05 001A5   C3C101   N            ORIF:     XBYT,A,LT,1ST0NKEY
05 001A8   FE0A     A
05 001AA   D2B101   N
05 001AD   3F       A                CMC
05 001AE   C3C101   N            ORIF:     XBYT,A,GE,1ST0KEY
05 001B1   FE14     A
05 001B3   DABC01   N
05 001B6   D604     A                SUI       1ST0KEY-LST0NKEY-1
05 001B8   3F       A                CMC
05 001B9   C3C101   N            ORIF:     XBYT,A,GE,LST0NKEY+1
05 001BC   FE10     A
                                 ENDIF
05 001C1   DACA01   N            IF:       CC,C,C
05 001C4   CDAE02   N                CALL      DSPL0ERR                BAD ENTRY BLINK DISPLAY
05 001C7   C3F301   N            ELSE:
05 001CA   D609     A                SUI       9
05 001CC   47       A                MOV       B,A                     IS THIS ENTRY DISCLOSED YET
05 001CD   CD7103   N                CALL      NVTB0CK                 CLEAR IF NOT DISCLOSED
05 001D0   CAE101   N                IF:       CC,Z,C
05 001D3   2E28     A                ANDIF:    IBIT,SERVICE#,F
05 001D5   CD0000   N
05 001D8   DAE101   N
05 001DB   CDAE02   N                    CALL      DSPL0ERR            NO,SHOW ERROR
05 001DE   C3F301   N                ELSE:
05 001E1   78       A                    MOV       A,B                 USE NEW PROGRAM NUMBER
05 001E2   324EFA   N                    STA       DGN0NUM             BLANK THE DISPLAY
05 001E5   CDEE02   N                    CALL      DSPL0CLR
05 001E8   2121FC   A                    SFBIT,P   ON0DIAG
05 001EB   3E02     A
05 001ED   B6       A
05 001EE   77       A
05 001EF   AF       A                    XRA       A                   'CAUSES 'FC' TO BE DISP PRG 20
05 001F0   326EFB   N                    STA       FALT0PTR            TO INDICATE PROGRAM ACTIVE'
                       *
                                     ENDIF
                                 ENDIF
                             ENDIF
05 001F3   C9       A        RET
```

TABLE XIV

```
                       *
                       *        ROUTINE TO DETERMINE IF DIAGNOSTIC PROGRAM HAS BEEN DISCLOSED BY
                       *        THE TECH-REP BY SEARCHING NV BYTE FOR ENABLE
                       *
05 00371   FE06     A  NVTB0CK  IF:       XBYT,A,LE,LST0NKEY-1ST0NKEY+1  IS IT DISCLOSURE RANGE
05 00373   DA7903   N
05 00376   C28503   N              CALL      NV0MASK                   BUILD MASK BASED ON A REG
05 00379   CD8603   N              PUSH      H                         SAVE MASK
05 0037C   E5       A              RNVBYT    TRP0DSCL                  GET DISCLOSED INFO
05 0037D   CD0000   N
05 00380   5F       A
05 00381   E3       A
05 00382   E1       A              POP       H
05 00383   A4       A              MODBYT    A,AND,H                   IS MASK BIT FOUND IN DISCLOSURE
05 00384   94       A              MODBYT    A,SUB,H                   BYTE
                                ENDIF
                       *
                       *        ZERO CC IS CLEARED IF PROGRAM IS NOT DISCLOSED
                       *
05 00385   C9       A           RET
```

TABLE XV

```
                       *
                       *        PROGRESSIVE DISCLOSURE DIAGNOSTIC PROGRAM USED BY THE TECH-REP
                       *        TO GIVE ADVANCED OPERATORS ADDITIONAL DIAGNOSTIC CAPABILITY
                       *
05 00971   2A6BFC   N  VALID033 LHLD      DGN0DSPL                     WHAT IS IN DISPLAY
05 00974   7C       A           IF:       VBYT,H,Z                     IS DISPLAY GT 99
05 00975   A7       A
05 00976   C29A09   N
05 00979   7D       A           ANDIF:    XBYT,L,GE,1ST0NKEY+6
05 0097A   FE10     A
05 0097C   DA9A09   N
```

```
1243  05 0097F   FE16     A        ANDIF!    XBYT,A,LT,LSTØNKEY+7
      05 00981   D29A09   N
1244  05 00984   D60F     A            SUI      15                        CONVERT TØ BINARY AND SUB 9
1245  05 00986   47       A            MØV      B,A
1246  05 00987   CD8603   N            CALL     NVSMASK                   BUILD MASK FØR ENABLING
1247  05 0098A   E5       A            PUSH     H                         ØR DISABLING RFQUESTED PRG
1248  05 0098B   CD0000   N            RNVBYT   TRPØDSCL
      05 0098E   5F       A
      05 0098F   E3       A
1249  05 00990   E1       A            PØP      H                         H HAS MASK
1250  05 00991   6F       A            MØV      L,A
1251  05 00992   AF       A            XRA      A
1252  05 00993   3D       A            DCR      A                         CLEAR ZERØ CØNDITIØN CØDE
1253  05 00994   3234F4   A            MØDFLG   KYBD5INH                  INHIBIT KEYBØARD ENTRY
1254  05 00997   C39E09   N        ELSE!
1255  05 0099A   CDAE02   N            CALL     DSPLØERR                  BAD NUMBER BLINK DISPLAY
1256  05 0099D   AF       A            XRA      A                         SET ZERØ CØNDITIØN CØDE
1257                               ENDIF
1258  05 0099E   C9       A        RET
1259                       *
1260                       *       PRØGRESSIVE DISCLØSURE BACKGRØUND PRØGRAM
1261                       *
1262  05 0099F   3A2AF4   A   DGNØTØ33 IF!    FLG,RCALLØDG,T            IS RECALL REQUFSTED
      05 009A2   07       A
      05 009A3   D2D109   N
1263  05 009A6   CD7109   N            CALL     VALIDØ33
1264  05 009A9   CACE09   N            IF!      CC,Z,C                    CLEAR IF GØØD NUMBER
1265  05 009AC   2E0D     A                IF!      IBIT,RECALL#,T
      05 009AE   CD0000   N
      05 009B1   D2C809   N
1266  05 009B4   78       A                    MØV      A,B
1267  05 009B5   CD7103   N                    CALL     NVTBØCK           CHECK IF IN TABLE
1268  05 009B8   C2C309   N                    IF!      CC,Z,S            SET IF IN TABLE
1269  05 009BB   CD0000   N                        SØBIT,S   READY*        TURN ØN READY LIGHT
      05 009BE   E701     A
1270  05 009C0   C3C809   N                    ELSE!
1271  05 009C3   CD0000   N                        SØBIT,S   JØB$ICMP      TURN ØN JØB INCØMPLETE
      05 009C6   F401     A
1272                                           ENDIF
1273  05 009C8   C3CE09   N                ELSE!
1274  05 009CB   CD6F00   N                    CALL     NØ&DGN            TURN ØFF READY LIGHT CLR RECALL
1275                       *                                                FLAG
1276                                       ENDIF
1277                                   ENDIF
1278  05 009CE   C30D0A   N        ØRIF!    FLG,STRTØDGN,T              IS START PRINT PUSHED
      05 009D1   3A3EF4   A
      05 009D4   07       A
      05 009D5   D2F009   N
1279  05 009D8   CD7109   N            CALL     VALIDØ33
1280  05 009DB   CAE009   N            IF!      CC,Z,C                    CLEAR IF GØØD NUMBER
1281  05 009DE   7D       A                MØV      A,L
1282  05 009DF   B4       A                ØRA      H                     PUT NEWLY DISCLØSED PRØGRAM
1283  05 009E0   325EE3   A                WNVBYT   TRPØDSCL              IN NV TABLE
      05 009E3   0F       A
      05 009E4   0F       A
      05 009E5   0F       A
      05 009E6   0F       A
      05 009E7   325FE3   A
1284  05 009EA   CDEE02   N                CALL     DSPLØCLR              BUTTØN PUSHED CLEAR DISPLAY
1285                                   ENDIF
1286  05 009ED   C30D0A   N        ØRIF!    FLG,STØPØDGN,T              IS STØP PRINT PUSHED
      05 009F0   3A33F4   A
      05 009F3   07       A
      05 009F4   D20D0A   N
1287  05 009F7   CD7109   N            CALL     VALIDØ33                  CLEAR IF GØØD NUMBER
1288  05 009FA   CA0D0A   N            IF!      CC,Z,C
1289  05 009FD   7C       A                MØV      A,H                   PUT MASK IN A
1290  05 009FE   2F       A                CMA                            BUILD CANCEL MASK
1291  05 009FF   A5       A                ANA      L                     CANCEL PRØGRAM FRØM TABLE
1292  05 00A00   325EE3   A                WNVBYT   TRPØDSCL
      05 00A03   0F       A
      05 00A04   0F       A
      05 00A05   0F       A
      05 00A06   0F       A
      05 00A07   325FE3   A
1293  05 00A0A   CDEE02   N                CALL     DSPLØCLR              BUTTØN PUSHED CLEAR DISPLAY
1294                                   ENDIF
1295                               ENDIF
1296  05 00A0D   CD9100   N        CALL     CLRØCK
1297  05 00A10   C9       A        RET
```

TABLE XVI

```
231                     ****************************************************************************
232                     * TECH REP DIGIT INPUT RØUTINE IS CALLED BY SWITCH SCAN IN THE TECH REP STATE *
233                     * WHEN A NUMERIC KEY IS PUSHED ØN THE PRØGRAMMER KEYBØARD. THIS RØUTINE LØADS *
234                     * A NUMBER INTØ DGNØDSPL WØRD                                                 *
235                     ****************************************************************************

237  05 000F1   0F       A   DIGITØTR RRC                              RECØVER NUMBER FRØM SWITCH SCAN
238  05 000F2   D637     A            SUI      55
239  05 000F4   5F       A            MØV      E,A
240  05 000F5   1600     A            MVI      D,0
241  05 000F7   3A34F4   A            IF!      FLG,KYBD5INH,F           IS THE ENTRY INHIBITED
     05 000FA   07       A
     05 000FB   DA4001   N
242  05 000FE   2A6BFC   N                LHLD     DGNØDSPL             GET PREVIØUS VALUE
243  05 00101   7C       A                MØV      A,H
244  05 00102   29       A                DAD      H
```

```
05 00103   29      A        DAD     H
05 00104   29      A        DAD     H
05 00105   29      A        DAD     H                      MULTIPLY PREVIOUS VALUE BY 10
05 00106   19      A        DAD     D                      MERGE NEW UNITS DIGIT
05 00107   FEDC    A        IF:     XBYT,A,NE,X'DC'        IS IT DIAGNOSTIC PROGRAM ENTRY
05 00109   CA2301  N
05 0010C   FEFC    A        ANDIF:  XBYT,A,NE,X'FC'        NO-IS IT PROG 20 OR 22 ENTRY
05 0010E   CA2301  N
05 00111   CD0000  N            CALL    DIG0FIX            NO-JUST PLAIN OLD ENTRY
05 00114   47      A            MOV     B,A                SAVE DIGIT FIX RESULT
05 00115   FE0F    A            IF:     XBYT,A,EQ,X'0F'    IS DISPLAY FULL
05 00117   C21F01  N
05 0011A   3E80    A                SFLG    KYBD5INH       INHIBIT FURTHER ENTRY
05 0011C   3234F4  A
                                ENDIF
05 0011F   78      A            MOV     A,B
05 00120   C33601  N        ELSE:
05 00123   67      A            MOV     H,A                PUT BACK 'DC' OR 'FC'
05 00124   70      A            IF:     XBYT,L,GE,X'10'
05 00125   FE10    A
05 00127   DA3401  N
05 0012A   3E80    A                SFLG    KYBD5INH       INHIBIT FURTHER ENTRY
05 0012C   3234F4  A
05 0012F   3E0F    A                MVI     A,X'0F'        ALL DIGITS ON
05 00131   C33601  N            ELSE:
05 00134   3E0D    A                MVI     A,X'0D'        TENS DIGIT BLANK
                                ENDIF
                            ENDIF
05 00136   226BFC  N        SHLD    DGN0DSPL               UPDATE MEMORY
05 00139   326DFC  N        STA     DG0DIGIT               UPDATE MEMORY
05 0013C   AF      A        CFLG    DSPL01ST               UPDATE DISPLAY
05 0013D   329AF4  A
                        ENDIF
05 00140   C9      A    RET
```

TABLE XVII

```
05 002CF   3A34F4  A   DGN0T013 IF:   FLG,KYBD5INH,F       1ST TIME FOR DIAG #13
05 002D2   07      A
05 002D3   DAE302  N
05 002D6   3E80    A            SFLG    KYBD5INH           SET ONE TIME(INHIBIT KEYBOARD)
05 002D8   3234F4  A
05 002DB   3E01    A            MVI     A,1
05 002DD   3283FA  N            STA     OUTPNTR            INITIALIZE PNTR TO LAST GAP TIM
05 002E0   C30B03  N        ORIF:   FLG,RCALL0DG,T         DISPLAY SELECT SWITCH PUSHED
05 002E3   3A2AF4  A
05 002E6   07      A
05 002E7   D2F602  N
05 002EA   AF      A            CFLG    RCALL0DG           ACKNOWLEDGE PUSH
05 002EB   322AF4  A
05 002EE   3E09    A            MVI     A,TABLNGTH         FETCH TABLE SIZE
05 002F0   CD1E03  N            CALL    ADH0DINC           UPDATE DISPLAY
05 002F3   C30B03  N        ORIF:   FLG,STRT0DGN,T         START PRINT PUSHED
05 002F6   3A3EF4  A
05 002F9   07      A
05 002FA   D20B03  N
05 002FD   AF      A            CFLG    STRT0DGN           ACKNOWLEDGE PUSH
05 002FE   323EF4  A                                       FETCH CURRENT GAP TIME IDENTIFI
05 00301   3A83FA  N            LDA     OUTPNTR
05 00304   3D      A            DCR     A                  MOV ID TO NEXT GAP TIME PAIR
05 00305   CA0B03  N            IF:     CC,Z,C             NOT AT LAST GAP TIME
05 00308   CD1E03  N                CALL    ADH0DINC       UPDATE DISPLAY
                                ENDIF
                            ENDIF
05 0030B   C9      A        RET
```

TABLE XVIII

```
                       *
                       *    THE FOLLOWING TAPLE DEFINES THE DISPLAYED GAP TIMES
                       *            THE GAP TIME IS DEFINED AS:
                       *            (ARGUMENT(2)-ARGUMENT(1))X10MS
                       *            *NOTE:CODE GENERATED IS NOT NECESSARILY IN
                       *                    THE SAME ORDER AS THE ARGUMENTS*
                       *                    (SEE ORDITBL PROC DEFINITION)
                       *

                       ADH0RGMT,TAB02 ORDITBL   ADH0CPDC,ADHRL3DC,;   1ST GAP TIME
                                      ADHRL3DC,ADH0L4DC,;             2ND GAP TIME
                                      ADH0L4DC,ADHRT3DC,;             3RD GAP TIME
                                      ADHRT3DC,ADH0T4DC,;             4TH GAP TIME
                                      ADH0SFDC,ADHFL3DC,;             5TH GAP TIME
                                      ADHFL3DC,ADH0T2DC,;             6TH GAP TIME
                                      ADH0T2DC,ADHFT3DC,;             7TH GAP TIME
                                      ADH0T1DC,ADH0L1DC,;             8TH GAP TIME
05 0030C   CA      A                  ADH0SFDC,ADH0L2DC               9TH GAP TIME
05 0030D   C8      A
05 0030E   C7      A
05 0030F   C6      A
05 00310   C5      A
05 00311   C3      A
05 00312   C2      A
05 00313   C1      A
05 00314   C0      A
```

```
05 00315   C4      A
05 00316   C9      A
05 00317   C6      A
05 00318   C5      A
05 00319   C4      A
05 0031A   C2      A
05 0031B   C1      A
05 0031C   C0      A
05 0031D   BF      A
```

TABLE XIX

```
05 0031E   3283FA  N  ADH@DINC STA      0UTPNTR                       UPDATE IDENTIFIER
05 00321   CD0000  N           STIMR    DSPL@TIM,510,ADH@DSPL         UPDATE DISPLAY IN .5SEC
05 00324   4A      A
05 00325   33      A
05 00326   3103    N
05 00328   CD0000  N           CALL     DSPL@CLR                      BLANK THE DISPLAY
05 0032B   3E80    A           SFLG     KYBD5INH                      RE-INHIBIT KEYBOARD
05 0032D   3234F4  A
05 00330   C9      A           RET

05 00331   3A83FA  N  ADH@DSPL LDA      0UTPNTR                       FETCH IDENTIFIER
05 00334   2A78FB  N           LHLD     TAB@STRT                      SET PNTR T0 START 0F C0NTR0L TA
                      *                                               (MINUS 0NE)
05 00337   1600    A           MVI      D,0
05 00339   5F      A           M0V      E,A                           SET PAIR T0 ID 0FFSET
05 0033A   19      A           DAD      D                             0FFSET PNTR T0 CURRENT ID
05 0033B   46      A           M0V      B,M                           SAV PRI0R DIAG CNTR 0FFSET
05 0033C   1E09    A           MVI      E,TABLNGTH
05 0033E   19      A           DAD      D                             M0V PNTR T0 2ND PART 0F C0NTRL
05 0033F   6E      A           M0V      L,M                           FETCH SUBSEQUENT DIAG CNTR 0FFS
05 00340   26FC    A           MVI      H,H0ADDR                      M0V PNTR T0 SUBSEQUENT DIAG CNT
05 00342   7E      A           M0V      A,M                           FETCH SUBSEQUENT DC TIME
05 00343   68      A           M0V      L,B                           M0V PNTR T0 PRI0R DIAG CNTR
05 00344   96      A           SUB      M                             CALCULATE GAP TIME
05 00345   CD0000  N           CALL     BINR1BCD                      CONVERT T0 BCD
05 00348   29      A           DAD      H
05 00349   29      A           DAD      H                             ADD TRAILING ZER0(MULTIPLY BY T
05 0034A   29      A           DAD      H
05 0034B   29      A           DAD      H
05 0034C   CD0000  N           CALL     DSPL@HL                       PUT GAP TIME IN DISPLAY
05 0034F   216DFC  N           LXI      H,DG@DIGIT                    SET PNTR T0 DIGIT DISPLAY ENABL
05 00352   3E01    A           MVI      A,D0
05 00354   B6      A           0RA      M
05 00355   77      A           M0V      M,A                           ENABLE ZER0 GAP TIME
05 00356   C9      A           RET
```

TABLE XX

```
05 001CE   3A3EF4  A  DGN@T@28 IF!      FLG,STRT@DGN,T               START PRINT PUSHED
05 001D1   07      A
05 001D2   021502  N
05 001D5   AF      A            CFLG     STRT@DGN                    ACKN0WLEDGE PUSH
05 001D6   323EF4  A
05 001D9   3A05F4  A            IF!      FLG,ADDR@ACT,T              ADH CLEARED
05 001DC   07      A
05 001DD   D21202  N
05 001E0   3A08F4  A            ANDIF!   FLG,ADH@MSEL,T              RE-SELECTED
05 001E3   07      A
05 001E4   D21202  N
05 001E7   3A8BF7  A            ANDIF!   FLG,ADH@NM0V,T              AND READY
05 001EA   07      A
05 001EB   D21202  N
05 001EE   AF      A                CFLG     ADDR@ACT                RESET SEQUENCE
05 001EF   3205F4  A
05 001F2   2F      A                CMA
05 001F3   3234F4  A                M0DFLG   KYBD5INH                INHIBIT KEYB0ARD
05 001F6   2A6BFC  N                LHLD     DGN@DSPL                FETCH GAP TIME IDENTIFIER
05 001F9   7C      A                IF!      VBYT,H,Z
05 001FA   A7      A
05 001FB   C20F02  N
05 001FE   7D      A                ANDIF!   XBYT,L,LT,TABLNGTH+1    IDENTIFIER IN RANGE
05 001FF   FE0A    A
05 00201   D20F02  N
05 00204   3283FA  N                    STA      0UTPNTR             SAV IDENTIFIER 0FFSET
05 00207   3EFF    A                    MVI      A,X'FF'             FETCH 'SET' MASK
05 00209   CD8602  N                    CALL     CYCLSTRT            START ADH RECYCLING
05 0020C   C31202  N                ELSE!                            IDENTIFIER 0UT 0F RANGE
05 0020F   CD0000  N                    CALL     DSPL@ERR
                                    ENDIF
                                ENDIF
05 00212   C38502  N        0RIF!    FLG,ST0P@DGN,T                  ST0P PRINT PUSHED
05 00215   3A33F4  A
05 00218   07      A
05 00219   C22D02  N
05 0021C   AF      A            CFLG     ST0P@DGN                    ACKN0WLEDGE PUSH
05 0021D   3233F4  A
05 00220   2F      A            CMA
05 00221   3205F4  A            M0DFLG   ADDR@ACT                    INDICATE ADH CLEARED
05 00224   CDCB00  N            CALL     ADH@CLR                     AB0RT(CLEAR) ADH
05 00227   CD0000  N            CALL     DSPL@CLR                    CLEAR DISPLAY
05 0022A   C38502  N        0RIF!    FLG,CLR@DGN,T                   CLEAR SWITCH PUSHED
05 0022D   3A16F4  A
05 00230   07      A
05 00231   D23E02  N
```

```
     05 00234   AF       A          CFLG      CLR@DGN                ACKNOWLEDGE PUSH
     05 00235   3216F4   A
     05 00238   CD9000   N          CALL      ADH@MULT               SELECT ADH
     05 0023B   C38502   N      BRIF:     FLG,RCALL@DG,T             DISPLAY SELECT PUSHED
     05 0023E   3A2AF4   A
     05 00241   07       A
     05 00242   025902   N
     05 00245   AF       A          CFLG      RCALL@DG               ACKNOWLEDGE PUSH
     05 00246   322AF4   A
     05 00249   2F       A          CMA
     05 0024A   3234F4   A          MODFLG    KYBD5INH               INHIBIT THE KEYBOARD
     05 0024D   3A83FA   N          LDA       OUTPNTR                FETCH LAST IDENTIFIER
     05 00250   2600     A          MVI       H,0
     05 00252   6F       A          MOV       L,A
     05 00253   CD0000   N          CALL      DSPL@HL                DISPLAY LAST IDENTIFIER
                                                                     NO BUTTONS PUSHED
     05 00256   C38502   N      ELSE:                                UPDATE JOB•ICMP & READY• LAMPS
     05 00259   CD9602   N          CALL      LMP@UPDT
     05 0025C   3A07F4   A          IF:       FLG•ADH@JOBR,T         ADH CYCLE STARTED
     05 0025F   07       A
     05 00260   D28502   N
     05 00263   3A83FA   N              LDA       OUTPNTR            FETCH CURRENT IDENTIFIER
     05 00266   3D       A              DCR       A
     05 00267   FA8502   N              IF:       CC,S,C             ID NOT ZERO
     05 0026A   2A78FB   N                  LHLD      TAB@STRT       FETCH START OF CONTROL TABLE
     05 0026D   111200   A                  LXI       D,TABLNGTH•2   SET OFFSET TO END OF CONTROL TA
     05 00270   47       A                  MOV       B,A            SAV ID OFFSET
     05 00271   7B       A                  MOV       A,E            MOV OFFSET TO SUBSEQUENT DIAGNO
     05 00272   90       A                  SUB       B              COUNTER OF CURRENT GAP TIME PAI
     05 00273   5F       A                  MOV       E,A
     05 00274   19       A                  DAD       D              MOV PNTR TO SUBSEQUENT CNTR IN
     05 00275   6E       A                  MOV       L,M            SET PNTR TO ACTUAL
     05 00276   26FC     A                  MVI       H,H@ADDR       SUBSEQUENT COUNTER
     05 00278   3A84FA   N                  LDA       ADH@DGNL       FETCH LAST VALUE OF COUNTER
     05 0027B   BE       A                  IF:       XBYT,A,NE,M    HAS THERE BEEN A CHANGE
     05 0027C   CA8502   N
     05 0027F   3284FA   N                      STA       ADH@DGNL   SAV NEW COUNTER VALUE
     05 00282   CD3103   N                      CALL      ADH@DSPL   CALC & DISPLAY NEW GAP TIME
                                            ENDIF
                                        ENDIF
                                    ENDIF
                                ENDIF
     05 00285   C9       A      RET
```

TABLE XXI

```
     05 0015F   3A3EF4   A  DGN@T029 IF:     FLG,STRT@DGN,T          START PRINT PUSHED
     05 00162   07       A
     05 00163   D2A101   N
     05 00166   AF       A          CFLG      STRT@DGN               ACKNOWLEDGE PUSH
     05 00167   323EF4   A
     05 0016A   3A05F4   A          IF:       FLG,ADDR@ACT,T         ADH READY TO START  (SELECTED)
     05 0016D   07       A
     05 0016E   D29E01   N
     05 00171   3A8BF7   A          ANDIF:    FLG,ADH@NMOV,T         AND NO JAM PENDING
     05 00174   07       A
     05 00175   D29E01   N
     05 00178   AF       A              CFLG      ADDR@ACT           CLEAR READY TILL NEXT SEQUENCE
     05 00179   3205F4   A
     05 0017C   11B1F4   A              LXIFLG    D,ADH@29@1         SET PNTR TO 1ST HLT FLAG
     05 0017F   2A6BFC   N              LHLD      DGN@DSPL           FETCH STATION CODE
     05 00182   2D       A              DCR       L                  JUSTIFY STATION CODE OFFSET
     05 00183   7C       A              MOV       A,H
     05 00184   B7       A              ORA       A                  CHECK MSBYT OF STATION CODE
     05 00185   C29B01   N              IF:       CC,Z,S             MSBYT OF CODE ZERO
     05 00188   7D       A              ANDIF:    XBYT,L,LT,MAX@CNT+1  LSBYT OF CODE IN RANGE(>0&<MAXC
     05 00189   FE05     A
     05 0018B   D29B01   N
     05 0018E   19       A                  DAD       D              SET PNTR TO PROPER FLAG
     05 0018F   3EFF     A                  MVI       A,X'FF'        FETCH 'SET' MASK
     05 00191   77       A                  MOV       M,A            SET HLT FLAG
     05 00192   3234F4   A                  MODFLG    KYBD5INH       INHIBIT KEYBOARD
     05 00195   CD8602   N                  CALL      CYCLSTRT       START ADH RECYCLING
     05 00198   C39E01   N              ELSE:                        STATION CODE OUT OF RANGE
     05 0019B   CD0000   N                  CALL      DSPL@ERR       START BLINKING THE DISPLAY
                                        ENDIF
                                    ENDIF
     05 0019E   C3C901   N      BRIF:     FLG,STOP@DGN,T             STOP PRINT PUSHED
     05 001A1   3A33F4   A
     05 001A4   07       A
     05 001A5   D2B901   N
     05 001A8   AF       A          CFLG      STOP@DGN               ACKNOWLEDGE PUSH
     05 001A9   3233F4   A
     05 001AC   2F       A          CMA
     05 001AD   3205F4   A          MODFLG    ADDR@ACT               INDICATE ADH READY FOR CYCLE (S
     05 001B0   CDCB00   N          CALL      ADH@CLR                CANCELL OLD CYCLE
     05 001B3   CD4800   N          CALL      ADH@SGNL               RE-SELECT ADH
     05 001B6   C3C901   N      BRIF:     FLG,CLR@DGN,T              CLEAR SWITCH PUSHED
     05 001B9   3A16F4   A
     05 001BC   07       A
     05 001BD   D2C601   N
     05 001C0   CD0000   N          CALL      DSPL@CLR               CLEAR THE DISPLAY
     05 001C3   C3C901   N      ELSE:                                UPDATE FRONT PANEL LIGHTS
     05 001C6   CD9602   N          CALL      LMP@UPDT               UPDATE JOB•ICMP & READY• LAMPS
                                ENDIF
     05 001C9   C9       A      RET

     05 001CA   CDCB00   N  ADH29EPL CALL     ADH@CLR                CLEAR ADH
     05 001CD   C9       A      RET
```

TABLE XXII

```
05 00546   3A80F4   A   ADH8CTRL IF1        FLG,ADH8SELC,T                 ADH SELECTED
05 00549   07       A
05 0054A   D2E805   N
05 0054D   C0A004   N           CALL       SENSREAD                        CHECK ADH INPUT SENSORS
05 00550   CAE505   N           IF1        CC,Z,C                          CHANGE STATE IF SENSOR CHANGE
05 00553   57       A              MOV        D,A                          SAVE CHANGE MASK IN D REG
05 00554   A0       A              ANA        B                            FIND LEAD EDGES
05 00555   5F       A              MOV        E,A                          SAVE LEAD EDGES IN E REG
05 00556   2F       A              CMA
05 00557   A2       A              ANA        D                            FIND TRAIL EDGES
05 00558   21B9FC   N              LXI        H,TEDGINH                    SET PNTR TO TEDG INHIBIT MASK
05 0055B   A6       A              ANA        M                            MASK OUT INHIBITED SENSORS
05 0055C   CA9E05   N              IF1        CC,Z,C                       ANY TRAIL EDGES THIS READ
05 0055F   57       A                 MOV        D,A                       SAVE TRAIL EDGES IN D REG
05 00560   23       A                 INX        H                         MOV PNTR TO TEDG BYPASS MASK
05 00561   A6       A                 ANA        M                         MASK OUT INDETERMINENT TRAIL ED
05 00562   47       A                 MOV        B,A                       SAVE VALID TRAIL EDGES
05 00563   23       A                 INX        H                         MOV PNTR TO TRAIL EDGE EXPECTED
05 00564   7E       A                 MOV        A,M                       FETCH EXPECTED TRAIL EDGES
05 00565   2F       A                 CMA
05 00566   A0       A                 ANA        B                         COMPARE ACTUAL AND EXPECTED TRA
05 00567   C29605   N                 IF1        CC,Z,S                    NO UNEXPECTED TRAIL EDGES
05 0056A   B2       A                    ORA        D                      RESTORE TRAIL EDG BYE/SET CC FO
05 0056B   1600     A                    MVI        D,0                    CLR CASE BRANCH TABLE POINTER
                                         REPEAT
05 0056D   17       A                       RAL
05 0056E   D28E05   N                       IF1        CC,C,S
05 00571   D5       A                          PUSH       D
05 00572   F5       A                          PUSH       PSW
05 00573   7A       A                          CASE1      VBYT,D
05 00574   118C05   N
05 00577   FE08     A
05 00579   CD0000   N
05 0057C   0108     N                             C,0      TEDGFDOF FEED-OFF TRAIL EDGE ROUT
05 0057E   C408     N                             C,1      TEDGWAIT WAIT TRAIL EDGE ROUTINE
05 00580   F308     N                             C,2      TEDGRET RETURN TRAIL EDGE ROUTINE
05 00582   EE05     N                             C,3      SPARE SPARE POSITION
05 00584   0208     N                             C,4      TEDGEXIT EXIT TRAIL EDGE ROUTINE
05 00586   3A09     N                             C,5      TEDGKICK KICK TRAIL EDGE ROUTINE
05 00588   EE05     N                             C,6      SPARE SPARE POSITION
05 0058A   5409     N                             C,7      TEDGIEMP INPUT EMPTY TRAIL EDGE R
                                           ENDCASE
05 0058C   F1       A                      POP        PSW
05 0058D   D1       A                      POP        D
                                        ENDIF
05 0058E   14       A                   INR        D                       INCREMENT CASE TABLE POINTER
05 0058F   B7       A                   ORA        A                       CHECK FOR ADDITIONAL TRAIL EDGE
05 00590   C26D05   N                UNTIL1     CC,Z,S                     LOOP UNTIL NO MORE TRAIL EDGES
05 00593   C39E05   N             ELSE1
05 00596   2134FD   A                LXIFBYT    H,ADH11                    SET PNTR TO PRIMARY FAULT BYTE
05 00599   B6       A                ORA        M                          SAVE INVALID TRAIL EDGES IN FAU
05 0059A   77       A                MOV        M,A
05 0059B   CDA309   N                CALL       ADH8ABRT                   ABORT ADH
                                  ENDIF
                               ENDIF
05 0059E   7B       A          MOV        A,E
05 0059F   21BCFC   N          LXI        H,LEDGINH                        SET PNTR TO LEAD EDGE INHIBIT M
05 005A2   A6       A          ANA        M                                MASK OUT INHIBITED SENSORS
05 005A3   CAE505   N          IF1        CC,Z,C                           LEAD EDGES THIS READ
05 005A6   5F       A             MOV        E,A                           SAVE VALID LEAD EDGES
05 005A7   23       A             INX        H                             MOV PNTR TO LEAD EDGE BYPASS MA
05 005A8   A6       A             ANA        M                             MASK OUT INDETERMINENT LEAD EDG
05 005A9   47       A             MOV        B,A                           SAVE VALID LEAD EDGES IN B-REG
05 005AA   23       A             INX        H                             MOV PNTR TO LEAD EDGE EXPECTED
05 005AB   7E       A             MOV        A,M                           FETCH EXPECTED LEAD EDGES
05 005AC   2F       A             CMA
05 005AD   A0       A             ANA        B                             COMPARE ACTUAL WITH EXPECTED LE
05 005AE   CABC05   N             IF1        CC,Z,C
05 005B1   2134FD   A                LXIFBYT    H,ADH11                    SET PNTR TO PRIMARY FAULT BYTE
05 005B4   B6       A                ORA        M                          SAVE INVALID LEAD EDGES
05 005B5   77       A                MOV        M,A
05 005B6   CDA309   N                CALL       ADH8ABRT                   ABORT ADH
05 005B9   C3E505   N             ELSE1
05 005BC   B3       A                ORA        E                          FETCH LEAD EDGES (IF ANY)
05 005BD   1600     A                MVI        D,0                        SET POINTER TO ZERO
                                     REPEAT
05 005BF   17       A                   RAL
05 005C0   D2E005   N                   IF1        CC,C,S
05 005C3   5F       A                      MOV        E,A   SAVE LEAD EDGE BYTE
05 005C4   D5       A                      PUSH       D
05 005C5   7A       A                      CASE1      VBYT,D
05 005C6   11DE05   N
05 005C9   FE08     A
05 005CB   CD0000   N
05 005CE   0008     N                             C,0      LEDGFDOF FEED-OFF LEAD EDGE ROUTI
05 005D0   5D07     N                             C,1      LEDGWAIT WAIT LEAD EDGE ROUTINE
05 005D2   AF07     N                             C,2      LEDGRET RETURN LEAD EDGE ROUTINE
05 005D4   EE05     N                             C,3      SPARE SPARE POSITION
05 005D6   8206     N                             C,4      LEDGEXIT EXIT LEAD EDGE ROUTINE
05 005D8   9207     N                             C,5      LEDGKICK KICK LEAD EDGE ROUTINE
05 005DA   EE05     N                             C,6      SPARE SPARE POSITION
05 005DC   C807     N                             C,7      LEDGIEMP INPUT EMPTY LEAD EDGE RO
                                           ENDCASE
05 005DE   D1       A                      POP        D
05 005DF   7B       A                      MOV        A,E   RESTORE LEAD EDGE BYTE
                                        ENDIF
05 005E0   14       A                   INR        D
05 005E1   B7       A                   ORA        A
```

```
05 005E2   C28F05   N                   UNTIL!    CC,Z,8         L00P UNTIL N0 M0RE LEAD EDGES
                                      ENDIF
                                   ENDIF
                                ENDIF
05 005E5   C3E005   N           ELSE!                            ADH N0T SELECTED
05 005E8   3E80     A              SFLG      ADH8NM0V            INDICATE N0 ADH PR0BLEMS
05 005EA   3288F7   A
                                ENDIF
05 005ED   C9       A           RET

05 005EE   C9       A   SPARE   RET                              DUMMY R0UTINE F0R CASE TABLES
```

TABLE XXIII

```
                        *       ****************************************
                        *       *                                      *
                        *       *  LEDGEXIT:R0UTINE CALLED WHEN LEAD   *
                        *       *    EDGE IS DETECTED AT EXIT SENS0R   *
                        *       *    IF PAPER IS M0VING F0RWARD THE    *
                        *       *    WAIT SENS0R IS ENABLED,THE FEED   *
                        *       *    C0UNTER IS PULSED,AND THE MISFEED *
                        *       *    AND T0 L0NG 0VER EXIT TIMING SEQ  *
                        *       *    ARE STARTED. THE SL0W WAIT T0 EXIT*
                        *       *    TIMING SEQUENCE IS ST0PPED.       *
                        *       *    IF M0VING REVERSE,0RIGINALS FLASH *
                        *       *    ED IS UPDATED,SL0W-0FF FAULT SEQ  *
                        *       *    IS ST0PPED,SL0W EXIT T0 RETURN SEQ*
                        *       *    IS STARTED AND THE PATTERS ARE    *
                        *       *    TURNED 0N                         *
                        *       *                                      *
                        *       ****************************************

05 00682   3A04F4   A   LEDGEXIT IF!       FLG,ADH8F0RW,T            D0CUMENT M0VING F0RWARD
05 00685   07       A
05 00686   D22007   N
05 00689   3A81F4   A            IF!       FLG,ADH82981,F            N0 DIAGN0STIC AB0RT PENDING
05 0068C   07       A
05 0068D   DA1607   N
05 006C0   21EEFF   A               S0BIT     ADH8WT                 ENABLE WAIT SENS0R
05 006C3   3E02     A
05 006C5   F3       A
05 006C6   B6       A
05 006C7   77       A
05 006C8   FB       A
05 006C9   21E8FF   A               S0BIT     ADH8FDCT               START FEED C0UNT PULSE
05 006CC   3E04     A
05 006CE   F3       A
05 006CF   B6       A
05 006D0   77       A
05 006D1   FB       A
05 006D2   2A60FB   N               LHLD      TLT8A0FD
05 006D5   CD0000   N               CALL      BCD8INC                INCREMENT S0FTWARE FEED C0UNTER
05 006D8   2260FB   N               SHLD      TLT8A0FD
05 006DB   CD0000   N               CTIMR     ADH80                  ST0P SL0W WAIT T0 EXIT
05 006DE   00       A
05 006DF   CD0000   N               CTIMR     ADH86                  ST0P SL0W 0UT FAULT TIMER
05 006E2   06       A
05 006E3   CD0000   N               STIMR     ADH81,350,EXIT8FLT     START T0 L0NG 0VER EXIT SEQ 0F
05 006E6   01       A
05 006E7   23       A
05 006E8   E109     N
05 006EA   CD0000   N               STIMR     ADH82,800,MISSFEED     START MISFEED SEQUENCE 0F 800MS
05 006ED   02       A
05 006EE   50       A
05 006EF   200A     N
05 006F1   CD0000   N               STIMR     ADH83,200,MULTFEED     ALL0W 200MS T0 CLEAR WAIT SENS0
05 006F4   03       A
05 006F5   14       A
05 006F6   850A     N
05 006F8   3A50FD   N               DIAG0CT   ADHFL30C               SAVE LEDG EXIT(F0RWARD PATH) TI
05 006FB   32C5FC   N
05 006FE   218AFC   N               LXI       H,TEDGMASK             SET PNTR T0 TRAIL EDGE MASK
05 00701   3EFB     A               MVI       A,ADH0L3FM
05 00703   A6       A               ANA       M                      BYPASS TRAIL EDGE AT KICK
05 00704   77       A               M0V       M,A
05 00705   23       A               INX       H                      M0V PNTR T0 EXPECTED TRAIL EDGE
05 00706   3640     A               MVI       M,ADH0L3F              EXPECTED TRAIL EDGE AT WAIT
05 00708   2189FC   N               LXI       H,TEDGINH
05 0070B   3E44     A               MVI       A,WAIT8Z!KICK81
05 0070D   B6       A               0RA       M                      ENABLE TRAIL EDGES AT WAIT & KI
05 0070E   77       A               M0V       M,A                    (CANCEL H0LE BYPASS)
05 0070F   AF       A               XRA       A
05 00710   328EFC   N               STA       LEDGEXPT               CANCEL EXPECTED LEAD EDGE AT EX
05 00713   C31007   N            ELSE!                               VALID HALT FLAG SET
05 00716   AF       A               CFLG      ADH82981               CLEAN UP HALT FLAG
05 00717   3281F4   A
05 0071A   CDA309   N               CALL      ADH8ABRT               ST0P 0RIGINAL
                                 ENDIF
                        *              D0CUEMENT M0VING 0N REVERSE PATH
05 0071D   C35C07   N          0RIF!      FLG,ADH82985,F            N0 AB0RT PENDING F0R REVERSE
05 00720   3A85F4   A
05 00723   07       A
05 00724   DA5507   N
```

```
1131   05 00727   21F7FF   A        SOBIT     ADH9PATT              START PATTERS
       05 0072A   3E08     A
       05 0072C   F3       A
       05 0072D   B6       A
       05 0072E   77       A
       05 0072F   FB       A
1132   05 00730   CD0000   N        CTIMR     ADH04                 STOP BLOW-OFF SEQUENCE
       05 00733   04       A
1133   05 00734   CD0000   N        STIMR     ADH05,300,EXTORET     START EXIT TO RETURN SEQ OF 300
       05 00737   05       A
       05 00738   1E       A
       05 00739   B00A     N
1134   05 0073B   CD0000   N        STIMR     ADH01,350,REXTOFLT    ALLOW 350MS TO CLEAR EXIT SENSO
       05 0073E   01       A
       05 0073F   23       A
       05 00740   DF0A     N
1135   05 00742   3A50FD   N        DIAGOCT   ADHRL3DC              SAVE LEDG EXIT(REVERSE PATH) TI
       05 00745   32C0FC   N
1136   05 00748   3E20     A        MVI       A,ADHOL3R
1137   05 0074A   32EEFC   N        STA       LEDGEXPT              EXPECT LEAD EDGE AT RETURN
1138   05 0074D   3E08     A        MVI       A,EXITB3
1139   05 0074F   32E8FC   N        STA       TEDGEXPT              EXPECT TRAIL EDGE AT EXIT
1140   05 00752   C35C07   N     ELSE!                              STOP DOCUEMENT ON REVERSE PATH
1141   05 00755   AF       A        CFLG      ADH02905              CLEAN UP HALT FLAG
       05 00756   3285F4   A
1142   05 00759   CDA309   N        CALL      ADH0ABRT              HALT ADH
1143                             ENDIF
1144   05 0075C   C9       A     RET
```

Referring particularly to the timing chart shown in FIG. 35 (*a, b, c*), an exemplary copy run wherein three copies of each of two simplex or one-sided originals in duplex mode is made. Referring to FIG. 32, the appropriate buttons of keyboard 808 are selected for the number of copies desired, i.e. 3 and document handler button 822, sorter select button 825 and two sided (duplex) button 811 depressed. The originals, in this case, two simplex or one-sided original are loaded into tray 233 of document handler 16 (FIG. 14) and the START button 805 depressed. It should be noted that the controller 500 is normally being instructed by the Background or State Checker (STCK reproduced in Table I) routine. On depression of button 805, the host machine 10 enters the Background PRINT state and the Run Event Table (FIG. 35) for the exemplary copy run programmed is built by controller 18 and stored in RAM memory 546. As described, the Run Event Table together with Background routine serve, via the multiple interrupt system and output refresh (through D.M.A.) to operate the various components of host machine 10 in integrated time relationship to produce the copies programmed as more fully described in the aforementioned copending application Ser. no. 677,473.

Figure 46A:
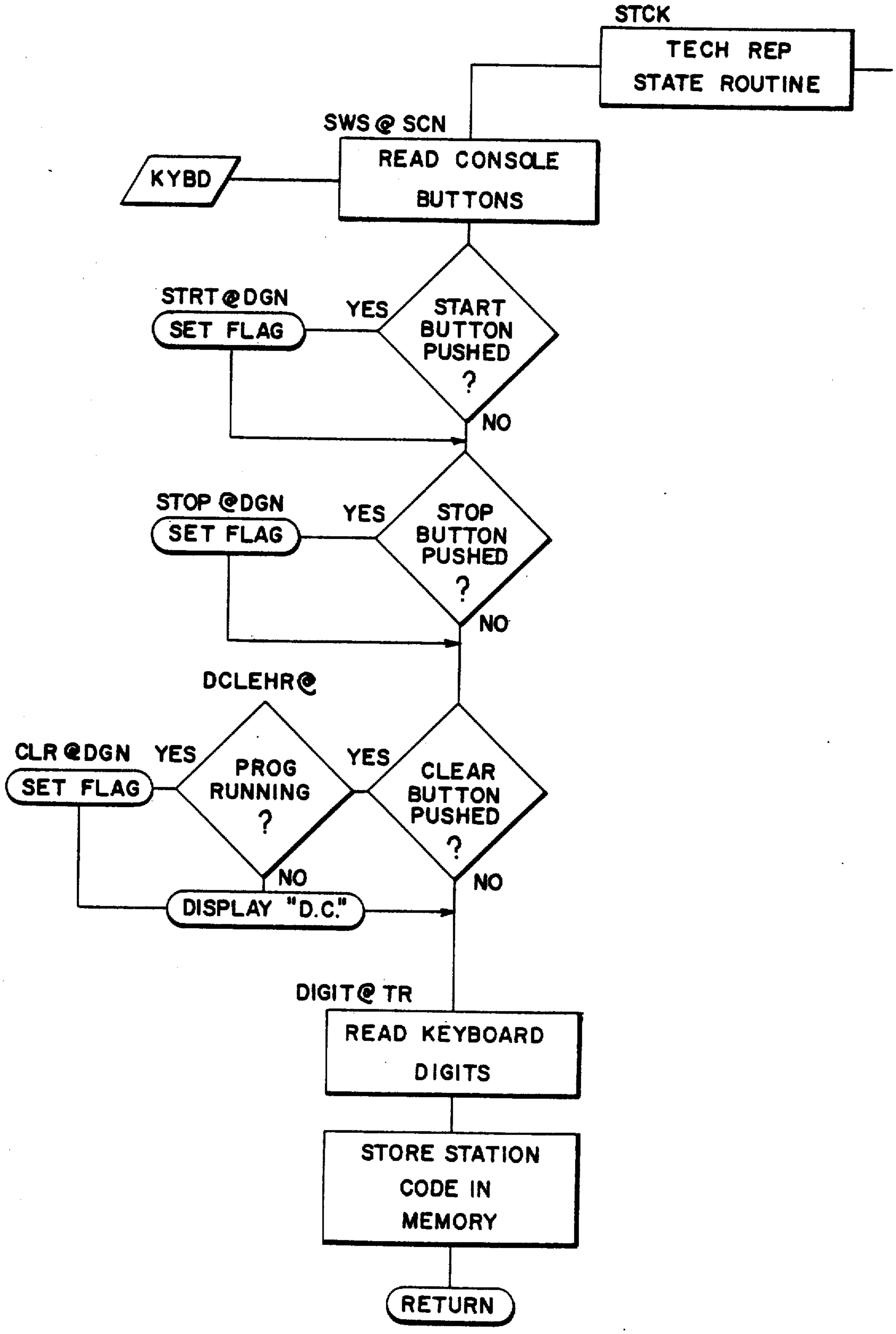
FIG. 46 is a flow chart which illustrates the operation of a diagnostic program which automatically moves documents to preselected stations in the document handler to check for proper alignment.
Figure 46B:
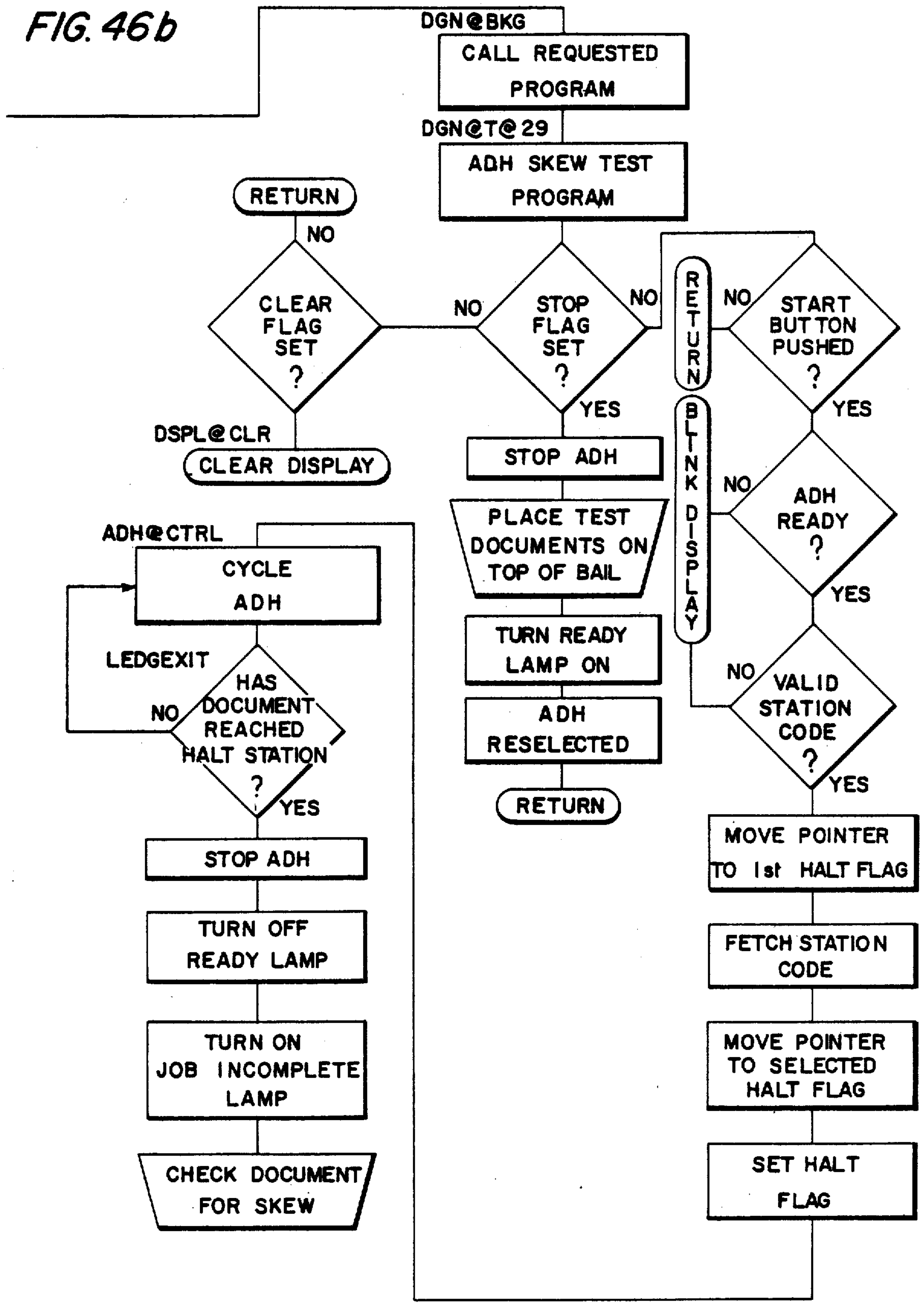

During the run, the first original is advanced onto platen 35 by document handler 16 wherein, as seen in FIG. 46(*a, b, c*), three exposures (FLASH SIDE 1,1,2) are made producing three latent electrostatic images on belt 20 in succession. As described earlier, the images are developed at developing station 28 and transferred to individual copy sheets fed forward (SHEET FEED 1,2,3) from main paper tray 100. The sheets bearing the images are carried from the transfer roll/belt nip by vacuum transport 155 to fuser 150 where the images are fixed. Following fusing, the copy sheets are routed by deflector 184 (referred to as an inverter gate in the tables) to return transport 182 (DIRECTS SIDE 1 COPIES TO RETURN TRANSPORT) and carried to auxiliary tray 102. The image bearing sheets entering tray 102 are aligned by edge pattern 187 in preparation for refeeding thereof.

Following delivery of the last copy sheet to auxiliary tray 102, the document handler 16 is activated to remove the first original from platen 35 and bring the second original into registered position on platen 35. The second original is exposed three times (FLASH SIDE 2), the resulting images being developed on belt 20 at developing station 28 and transferred to the opposite or second side of the previously processed copy sheets which are now advanced (FEED SIDE 2) in timed relationship from auxiliary tray 102. Following transfer, the side two images are fused by fuser 150 and routed, by gate 184 toward stop 190, the latter being raised for this purpose (INVERT SIDE 2 COPIES). Abutment of the leading edge of the copy sheet with stop 190 causes the sheet trailing edge to be guided into discharge chute 201, effectively inverting the sheet, now bearing images on both sides. The inverted sheet is fed onto transport 181 and into an output receptacle such as sorter 14 where, in this example, the sheets are placed in successive ones of the first three trays 212 of either the upper of lower arrays 210, 211 respectively depending on the disposition of deflector 220.

DIAGNOSTICS

As noted above, controller 18 is normally being instructed by the master or copy control program consisting of state sub-programs numbers 0–4 to make copies. However, ROM memory 545 also includes several other programs, accessible in the Service or Tech Rep state number 5, which instruct controller 18 to operate the machine components in an entirely different manner. For example, the reproduction machine of the present invention includes several diagnostic programs which aid the user or service personnel to maintain the reliability of the machine. Some of the programs are more complex than others, with the most complex programs bearing significant meaning only to trained service personnel. Accordingly, the machine is programmed or conditioned to prohibit the casual user from accessing the most complex routines. However, some of the programs of lesser complexity can be useful to the trained user depending upon the extent of her familiarity with the machine. Accordingly, the machine of the present invention has the capability of permitting the service personnel to progressively disclose more complex diagnostic programs to the user as her training correspondingly increases, while at the same time reserving the most complex programs for use only by the service personnel.

Figure 41:
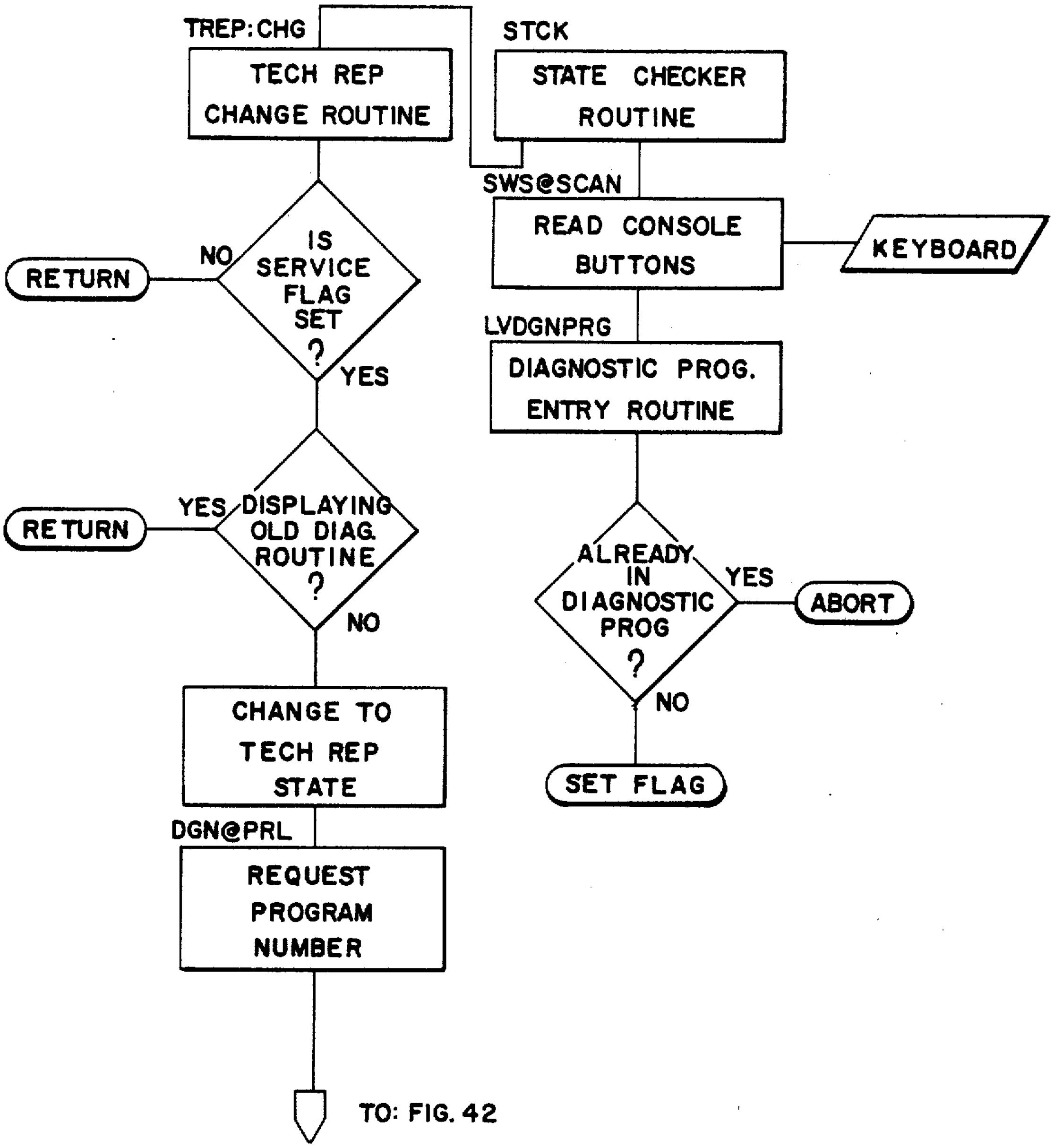
FIGS. 41–43 are flow charts which illustrate the sequence of events for entering the machine into a diagnostic program, as well as determining whether the user has access to the particular program requested.
Figure 42:
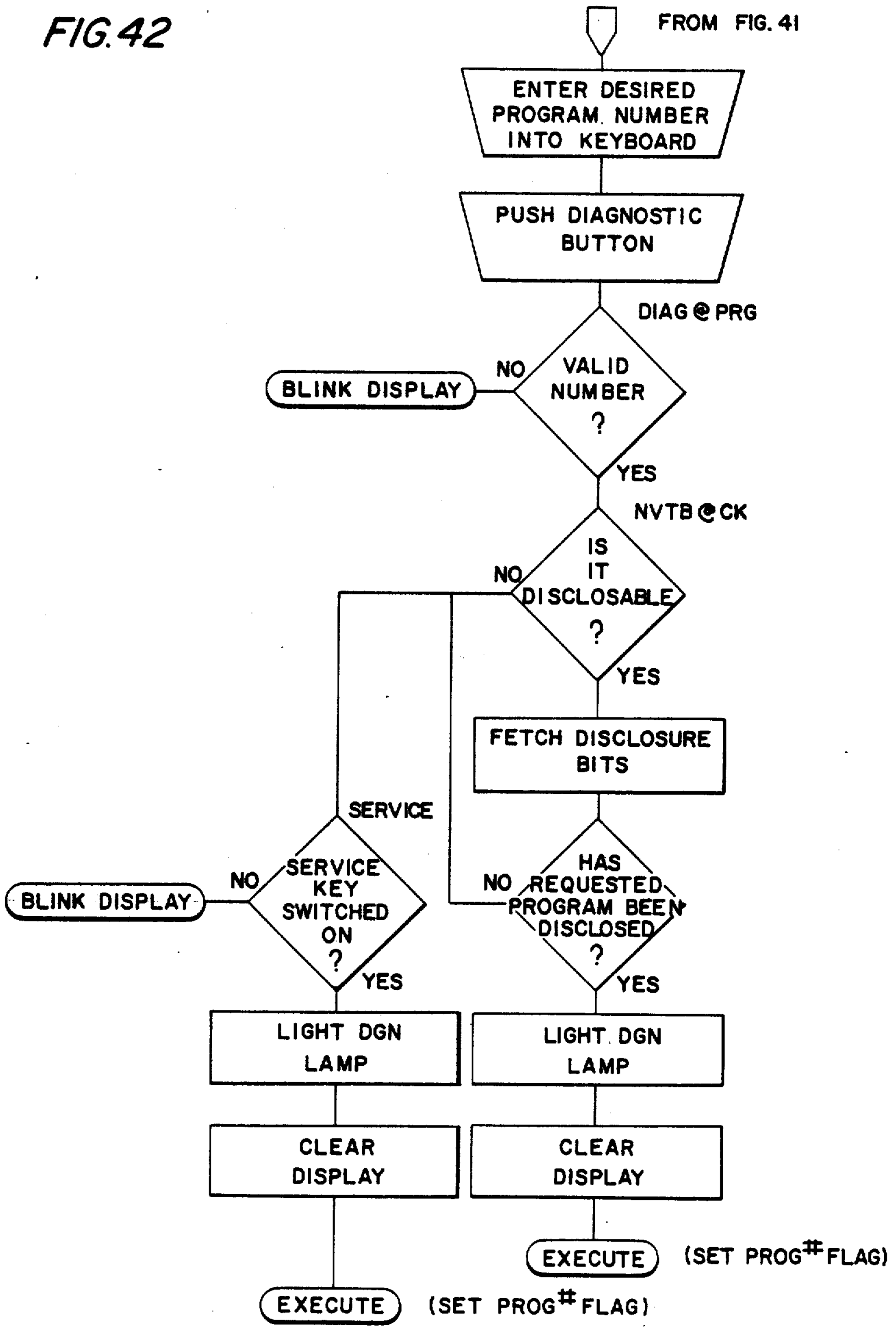

Referring now to FIGS. 41 and 42, along with the illustration of the operator console as shown in FIG. 32, the operating routine for selecting a desired diagnostic program will be explained. It will be remembered that the machine is normally under the control of the copy control program reproduced in Table I. Each state program therein periodically calls a Switch Scan routine (SWS@SCAN) reproduced in Table XI. To enter a diagnostic program, the operator presses diagnostic console button 801 which is read by the Switch Scan routine thereby causing it to call a Diagnostic Program Entry routine (LVDGNPRG of Table XII). This routine checks to see if there is an active diagnostic program in progress. If so, it causes the operating program to cease. Normally, there will not be another diagnostic program running. Consequently, a service flag (SER@ACT) will be set indicating that the user desires to enter a diagnostic program.

The state programs in the copy control program periodically call the Tech Rep Change (TREP:CHG) subroutine which monitors the computer memory to determine whether the service flag has been set. If it has been set and there is no diagnostic routine information being displayed, the copy control program will change to the Tech Rep state (also shown in Table I). This routine, in turn, will periodically call the Diagnostic Prologue (DGN@PRL) routine also shown in Table XII which puts a "dC" in the console display 830 thereby requesting that the operator enter the two digit code corresponding to the diagnostic program desired. After doing so, the diagnostics button 801 is then again pushed which, in turn, is picked up by the diagnostic program routine (DIAG@PRG of Table XIII). This routine determines whether the numbers entered to the display 830 correspond to valid diagnostic program numbers. For example, if numbers 10–36 are valid diagnostic programs and a number 52 was pushed, it would not be a valid number, with this program indicating such an error by blinking the display 830.

If it is a valid number, a Nonvolatile Memory Table Check routine (NVTB@CK) shown in Table XIV is called. This routine first checks to determine whether the requested program number is disclosable, i.e., whether this particular routine can be accessed by an operator other than the service personnel. For example, assume that program numbers 10–15 can be, but need not be, disclosed to the user, with the remaining programs being reserved for the service personnel. Then, if the requested program number is within the 10–15 range this routine will check the nonvolatile memory 610 to determine whether the service personnel has stored the access code corresponding to the requested program in the memory, i.e. disclosed the program to the user. If it has been disclosed, the display 230 is cleared and the light on the console above the diagnostic button 801 is turned on indicating that the machine is now under the control of the diagnostic program desired, i.e. controller 18 is being instructed by the desired diagnostic program and is no longer being currently instructed by the copy control program which controls the machine components to produce copies.

On the other hand, if it was determined that the requested program was not disclosable to the user, the controller makes another check to determine whether the service key 828 has been switched on or off via the SWITCH SCAN routine and, periodically called subroutines SERVICE and KEY@OFF of Table XII. Normally, only the service personnel possesses this key. When the key is turned on, all of the diagnostic program routines are accessible. However, if the requested program number has not been disclosed to the user nor has the service key been switched on, the display 230 will be caused to blink thereby indicating the error. Conversely, if the program is accessible, the program number flag is set signalling the controller to execute the requested program.

Figure 43A:
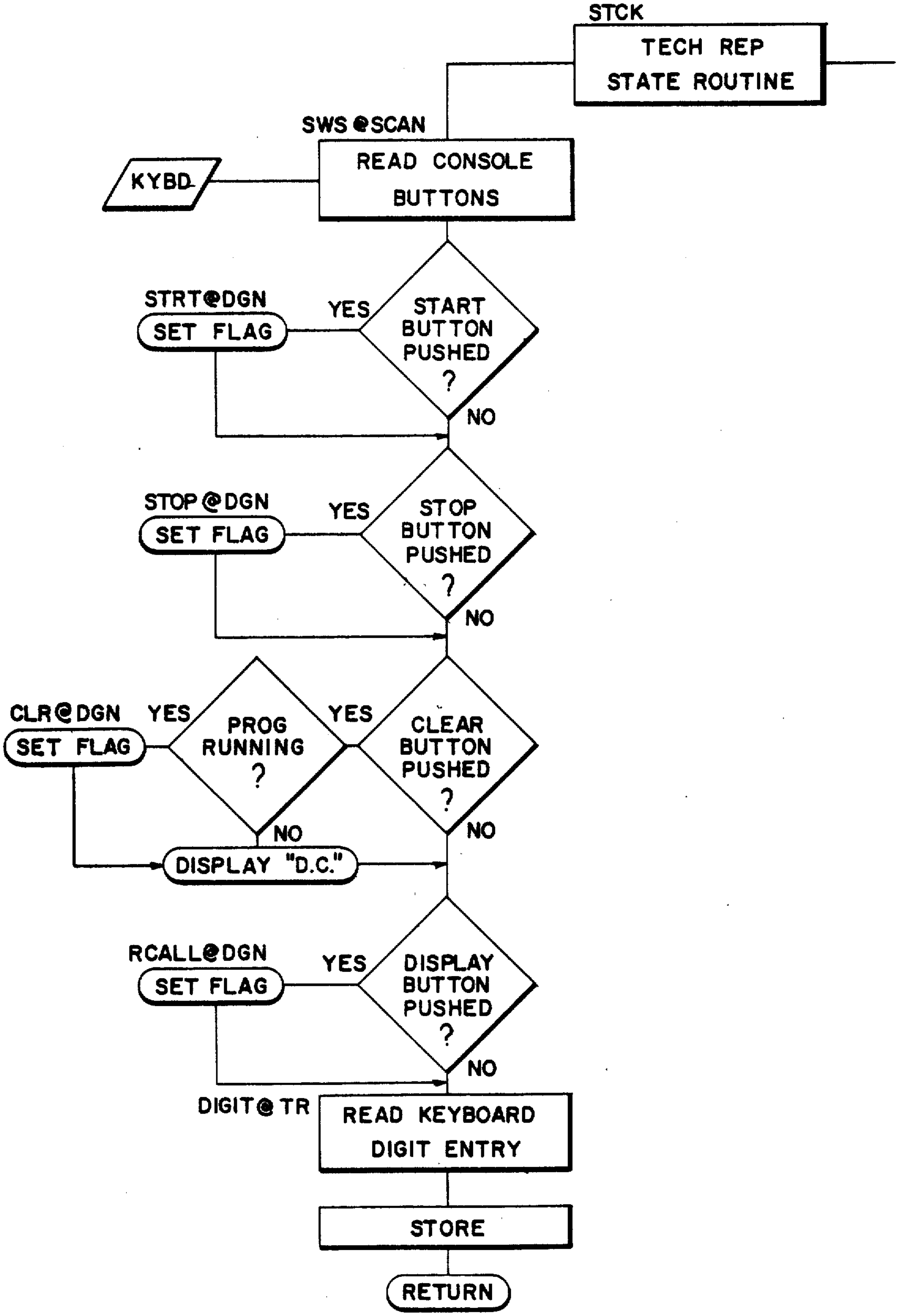
Figure 43B:
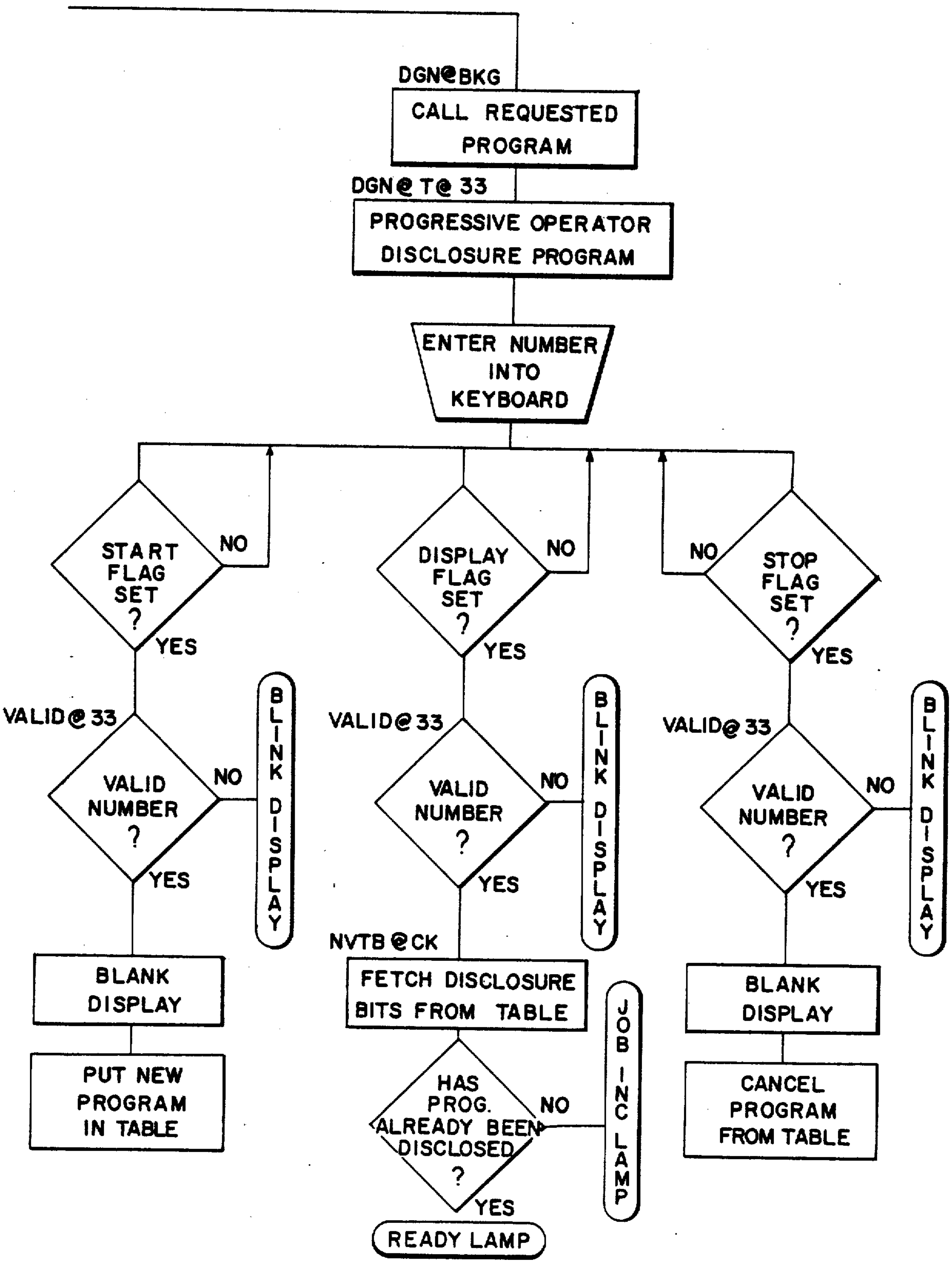

Referring to FIG. 43, in order to disclose more complex programs to the user as he becomes more familiar with the machine, the service personnel utilizes the Progressive Operator Disclosure Program (DGN@T@33) shown in Table XV. This program is not disclosable to the user and can be accessed only by the service personnel through the use of his service key. With the switch 828 turned on, the program is entered in the manner set forth above. To determine whether a particular program has already been disclosed, he enters the program access code number into keyboard 808 and pushes the Display button 809. The Switch Scan routine (SWS@SCAN) reads the various console buttons to determine whether they have been pushed, and, in this state, sets a flag, RCALL@DGN, indicating that the Display button 809 has been pushed. Similarly, another routine (DIGIT@TR of Table XVI) reads the numbers entered in the keyboard 808 and stores them in a register or memory location for further use.

The Disclosure program (DGN@T@33) cause the controller to read the Display flag and calls a subroutine (VALID@33) which, in turn, checks the entered number to determine whether it is within a predetermined range. If it is not a valid number, the display 230 will blink indicating that the number does not correspond to a designated program number. If this test is passed, the controller 18 interrogates the disclosure bits in a table in the non-volatile memory 610, via routine NVTB@CK, such bits having been previously placed in dedicated locations therein by the service personnel.

As described above, this routine interrogates the memory to determine whether a bit or access code for the requested routine has been stored in the memory thereby indicating that it has already been disclosed. If it has been disclosed, one of the console lamps 830 (READY) will be turned on. If it has not been disclosed, another lamp (JOB INCOMPLETE) is lit. Accordingly, the service personnel can determine whether a particular program has already been disclosed to the user.

If he wishes to disclose a new program, he merely enters the number into keyboard 808 and presses Start button 805. If it is a valid number, its digital representation will be stored in memory 610 so that the user can now access the disclosed program. Conversely, if he wishes to cancel a program already disclosed, the stop button 806 is pushed instead. This removes the entered program number from memory 610 so that only the service personnel can access the diagnostic program. By storing the disclosed program access code in the non-volatile memory 610, it is insured that the code will not be lost in the event of a power failure, etc.

Figure 44:
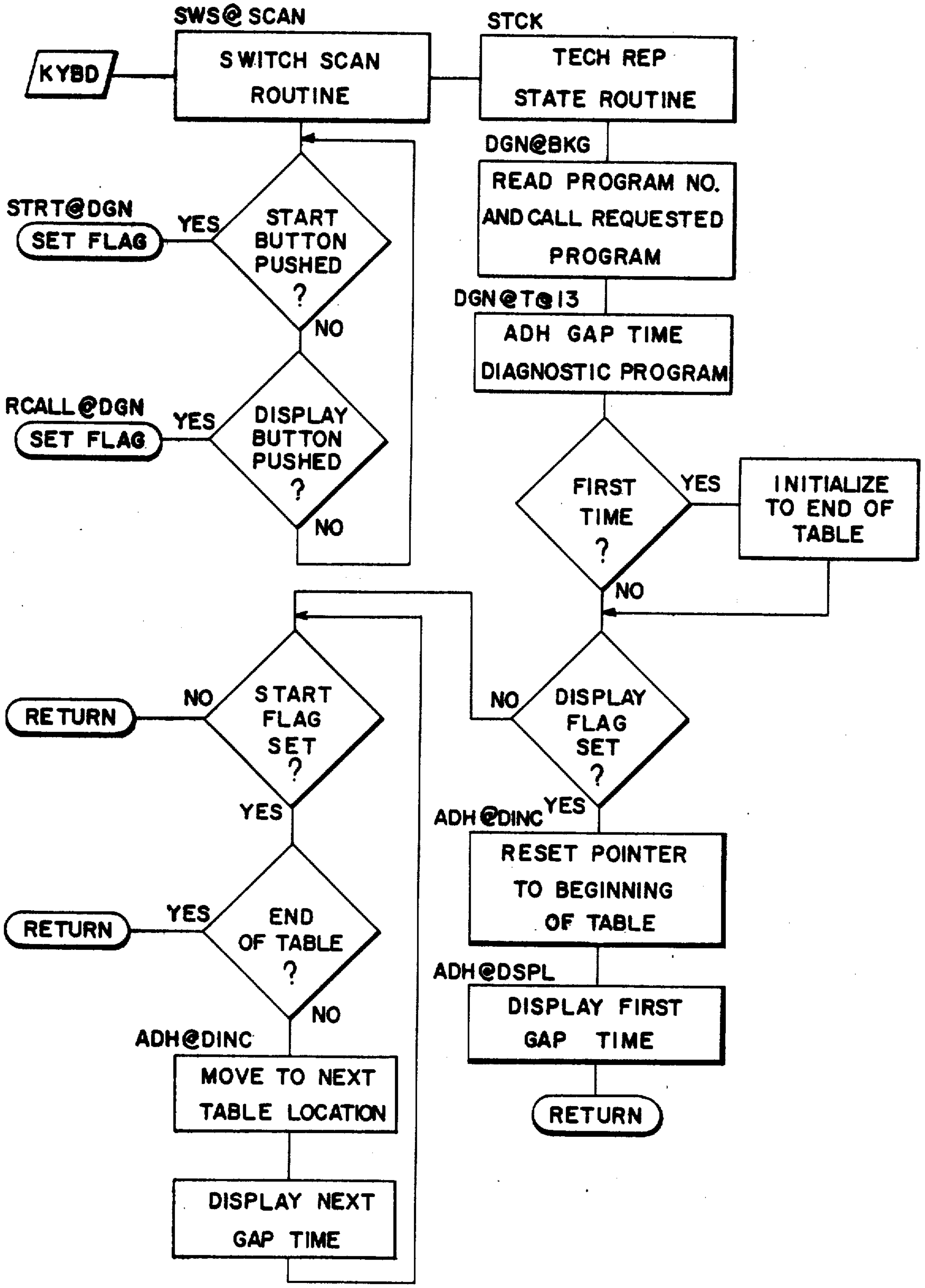
FIG. 44 is a flow chart which illustrates the operation of a diagnostic program for displaying document travel times in the document handler.

Referring now to FIGS. 44 and 14, a diagnostic program for the automatic document handler (ADH) 16 will be described. Document handler 16 includes four paper path sensors hereinafter referred to as the kick sensor 246, the wait sensor 280, the exit sensor 281, and the return sensor 282. As the original documents 2 cycle through the ADH as previously described, each sensor senses the leading and trailing edge of the document. For example, if the photocell sensor goes from light to dark, then it is sensing a leading edge. However, if the sensor goes from dark to light it is sensing a trailing edge. Each of the sensors are coupled to a free running global counter or timer, referred to as a diagnostic counter, DIAG CT, in the tables. The diagnostic counter can be any of a variety of known counting devices. In the preferred embodiment, it is a specified register which is periodically incremented by real time clock 670.

When each sensor senses a leading or trailing edge of the document 2, the controller reads the time of the diagnostic counter and stores it in a specified addresses in the RAM memory 546. These times are accessed by the ADH Gap Time Diagnostic program (DGN@T@13) shown in Table XVII. This routine reads the addresses of the stored times from the Gap Time Table shown in TABLE XVIII. The Gap Time Table defines a plurality of stations or gap times, i.e. the time it takes for a document to travel between various preselected sensors. For example, one gap time may be the time it takes the leading edge of the document to travel from the exit sensor 281 to the return sensor 282. In such case, when the exit sensor 281 senses a leading edge of a document, it will read the diagnostic counter and store that time in the table (see, e.g. Lead Edge Exit routine (LEDGEXIT) of Table XXIII). Similarly, when the return sensor 282 senses the document, it also will store that time in the table. Consequently, to read that gap time, a pointer, e.g. an index register, is set to the particular address of the Gap Time Table which, in turn, contains the addresses in RAM memory 546 of these two times. One time is then subtracted from the other to determine the particular gap time, i.e. the time of document travel between these sensors. It should be realized that a particular "gaps" defined in the Gap Time Table can be changed if desired.

Referring now especially to FIG. 44, the ADH Gap Time Diagnostic (DGN T 13) program is entered in the usual manner as previously described to determine if this program has been disclosed to the user. If so, the program checks to determine whether this is the first time that this particular program has been requested. If it is the first time, the pointer is initialized by setting it to the end of the Gap Time Table. The routine then checks to see if the display flag (RCALL@DGN) has been set by the operator pushing the display select button 809 on console 800. If this button has been pushed, the switch scan routine will set a flag (RCALL@DGN) which is tested by the Diagnostic routine. If it has been set, the pointer will be decremented by the ADH Display Decrementing routine (ADH@DINC) shown in Table XIX. This will cause display 230 to blank for approximately one-half second in order to permit the viewer to distinguish between the gap time about to be displayed and an old gap time that may be currently displayed. Then the gap time identified by the pointer (or identifier as sometimes referred to in the tables) is calculated and displayed in the display 230 via the ADH display routine (ADH@DSPL) which is also shown in Table XIX. Accordingly, the first gap time of the previous document run will appear in the display. The operator or service personnel can compare this gap time with standard times and make necessary adjustments to the machine, if required, thereby insuring proper synchronism with the machine processor.

In order to display the next gap time the operator pushes start button 805. This sets the start flag (STRT@DGN) which is picked up by the Diagnostic program. It will check if the pointer is set at the end of the table. If not, the pointer is moved to the next table location and the next gap time is calculated and displayed in the display 230 as previously described. In order to display the next gap time the start button 805 is again pushed and the next gap time is analogously displayed. This operaton occurs until the pointer reaches the end of the table.

Figure 45A:
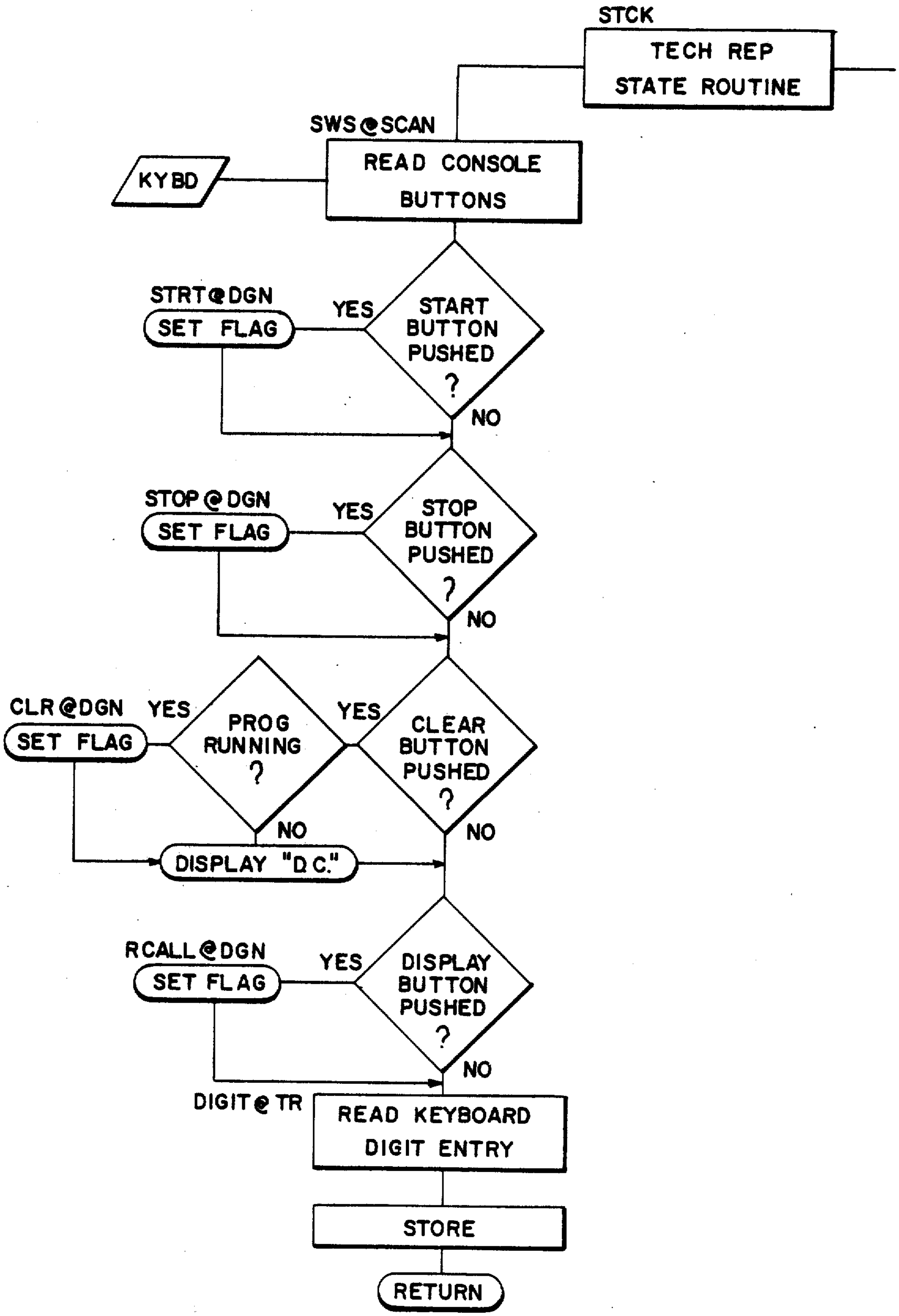
FIG. 45 is a flow chart which illustrates the operation of a diagnostic program for continuously cycling documents through the document handler and, if desired, displaying successive document travel times between various stations therein.
Figure 45B:
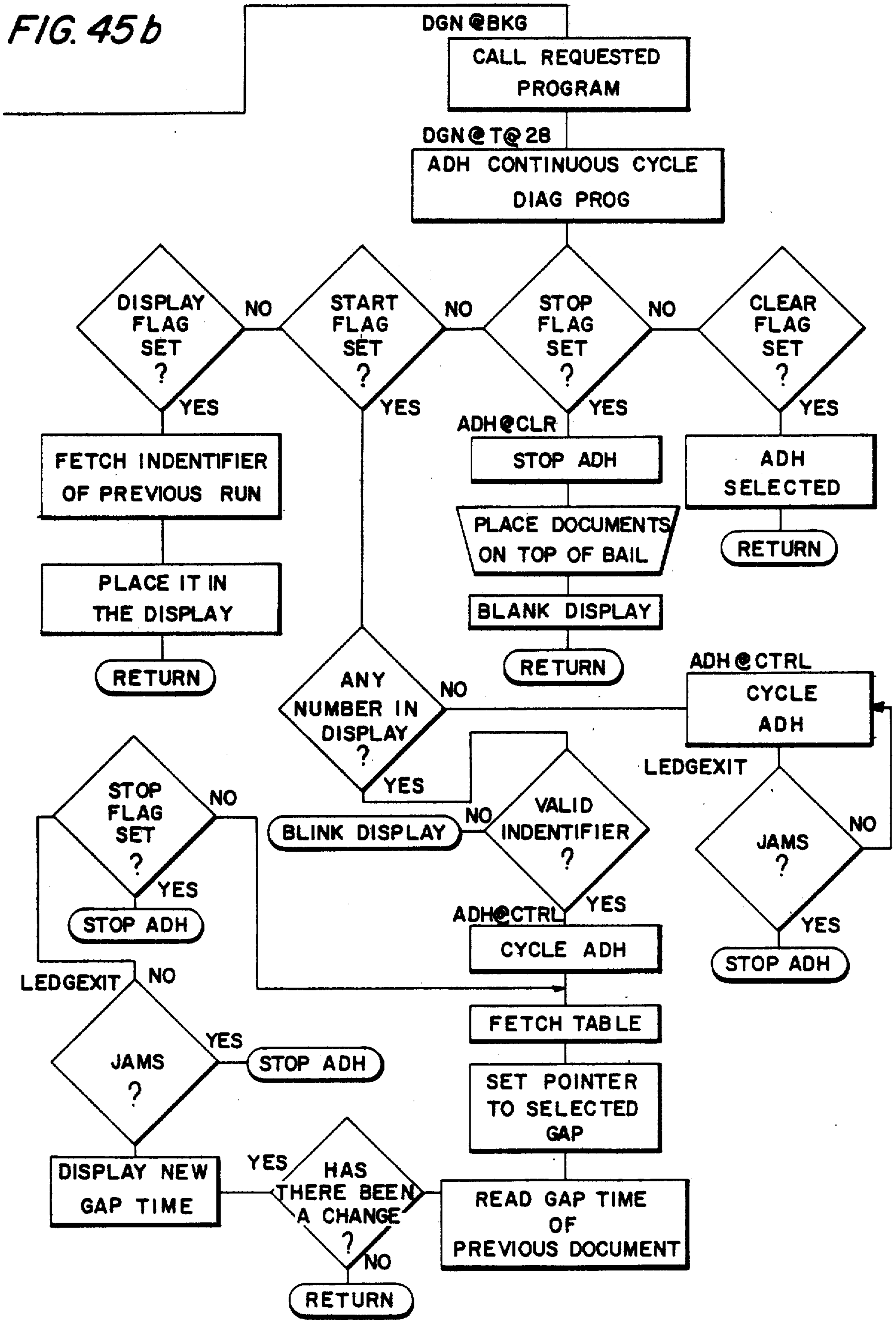

The previous routine provides the ability to check the gap times of an earlier run during normal ADH operation. However, in some instances it is desirable to activate or cycle the ADH without making copies in order to check for potential problem areas. The ADH Continuous Cycle Diagnostic program (DVN@T@28 as shown in Table XX) provides this ability. It should be noted that due to the complexity of this routine it is not disclosable to the casual operator and can be accessed only by the service personnel by switching the key switch 828 on. As illustrated in FIG. 45, this routine interacts not only with the start button 805 and display select button 809 as in the previous routine, but also with the clear button 817, stop button 806 and keyboard 808. Pushing each of these buttons will set a specific flag as previously discussed.

By pushing the stop button 805, the ADH will come to a stop and display 230 will blank. At this time the operator should place the test documents on top of separator or bail bar 235 as shown in FIG. 14. After this is done, the clear button 817 is pushed thereby selecting and preparing the document handler 16 for continuously cycling original documents through the ADH paper paths.

The operator then decides whether he wishes to display gap times as the documents cycle through the ADH. If so, he enters the desired gap time code number into the keyboard 808. If he wishes to display the same gap time as previously requested, for example, as requested in the ADH Gap Time program (DGN@T@13) previously described, then the display button 809 is pushed which automatically places that gap time number into the display 230. The start button 805 is then pushed. If there is no number in the display the ADH begins to continuously cycle the documents 2 through the paper path under the control of the ADH Control routine (ADH@CTRL) shown in Table XXII. If any jam occurs, as sensed by the sensors 246, 280, 281, and 282 (see, e.g. the Lead Edge Exit routine of Table XXIII) the ADH will be automatically stopped thereby by permitting the user to identify the potential problem areas.

If a number has been entered into the display indicating that it is desired to display selected gap times, the program checks to see if the entered digits correspond to a valid gap time identifier. It will be remembered that there are several gap times in the Gap Time Table which can be displayed. If it is valid identifier, the ADH begins to cycle. The gap time table is then fetched and the pointer is set to the selected gap time desired to be displayed. It will be remembered that the table will contain the times of the previous document run, as these times are being continually updated every time a document travels through the ADH. Therefore, the program will read the gap time of the previous document and compare it with the new gap time of each document as it cycles through the ADH. It will then compare the two gap times to determine if there has been a change. If so, it will display the new gap time. This sequence of events continues until the stop button 806 is pushed. Hence, this routine provides the ability to continually display the gap times for each document as it travels through the document handler 16. By visually monitoring the display 230 the service personnel can readily determine whether there is an undesirable fluctuation in the gap times for the various documents. To display and monitor a different gap time, a new number is entered into keyboard 808 and the same sequence as described above is followed.

Document misalignment is often a potential source of problems in the document handler 16, often leading to a jam condition. The ADH Skew Test program (DGN@T@29) as shown in Table XXI is utilized to check for proper document alignment. Again this routine is entered in the manner as previously described.

Referring to FIG. 46, by pushing the stop button 806, document handler 16 will come to a halt permitting the operator to clear the documents from the ADH 16 and place the test documents on top of bail bar 235. When the appropriate covers (not shown) are closed, an appropriate console light 830 will be activated to indicate that the ADH has been reselected and is ready for further operation.

The operator then enters a one digit station code into the keyboard 808. The station code corresponds to selected stations in document handler 16. For example, station code number 1 corresponds to the station in the document handler with the leading edge of the document 2 underneath exit sensor 281 on its forward path towards platen 35. Other station codes for other stations are defined in a similar manner. In the preferred embodiment there are 5 valid station codes. As previously described, the digit read routine (DIGIT@TR) will read the enter digit and store it in a specified memory location. When the start button 805 is pushed, the controller will read that memory location and determine whether that is a valid station code, i.e. in this embodiment whether the digit entered is between the numbers 1 and 5. If so, the controller checks to make sure that there are no jams pending in the document handler 16 and that it is ready to be cycled again. If neither of the above tests are met, the display 230 is blinked to indicate the error. If the tests are met, a software pointer such as described previously, is moved to the address of the first of 5 halt flags which are stored in RAM memory 546. The halt flags correspond to sensors 246, 280, 281 and 282. The controller combines the address of the first half flag and combines it with the station code entered to move the pointer to the halt flag corresponding to the selected station. The correct halt flag is then set.

After the appropriate halt flag has been set, the document handler 16 is then cycled, moving the test documents 2 from paper tray 233 throughout the paper path cycle under the control of the ADH control routine (ADH@CTRL) of Table XXII. When the arrival of the document 2 is detected by sensors 246, 280, 281, 282, the controller checks to see if its corresponding halt flag is set. If so, the ADH is stopped. For example, when a document passes underneath sensor 281 on its forward path to platen 35, the Lead Edge Exit routine (TABLE XXIII) checks to see if its corresponding halt flag (ADH@29@1) is set. If so, the ADH is stopped.

After the document handler 16 has been stopped with the document 2 at the selected station, appropriate indicator lamps 830 on the console 800 are turned on to indicate that the operator may now check for document alignment. By entering new codes into the keyboard 808 the ADH can be recycled to bring the document to another station for inspection. Accordingly, this routine provides the service personnel with the ability to visually check the documents for skew at various locations throughout the document handler 16 thereby insuring proper operation.

It can now be realized that the present invention provides a control system which permits the utilization of the same console input selection devices to initiate entirely different machine activities depending upon the program currently instructing controller 18. For example, when controller 18 is being instructed by the Ready state program, the selection of Start button 805 causes the machine to begin to make copies. In contrast, when controller 18 is being instructed by the ADH Gap time Diagnostic program in the Tech Rep state, selection of Start button 805 causes the machine to display the next successive gap time. Analogously, in U.S. Ser. No. 829,028, Batchelor et al, entitled "Sample Copy System for Xerographic Reproduction Machine", filed concurrently herewith and having the same assignee as the present invention, depression of Start button 805 in the Print state will activate the sample copy sequence. The above application is hereby incorporated by reference. Similarly, keyboard 808 entries are utilized to select the station at which the documents 2 in the document handler 16 are to be stopped when the ADH Skew Test program is instructing controller 18, while normally such entries condition the machine to produce the entered number of copies.

Referring to Table I, as each state program (NOT READY, READY, PRINT, etc) is accessed by controller 18, it calls the Switch Scan routine of Table XI. This routine either calls other routines or sets flags which are read by the routines in the particular state program. In any event, the particular routines called or flags set will depend upon the program currently instructing controller 18. For example, when Start button 805 is pushed, the flag STRT@PRT is set in the NOT READY and READY states, the routine SMPL CPY is called in the PRINT state, and the flag STRT@DG is set in the TECH REP state. In such manner, selected of the same console input selection device will initiate different machine activities depending on the program currently instructing controller 18.

Therefore, while this invention has been described in connection with particular examples thereof, no limitation is intended thereby except as defined in the appended claims.

What is claimed is:

1. In a reproduction machine having machine components including an operator console with a fixed number of input selection devices, said machine including a programmable digital computer being instructed by a plurality of programs, the improvement comprising a method of utilizing the same selection device to initiate different machine activities, said method including:

storing the programs in a memory;

accessing the programs to instruct the computer to control the machine components in particular manner;

sensing the activation of the console selection devices every time a different program is accessed; and providing a unique output signal in response to the activation of the same devices for initiating different machine activity depending upon which program is currently instructing the computer.

2. A method of controlling a reproduction machine having machine components to permit the utilization of the same console input selection device to initiate different machine activities, said machine being controlled by a programmable digital computer, said method comprising:

defining machine operation into a plurality of different operational states;

storing a program in a memory for each operational state;

accessing the programs to instruct the computer to control the machine components in a particular manner relative to its respective operational state;

checking the console input selection device to determine if it has been activated each time a different program is accessed;

providing an output signal in response to the device being activated, with the signal being different depending upon the program currently in effect thereby initiating different machine activity.

3. The method of claim 2 wherein said output signal is a flag stored in a memory location.

4. The method of claim 2 wherein said output signal calls routines for controlling the actuation of machine components.

5. The method of claim 2 wherein some of the programs cooperate with each other to form a copy control program for instructing the computer to actuate the machine components to produce copies;

with other programs instructing the computer to control the machine components in such manner to diagnose machine malfunctions, and said diagnostic programs being accessed through another console input selection device.

* * * * *